(12) United States Patent
DuBois et al.

(10) Patent No.: US 10,602,758 B2
(45) Date of Patent: Mar. 31, 2020

(54) METHODS AND COMPOSITIONS FOR IMPROVED TASTE QUALITY

(71) Applicant: Almendra Pte. Ltd, Singapore (SG)

(72) Inventors: Grant E. DuBois, Roswell, GA (US); Rafael I. San Miguel, Atlanta, GA (US)

(73) Assignee: Almendra PTE. LTD, Singapore (SG)

( * ) Notice: Subject to any disclaimer, the term of this patent is extended or adjusted under 35 U.S.C. 154(b) by 0 days.

(21) Appl. No.: 16/386,012

(22) Filed: Apr. 16, 2019

(65) Prior Publication Data

US 2019/0313669 A1    Oct. 17, 2019

Related U.S. Application Data

(60) Provisional application No. 62/658,208, filed on Apr. 16, 2018.

(51) Int. Cl.
| | |
|---|---|
| *A23L 2/56* | (2006.01) |
| *A23L 27/30* | (2016.01) |
| *A23L 2/60* | (2006.01) |
| *A23L 27/00* | (2016.01) |

(52) U.S. Cl.
CPC ............ *A23L 2/56* (2013.01); *A23L 2/60* (2013.01); *A23L 27/32* (2016.08); *A23L 27/34* (2016.08); *A23L 27/36* (2016.08); *A23L 27/88* (2016.08); *A23V 2002/00* (2013.01)

(58) Field of Classification Search
CPC .. A23L 2/56; A23L 27/88; A23L 27/32; A23L 27/34; A23L 27/36; A23L 2/60
USPC .................................. 426/649, 590, 650, 74
See application file for complete search history.

(56) References Cited

U.S. PATENT DOCUMENTS 4,551,342 A * 11/1985 Nakel et al.
2010/0267847 A1* 10/2010 Yoshinaka et al.
2016/0198751 A1* 7/2016 Fletcher et al.

* cited by examiner

*Primary Examiner* — Helen F Heggestad
(74) *Attorney, Agent, or Firm* — Thomas|Horstemeyer, LLP

(57) ABSTRACT

In one aspect, the disclosure relates to sweetener compositions, methods of making same, and products comprising same. In various aspects, the disclosed sweetener compositions comprise a sweetening agent and a taste modulator component. The taste modulator component improves key properties associated with many sweetening agents, including maximal sweetness response; mitigates flavor profile issues such as bitter and/or licorice-like off-tastes; improves sweetness onset rate and lingering sweet aftertaste properties; improves desensitization/adaptation profile issues; and improves body/mouthfeel characteristics. This abstract is intended as a scanning tool for purposes of searching in the particular art and is not intended to be limiting of the present disclosure.

24 Claims, 3 Drawing Sheets

METHODS AND COMPOSITIONS FOR IMPROVED TASTE QUALITY

CROSS-REFERENCE TO RELATED APPLICATIONS

This application claims the benefit of U.S. Provisional Application No. 62/658,208, filed on Apr. 16, 2018, which is incorporated herein by reference in its entirety.

BACKGROUND

Natural sugars, such as sucrose, fructose and glucose, are utilized in the food and beverage industries to provide a pleasant taste to foods and beverages. In addition, natural sugars are commonly used in pharmaceuticals, nutraceuticals, and oral hygienic/cosmetic products to similarly impart a pleasant taste. Sucrose, in particular, imparts a taste that is highly preferred by many consumers. Although sucrose provides superior sweetness characteristics, it is caloric. High-potency ("HP") sweeteners have been introduced to address consumer demand for products having a pleasant taste, while at the same time meet increasing demand for healthier, reduced calorie products. Moreover, the demand for healthier, reduced calorie products is being driven by public policy and regulatory mandates.

However, HP sweeteners differ significantly from natural caloric sugars in ways that frustrate consumers and limit market penetration of products containing many HP sweeteners. On a taste basis, HP sweeteners exhibit temporal profiles, maximal responses, flavor profiles, mouthfeels, and/or adaptation behaviors that differ from sugar. Commonly, HP sweeteners exhibit delayed sweetness onset, lingering sweet aftertaste, bitter taste, metallic taste, astringent taste, cooling taste and/or licorice-like taste. HP sweeteners may be synthetic chemicals, natural substances, physically or chemically modified natural substances, and/or reaction products obtained from synthetic and/or natural substances. The desire for natural HP sweeteners with favorable taste characteristics remains high.

One class of HP sweeteners are the steviol glycosides. However, utilization has been limited to date by certain undesirable taste properties, including licorice taste, bitterness, astringency, sweet aftertaste, bitter aftertaste, and licorice aftertaste. These undesirable taste properties tend to become more prominent with increased concentration. For example, these undesirable taste attributes are particularly prominent in carbonated beverages, where full replacement of sugar may involve concentrations of steviol glycosides that exceed 500 mg/L.

Importantly, although there exist certain taste modulators that have addressed some or many of the undesirable taste properties of HP sweeteners, the use of taste modulators has added significant cost to the use of HP sweeteners. For example, although a blend consisting of a steviol glycoside, rebaudioside A, with meso-erythritol can ameliorate the undesirable taste properties of rebaudioside A, it also results in a cost increase of about 2- to 4-fold for the good-tasting blends compared to rebaudioside A alone. The cost increase is even more significant when compared to the costs associated with sweeteners such as aspartame- or aspartame/acesulfame-sweetened products.

Despite advances in compositions and methods for sweetening foods, beverages, and other products, there is a scarcity of HP sweeteners that have both the taste properties of sucrose, fructose and glucose and suitably low cost for widespread use. These needs and other needs are satisfied by the present disclosure.

SUMMARY

In accordance with the purpose(s) of the present disclosure, as embodied and broadly described herein, the disclosure, in one aspect, relates to sweetener compositions, methods of making same, and products comprising same. In various aspects, the disclosed sweetener compositions comprise a sweetening agent and a taste modulator component. The taste modulator component improves key properties associated with many sweetening agents, including maximal sweetness response; mitigates flavor profile issues such as bitter and/or licorice-like off-tastes; improves sweetness onset rate and lingering sweet aftertaste properties; improves desensitization/adaptation profile issues; and improves body/mouthfeel characteristics.

Disclosed are taste modulator compositions comprising a first taste modulator component comprising a first salt having a first cation selected from $Na^+$, $K^+$, $Ca^{2+}$, and $Mg^{2+}$ and a first anion; and a second modulator component comprising a second salt having a second cation selected from $Na^+$, $K^+$, $Ca^{2+}$, and $Mg^{2+}$ and a second anion; such that the first taste modulator component is present at a concentration of from about 0.1 mM to about 25 mM if the first cation is $Na^+$ or $K^+$, or at a concentration of from about 0.1 mM to about 10 mM if the first cation is $Ca^{2+}$ or $Mg^{2+}$; and such that the second taste modulator component is present at a concentration of from about 0.1 mM to about 25 mM if the second cation is $Na^+$ or $K^+$, or at a concentration of from about 0.1 mM to about 10 mM if the second cation is $Ca^{2+}$ or $Mg^{2+}$.

Also disclosed are sweetener compositions comprising: a taste modulator component comprising a first salt having a first cation selected from $Na^+$, $K^+$, $Ca^{2+}$, and $Mg^{2+}$; and a sweetening agent. The taste modulator component of the disclosed sweetener composition can optionally further comprise a second cation, a third cation, and a fourth cation.

Also disclosed are methods for making a disclosed sweetener composition comprising: mixing a taste modulator component comprising a first salt having a first cation selected from $Na^+$, $K^+$, $Ca^{2+}$, and $Mg^{2+}$; and a sweetening agent; wherein the mixing is carried out until a mixture of the taste modulator and the sweetening agent is essentially homogeneous. In various aspects, the disclosed methods of making a disclosed sweetener composition can further comprise mixing a solvent with the taste modulator and the sweetening agent; and mixing the taste modulator, the sweetening agent, and the solvent until a solution or a suspension is essentially homogeneous. In a further aspect, the disclosed methods of making a disclosed sweetener composition can further comprise spray-drying or lyophilizing the solution or the suspension. In some aspects, the disclosed methods of making a disclosed sweetener composition can further comprise tableting a solid mixture of the taste modulator and the sweetening agent composition.

Also disclosed are products comprising a disclosed sweetening composition. In various aspect, the product can be a beverage, a food, a nutraceutical, or a concentrated sweetener composition.

Also disclosed are beverage compositions comprising: a disclosed taste modulator composition comprising a first taste modulator component comprising a first salt having a first cation selected from $Na^+$, $K^+$, $Ca^{2+}$, and $Mg^{2+}$ and a first anion; and a second modulator component comprising a second salt having a second cation selected from $Na^+$, $K^+$, $Ca^{2+}$, and $Mg^{2+}$ and a second anion; a sweetening agent selected from at least one non-caloric sweetener, at least one caloric sweetener, and combinations thereof; wherein each of the first taste modulator component is present at a concentration of from about 0.1 mM to about 25 mM if the first cation is $Na^+$ or $K^+$, or at a concentration of from about 0.1 mM to about 10 mM if the first cation is $Ca^{2+}$ or $Mg^{2+}$; wherein each of the second taste modulator component is present at a concentration of from about 0.1 mM to about 25 mM if the second cation is $Na^+$ or $K^+$, or at a concentration of from about 0.1 mM to about 10 mM if the second cation is $Ca^{2+}$ or $Mg^{2+}$; wherein the at least one non-caloric sweetening agent is present in an amount of from about 0.1 mg/L to about 1000 mg/L; and wherein the at least one caloric sweetening agent is present in an amount of from about 1 wt % to about 15 wt %.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims. In addition, all optional and preferred features and modifications of the described aspects are usable in all aspects of the disclosure taught herein. Furthermore, the individual features of the dependent claims, as well as all optional and preferred features and modifications of the described aspects are combinable and interchangeable with one another.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

Figure 1:
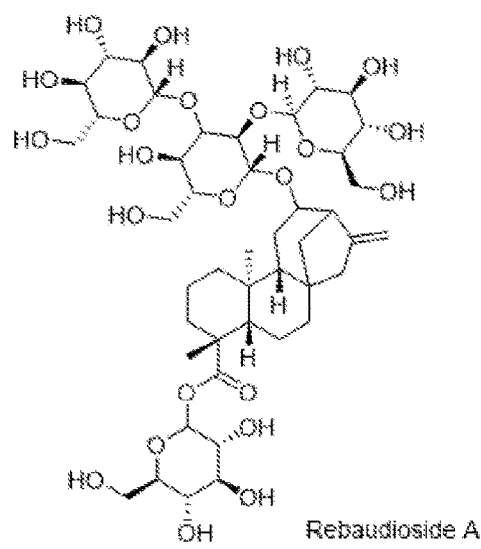
FIG. 1 shows chemical structures for representative *Stevia*-derived compounds as indicated (Rebaudioside A, Rebaudioside B, Rebaudioside C, Rebaudioside D, and Rebaudioside E).
Figure 1:
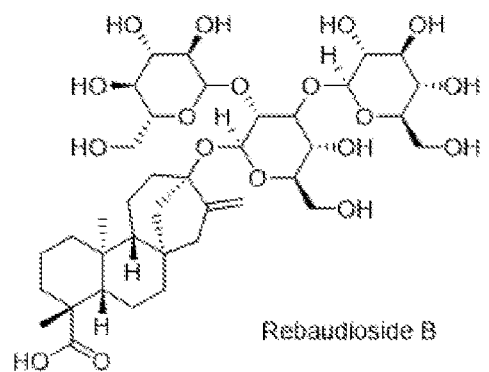
Figure 1:
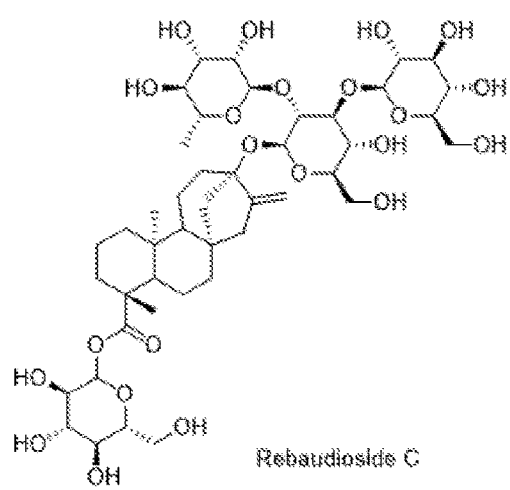
Figure 1:
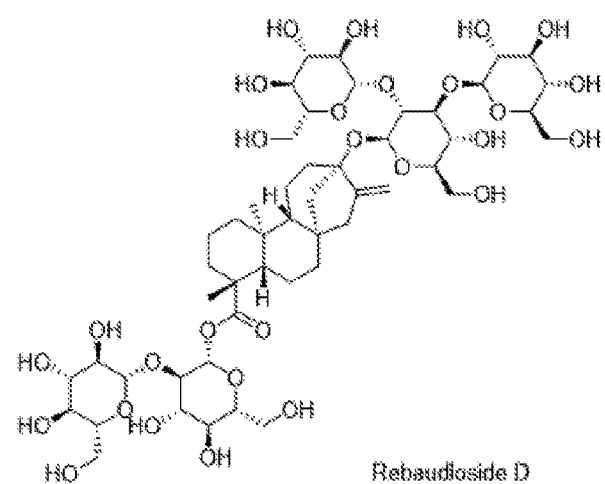
Figure 1:
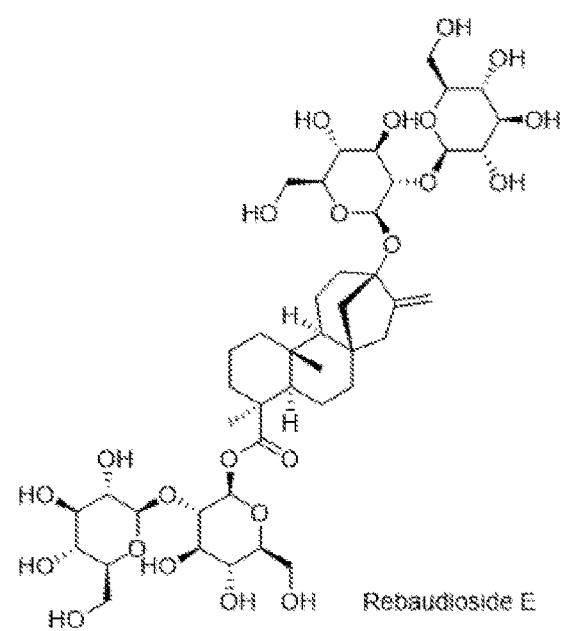

Additional advantages of the disclosure will be set forth in part in the description which follows, and in part will be obvious from the description, or can be learned by practice of the disclosure. The advantages of the disclosure will be realized and attained by means of the elements and combinations particularly pointed out in the appended claims. It is to be understood that both the foregoing general description and the following detailed description are exemplary and explanatory only and are not restrictive of the disclosure, as claimed.

DETAILED DESCRIPTION

Many modifications and other aspects disclosed herein will come to mind to one skilled in the art to which the disclosed compositions and methods pertain having the benefit of the teachings presented in the foregoing descriptions and the associated drawings. Therefore, it is to be understood that the disclosure are not to be limited to the specific aspects disclosed and that modifications and other aspects are intended to be included within the scope of the appended claims. The skilled artisan will recognize many variants and adaptations of the aspects described herein. These variants and adaptations are intended to be included in the teachings of this disclosure and to be encompassed by the claims herein.

Although specific terms are employed herein, they are used in a generic and descriptive sense only and not for purposes of limitation.

As will be apparent to those of skill in the art upon reading this disclosure, each of the individual aspects described and illustrated herein has discrete components and features which may be readily separated from or combined with the features of any of the other several aspects without departing from the scope or spirit of the present disclosure.

Any recited method can be carried out in the order of events recited or in any other order that is logically possible. That is, unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

All publications mentioned herein are incorporated herein by reference to disclose and describe the methods and/or materials in connection with which the publications are cited. The publications discussed herein are provided solely for their disclosure prior to the filing date of the present application. Nothing herein is to be construed as an admission that the present disclosure is not entitled to antedate such publication by virtue of prior disclosure. Further, the dates of publication provided herein can be different from the actual publication dates, which can require independent confirmation.

While aspects of the present disclosure can be described and claimed in a particular statutory class, such as the system statutory class, this is for convenience only and one of skill in the art will understand that each aspect of the present disclosure can be described and claimed in any statutory class.

It is also to be understood that the terminology used herein is for the purpose of describing particular aspects only and is not intended to be limiting. Unless defined otherwise, all technical and scientific terms used herein have the same meaning as commonly understood by one of ordinary skill in the art to which the disclosed compositions and methods belong. It will be further understood that terms, such as those defined in commonly used dictionaries, should be interpreted as having a meaning that is consistent with their meaning in the context of the specification and relevant art and should not be interpreted in an idealized or overly formal sense unless expressly defined herein.

Prior to describing the various aspects of the present disclosure, the following definitions are provided and should be used unless otherwise indicated. Additional terms may be defined elsewhere in the present disclosure.

Definitions

As used herein, "comprising" is to be interpreted as specifying the presence of the stated features, integers, steps, or components as referred to, but does not preclude the presence or addition of one or more features, integers, steps, or components, or groups thereof. Additionally, the term "comprising" is intended to include examples and aspects encompassed by the terms "consisting essentially of" and "consisting of." Similarly, the term "consisting essentially of" is intended to include examples encompassed by the term "consisting of."

As used in the specification and the appended claims, the singular forms "a," "an" and "the" include plural referents unless the context clearly dictates otherwise. Thus, for example, reference to "HP sweetener," "a sweetening agent," "a cation," or "a taste modulator," including, but not limited to, two or more such HP sweeteners, sweetening agents, cations, or taste modulators, including combinations of sweetening agents, cations, and taste modulators, and the like.

It should be noted that ratios, concentrations, amounts, and other numerical data can be expressed herein in a range format. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. Ranges can be expressed herein as from "about" one particular value, and/or to "about" another particular value. Similarly, when values are expressed as approximations, by use of the antecedent "about," it will be understood that the particular value forms a further aspect. For example, if the value "about 10" is disclosed, then "10" is also disclosed.

When a range is expressed, a further aspect includes from the one particular value and/or to the other particular value. For example, where the stated range includes one or both of the limits, ranges excluding either or both of those included limits are also included in the disclosure, e.g. the phrase "x to y" includes the range from 'x' to 'y' as well as the range greater than 'x' and less than 'y'. The range can also be expressed as an upper limit, e.g. 'about x, y, z, or less' and should be interpreted to include the specific ranges of 'about x', 'about y', and 'about z' as well as the ranges of 'less than x', less than y', and 'less than z'. Likewise, the phrase 'about x, y, z, or greater' should be interpreted to include the specific ranges of 'about x', 'about y', and 'about z' as well as the ranges of 'greater than x', greater than y', and 'greater than z'. In addition, the phrase "about 'x' to 'y'", where 'x' and 'y' are numerical values, includes "about 'x' to about 'y'".

It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a numerical range of "about 0.1% to 5%" should be interpreted to include not only the explicitly recited values of about 0.1% to about 5%, but also include individual values (e.g., about 1%, about 2%, about 3%, and about 4%) and the sub-ranges (e.g., about 0.5% to about 1.1%; about 5% to about 2.4%; about 0.5% to about 3.2%, and about 0.5% to about 4.4%, and other possible sub-ranges) within the indicated range.

As used herein, the terms "about," "approximate," "at or about," and "substantially" mean that the amount or value in question can be the exact value or a value that provides equivalent results or effects as recited in the claims or taught herein. That is, it is understood that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art such that equivalent results or effects are obtained. In some circumstances, the value that provides equivalent results or effects cannot be reasonably determined. In such cases, it is generally understood, as used herein, that "about" and "at or about" mean the nominal value indicated ±10% variation unless otherwise indicated or inferred. In general, an amount, size, formulation, parameter or other quantity or characteristic is "about," "approximate," or "at or about" whether or not expressly stated to be such. It is understood that where "about," "approximate," or "at or about" is used before a quantitative value, the parameter also includes the specific quantitative value itself, unless specifically stated otherwise.

As used herein, "*Stevia* sweetener," "*Stevia*-derived sweetener," and "*Stevia rebaudiana*-derived sweetener" can be used interchangeably. It is understood that a *Stevia* sweetener can refer to an extract, concentrate, juice, or other preparation obtained from leaves and/or other plant structures (e.g., fruits, seeds, stems or fleshy plant parts) of a plant in the genus *Stevia*, in some cases from the *Stevia rebaudiana* plant; or a mixture of one or more purified or partially purified component or compound from a plant in the genus *Stevia*, in some cases from the *Stevia rebaudiana* plant, such as steviol glycosides, stevioside, rebaudioside A, rebaudioside B, rebaudioside C, rebaudioside F, rebaudioside F, dulcoside A, steviolbioside, rubusoside, as well as other steviol glycosides found in a plant in the genus *Stevia*, in some cases from the *Stevia rebaudiana* plant, and mixtures thereof; glucosylated steviol glucosides; and combinations, mixtures, and kits comprising.

As used herein, the term "steviol glycoside(s)" refers to glycosides of steviol, including, but not limited to, naturally occurring steviol glycosides, e.g. Rebaudioside A, Rebaudioside B, Rebaudioside C, Rebaudioside D, Rebaudioside E, Rebaudioside F, Rebaudioside G, Rebaudioside H, Rebaudioside I, Rebaudioside J, Rebaudioside K, Rebaudioside L, Rebaudioside M (also referred to as Rebaudioside X), Rebaudioside N, Rebaudioside O, Stevioside, Steviolbioside, Dulcoside A, Rubusoside, etc., or synthetic steviol glycosides, e.g. enzymatically glucosylated steviol glycosides and combinations thereof.

As used herein, "monk fruit sweetener," "monk fruit-derived sweetener," "luo han guo sweetener," luo han guo-derived sweetener," and "*Siraitia grosvenorii*-derived sweetener" can be used interchangeably. It is understood that a monk fruit sweetener can refer to an extract, concentrate, juice, or other preparation obtained from leaves and/or other plant structures (e.g., fruits, seeds, stems or fleshy plant parts) of a plant in the genus *Siraitia*, in some cases from the *Siraitia grosvenorii* plant; or a mixture of one or more purified or partially purified component or compound from a plant in the genus *Siraitia*, in some cases from the *Siraitia grosvenorii* plant, such as mogroside I, mogroside II, mogroside III, mogroside IV (esgoside), neomogroside, 11-oxomogroside V, mogroside VI, mogroside V, mogroside IV, and siamenoside I, as well as other mogrosides and triterpene glycosides found in a plant in the genus *Siraitia*, in some cases from the *Siraitia grosvenorii* plant, and mixtures thereof; glucosylated mogrosides; and combinations, mixtures, and kits comprising any of the foregoing.

As used herein, the terms "high potency sweetener," "high-potency sweetener," and "HP sweetener," terms that can be used interchangeably, refers to a sweetening agent that can synthetic or natural in origin, with a sweetness potency greater than sucrose, e.g., a sweetness potency that can be about 2-fold-15,000-fold greater than sucrose. HP sweeteners are essentially non-caloric and used widely in manufacturing of diet and reduced calorie food. In general, HP sweeteners do not affect the blood glucose level and provide little or no nutritive value. Non-limiting examples of synthetic HP sweeteners include sucralose, potassium acesulfame, aspartame, alitame, saccharin, neohesperidin dihydrochalcone synthetic derivatives, cyclamate, neotame, dulcin, suosan, N—[N-[3-(3-hydroxy-4-methoxyphenyl)propyl]-L-α-aspartyl]-L-phenylalanine 1-methyl ester, N—[N-[3-(3-hydroxy-4-methoxyphenyl)-3-methylbutyl]-L-α-aspartyl]-L-phenylalanine 1-methyl ester, N—[N-[3-(3-methoxy-4-hydroxyphenyl)propyl]-L-α-aspartyl]-L-phenylalanine 1-methyl ester, salts thereof, and the like. Additional examples of synthetic HP sweeteners are described herein below. Non-limiting examples of natural HP sweeteners include Stevioside, Rebaudioside A, Rebaudioside B, Rebaudioside C, Rebaudioside E, Rebaudioside F, Steviolbioside, Dulcoside A, Rubusoside, mogrosides, brazzein, neohesperidin dihydrochalcone (NHDC), glycyrrhizic acid and its salts, thaumatin, perillartine, pernandulcin, mukuroziosides, baiyunoside, phlomisoside-I, dimethyl-hexahydrofluorene-dicarboxylic acid, abrusosides, periandrin, carnosiflosides, cyclocarioside, pterocaryosides, polypodoside A, brazilin, hernandulcin, phillodulcin, glycyphyllin, phlorizin, trilobatin, dihydroflavonol, dihydroquercetin-3-acetate, neoastilibin, trans-cinnamaldehyde, monatin and its salts, selligueain A, hematoxylin, monellin, osladin, pterocaryoside A, pterocaryoside B, mabinlin, pentadin, miraculin, curculin, neoculin, chlorogenic acid, cynarin, siamenoside and others. Additional examples of natural HP sweeteners are described herein below. It should be noted that HP sweeteners can be derived from the modification of natural high intensity sweeteners, for example, by fermentation, enzymatic treatment, or derivatization.

A "flavor" herein refers to the perception of taste and/or smell in a subject, which include sweet, sour, salty, bitter, umami, and others. The subject may be a human or an animal.

A "flavoring agent" herein refers to a compound or a biologically acceptable salt thereof that induces a flavor or taste in an animal or a human.

A "flavor modifier" herein refers to a compound or biologically acceptable salt thereof that modulates, including enhancing or potentiating, and inducing, the tastes and/or smell of a natural or synthetic flavoring agent in an animal or a human.

A "flavor enhancer" herein refers to a compound or biologically acceptable salt thereof that enhances and/or multiplies the tastes or smell of a natural or synthetic flavoring agent, or a comestible composition comprising the flavor enhancer.

As used herein, "flavors with modifying properties" or "FMP" can be used interchangeably, and refer to those generally recognized as safe (GRAS) ingredients that enhance, subdue or otherwise effect other flavors without themselves being sweeteners or flavorings. The Flavor and Extracts Manufacturing Association (FEMA) has developed a protocol published in the November 2013 Edition of Food Technology.

As used herein, the term "FEMA GRAS" means that an ingredient has been designated as generally recognized as safe by an independent Flavor Expert Panel for use in flavors, e.g., see Expert Panel, Toxicology, Decision Tree, Consumption Ratio, and Chart 486—FEMA GRAS Lists Numbers Included, FDA GRAS, Bulk Flavor Labeling Statement.

As used herein, the term "effective amount" refers to an amount that is sufficient to achieve the desired modification of a physical property of the composition or material. For example, an "effective amount" of a disclosed sweetener composition or a sweetening agent refers to an amount that is sufficient to achieve the desired improvement in the property modulated by the formulation component, e.g. achieving the desired level of sweetness, sweetness appearance time, sweetness linger, sweetness desensitization, body/mouthfeel, sourness, saltiness, bitterness, or astringency. The specific level in terms of wt % in a composition required as an effective amount will depend upon a variety of factors including the amount and type of sweetener, amount and type of taste modulator, amount and type of salts and/or cations, and end use of the product made using the composition.

As used herein, the terms "optional" or "optionally" means that the subsequently described event or circumstance can or cannot occur, and that the description includes instances where said event or circumstance occurs and instances where it does not.

Unless otherwise specified, temperatures referred to herein are based on atmospheric pressure (i.e. one atmosphere).

Taste Modulator Compositions

In various aspects, the present disclosure, relates to taste modulator compositions comprising one or more taste modulator components. The taste modulator component improves key properties associated with edible liquids and foodstuffs, including overall taste response; mitigation of various flavor profile issues; improves desensitization/adaptation profile issues; and improves body/mouthfeel characteristics. In a further aspect, the disclosed taste modulator compositions comprise a first taste modulator component comprising a first salt having a first cation selected from $Na^+$, $K^+$, $Ca^{2+}$, and $Mg^{2+}$. The taste modulator compositions can optionally further comprise one or more additional taste modulator components, e.g., a second taste modulator component comprising a second salt having a second cation selected from $Na^+$, $K^+$, $Ca^{2+}$, and $Mg^{2+}$; a third taste modulator component comprising a third salt having a third cation selected from $Na^+$, $K^+$, $Ca^{2+}$, and $Mg^{2+}$; and a fourth taste modulator component comprising a fourth salt having a fourth cation selected from $Na^+$, $K^+$, $Ca^{2+}$, and $Mg^{2+}$. In some instances, the additional taste modulator components each comprise a different cation selected from $Na^+$, $K^+$, $Ca^{2+}$, and $Mg^{2+}$.

In various aspects, a disclosed taste modulator composition comprises a first salt having a first cation independently selected from $Na^+$, $K^+$, $Ca^{2+}$, and $Mg^{2+}$; optionally a second salt having a second cation independently selected from $Na^+$, $K^+$, $Ca^{2+}$, and $Mg^{2+}$; optionally a third salt having a third cation independently selected from $Na^+$, $K^+$, $Ca^{2+}$, and $Mg^{2+}$; and optionally a fourth salt having a fourth cation independently selected from $Na^+$, $K^+$, $Ca^{2+}$, and $Mg^{2+}$;

provided that first cation, second cation, third cation, and fourth cation are not the same.

In a further aspect, a disclosed modulator composition comprises a first salt having a first cation and a first anion, such that the first cation is selected from $Na^+$, $K^+$, $Ca^{2+}$, and $Mg^{2+}$; and a first anion is selected from gluconate ($C_6H_{11}O_7^{-1}$), citrate ($C_6H_5O_7^{-3}$), hydrogen citrate ($C_6H_6O_7^{-2}$), dihydrogen citrate ($C_6H_7O_7^{-1}$), malate ($C_4H_6O_5^{-2}$), hydrogen malate ($C_4H_7O_5^{-1}$), maleate ($C_4H_2O_4^{-2}$), hydrogen maleate ($C_4H_3O_4^{-1}$), fumarate ($C_4H_2O_4^{-2}$), hydrogen fumarate ($C_4H_3O_4^{-1}$), succinate ($C_4H_4O_4^{-2}$), hydrogen succinate ($C_4H_5O_4^{-1}$), glutarate ($C_5H_6O_4^{-2}$), hydrogen glutarate ($C_5H_7O_4^{-1}$), adipate $C_6H_8O_4^{-2}$), hydrogen adipate $C_6H_9O_4^{-1}$), lactate ($C_3H_5O_3^{-1}$), tartrate ($C_4H_4O_6^{-2}$), bitartrate ($C_4H_5O_6^{-1}$), phosphate ($PO_4^{-3}$), monohydrogen phosphate ($HPO_4^{-2}$), dihydrogen phosphate ($H_2PO_4^-$), fluoride ($F^-$), chloride ($Cl^-$), sulfate ($SO_4^{-2}$), bisulfate ($HSO_4^{-1}$), nitrate ($NO_3^-$), carbonate ($CO_3^{-2}$), bicarbonate ($HCO_3^-$), glycerate ($C_3H_5O_4^{-1}$), glycolate ($C_2H_3O_3^{-1}$), or combinations thereof. In a specific aspect, the first anion comprises citrate ($C_6H_5O_7^{-3}$), chloride ($Cl^-$), phosphate ($PO_4^{-3}$), carbonate ($CO_3^{-2}$), and combinations thereof. Alternatively, in an aspect, the first anion comprises citrate ($C_6H_5O_7^{-3}$) or the first anion comprises chloride ($Cl^-$).

In a further aspect, a disclosed taste modulator composition comprises a first salt having a first cation and a first anion; optionally a second salt having a second cation and a second anion; optionally a third salt having a third cation and a third anion; and optionally a fourth salt having a fourth cation and a fourth anion; the first cation is independently selected from $Na^+$, $K^+$, $Ca^{2+}$, and $Mg^{2+}$; the second cation is independently selected from $Na^+$, $K^+$, $Ca^{2+}$, and $Mg^{2+}$; the third cation is independently selected from $Na^+$, $K^+$, $Ca^{2+}$, and $Mg^{2+}$; and the fourth cation is independently selected from $Na^+$, $K^+$, $Ca^{2+}$, and $Mg^{2+}$; the first anion is independently selected from gluconate ($C_6H_{11}O_7^{-1}$), citrate ($C_6H_5O_7^{-3}$), hydrogen citrate ($C_6H_6O_7^{-2}$), dihydrogen citrate ($C_6H_7O_7^{-1}$), malate ($C_4H_6O_5^{-2}$), hydrogen malate ($C_4H_7O_5^{-1}$), maleate ($C_4H_2O_4^{-2}$), hydrogen maleate ($C_4H_3O_4^{-1}$), fumarate ($C_4H_2O_4^{-2}$), hydrogen fumarate ($C_4H_3O_4^{-1}$), succinate ($C_4H_4O_4^{-2}$), hydrogen succinate ($C_4H_5O_4^{-1}$), glutarate ($C_5H_6O_4^{-2}$), hydrogen glutarate ($C_5H_7O_4^{-1}$), adipate $C_6H_8O_4^{-2}$), hydrogen adipate $C_6H_9O_4^{-1}$), lactate ($C_3H_5O_3^{-1}$), tartrate ($C_4H_4O_6^{-2}$), bitartrate ($C_4H_5O_6^{-1}$), phosphate ($PO_4^{-3}$), monohydrogen phosphate ($HPO_4^{-2}$), dihydrogen phosphate ($H_2PO_4^-$), fluoride ($F^-$), chloride ($Cl^-$), sulfate ($SO_4^{-2}$), bisulfate ($HSO_4^{-1}$), nitrate ($NO_3^-$), carbonate ($CO_3^{-2}$), bicarbonate ($HCO_3^-$), glycerate ($C_3H_5O_4^{-1}$), glycolate ($C_2H_3O_3^{-1}$), or combinations thereof; the second anion is independently selected from gluconate ($C_6H_{11}O_7^{-1}$), citrate ($C_6H_5O_7^{-3}$), hydrogen citrate ($C_6H_6O_7^{-2}$), dihydrogen citrate ($C_6H_7O_7^{-1}$), malate ($C_4H_6O_5^{-2}$), hydrogen malate ($C_4H_7O_5^{-1}$), maleate ($C_4H_2O_4^{-2}$), hydrogen maleate ($C_4H_3O_4^{-1}$), fumarate ($C_4H_2O_4^{-2}$), hydrogen fumarate ($C_4H_3O_4^{-1}$), succinate ($C_4H_4O_4^{-2}$), hydrogen succinate ($C_4H_5O_4^{-1}$), glutarate ($C_5H_6O_4^{-2}$), hydrogen glutarate ($C_5H_7O_4^{-1}$), adipate $C_6H_8O_4^{-2}$), hydrogen adipate $C_6H_9O_4^{-1}$), lactate ($C_3H_5O_3^{-1}$), tartrate ($C_4H_4O_6^{-2}$), bitartrate ($C_4H_5O_6^{-1}$), phosphate ($PO_4^{-3}$), monohydrogen phosphate ($HPO_4^{-2}$), dihydrogen phosphate ($H_2PO_4^-$), fluoride ($F^-$), chloride ($Cl^-$), sulfate ($SO_4^{-2}$), bisulfate ($HSO_4^{-1}$), nitrate ($NO_3^-$), carbonate ($CO_3^{-2}$), bicarbonate ($HCO_3^-$), glycerate ($C_3H_5O_4^{-1}$), glycolate ($C_2H_3O_3^{-1}$), or combinations thereof; the third anion is independently selected from gluconate ($C_6H_{11}O_7^{-1}$), citrate ($C_6H_5O_7^{-3}$), hydrogen citrate ($C_6H_6O_7^{-2}$), dihydrogen citrate ($C_6H_7O_7^{-1}$), malate ($C_4H_6O_5^{-2}$), hydrogen malate ($C_4H_7O_5^{-1}$), maleate ($C_4H_2O_4^{-2}$), hydrogen maleate ($C_4H_3O_4^{-1}$), fumarate ($C_4H_2O_4^{-2}$), hydrogen fumarate ($C_4H_3O_4^{-1}$), succinate ($C_4H_4O_4^{-2}$), hydrogen succinate ($C_4H_5O_4^{-1}$), glutarate ($C_5H_6O_4^{-2}$), hydrogen glutarate ($C_5H_7O_4^{-1}$), adipate $C_6H_8O_4^{-2}$), hydrogen adipate $C_6H_9O_4^{-1}$), lactate ($C_3H_5O_3^{-1}$), tartrate ($C_4H_4O_6^{-2}$), bitartrate ($C_4H_5O_6^{-1}$), phosphate ($PO_4^{-3}$), monohydrogen phosphate ($HPO_4^{-2}$), dihydrogen phosphate ($H_2PO_4^-$), fluoride ($F^-$), chloride ($Cl^-$), sulfate ($SO_4^{-2}$), bisulfate ($HSO_4^{-1}$), nitrate ($NO_3^-$), carbonate ($CO_3^{-2}$), bicarbonate ($HCO_3^-$), glycerate ($C_3H_5O_4^{-1}$), glycolate ($C_2H_3O_3^{-1}$), or combinations thereof; and the fourth anion is independently selected from gluconate ($C_6H_{11}O_7^{-1}$), citrate ($C_6H_5O_7^{-3}$), hydrogen citrate ($C_6H_6O_7^{-2}$), dihydrogen citrate ($C_6H_7O_7^{-1}$), malate ($C_4H_6O_5^{-2}$), hydrogen malate ($C_4H_7O_5^{-1}$), maleate ($C_4H_2O_4^{-2}$), hydrogen maleate ($C_4H_3O_4^{-1}$), fumarate ($C_4H_2O_4^{-2}$), hydrogen fumarate ($C_4H_3O_4^{-1}$), succinate ($C_4H_4O_4^{-2}$), hydrogen succinate ($C_4H_5O_4^{-1}$), glutarate ($C_5H_6O_4^{-2}$), hydrogen glutarate ($C_5H_7O_4^{-1}$), adipate $C_6H_8O_4^{-2}$), hydrogen adipate $C_6H_9O_4^{-1}$), lactate ($C_3H_5O_3^{-1}$), tartrate ($C_4H_4O_6^{-2}$), bitartrate ($C_4H_5O_6^{-1}$), phosphate ($PO_4^{-3}$), monohydrogen phosphate ($HPO_4^{-2}$), dihydrogen phosphate ($H_2PO_4^-$), fluoride ($F^-$), chloride ($Cl^-$), sulfate ($SO_4^{-2}$), bisulfate ($HSO_4^{-1}$), nitrate ($NO_3^-$), carbonate ($CO_3^{-2}$), bicarbonate ($HCO_3^-$), glycerate ($C_3H_5O_4^{-1}$), glycolate ($C_2H_3O_3^{-1}$), or combinations thereof. In some instances, the first cation, the second cation, the third cation, and the fourth cation are not the same. In other instances, some or all of the first cation, the second cation, the third cation, and the fourth cation can be the same, provided that the first anion, the second anion, the third anion, and the fourth anion are not the same.

In a further aspect, a disclosed taste modulator composition comprises a first salt having a first cation and a first anion; a second salt having a second cation and a second anion; optionally a third salt having a third cation and a third anion; and optionally a fourth salt having a fourth cation and a fourth anion; the first cation is independently selected from $Na^+$, $K^+$, $Ca^{2+}$, and $Mg^{2+}$; the second cation is independently selected from $Na^+$, $K^+$, $Ca^{2+}$, and $Mg^{2+}$; the third cation is independently selected from $Na^+$, $K^+$, $Ca^{2+}$, and $Mg^{2+}$; and the fourth cation is independently selected from $Na^+$, $K^+$, $Ca^{2+}$, and $Mg^{2+}$; the first anion is independently selected from gluconate ($C_6H_{11}O_7^{-1}$), citrate ($C_6H_5O_7^{-3}$), hydrogen citrate ($C_6H_6O_7^{-2}$), dihydrogen citrate ($C_6H_7O_7^{-1}$), malate ($C_4H_6O_5^{-2}$), hydrogen malate ($C_4H_7O_5^{-1}$), maleate ($C_4H_2O_4^{-2}$), hydrogen maleate ($C_4H_3O_4^{-1}$), fumarate ($C_4H_2O_4^{-2}$), hydrogen fumarate ($C_4H_3O_4^{-1}$), succinate ($C_4H_4O_4^{-2}$), hydrogen succinate ($C_4H_5O_4^{-1}$), glutarate ($C_5H_6O_4^{-2}$), hydrogen glutarate ($C_5H_7O_4^{-1}$), adipate $C_6H_8O_4^{-2}$), hydrogen adipate $C_6H_9O_4^{-1}$), lactate ($C_3H_5O_3^{-1}$), tartrate ($C_4H_4O_6^{-2}$), bitartrate ($C_4H_5O_6^{-1}$), phosphate ($PO_4^{-3}$), monohydrogen phosphate ($HPO_4^{-2}$), dihydrogen phosphate ($H_2PO_4^-$), fluoride ($F^-$), chloride ($Cl^-$), sulfate ($SO_4^{-2}$), bisulfate ($HSO_4^{-1}$), nitrate ($NO_3^-$), carbonate ($CO_3^{-2}$), bicarbonate ($HCO_3^-$), glycerate ($C_3H_5O_4^{-1}$), glycolate ($C_2H_3O_3^{-1}$), or combinations thereof; the second anion is independently selected from gluconate ($C_6H_{11}O_7^{-1}$), citrate ($C_6H_5O_7^{-3}$), hydrogen citrate ($C_6H_6O_7^{-2}$), dihydrogen citrate ($C_6H_7O_7^{-1}$), malate ($C_4H_6O_5^{-2}$), hydrogen malate ($C_4H_7O_5^{-1}$), maleate ($C_4H_2O_4^{-2}$), hydrogen maleate ($C_4H_3O_4^{-1}$), fumarate ($C_4H_2O_4^{-2}$), hydrogen fumarate ($C_4H_3O_4^{-1}$), succinate ($C_4H_4O_4^{-2}$), hydrogen succinate ($C_4H_5O_4^{-1}$), glutarate ($C_5H_6O_4^{-2}$), hydrogen glutarate ($C_5H_7O_4^{-1}$), adipate $C_6H_8O_4^{-2}$), hydrogen adipate $C_6H_9O_4^{-1}$), lactate ($C_3H_5O_3^{-1}$), tartrate ($C_4H_4O_6^{-2}$), bitartrate ($C_4H_5O_6^{-1}$), phosphate ($PO_4^{-3}$), monohydrogen phosphate ($HPO_4^{-2}$), dihydrogen phosphate ($H_2PO_4^-$), fluoride ($F^-$), chloride ($Cl^-$), sulfate ($SO_4^{-2}$), bisulfate ($HSO_4^{-1}$), nitrate ($NO_3^-$), carbonate ($CO_3^{-2}$), bicarbonate ($HCO_3^-$), glycerate ($C_3H_5O_4^{-1}$), glycolate ($C_2H_3O_3^{-1}$), or combinations thereof; the third anion is independently selected from gluconate ($C_6H_{11}O_7^{-1}$), citrate ($C_6H_5O_7^{-3}$), hydrogen citrate ($C_6H_6O_7^{-2}$), dihydrogen citrate ($C_6H_7O_7^{-1}$), malate ($C_4H_6O_5^{-2}$), hydrogen malate ($C_4H_7O_5^{-1}$), maleate ($C_4H_2O_4^{-2}$), hydrogen maleate ($C_4H_3O_4^{-1}$), fumarate ($C_4H_2O_4^{-2}$), hydrogen fumarate ($C_4H_3O_4^{-1}$), succinate ($C_4H_4O_4^{-2}$), hydrogen succinate ($C_4H_5O_4^{-1}$), glutarate ($C_5H_6O_4^{-2}$), hydrogen glutarate ($C_5H_7O_4^{-1}$), adipate $C_6H_8O_4^{-2}$), hydrogen adipate $C_6H_9O_4^{-1}$), lactate ($C_3H_5O_3^{-1}$), tartrate ($C_4H_4O_6^{-2}$), bitartrate ($C_4H_5O_6^{-1}$), phosphate ($PO_4^{-3}$), monohydrogen phosphate ($HPO_4^{-2}$), dihydrogen phosphate ($H_2PO_4^-$), fluoride ($F^-$), chloride ($Cl^-$), sulfate ($SO_4^{-2}$), bisulfate ($HSO_4^{-1}$), nitrate ($NO_3^-$), carbonate ($CO_3^{-2}$), bicarbonate ($HCO_3^-$), glycerate ($C_3H_5O_4^{-1}$), glycolate ($C_2H_3O_3^{-1}$), or combinations thereof; and the fourth anion is independently selected from gluconate ($C_6H_{11}O_7^{-1}$), citrate ($C_6H_5O_7^{-3}$), hydrogen citrate ($C_6H_6O_7^{-2}$), dihydrogen citrate ($C_6H_7O_7^{-1}$), malate ($C_4H_6O_5^{-2}$), hydrogen malate ($C_4H_7O_5^{-1}$), maleate ($C_4H_2O_4^{-2}$), hydrogen maleate ($C_4H_3O_4^{-1}$), fumarate ($C_4H_2O_4^{-2}$), hydrogen fumarate ($C_4H_3O_4^{-1}$), succinate ($C_4H_4O_4^{-2}$), hydrogen succinate ($C_4H_5O_4^{-1}$), glutarate ($C_5H_6O_4^{-2}$), hydrogen glutarate ($C_5H_7O_4^{-1}$), adipate $C_6H_8O_4^{-2}$), hydrogen adipate $C_6H_9O_4^{-1}$), lactate ($C_3H_5O_3^{-1}$), tartrate ($C_4H_4O_6^{-2}$), bitartrate ($C_4H_5O_6^{-1}$), phosphate ($PO_4^{-3}$), monohydrogen phosphate ($HPO_4^{-2}$), dihydrogen phosphate ($H_2PO_4^-$), fluoride ($F^-$), chloride ($Cl^-$), sulfate ($SO_4^{-2}$), bisulfate ($HSO_4^{-1}$), nitrate ($NO_3^-$), carbonate ($CO_3^{-2}$), bicarbonate ($HCO_3^-$), glycerate ($C_3H_5O_4^{-1}$), glycolate ($C_2H_3O_3^{-1}$), or combinations thereof. In some instances, the first cation, the second cation, the third cation, and the fourth cation are not the same. In other instances, some or all of the first cation, the second cation, the third cation, and the fourth cation can be the same, provided that the first anion, the second anion, the third anion, and the fourth anion are not the same.

In a further aspect, a disclosed taste modulator composition comprises a first salt having a first cation and a first anion; a second salt having a second cation and a second anion; a third salt having a third cation and a third anion; and optionally a fourth salt having a fourth cation and a fourth anion; the first cation is independently selected from $Na^+$, $K^+$, $Ca^{2+}$, and $Mg^{2+}$; the second cation is independently selected from $Na^+$, $K^+$, $Ca^{2+}$, and $Mg^{2+}$; the third cation is independently selected from $Na^+$, $K^+$, $Ca^{2+}$, and $Mg^{2+}$; and the fourth cation is independently selected from $Na^+$, $K^+$, $Ca^{2+}$, and $Mg^{2+}$; the first anion is independently selected from gluconate ($C_6H_{11}O_7^{-1}$), citrate ($C_6H_5O_7^{-3}$), hydrogen citrate ($C_6H_6O_7^{-2}$), dihydrogen citrate ($C_6H_7O_7^{-1}$), malate ($C_4H_6O_5^{-2}$), hydrogen malate ($C_4H_7O_5^{-1}$), maleate ($C_4H_2O_4^{-2}$), hydrogen maleate ($C_4H_3O_4^{-1}$), fumarate ($C_4H_2O_4^{-2}$), hydrogen fumarate ($C_4H_3O_4^{-1}$), succinate ($C_4H_4O_4^{-2}$), hydrogen succinate ($C_4H_5O_4^{-1}$), glutarate ($C_5H_6O_4^{-2}$), hydrogen glutarate ($C_5H_7O_4^{-1}$), adipate $C_6H_8O_4^{-2}$), hydrogen adipate $C_6H_9O_4^{-1}$), lactate ($C_3H_5O_3^{-1}$), tartrate ($C_4H_4O_6^{-2}$), bitartrate ($C_4H_5O_6^{-1}$), phosphate ($PO_4^{-3}$), monohydrogen phosphate ($HPO_4^{-2}$), dihydrogen phosphate ($H_2PO_4^-$), fluoride ($F^-$), chloride ($Cl^-$), sulfate ($SO_4^{-2}$), bisulfate ($HSO_4^{-1}$), nitrate ($NO_3^-$), carbonate ($CO_3^{-2}$), bicarbonate ($HCO_3^-$), glycerate ($C_3H_5O_4^{-1}$), glycolate ($C_2H_3O_3^{-1}$), or combinations thereof; the second anion is independently selected from gluconate ($C_6H_{11}O_7^{-1}$), citrate ($C_6H_5O_7^{-3}$), hydrogen citrate ($C_6H_6O_7^{-2}$), dihydrogen citrate ($C_6H_7O_7^{-1}$), malate ($C_4H_6O_5^{-2}$), hydrogen malate ($C_4H_7O_5^{-1}$), maleate ($C_4H_2O_4^{-2}$), hydrogen maleate ($C_4H_3O_4^{-1}$), fumarate ($C_4H_2O_4^{-2}$), hydrogen fumarate ($C_4H_3O_4^{-1}$), succinate ($C_4H_4O_4^{-2}$), hydrogen succinate ($C_4H_5O_4^{-1}$), glutarate ($C_5H_6O_4^{-2}$), hydrogen glutarate ($C_5H_7O_4^{-1}$), adipate $C_6H_8O_4^{-2}$), hydrogen adipate $C_6H_9O_4^{-1}$), lactate ($C_3H_5O_3^{-1}$), tartrate ($C_4H_4O_6^{-2}$), bitartrate ($C_4H_5O_6^{-1}$), phosphate ($PO_4^{-3}$), monohydrogen phosphate ($HPO_4^{-2}$), dihydrogen phosphate ($H_2PO_4^-$), fluoride ($F^-$), chloride ($Cl^-$), sulfate ($SO_4^{-2}$), bisulfate ($HSO_4^{-1}$), nitrate ($NO_3^-$), carbonate ($CO_3^{-2}$), bicarbonate ($HCO_3^-$), glycerate ($C_3H_5O_4^{-1}$), glycolate ($C_2H_3O_3^{-1}$), or combinations thereof; the third anion is independently selected from gluconate ($C_6H_{11}O_7^{-1}$), citrate ($C_6H_5O_7^{-3}$), hydrogen citrate ($C_6H_6O_7^{-2}$), dihydrogen citrate ($C_6H_7O_7^{-1}$), malate ($C_4H_6O_5^{-2}$), hydrogen malate ($C_4H_7O_5^{-1}$), maleate ($C_4H_2O_4^{-2}$), hydrogen maleate ($C_4H_3O_4^{-1}$), fumarate ($C_4H_2O_4^{-2}$), hydrogen fumarate ($C_4H_3O_4^{-1}$), succinate ($C_4H_4O_4^{-2}$), hydrogen succinate ($C_4H_5O_4^{-1}$), glutarate ($C_5H_6O_4^{-2}$), hydrogen glutarate ($C_5H_7O_4^{-1}$), adipate $C_6H_8O_4^{-2}$), hydrogen adipate $C_6H_9O_4^{-1}$), lactate ($C_3H_5O_3^{-1}$), tartrate ($C_4H_4O_6^{-2}$), bitartrate ($C_4H_5O_6^{-1}$), phosphate ($PO_4^{-3}$), monohydrogen phosphate ($HPO_4^{-2}$), dihydrogen phosphate ($H_2PO_4^-$), fluoride ($F^-$), chloride ($Cl^-$), sulfate ($SO_4^{-2}$), bisulfate ($HSO_4^{-1}$), nitrate ($NO_3^-$), carbonate ($CO_3^{-2}$), bicarbonate ($HCO_3^-$), glycerate ($C_3H_5O_4^{-1}$), glycolate ($C_2H_3O_3^{-1}$), or combinations thereof; and the fourth anion is independently selected from gluconate ($C_6H_{11}O_7^{-1}$), citrate ($C_6H_5O_7^{-3}$), hydrogen citrate ($C_6H_6O_7^{-2}$), dihydrogen citrate ($C_6H_7O_7^{-1}$), malate ($C_4H_6O_5^{-2}$), hydrogen malate ($C_4H_7O_5^{-1}$), maleate ($C_4H_2O_4^{-2}$), hydrogen maleate ($C_4H_3O_4^{-1}$), fumarate ($C_4H_2O_4^{-2}$), hydrogen fumarate ($C_4H_3O_4^{-1}$), succinate ($C_4H_4O_4^{-2}$), hydrogen succinate ($C_4H_5O_4^{-1}$), glutarate ($C_5H_6O_4^{-2}$), hydrogen glutarate ($C_5H_7O_4^{-1}$), adipate $C_6H_8O_4^{-2}$), hydrogen adipate $C_6H_9O_4^{-1}$), lactate ($C_3H_5O_3^{-1}$), tartrate ($C_4H_4O_6^{-2}$), bitartrate ($C_4H_5O_6^{-1}$), phosphate ($PO_4^{-3}$), monohydrogen phosphate ($HPO_4^{-2}$), dihydrogen phosphate ($H_2PO_4^-$), fluoride ($F^-$), chloride ($Cl^-$), sulfate ($SO_4^{-2}$), bisulfate ($HSO_4^{-1}$), nitrate ($NO_3^-$), carbonate ($CO_3^{-2}$), bicarbonate ($HCO_3^-$), glycerate ($C_3H_5O_4^{-1}$), glycolate ($C_2H_3O_3^{-1}$), or combinations thereof. In some instances, the first cation, the second cation, the third cation, and the fourth cation are not the same. In other instances, some or all of the first cation, the second cation, the third cation, and the fourth cation can be the same, provided that the first anion, the second anion, the third anion, and the fourth anion are not the same.

In a further aspect, a disclosed taste modulator composition comprises a first salt having a first cation and a first anion; a second salt having a second cation and a second anion; a third salt having a third cation and a third anion; the first cation is independently selected from $Na^+$, $K^+$, $Ca^{2+}$, and $Mg^{2+}$; the second cation is independently selected from $Na^+$, $K^+$, $Ca^{2+}$, and $Mg^{2+}$; the third cation is independently selected from $Na^+$, $K^+$, $Ca^{2+}$, and $Mg^{2+}$; the first anion is independently selected from gluconate ($C_6H_{11}O_7^{-1}$), citrate ($C_6H_5O_7^{-3}$), hydrogen citrate ($C_6H_6O_7^{-2}$), dihydrogen citrate ($C_6H_7O_7^{-1}$), malate ($C_4H_6O_5^{-2}$), hydrogen malate ($C_4H_7O_5^{-1}$), maleate ($C_4H_2O_4^{-2}$), hydrogen maleate ($C_4H_3O_4^{-1}$), fumarate ($C_4H_2O_4^{-2}$), hydrogen fumarate ($C_4H_3O_4^{-1}$), succinate ($C_4H_4O_4^{-2}$), hydrogen succinate ($C_4H_5O_4^{-1}$), glutarate ($C_5H_6O_4^{-2}$), hydrogen glutarate ($C_5H_7O_4^{-1}$), adipate $C_6H_8O_4^{-2}$), hydrogen adipate $C_6H_9O_4^{-1}$), lactate ($C_3H_5O_3^{-1}$), tartrate ($C_4H_4O_6^{-2}$), bitartrate ($C_4H_5O_6^{-1}$), phosphate ($PO_4^{-3}$), monohydrogen phosphate (HPO$_4^{-2}$), dihydrogen phosphate (H$_2$PO$_4^-$), fluoride (F$^-$), chloride (Cl$^-$), sulfate (SO$_4^{-2}$), bisulfate (HSO$_4^{-1}$), nitrate (NO$_3^-$), carbonate (CO$_3^{-2}$), bicarbonate (HCO$_3^-$), glycerate (C$_3$H$_5$O$_4^{-1}$), glycolate (C$_2$H$_3$O$_3^{-1}$), or combinations thereof; the second anion is independently selected from gluconate (C$_6$H$_{11}$O$_7^{-1}$), citrate (C$_6$H$_5$O$_7^{-3}$), hydrogen citrate (C$_6$H$_6$O$_7^{-2}$), dihydrogen citrate (C$_6$H$_7$O$_7^{-1}$), malate (C$_4$H$_6$O$_5^{-2}$), hydrogen malate (C$_4$H$_7$O$_5^{-1}$), maleate (C$_4$H$_2$O$_4^{-2}$), hydrogen maleate (C$_4$H$_3$O$_4^{-1}$), fumarate (C$_4$H$_2$O$_4^{-2}$), hydrogen fumarate (C$_4$H$_3$O$_4^{-1}$), succinate (C$_4$H$_4$O$_4^{-2}$), hydrogen succinate (C$_4$H$_5$O$_4^{-1}$), glutarate (C$_5$H$_6$O$_4^{-2}$), hydrogen glutarate (C$_5$H$_7$O$_4^{-1}$), adipate C$_6$H$_8$O$_4^{-2}$), hydrogen adipate C$_6$H$_9$O$_4^{-1}$), lactate (C$_3$H$_5$O$_3^{-1}$), tartrate (C$_4$H$_4$O$_6^{-2}$), bitartrate (C$_4$H$_5$O$_6^{-1}$), phosphate (PO$_4^{-3}$), monohydrogen phosphate (HPO$_4^{-2}$), dihydrogen phosphate (H$_2$PO$_4^-$), fluoride (F$^-$), chloride (Cl$^-$), sulfate (SO$_4^{-2}$), bisulfate (HSO$_4^{-1}$), nitrate (NO$_3^-$), carbonate (CO$_3^{-2}$), bicarbonate (HCO$_3^-$), glycerate (C$_3$H$_5$O$_4^{-1}$), glycolate (C$_2$H$_3$O$_3^{-1}$), or combinations thereof; and the third anion is independently selected from gluconate (C$_6$H$_{11}$O$_7^{-1}$), citrate (C$_6$H$_5$O$_7^{-3}$), hydrogen citrate (C$_6$H$_6$O$_7^{-2}$), dihydrogen citrate (C$_6$H$_7$O$_7^{-1}$), malate (C$_4$H$_6$O$_5^{-2}$), hydrogen malate (C$_4$H$_7$O$_5^{-1}$), maleate (C$_4$H$_2$O$_4^{-2}$), hydrogen maleate (C$_4$H$_3$O$_4^{-1}$), fumarate (C$_4$H$_2$O$_4^{-2}$), hydrogen fumarate (C$_4$H$_3$O$_4^{-1}$), succinate (C$_4$H$_4$O$_4^{-2}$), hydrogen succinate (C$_4$H$_5$O$_4^{-1}$), glutarate (C$_5$H$_6$O$_4^{-2}$), hydrogen glutarate (C$_5$H$_7$O$_4^{-1}$), adipate C$_6$H$_8$O$_4^{-2}$), hydrogen adipate C$_6$H$_9$O$_4^{-1}$), lactate (C$_3$H$_5$O$_3^{-1}$), tartrate (C$_4$H$_4$O$_6^{-2}$), bitartrate (C$_4$H$_5$O$_6^{-1}$), phosphate (PO$_4^{-3}$), monohydrogen phosphate (HPO$_4^{-2}$), dihydrogen phosphate (H$_2$PO$_4^-$), fluoride (F$^-$), chloride (Cl$^-$), sulfate (SO$_4^{-2}$), bisulfate (HSO$_4^{-1}$), nitrate (NO$_3^-$), carbonate (CO$_3^{-2}$), bicarbonate (HCO$_3^-$), glycerate (C$_3$H$_5$O$_4^{-1}$), glycolate (C$_2$H$_3$O$_3^{-1}$), or combinations thereof. In some instances, the first cation, the second cation, the third cation, and the fourth cation are not the same. In other instances, some or all of the first cation, the second cation, the third cation, and the fourth cation can be the same, provided that the first anion, the second anion, the third anion, and the fourth anion are not the same.

In a further aspect, a disclosed taste modulator composition comprises a first salt having a first cation and a first anion; a second salt having a second cation and a second anion; a third salt having a third cation and a third anion; the first cation is K$^+$; the second cation is Mg$^{2+}$; the third cation is Ca$^{2+}$; the first anion is independently selected from gluconate (C$_6$H$_{11}$O$_7^{-1}$), citrate (C$_6$H$_5$O$_7^{-3}$), hydrogen citrate (C$_6$H$_6$O$_7^{-2}$), dihydrogen citrate (C$_6$H$_7$O$_7^{-1}$), malate (C$_4$H$_6$O$_5^{-2}$), hydrogen malate (C$_4$H$_7$O$_5^{-1}$), maleate (C$_4$H$_2$O$_4^{-2}$), hydrogen maleate (C$_4$H$_3$O$_4^{-1}$), fumarate (C$_4$H$_2$O$_4^{-2}$), hydrogen fumarate (C$_4$H$_3$O$_4^{-1}$), succinate (C$_4$H$_4$O$_4^{-2}$), hydrogen succinate (C$_4$H$_5$O$_4^{-1}$), glutarate (C$_5$H$_6$O$_4^{-2}$), hydrogen glutarate (C$_5$H$_7$O$_4^{-1}$), adipate C$_6$H$_8$O$_4^{-2}$), hydrogen adipate C$_6$H$_9$O$_4^{-1}$), lactate (C$_3$H$_5$O$_3^{-1}$), tartrate (C$_4$H$_4$O$_6^{-2}$), bitartrate (C$_4$H$_5$O$_6^{-1}$), phosphate (PO$_4^{-3}$), monohydrogen phosphate (HPO$_4^{-2}$), dihydrogen phosphate (H$_2$PO$_4^-$), fluoride (F$^-$), chloride (Cl$^-$), sulfate (SO$_4^{-2}$), bisulfate (HSO$_4^{-1}$), nitrate (NO$_3^-$), carbonate (CO$_3^{-2}$), bicarbonate (HCO$_3^-$), glycerate (C$_3$H$_5$O$_4^{-1}$), glycolate (C$_2$H$_3$O$_3^{-1}$), or combinations thereof; the second anion is independently selected from gluconate (C$_6$H$_{11}$O$_7^{-1}$), citrate (C$_6$H$_5$O$_7^{-3}$), hydrogen citrate (C$_6$H$_6$O$_7^{-2}$), dihydrogen citrate (C$_6$H$_7$O$_7^{-1}$), malate (C$_4$H$_6$O$_5^{-2}$), hydrogen malate (C$_4$H$_7$O$_5^{-1}$), maleate (C$_4$H$_2$O$_4^{-2}$), hydrogen maleate (C$_4$H$_3$O$_4^{-1}$), fumarate (C$_4$H$_2$O$_4^{-2}$), hydrogen fumarate (C$_4$H$_3$O$_4^{-1}$), succinate (C$_4$H$_4$O$_4^{-2}$), hydrogen succinate (C$_4$H$_5$O$_4^{-1}$), glutarate (C$_5$H$_6$O$_4^{-2}$), hydrogen glutarate (C$_5$H$_7$O$_4^{-1}$), adipate (C$_6$H$_8$O$_4^{-2}$), hydrogen adipate C$_6$H$_9$O$_4^{-1}$), lactate (C$_3$H$_5$O$_3^{-1}$), tartrate (C$_4$H$_4$O$_6^{-2}$), bitartrate (C$_4$H$_5$O$_6^{-1}$), phosphate (PO$_4^{-3}$), monohydrogen phosphate (HPO$_4^{-2}$), dihydrogen phosphate (H$_2$PO$_4^-$), fluoride (F$^-$), chloride (Cl$^-$), sulfate (SO$_4^{-2}$), bisulfate (HSO$_4^{-1}$), nitrate (NO$_3^-$), carbonate (CO$_3^{-2}$), bicarbonate (HCO$_3^-$), glycerate (C$_3$H$_5$O$_4^{-1}$), glycolate (C$_2$H$_3$O$_3^{-1}$), or combinations thereof; and the third anion is independently selected from gluconate (C$_6$H$_{11}$O$_7^{-1}$), citrate (C$_6$H$_5$O$_7^{-3}$), hydrogen citrate (C$_6$H$_6$O$_7^{-2}$), dihydrogen citrate (C$_6$H$_7$O$_7^{-1}$), malate (C$_4$H$_6$O$_5^{-2}$), hydrogen malate (C$_4$H$_7$O$_5^{-1}$), maleate (C$_4$H$_2$O$_4^{-2}$), hydrogen maleate (C$_4$H$_3$O$_4^{-1}$), fumarate (C$_4$H$_2$O$_4^{-2}$), hydrogen fumarate (C$_4$H$_3$O$_4^{-1}$), succinate (C$_4$H$_4$O$_4^{-2}$), hydrogen succinate (C$_4$H$_5$O$_4^{-1}$), glutarate (C$_5$H$_6$O$_4^{-2}$), hydrogen glutarate (C$_5$H$_7$O$_4^{-1}$), adipate C$_6$H$_8$O$_4^{-2}$), hydrogen adipate C$_6$H$_9$O$_4^{-1}$), lactate (C$_3$H$_5$O$_3^{-1}$), tartrate (C$_4$H$_4$O$_6^{-2}$), bitartrate (C$_4$H$_5$O$_6^{-1}$), phosphate (PO$_4^{-3}$), monohydrogen phosphate (HPO$_4^{-2}$), dihydrogen phosphate (H$_2$PO$_4^-$), fluoride (F$^-$), chloride (Cl$^-$), sulfate (SO$_4^{-2}$), bisulfate (HSO$_4^{-1}$), nitrate (NO$_3^-$), carbonate (CO$_3^{-2}$), bicarbonate (HCO$_3^-$), glycerate (C$_3$H$_5$O$_4^{-1}$), glycolate (C$_2$H$_3$O$_3^{-1}$), or combinations thereof. In some instances, the first cation, the second cation, the third cation, and the fourth cation are not the same. In other instances, some or all of the first cation, the second cation, the third cation, and the fourth cation can be the same, provided that the first anion, the second anion, the third anion, and the fourth anion are not the same.

In a further aspect, a disclosed taste modulator composition comprises a first salt having a first cation and a first anion; a second salt having a second cation and a second anion; a third salt having a third cation and a third anion; the first cation is K$^+$; the second cation is Mg$^{2+}$; the third cation is Ca$^{2+}$; the first anion is independently selected from citrate (C$_6$H$_5$O$_7^{-3}$) or conjugate acid form thereof, chloride (Cl$^-$), sulfate (SO$_4^{-2}$), or bisulfate (HSO$_4^{-1}$), or combinations thereof; the second anion is independently selected from citrate (C$_6$H$_5$O$_7^{-3}$) or conjugate acid form thereof, chloride (Cl$^-$), sulfate (SO$_4^{-2}$), or bisulfate (HSO$_4^{-1}$), or combinations thereof; and the third anion is independently selected from citrate (C$_6$H$_5$O$_7^{-3}$) or conjugate acid form thereof, chloride (Cl$^-$), sulfate (SO$_4^{-2}$), or bisulfate (HSO$_4^{-1}$), or combinations thereof. In some instances, the first cation, the second cation, the third cation, and the fourth cation are not the same. In other instances, some or all of the first cation, the second cation, the third cation, and the fourth cation can be the same, provided that the first anion, the second anion, the third anion, and the fourth anion are not the same.

In various aspects, a disclosed taste modulator composition comprises a first taste modulator component comprising a first salt having a first cation selected from Na$^+$, K$^+$, Ca$^{2+}$, and Mg$^{2+}$ and a first anion; and a second modulator component comprising a second salt having a second cation selected from Na$^+$, K$^+$, Ca$^{2+}$, and Mg$^{2+}$ and a second anion; such that the first taste modulator component is present at a concentration of from about 0 mM to about 25 mM if the first cation is Na$^+$ or K$^+$, or at a concentration of from about 0 mM to about 10 mM if the first cation is Ca$^{2+}$ or Mg$^{2+}$; and such that the second taste modulator component is present at a concentration of from about 0 mM to about 25 mM if the second cation is Na$^+$ or K$^+$, or at a concentration of from about 0 mM to about 10 mM if the second cation is Ca$^{2+}$ or Mg$^2$.

In various aspects, a disclosed taste modulator composition comprises a first taste modulator component comprising a first salt having a first cation selected from Na$^+$, K$^+$, Ca$^{2+}$, and Mg$^{2+}$ and a first anion; and a second modulator component comprising a second salt having a second cation selected from $Na^+$, $K^+$, $Ca^{2+}$, and $Mg^{2+}$ and a second anion; such that the first taste modulator component is present at a concentration of from about 0 mM to about 25 mM if the first cation is $Na^+$ or $K^+$, or at a concentration of from about 0 mM to about 5 mM if the first cation is $Ca^{2+}$ or $Mg^{2+}$; and such that the second taste modulator component is present at a concentration of from about 0 mM to about 25 mM if the second cation is $Na^+$ or $K^+$, or at a concentration of from about 0 mM to about 10 mM if the second cation is $Ca^{2+}$ or $Mg^{2+}$ or $K^+$, or at a concentration of from about 0 mM to about 10 mM if the third cation is $Ca^{2+}$ or $Mg^{2+}$.

In various aspects, a disclosed taste modulator composition comprises a first taste modulator component comprising a first salt having a first cation selected from $Na^+$, $K^+$, $Ca^{2+}$, and $Mg^{2+}$ and a first anion; and a second modulator component comprising a second salt having a second cation selected from $Na^+$, $K^+$, $Ca^{2+}$, and $Mg^{2+}$ and a second anion; such that the first taste modulator component is present at a concentration of from about 0 mM to about 10 mM if the first cation is $Na^+$ or $K^+$, or at a concentration of from about 0 mM to about 5 mM if the first cation is $Ca^{2+}$ or $Mg^{2+}$; and such that the second taste modulator component is present at a concentration of from about 0 mM to about 10 mM if the second cation is $Na^+$ or $K^+$, or at a concentration of from about 0 mM to about 5 mM if the second cation is $Ca^{2+}$ or $Mg^{2+}$.

In various aspects, a disclosed taste modulator composition comprises a first taste modulator component comprising a first salt having a first cation selected from $Na^+$, $K^+$, $Ca^{2+}$, and $Mg^{2+}$ and a first anion; a second modulator component comprising a second salt having a second cation selected from $Na^+$, $K^+$, $Ca^{2+}$, and $Mg^{2+}$ and a second anion; such that the first taste modulator component is present at a concentration of from about 0.1 mM to about 25 mM if the first cation is $Na^+$ or $K^+$, or at a concentration of from about 0.1 mM to about 10 mM if the first cation is $Ca^{2+}$ or $Mg^{2+}$; and such that the second taste modulator component is present at a concentration of from about 0.1 mM to about 25 mM if the second cation is $Na^+$ or $K^+$, or at a concentration of from about 0.1 mM to about 10 mM if the second cation is $Ca^{2+}$ or $Mg^{2+}$ or $Mg^{2+}$.

In various aspects, a disclosed taste modulator composition comprises a first taste modulator component comprising a first salt having a first cation selected from $Na^+$, $K^+$, $Ca^{2+}$, and $Mg^{2+}$ and a first anion; a second modulator component comprising a second salt having a second cation selected from $Na^+$, $K^+$, $Ca^{2+}$, and $Mg^{2+}$ and a second anion; such that the first taste modulator component is present at a concentration of from about 0.1 mM to about 25 mM if the first cation is $Na^+$ or $K^+$, or at a concentration of from about 0.1 mM to about 5 mM if the first cation is $Ca^{2+}$ or $Mg^{2+}$; and such that the second taste modulator component is present at a concentration of from about 0.1 mM to about 25 mM if the second cation is $Na^+$ or $K^+$, or at a concentration of from about 0.1 mM to about 10 mM if the second cation is $Ca^{2+}$ or $Mg^{2+}$.

In various aspects, a disclosed taste modulator composition comprises a first taste modulator component comprising a first salt having a first cation selected from $Na^+$, $K^+$, $Ca^{2+}$, and $Mg^{2+}$ and a first anion; a second modulator component comprising a second salt having a second cation selected from $Na^+$, $K^+$, $Ca^{2+}$, and $Mg^{2+}$ and a second anion; such that the first taste modulator component is present at a concentration of from about 0.1 mM to about 10 mM if the first cation is $Na^+$ or $K^+$, or at a concentration of from about 0.1 mM to about 5 mM if the first cation is $Ca^{2+}$ or $Mg^{2+}$; and such that the second taste modulator component is present at a concentration of from about 0.1 mM to about 10 mM if the second cation is $Na^+$ or $K^+$, or at a concentration of from about 0.1 mM to about 5 mM if the second cation is $Ca^{2+}$ or $Mg^{2+}$.

In various aspects, a disclosed taste modulator composition comprises a first taste modulator component comprising a first salt having a first cation selected from $Na^+$, $K^+$, $Ca^{2+}$, and $Mg^{2+}$ and a first anion; a second modulator component comprising a second salt having a second cation selected from $Na^+$, $K^+$, $Ca^{2+}$, and $Mg^{2+}$ and a second anion; such that the first taste modulator component is present at a concentration of from about 1 mM to about 25 mM if the first cation is $Na^+$ or $K^+$, or at a concentration of from about 1 mM to about 10 mM if the first cation is $Ca^{2+}$ or $Mg^{2+}$; and such that the second taste modulator component is present at a concentration of from about 1 mM to about 25 mM if the second cation is $Na^+$ or $K^+$, or at a concentration of from about 1 mM to about 10 mM if the second cation is $Ca^{2+}$ or $Mg^{2+}$.

In various aspects, a disclosed taste modulator composition comprises a first taste modulator component comprising a first salt having a first cation selected from $Na^+$, $K^+$, $Ca^{2+}$, and $Mg^{2+}$ and a first anion; a second modulator component comprising a second salt having a second cation selected from $Na^+$, $K^+$, $Ca^{2+}$, and $Mg^{2+}$ and a second anion; such that the first taste modulator component is present at a concentration of from about 1 mM to about 25 mM if the first cation is $Na^+$ or $K^+$, or at a concentration of from about 1 mM to about 5 mM if the first cation is $Ca^{2+}$ or $Mg^{2+}$; and such that the second taste modulator component is present at a concentration of from about 1 mM to about 25 mM if the second cation is $Na^+$ or $K^+$, or at a concentration of from about 1 mM to about 10 mM if the second cation is $Ca^{2+}$ or $Mg^{2+}$.

In various aspects, a disclosed taste modulator composition comprises a first taste modulator component comprising a first salt having a first cation selected from $Na^+$, $K^+$, $Ca^{2+}$, and $Mg^{2+}$ and a first anion; a second modulator component comprising a second salt having a second cation selected from $Na^+$, $K^+$, $Ca^{2+}$, and $Mg^{2+}$ and a second anion; such that the first taste modulator component is present at a concentration of from about 1 mM to about 10 mM if the first cation is $Na^+$ or $K^+$, or at a concentration of from about 1 mM to about 5 mM if the first cation is $Ca^{2+}$ or $Mg^{2+}$; and such that the second taste modulator component is present at a concentration of from about 1 mM to about 10 mM if the second cation is $Na^+$ or $K^+$, or at a concentration of from about 1 mM to about 5 mM if the second cation is $Ca^{2+}$ or $Mg^{2+}$.

In various aspects, a disclosed taste modulator composition comprises a first taste modulator component comprising a first salt having a first cation selected from $Na^+$, $K^+$, $Ca^{2+}$, and $Mg^{2+}$; a second modulator component comprising a second salt having a second cation selected from $Na^+$, $K^+$, $Ca^{2+}$, and $Mg^{2+}$; and a third modulator component comprising a third salt having a third cation selected from $Na^+$, $K^+$, $Ca^{2+}$, and $Mg^{2+}$; such that the first taste modulator component is present at a concentration of from about 0 mM to about 25 mM if the first cation is $Na^+$ or $K^+$, or at a concentration of from about 0 mM to about 10 mM if the first cation is $Ca^{2+}$ or $Mg^{2+}$; such that the second taste modulator component is present at a concentration of from about 0 mM to about 25 mM if the second cation is $Na^+$ or $K^+$, or at a concentration of from about 0 mM to about 10 mM if the second cation is $Ca^{2+}$ or $Mg^{2+}$; and such that the third taste modulator component is present at a concentration of from about 0 mM to about 25 mM if the third cation is $Na^+$ or $K^+$, or at a concentration of from about 0 mM to about 10 mM if the third cation is $Ca^{2+}$ or $Mg^{2+}$.

In various aspects, a disclosed taste modulator composition comprises a first taste modulator component comprising a first salt having a first cation selected from $Na^+$, $K^+$, $Ca^{2+}$, and $Mg^{2+}$; a second modulator component comprising a second salt having a second cation selected from $Na^+$, $K^+$, $Ca^{2+}$, and $Mg^{2+}$; and a third modulator component comprising a third salt having a third cation selected from $Na^+$, $K^+$, $Ca^{2+}$, and $Mg^{2+}$; such that the first taste modulator component is present at a concentration of from about 0 mM to about 25 mM if the first cation is $Na^+$ or $K^+$, or at a concentration of from about 0 mM to about 5 mM if the first cation is $Ca^{2+}$ or $Mg^{2+}$; such that the second taste modulator component is present at a concentration of from about 0 mM to about 25 mM if the second cation is $Na^+$ or $K^+$, or at a concentration of from about 0 mM to about 10 mM if the second cation is $Ca^{2+}$ or $Mg^{2+}$; and such that the third taste modulator component is present at a concentration of from about 0 mM to about 25 mM if the third cation is $Na^+$ or $K^+$, or at a concentration of from about 0 mM to about 10 mM if the third cation is $Ca^{2+}$ or $Mg^{2+}$.

In various aspects, a disclosed taste modulator composition comprises a first taste modulator component comprising a first salt having a first cation selected from $Na^+$, $K^+$, $Ca^{2+}$, and $Mg^{2+}$; a second modulator component comprising a second salt having a second cation selected from $Na^+$, $K^+$, $Ca^{2+}$, and $Mg^{2+}$; and a third modulator component comprising a third salt having a third cation selected from $Na^+$, $K^+$, $Ca^{2+}$, and $Mg^{2+}$; such that the first taste modulator component is present at a concentration of from about 0 mM to about 10 mM if the first cation is $Na^+$ or $K^+$, or at a concentration of from about 0 mM to about 5 mM if the first cation is $Ca^{2+}$ or $Mg^{2+}$; such that the second taste modulator component is present at a concentration of from about 0 mM to about 10 mM if the second cation is $Na^+$ or $K^+$, or at a concentration of from about 0 mM to about 5 mM if the second cation is $Ca^{2+}$ or $Mg^{2+}$; and such that the third taste modulator component is present at a concentration of from about 0 mM to about 10 mM if the third cation is $Na^+$ or $K^+$, or at a concentration of from about 0 mM to about 5 mM if the third cation is $Ca^{2+}$ or $Mg^{2+}$.

In various aspects, a disclosed taste modulator composition comprises a first taste modulator component comprising a first salt having a first cation selected from $Na^+$, $K^+$, $Ca^{2+}$, and $Mg^{2+}$; a second modulator component comprising a second salt having a second cation selected from $Na^+$, $K^+$, $Ca^{2+}$, and $Mg^{2+}$; and a third modulator component comprising a third salt having a third cation selected from $Na^+$, $K^+$, $Ca^{2+}$, and $Mg^{2+}$; such that the first taste modulator component is present at a concentration of from about 0.1 mM to about 25 mM if the first cation is $Na^+$ or $K^+$, or at a concentration of from about 0.1 mM to about 10 mM if the first cation is $Ca^{2+}$ or $Mg^{2+}$; such that the second taste modulator component is present at a concentration of from about 0.1 mM to about 25 mM if the second cation is $Na^+$ or $K^+$, or at a concentration of from about 0.1 mM to about 10 mM if the second cation is $Ca^{2+}$ or $Mg^{2+}$; and such that the third taste modulator component is present at a concentration of from about 0.1 mM to about 25 mM if the third cation is $Na^+$ or $K^+$, or at a concentration of from about 0.1 mM to about 10 mM if the third cation is $Ca^{2+}$ or $Mg^{2+}$.

In various aspects, a disclosed taste modulator composition comprises a first taste modulator component comprising a first salt having a first cation selected from $Na^+$, $K^+$, $Ca^{2+}$, and $Mg^{2+}$; a second modulator component comprising a second salt having a second cation selected from $Na^+$, $K^+$, $Ca^{2+}$, and $Mg^{2+}$; and a third modulator component comprising a third salt having a third cation selected from $Na^+$, $K^+$, $Ca^{2+}$, and $Mg^{2+}$; such that the first taste modulator component is present at a concentration of from about 0.1 mM to about 25 mM if the first cation is $Na^+$ or $K^+$, or at a concentration of from about 0.1 mM to about 5 mM if the first cation is $Ca^{2+}$ or $Mg^{2+}$; such that the second taste modulator component is present at a concentration of from about 0.1 mM to about 25 mM if the second cation is $Na^+$ or $K^+$, or at a concentration of from about 0.1 mM to about 10 mM if the second cation is $Ca^{2+}$ or $Mg^{2+}$; and such that the third taste modulator component is present at a concentration of from about 0.1 mM to about 25 mM if the third cation is $Na^+$ or $K^+$, or at a concentration of from about 0.1 mM to about 10 mM if the third cation is $Ca^{2+}$ or $Mg^{2+}$.

In various aspects, a disclosed taste modulator composition comprises a first taste modulator component comprising a first salt having a first cation selected from $Na^+$, $K^+$, $Ca^{2+}$, and $Mg^{2+}$; a second modulator component comprising a second salt having a second cation selected from $Na^+$, $K^+$, $Ca^{2+}$, and $Mg^{2+}$; and a third modulator component comprising a third salt having a third cation selected from $Na^+$, $K^+$, $Ca^{2+}$, and $Mg^{2+}$; such that the first taste modulator component is present at a concentration of from about 0.1 mM to about 10 mM if the first cation is $Na^+$ or $K^+$, or at a concentration of from about 0.1 mM to about 5 mM if the first cation is $Ca^{2+}$ or $Mg^{2+}$; such that the second taste modulator component is present at a concentration of from about 0.1 mM to about 10 mM if the second cation is $Na^+$ or $K^+$, or at a concentration of from about 0.1 mM to about 5 mM if the second cation is $Ca^{2+}$ or $Mg^{2+}$; and such that the third taste modulator component is present at a concentration of from about 0.1 mM to about 10 mM if the third cation is $Na^+$ or $K^+$, or at a concentration of from about 0.1 mM to about 5 mM if the third cation is $Ca^{2+}$ or $Mg^{2+}$.

In various aspects, a disclosed taste modulator composition comprises a first taste modulator component comprising a first salt having a first cation selected from $Na^+$, $K^+$, $Ca^{2+}$, and $Mg^{2+}$; a second modulator component comprising a second salt having a second cation selected from $Na^+$, $K^+$, $Ca^{2+}$, and $Mg^{2+}$; and a third modulator component comprising a third salt having a third cation selected from $Na^+$, $K^+$, $Ca^{2+}$, and $Mg^{2+}$; such that the first taste modulator component is present at a concentration of from about 1 mM to about 25 mM if the first cation is $Na^+$ or $K^+$, or at a concentration of from about 1 mM to about 10 mM if the first cation is $Ca^{2+}$ or $Mg^{2+}$; such that the second taste modulator component is present at a concentration of from about 1 mM to about 25 mM if the second cation is $Na^+$ or $K^+$, or at a concentration of from about 1 mM to about 10 mM if the second cation is $Ca^{2+}$ or $Mg^{2+}$; and such that the third taste modulator component is present at a concentration of from about 1 mM to about 25 mM if the third cation is $Na^+$ or $K^+$, or at a concentration of from about 1 mM to about 10 mM if the third cation is $Ca^{2+}$ or $Mg^{2+}$.

In various aspects, a disclosed taste modulator composition comprises a first taste modulator component comprising a first salt having a first cation selected from $Na^+$, $K^+$, $Ca^{2+}$, and $Mg^{2+}$; a second modulator component comprising a second salt having a second cation selected from $Na^+$, $K^+$, $Ca^{2+}$, and $Mg^{2+}$; and a third modulator component comprising a third salt having a third cation selected from $Na^+$, $K^+$, $Ca^{2+}$, and $Mg^{2+}$; such that the first taste modulator component is present at a concentration of from about 1 mM to about 25 mM if the first cation is $Na^+$ or $K^+$, or at a concentration of from about 1 mM to about 5 mM if the first cation is $Ca^{2+}$ or $Mg^{2+}$; such that the second taste modulator component is present at a concentration of from about 1 mM to about 25 mM if the second cation is $Na^+$ or $K^+$, or at a concentration of from about 1 mM to about 10 mM if the second cation is $Ca^{2+}$ or $Mg^{2+}$; and such that the third taste modulator component is present at a concentration of from about 1 mM to about 25 mM if the third cation is $Na^+$ or $K^+$, or at a concentration of from about 1 mM to about 10 mM if the third cation is $Ca^{2+}$ or $Mg^{2+}$.

In various aspects, a disclosed taste modulator composition comprises a first taste modulator component comprising a first salt having a first cation selected from $Na^+$, $K^+$, $Ca^{2+}$, and $Mg^{2+}$; a second modulator component comprising a second salt having a second cation selected from $Na^+$, $K^+$, $Ca^{2+}$, and $Mg^{2+}$; and a third modulator component comprising a third salt having a third cation selected from $Na^+$, $K^+$, $Ca^{2+}$, and $Mg^{2+}$; such that the first taste modulator component is present at a concentration of from about 1 mM to about 10 mM if the first cation is $Na^+$ or $K^+$, or at a concentration of from about 1 mM to about 5 mM if the first cation is $Ca^{2+}$ or $Mg^{2+}$; such that the second taste modulator component is present at a concentration of from about 1 mM to about 10 mM if the second cation is $Na^+$ or $K^+$, or at a concentration of from about 1 mM to about 5 mM if the second cation is $Ca^{2+}$ or $Mg^{2+}$; and such that the third taste modulator component is present at a concentration of from about 1 mM to about 10 mM if the third cation is $Na^+$ or $K^+$, or at a concentration of from about 1 mM to about 5 mM if the third cation is $Ca^{2+}$ or $Mg^{2+}$.

In various aspects, a disclosed taste modulator composition comprises a first taste modulator component comprising a first salt having a first cation selected from $Na^+$, $K^+$, $Ca^{2+}$, and $Mg^{2+}$; a second modulator component comprising a second salt having a second cation selected from $Na^+$, $K^+$, $Ca^{2+}$, and $Mg^{2+}$; and a third modulator component comprising a third salt having a third cation selected from $Na^+$, $K^+$, $Ca^{2+}$, and $Mg^{2+}$; such that the first taste modulator component is present at a concentration of from about 0 mM to about 25 mM; and such that each of the second taste modulator component and the third modulator component are independently present at a concentration of from about 0 mM to about 10 mM.

In various aspects, a disclosed taste modulator composition comprises a first taste modulator component comprising a first salt having a first cation selected from $Na^+$, $K^+$, $Ca^{2+}$, and $Mg^{2+}$; a second modulator component comprising a second salt having a second cation selected from $Na^+$, $K^+$, $Ca^{2+}$, and $Mg^{2+}$; and a third modulator component comprising a third salt having a third cation selected from $Na^+$, $K^+$, $Ca^{2+}$, and $Mg^{2+}$; such that the first taste modulator component is present at a concentration of from about 0 mM to about 25 mM; and such that each of the second taste modulator component and the third modulator component are independently present at a concentration of from about 0 mM to about 5 mM.

In various aspects, a disclosed taste modulator composition comprises a first taste modulator component comprising a first salt having a first cation selected from $Na^+$, $K^+$, $Ca^{2+}$, and $Mg^{2+}$; a second modulator component comprising a second salt having a second cation selected from $Na^+$, $K^+$, $Ca^{2+}$, and $Mg^{2+}$; and a third modulator component comprising a third salt having a third cation selected from $Na^+$, $K^+$, $Ca^{2+}$, and $Mg^{2+}$; such that the first taste modulator component is present at a concentration of from about 0 mM to about 10 mM; and such that each of the second taste modulator component and the third modulator component are independently present at a concentration of from about 0 mM to about 5 mM.

In various aspects, a disclosed taste modulator composition comprises a first taste modulator component comprising a first salt having a first cation selected from $Na^+$, $K^+$, $Ca^{2+}$, and $Mg^{2+}$; a second modulator component comprising a second salt having a second cation selected from $Na^+$, $K^+$, $Ca^{2+}$, and $Mg^{2+}$; and a third modulator component comprising a third salt having a third cation selected from $Na^+$, $K^+$, $Ca^{2+}$, and $Mg^{2+}$; such that the first taste modulator component is present at a concentration of from about 0.1 mM to about 25 mM; and such that each of the second taste modulator component and the third modulator component are independently present at a concentration of from about 0.1 mM to about 10 mM.

In various aspects, a disclosed taste modulator composition comprises a first taste modulator component comprising a first salt having a first cation selected from $Na^+$, $K^+$, $Ca^{2+}$, and $Mg^{2+}$; a second modulator component comprising a second salt having a second cation selected from $Na^+$, $K^+$, $Ca^{2+}$, and $Mg^{2+}$; and a third modulator component comprising a third salt having a third cation selected from $Na^+$, $K^+$, $Ca^{2+}$, and $Mg^{2+}$; such that the first taste modulator component is present at a concentration of from about 0.1 mM to about 25 mM; and such that each of the second taste modulator component and the third modulator component are independently present at a concentration of from about 0.1 mM to about 5 mM.

In various aspects, a disclosed taste modulator composition comprises a first taste modulator component comprising a first salt having a first cation selected from $Na^+$, $K^+$, $Ca^{2+}$, and $Mg^{2+}$; a second modulator component comprising a second salt having a second cation selected from $Na^+$, $K^+$, $Ca^{2+}$, and $Mg^{2+}$; and a third modulator component comprising a third salt having a third cation selected from $Na^+$, $K^+$, $Ca^{2+}$, and $Mg^{2+}$; such that the first taste modulator component is present at a concentration of from about 0.1 mM to about 10 mM; and such that each of the second taste modulator component and the third modulator component are independently present at a concentration of from about 0.1 mM to about 5 mM.

In various aspects, a disclosed taste modulator composition comprises a first taste modulator component comprising a first salt having a first cation selected from $Na^+$, $K^+$, $Ca^{2+}$, and $Mg^{2+}$; a second modulator component comprising a second salt having a second cation selected from $Na^+$, $K^+$, $Ca^{2+}$, and $Mg^{2+}$; and a third modulator component comprising a third salt having a third cation selected from $Na^+$, $K^+$, $Ca^{2+}$, and $Mg^{2+}$; such that the first taste modulator component is present at a concentration of from about 1 mM to about 25 mM; and such that each of the second taste modulator component and the third modulator component are independently present at a concentration of from about 1 mM to about 10 mM.

In various aspects, a disclosed taste modulator composition comprises a first taste modulator component comprising a first salt having a first cation selected from $Na^+$, $K^+$, $Ca^{2+}$, and $Mg^{2+}$; a second modulator component comprising a second salt having a second cation selected from $Na^+$, $K^+$, $Ca^{2+}$, and $Mg^{2+}$; and a third modulator component comprising a third salt having a third cation selected from $Na^+$, $K^+$, $Ca^{2+}$, and $Mg^{2+}$; such that the first taste modulator component is present at a concentration of from about 1 mM to about 25 mM; and such that each of the second taste modulator component and the third modulator component are independently present at a concentration of from about 1 mM to about 5 mM.

In various aspects, a disclosed taste modulator composition comprises a first taste modulator component comprising a first salt having a first cation selected from $Na^+$, $K^+$, $Ca^{2+}$, and $Mg^{2+}$; a second modulator component comprising a second salt having a second cation selected from Na$^+$, K$^+$, Ca$^{2+}$, and Mg$^{2+}$; and a third modulator component comprising a third salt having a third cation selected from Na$^+$, K$^+$, Ca$^{2+}$, and Mg$^{2+}$; such that the first taste modulator component is present at a concentration of from about 1 mM to about 10 mM; and such that each of the second taste modulator component and the third modulator component are independently present at a concentration of from about 1 mM to about 5 mM.

In various aspects, a disclosed taste modulator composition comprises a first taste modulator component comprising a first salt having a first cation selected from Na$^+$, K$^+$, Ca$^{2+}$, and Mg$^{2+}$ and a first anion selected from citrate (C$_6$H$_5$O$_7^{-3}$), chloride (Cl$^-$), phosphate (PO$_4^{-3}$), carbonate (CO$_3^{-2}$), sulfate (SO$_4^{-2}$), and combinations thereof; a second modulator component comprising a second salt having a second cation selected from Na$^+$, K$^+$, Ca$^{2+}$, and Mg$^{2+}$ and a second anion selected from citrate (C$_6$H$_5$O$_7^{-3}$), chloride (Cl$^-$), phosphate (PO$_4^{-3}$), carbonate (CO$_3^{-2}$), sulfate (SO$_4^{-2}$), and combinations thereof; and a third modulator component comprising a third salt having a third cation selected from Na$^+$, K$^+$, Ca$^{2+}$, and Mg$^{2+}$ and a third anion selected from citrate (C$_6$H$_5$O$_7^{-3}$), chloride (Cl$^-$), phosphate (PO$_4^{-3}$), carbonate (CO$_3^{-2}$), sulfate (SO$_4^{-2}$), and combinations thereof; such that the first taste modulator component is present at a concentration of from about 0 mM to about 10 mM; and such that each of the second taste modulator component and the third modulator component are independently present at a concentration of from about 0 mM to about 5 mM.

In various aspects, a disclosed taste modulator composition comprises a first taste modulator component comprising a first salt having a first cation selected from Na$^+$, K$^+$, Ca$^{2+}$, and Mg$^{2+}$; a second modulator component comprising a second salt having a second cation selected from Na$^+$, K$^+$, Ca$^{2+}$, and Mg$^{2+}$; and a third modulator component comprising a third salt having a third cation selected from Na$^+$, K$^+$, Ca$^{2+}$, and Mg$^{2+}$; such that the first taste modulator component is present at a concentration of from about 0.1 mM to about 10 mM; and such that each of the second taste modulator component and the third modulator component are independently present at a concentration of from about 0.1 mM to about 5 mM.

In various aspects, a disclosed taste modulator composition comprises a first taste modulator component comprising a first salt having a first cation selected from Na$^+$, K$^+$, Ca$^{2+}$, and Mg$^{2+}$ and a first anion selected from citrate (C$_6$H$_5$O$_7^{-3}$), chloride (Cl$^-$), phosphate (PO$_4^{-3}$), carbonate (CO$_3^{-2}$), sulfate (SO$_4^{-2}$), and combinations thereof; a second modulator component comprising a second salt having a second cation selected from Na$^+$, K$^+$, Ca$^{2+}$, and Mg$^{2+}$ and a second anion selected from citrate (C$_6$H$_5$O$_7^{-3}$), chloride (Cl$^-$), phosphate (PO$_4^{-3}$), carbonate (CO$_3^{-2}$), sulfate (SO$_4^{-2}$), and combinations thereof; and a third modulator component comprising a third salt having a third cation selected from Na$^+$, K$^+$, Ca$^{2+}$, and Mg$^{2+}$ and a third anion selected from citrate (C$_6$H$_5$O$_7^{-3}$), chloride (Cl$^-$), phosphate (PO$_4^{-3}$), carbonate (CO$_3^{-2}$), sulfate (SO$_4^{-2}$), and combinations thereof; such that the first taste modulator component is present at a concentration of from about 0.1 mM to about 10 mM; and such that each of the second taste modulator component and the third modulator component are independently present at a concentration of from about 0.1 mM to about 5 mM.

In various aspects, a disclosed taste modulator composition comprises a first taste modulator component comprising a first salt having a first cation comprising K$^+$; a second modulator component comprising a second salt having a second cation comprising Mg$^{2+}$; and a third modulator component comprising a third salt having a third cation comprising Ca$^{2+}$; such that the first taste modulator component is present at a concentration of from about 0 mM to about 10 mM; and such that each of the second taste modulator component and the third modulator component are independently present at a concentration of from about 0 mM to about 5 mM.

In various aspects, a disclosed taste modulator composition comprises a first taste modulator component comprising a first salt having a first cation comprising K$^+$ and a first anion selected from citrate (C$_6$H$_5$O$_7^{-3}$), chloride (Cl$^-$), phosphate (PO$_4^{-3}$), carbonate (CO$_3^{-2}$), sulfate (SO$_4^{-2}$), and combinations thereof; a second modulator component comprising a second salt having a second cation comprising Mg$^{2+}$ and a second anion selected from citrate (C$_6$H$_5$O$_7^{-3}$), chloride (Cl$^-$), phosphate (PO$_4^{-3}$), carbonate (CO$_3^{-2}$), sulfate (SO$_4^{-2}$), and combinations thereof; and a third modulator component comprising a third salt having a third cation comprising Ca$^{2+}$ and a third anion selected from citrate (C$_6$H$_5$O$_7^{-3}$), chloride (Cl$^-$), phosphate (PO$_4^{-3}$), carbonate (CO$_3^{-2}$), sulfate (SO$_4^{-2}$), and combinations thereof; such that the first taste modulator component is present at a concentration of from about 0 mM to about 10 mM; and such that each of the second taste modulator component and the third modulator component are independently present at a concentration of from about 0 mM to about 5 mM.

In various aspects, a disclosed taste modulator composition comprises a first taste modulator component comprising a first salt having a first cation comprising K$^+$; a second modulator component comprising a second salt having a second cation comprising Mg$^{2+}$; and a third modulator component comprising a third salt having a third cation comprising Ca$^{2+}$; such that the first taste modulator component is present at a concentration of from about 0.1 mM to about 10 mM; and such that each of the second taste modulator component and the third modulator component are independently present at a concentration of from about 0.1 mM to about 5 mM.

In various aspects, a disclosed taste modulator composition comprises a first taste modulator component comprising a first salt having a first cation comprising K$^+$ and a first anion selected from citrate (C$_6$H$_5$O$_7^{-3}$), chloride (Cl$^-$), phosphate (PO$_4^{-3}$), carbonate (CO$_3^{-2}$), sulfate (SO$_4^{-2}$), and combinations thereof; a second modulator component comprising a second salt having a second cation comprising Mg$^{2+}$ and a second anion selected from citrate (C$_6$H$_5$O$_7^{-3}$), chloride (Cl$^-$), phosphate (PO$_4^{-3}$), carbonate (CO$_3^{-2}$), sulfate (SO$_4^{-2}$), and combinations thereof; and a third modulator component comprising a third salt having a third cation comprising Ca$^{2+}$ and a third anion selected from citrate (C$_6$H$_5$O$_7^{-3}$), chloride (Cl$^-$), phosphate (PO$_4^{-3}$), carbonate (CO$_3^{-2}$), sulfate (SO$_4^{-2}$), and combinations thereof; such that the first taste modulator component is present at a concentration of from about 0.1 mM to about 10 mM; and such that each of the second taste modulator component and the third modulator component are independently present at a concentration of from about 0.1 mM to about 5 mM.

In various aspects, the total concentration of the first modulator component, the second modulator component, the third modulator component, and the fourth modulator component taken together can be from about 0.1 mM to about 30 mM. For example, each of the first modulator component, the second modulator component, the third modulator component, and the fourth modulator component are independently present a concentration of from about 0 mM to about 10 mM, provided that the sum of concentrations of the first modulator component, the second modulator component, the third modulator component, and the fourth modulator component is less than about 30 mM. In a further aspect, the total concentration of the first modulator component, the second modulator component, the third modulator component, and the fourth modulator component taken together can be from about 0.1 mM to about 30 mM, about 0.2 mM to about 30 mM, about 0.3 mM to about 30 mM, about 0.4 mM to about 30 mM, about 0.5 mM to about 30 mM, about 0.6 mM to about 30 mM, about 0.7 mM to about 30 mM, about 0.8 mM to about 30 mM, about 0.9 mM to about 30 mM, about 1.0 mM to about 30 mM, about 0.1 mM to about 25 mM, about 0.2 mM to about 25 mM, about 0.3 mM to about 25 mM, about 0.4 mM to about 25 mM, about 0.5 mM to about 25 mM, about 0.6 mM to about 25 mM, about 0.7 mM to about 25 mM, about 0.8 mM to about 25 mM, about 0.9 mM to about 25 mM, about 1.0 mM to about 25 mM, about 0.1 mM to about 20 mM, about 0.2 mM to about 20 mM, about 0.3 mM to about 20 mM, about 0.4 mM to about 20 mM, about 0.5 mM to about 20 mM, about 0.6 mM to about 20 mM, about 0.7 mM to about 20 mM, about 0.8 mM to about 20 mM, about 0.9 mM to about 20 mM, about 1.0 mM to about 20 mM, about 0.1 mM to about 15 mM, about 0.2 mM to about 15 mM, about 0.3 mM to about 15 mM, about 0.4 mM to about 15 mM, about 0.5 mM to about 15 mM, about 0.6 mM to about 15 mM, about 0.7 mM to about 15 mM, about 0.8 mM to about 15 mM, about 0.9 mM to about 15 mM, about 1.0 mM to about 15 mM, about 0.1 mM to about 10 mM, about 0.2 mM to about 10 mM, about 0.3 mM to about 10 mM, about 0.4 mM to about 10 mM, about 0.5 mM to about 10 mM, about 0.6 mM to about 10 mM, about 0.7 mM to about 10 mM, about 0.8 mM to about 10 mM, about 0.9 mM to about 10 mM, about 1.0 mM to about 10 mM; or a concentration or set of concentrations within the foregoing concentration ranges; or a sub-range of any of the foregoing concentration ranges.

In a further aspect, the concentration of the first modulator component can be from about 0.1 mM to about 30 mM, about 0.2 mM to about 30 mM, about 0.3 mM to about 30 mM, about 0.4 mM to about 30 mM, about 0.5 mM to about 30 mM, about 0.6 mM to about 30 mM, about 0.7 mM to about 30 mM, about 0.8 mM to about 30 mM, about 0.9 mM to about 30 mM, about 1.0 mM to about 30 mM, about 0.1 mM to about 25 mM, about 0.2 mM to about 25 mM, about 0.3 mM to about 25 mM, about 0.4 mM to about 25 mM, about 0.5 mM to about 25 mM, about 0.6 mM to about 25 mM, about 0.7 mM to about 25 mM, about 0.8 mM to about 25 mM, about 0.9 mM to about 25 mM, about 1.0 mM to about 25 mM, about 0.1 mM to about 20 mM, about 0.2 mM to about 20 mM, about 0.3 mM to about 20 mM, about 0.4 mM to about 20 mM, about 0.5 mM to about 20 mM, about 0.6 mM to about 20 mM, about 0.7 mM to about 20 mM, about 0.8 mM to about 20 mM, about 0.9 mM to about 20 mM, about 1.0 mM to about 20 mM, about 0.1 mM to about 15 mM, about 0.2 mM to about 15 mM, about 0.3 mM to about 15 mM, about 0.4 mM to about 15 mM, about 0.5 mM to about 15 mM, about 0.6 mM to about 15 mM, about 0.7 mM to about 15 mM, about 0.8 mM to about 15 mM, about 0.9 mM to about 15 mM, about 1.0 mM to about 15 mM, about 0.1 mM to about 10 mM, about 0.2 mM to about 10 mM, about 0.3 mM to about 10 mM, about 0.4 mM to about 10 mM, about 0.5 mM to about 10 mM, about 0.6 mM to about 10 mM, about 0.7 mM to about 10 mM, about 0.8 mM to about 10 mM, about 0.9 mM to about 10 mM, about 1.0 mM to about 10 mM, about 0.1 mM to about 9 mM, about 0.2 mM to about 9 mM, about 0.3 mM to about 9 mM, about 0.4 mM to about 9 mM, about 0.5 mM to about 9 mM, about 0.6 mM to about 9 mM, about 0.7 mM to about 9 mM, about 0.8 mM to about 9 mM, about 0.9 mM to about 9 mM, about 1.0 mM to about 9 mM, about 0.1 mM to about 8 mM, about 0.2 mM to about 8 mM, about 0.3 mM to about 8 mM, about 0.4 mM to about 8 mM, about 0.5 mM to about 8 mM, about 0.6 mM to about 8 mM, about 0.7 mM to about 8 mM, about 0.8 mM to about 8 mM, about 0.9 mM to about 8 mM, about 1.0 mM to about 8 mM, about 0.1 mM to about 7 mM, about 0.2 mM to about 7 mM, about 0.3 mM to about 7 mM, about 0.4 mM to about 7 mM, about 0.5 mM to about 7 mM, about 0.6 mM to about 7 mM, about 0.7 mM to about 7 mM, about 0.8 mM to about 7 mM, about 0.9 mM to about 7 mM, about 1.0 mM to about 7 mM, about 0.1 mM to about 6 mM, about 0.2 mM to about 6 mM, about 0.3 mM to about 6 mM, about 0.4 mM to about 6 mM, about 0.5 mM to about 6 mM, about 0.6 mM to about 6 mM, about 0.7 mM to about 6 mM, about 0.8 mM to about 6 mM, about 0.9 mM to about 6 mM, about 1.0 mM to about 6 mM, about 0.1 mM to about 5 mM, about 0.2 mM to about 5 mM, about 0.3 mM to about 5 mM, about 0.4 mM to about 5 mM, about 0.5 mM to about 5 mM, about 0.6 mM to about 5 mM, about 0.7 mM to about 5 mM, about 0.8 mM to about 5 mM, about 0.9 mM to about 5 mM, about 1.0 mM to about 5 mM, about 0.1 mM to about 4 mM, about 0.2 mM to about 4 mM, about 0.3 mM to about 4 mM, about 0.4 mM to about 4 mM, about 0.5 mM to about 4 mM, about 0.6 mM to about 4 mM, about 0.7 mM to about 4 mM, about 0.8 mM to about 4 mM, about 0.9 mM to about 4 mM, about 1.0 mM to about 4 mM, about 0.1 mM to about 3 mM, about 0.2 mM to about 3 mM, about 0.3 mM to about 3 mM, about 0.4 mM to about 3 mM, about 0.5 mM to about 3 mM, about 0.6 mM to about 3 mM, about 0.7 mM to about 3 mM, about 0.8 mM to about 3 mM, about 0.9 mM to about 3 mM, about 1.0 mM to about 3 mM; or a concentration or set of concentrations within the foregoing concentration ranges; or a sub-range of any of the foregoing concentration ranges.

In a further aspect, the concentration of the second modulator component can be from about 0.1 mM to about 30 mM, about 0.2 mM to about 30 mM, about 0.3 mM to about 30 mM, about 0.4 mM to about 30 mM, about 0.5 mM to about 30 mM, about 0.6 mM to about 30 mM, about 0.7 mM to about 30 mM, about 0.8 mM to about 30 mM, about 0.9 mM to about 30 mM, about 1.0 mM to about 30 mM, about 0.1 mM to about 25 mM, about 0.2 mM to about 25 mM, about 0.3 mM to about 25 mM, about 0.4 mM to about 25 mM, about 0.5 mM to about 25 mM, about 0.6 mM to about 25 mM, about 0.7 mM to about 25 mM, about 0.8 mM to about 25 mM, about 0.9 mM to about 25 mM, about 1.0 mM to about 25 mM, about 0.1 mM to about 20 mM, about 0.2 mM to about 20 mM, about 0.3 mM to about 20 mM, about 0.4 mM to about 20 mM, about 0.5 mM to about 20 mM, about 0.6 mM to about 20 mM, about 0.7 mM to about 20 mM, about 0.8 mM to about 20 mM, about 0.9 mM to about 20 mM, about 1.0 mM to about 20 mM, about 0.1 mM to about 15 mM, about 0.2 mM to about 15 mM, about 0.3 mM to about 15 mM, about 0.4 mM to about 15 mM, about 0.5 mM to about 15 mM, about 0.6 mM to about 15 mM, about 0.7 mM to about 15 mM, about 0.8 mM to about 15 mM, about 0.9 mM to about 15 mM, about 1.0 mM to about 15 mM, about 0.1 mM to about 10 mM, about 0.2 mM to about 10 mM, about 0.3 mM to about 10 mM, about 0.4 mM to about 10 mM, about 0.5 mM to about 10 mM, about 0.6 mM to about 10 mM, about 0.7 mM to about 10 mM, about 0.8 mM to about 10 mM, about 0.9 mM to about 10 mM, about 1.0 mM to about 10 mM, about 0.1 mM to about 9 mM, about 0.2 mM to about 9 mM, about 0.3 mM to about 9 mM, about 0.4 mM to about 9 mM, about 0.5 mM to about 9 mM, about 0.6 mM to about 9 mM, about 0.7 mM to about 9 mM, about 0.8 mM to about 9 mM, about 0.9 mM to about 9 mM, about 1.0 mM to about 9 mM, about 0.1 mM to about 8 mM, about 0.2 mM to about 8 mM, about 0.3 mM to about 8 mM, about 0.4 mM to about 8 mM, about 0.5 mM to about 8 mM, about 0.6 mM to about 8 mM, about 0.7 mM to about 8 mM, about 0.8 mM to about 8 mM, about 0.9 mM to about 8 mM, about 1.0 mM to about 8 mM, about 0.1 mM to about 7 mM, about 0.2 mM to about 7 mM, about 0.3 mM to about 7 mM, about 0.4 mM to about 7 mM, about 0.5 mM to about 7 mM, about 0.6 mM to about 7 mM, about 0.7 mM to about 7 mM, about 0.8 mM to about 7 mM, about 0.9 mM to about 7 mM, about 1.0 mM to about 7 mM, about 0.1 mM to about 6 mM, about 0.2 mM to about 6 mM, about 0.3 mM to about 6 mM, about 0.4 mM to about 6 mM, about 0.5 mM to about 6 mM, about 0.6 mM to about 6 mM, about 0.7 mM to about 6 mM, about 0.8 mM to about 6 mM, about 0.9 mM to about 6 mM, about 1.0 mM to about 6 mM, about 0.1 mM to about 5 mM, about 0.2 mM to about 5 mM, about 0.3 mM to about 5 mM, about 0.4 mM to about 5 mM, about 0.5 mM to about 5 mM, about 0.6 mM to about 5 mM, about 0.7 mM to about 5 mM, about 0.8 mM to about 5 mM, about 0.9 mM to about 5 mM, about 1.0 mM to about 5 mM, about 0.1 mM to about 4 mM, about 0.2 mM to about 4 mM, about 0.3 mM to about 4 mM, about 0.4 mM to about 4 mM, about 0.5 mM to about 4 mM, about 0.6 mM to about 4 mM, about 0.7 mM to about 4 mM, about 0.8 mM to about 4 mM, about 0.9 mM to about 4 mM, about 1.0 mM to about 4 mM, about 0.1 mM to about 3 mM, about 0.2 mM to about 3 mM, about 0.3 mM to about 3 mM, about 0.4 mM to about 3 mM, about 0.5 mM to about 3 mM, about 0.6 mM to about 3 mM, about 0.7 mM to about 3 mM, about 0.8 mM to about 3 mM, about 0.9 mM to about 3 mM, about 1.0 mM to about 3 mM; or a concentration or set of concentrations within the foregoing concentration ranges; or a sub-range of any of the foregoing concentration ranges.

In a further aspect, the concentration of the third modulator component can be from about 0.1 mM to about 30 mM, about 0.2 mM to about 30 mM, about 0.3 mM to about 30 mM, about 0.4 mM to about 30 mM, about 0.5 mM to about 30 mM, about 0.6 mM to about 30 mM, about 0.7 mM to about 30 mM, about 0.8 mM to about 30 mM, about 0.9 mM to about 30 mM, about 1.0 mM to about 30 mM, about 0.1 mM to about 25 mM, about 0.2 mM to about 25 mM, about 0.3 mM to about 25 mM, about 0.4 mM to about 25 mM, about 0.5 mM to about 25 mM, about 0.6 mM to about 25 mM, about 0.7 mM to about 25 mM, about 0.8 mM to about 25 mM, about 0.9 mM to about 25 mM, about 1.0 mM to about 25 mM, about 0.1 mM to about 20 mM, about 0.2 mM to about 20 mM, about 0.3 mM to about 20 mM, about 0.4 mM to about 20 mM, about 0.5 mM to about 20 mM, about 0.6 mM to about 20 mM, about 0.7 mM to about 20 mM, about 0.8 mM to about 20 mM, about 0.9 mM to about 20 mM, about 1.0 mM to about 20 mM, about 0.1 mM to about 15 mM, about 0.2 mM to about 15 mM, about 0.3 mM to about 15 mM, about 0.4 mM to about 15 mM, about 0.5 mM to about 15 mM, about 0.6 mM to about 15 mM, about 0.7 mM to about 15 mM, about 0.8 mM to about 15 mM, about 0.9 mM to about 15 mM, about 1.0 mM to about 15 mM, about 0.1 mM to about 10 mM, about 0.2 mM to about 10 mM, about 0.3 mM to about 10 mM, about 0.4 mM to about 10 mM, about 0.5 mM to about 10 mM, about 0.6 mM to about 10 mM, about 0.7 mM to about 10 mM, about 0.8 mM to about 10 mM, about 0.9 mM to about 10 mM, about 1.0 mM to about 10 mM, about 0.1 mM to about 9 mM, about 0.2 mM to about 9 mM, about 0.3 mM to about 9 mM, about 0.4 mM to about 9 mM, about 0.5 mM to about 9 mM, about 0.6 mM to about 9 mM, about 0.7 mM to about 9 mM, about 0.8 mM to about 9 mM, about 0.9 mM to about 9 mM, about 1.0 mM to about 9 mM, about 0.1 mM to about 8 mM, about 0.2 mM to about 8 mM, about 0.3 mM to about 8 mM, about 0.4 mM to about 8 mM, about 0.5 mM to about 8 mM, about 0.6 mM to about 8 mM, about 0.7 mM to about 8 mM, about 0.8 mM to about 8 mM, about 0.9 mM to about 8 mM, about 1.0 mM to about 8 mM, about 0.1 mM to about 7 mM, about 0.2 mM to about 7 mM, about 0.3 mM to about 7 mM, about 0.4 mM to about 7 mM, about 0.5 mM to about 7 mM, about 0.6 mM to about 7 mM, about 0.7 mM to about 7 mM, about 0.8 mM to about 7 mM, about 0.9 mM to about 7 mM, about 1.0 mM to about 7 mM, about 0.1 mM to about 6 mM, about 0.2 mM to about 6 mM, about 0.3 mM to about 6 mM, about 0.4 mM to about 6 mM, about 0.5 mM to about 6 mM, about 0.6 mM to about 6 mM, about 0.7 mM to about 6 mM, about 0.8 mM to about 6 mM, about 0.9 mM to about 6 mM, about 1.0 mM to about 6 mM, about 0.1 mM to about 5 mM, about 0.2 mM to about 5 mM, about 0.3 mM to about 5 mM, about 0.4 mM to about 5 mM, about 0.5 mM to about 5 mM, about 0.6 mM to about 5 mM, about 0.7 mM to about 5 mM, about 0.8 mM to about 5 mM, about 0.9 mM to about 5 mM, about 1.0 mM to about 5 mM, about 0.1 mM to about 4 mM, about 0.2 mM to about 4 mM, about 0.3 mM to about 4 mM, about 0.4 mM to about 4 mM, about 0.5 mM to about 4 mM, about 0.6 mM to about 4 mM, about 0.7 mM to about 4 mM, about 0.8 mM to about 4 mM, about 0.9 mM to about 4 mM, about 1.0 mM to about 4 mM, about 0.1 mM to about 3 mM, about 0.2 mM to about 3 mM, about 0.3 mM to about 3 mM, about 0.4 mM to about 3 mM, about 0.5 mM to about 3 mM, about 0.6 mM to about 3 mM, about 0.7 mM to about 3 mM, about 0.8 mM to about 3 mM, about 0.9 mM to about 3 mM, about 1.0 mM to about 3 mM; or a concentration or set of concentrations within the foregoing concentration ranges; or a sub-range of any of the foregoing concentration ranges.

The disclosed taste modulator compositions can be used at a suitable pH, e.g. a pH of from about pH 2 to about pH 9. In some instances, it may be desirable, e.g., to optimize a Taste Quality Metric such as sweetness linger, and/or body/mouthfeel, to use a lower pH, such as a pH of from about pH 2 to about pH 5, about pH 2 to about pH 4.5, about pH 2.0 to about pH 4.0, about pH 2.0 to about pH 3.9, about pH 2.0 to about pH 3.8, about pH 2.0 to about pH 3.7, about pH 2.0 to about pH 3.6, about pH 2.0 to about pH 3.5, about pH 2.0 to about pH 3.4, about pH 2.0 to about pH 3.3, about pH 2.0 to about pH 3.2, about pH 2.0 to about pH 3.1, about pH 2.0 to about pH 3.0, about pH 2.1 to about pH 4.0, about pH 2.1 to about pH 3.9, about pH 2.1 to about pH 3.8, about pH 2.1 to about pH 3.7, about pH 2.1 to about pH 3.6, about pH 2.1 to about pH 3.5, about pH 2.1 to about pH 3.4, about pH 2.1 to about pH 3.3, about pH 2.1 to about pH 3.2, about pH 2.1 to about pH 3.1, about pH 2.1 to about pH 3.0, about pH 2.2 to about pH 4.0, about pH 2.2 to about pH 3.9, about pH 2.2 to about pH 3.8, about pH 2.2 to about pH 3.7, about pH 2.2 to about pH 3.6, about pH 2.2 to about pH 3.5, about pH 2.2 to about pH 3.4, about pH 2.2 to about pH 3.3, about pH 2.2 to about pH 3.2, about pH 2.2 to about pH 3.1, about pH 2.2 to about pH 3.0, about pH 2.3 to about pH 4.0, about pH 2.3 to about pH 3.9, about pH 2.3 to about pH 3.8, about pH 2.3 to about pH 3.7, about pH 2.3 to about pH 3.6, about pH 2.3 to about pH 3.5, about pH 2.3 to about pH 3.4, about pH 2.3 to about pH 3.3, about pH 2.3 to about pH 3.2, about pH 2.3 to about pH 3.1, about pH 2.3 to about pH 3.0, about pH 2.4 to about pH 4.0, about pH 2.4 to about pH 3.9, about pH 2.4 to about pH 3.8, about pH 2.4 to about pH 3.7, about pH 2.4 to about pH 3.6, about pH 2.4 to about pH 3.5, about pH 2.4 to about pH 3.4, about pH 2.4 to about pH 3.3, about pH 2.4 to about pH 3.2, about pH 2.4 to about pH 3.1, about pH 2.4 to about pH 3.0, about pH 2.5 to about pH 4.0, about pH 2.5 to about pH 3.9, about pH 2.5 to about pH 3.8, about pH 2.5 to about pH 3.7, about pH 2.5 to about pH 3.6, about pH 2.5 to about pH 3.5, about pH 2.5 to about pH 3.4, about pH 2.5 to about pH 3.3, about pH 2.5 to about pH 3.2, about pH 2.5 to about pH 3.1, about pH 2.5 to about pH 3.0; or any pH value or sub-range within the foregoing ranges.

Without wishing to be bound by a particular theory, it is possible that the disclosed taste modulator compositions act in part via activation of the calcium sensing receptor (CaSR). It has been reported that CaSR can be activated by both $Ca^{2+}$ salts and $Mg^{2+}$ salts as well as a large number of other agonists (e.g., see Spurney, R. F., et al. Kidney Int. 1999 May; 55(5):1750-8; and Breitwieser, G. E., et al. Cell Calcium. 2004 March; 35(3):209-16). The CaSR belongs to class C of the seven-transmembrane receptors (G protein-coupled receptor; GPCR). The cloning of the gene for the calcium receptor was reported in 1993 (Nature, 1993 Dec. 9; 366(6455):575-80). The calcium receptor is known to cause various cellular responses through elevation of the intracellular calcium levels, etc., when activated with calcium, etc. The sequence of the human calcium receptor gene is registered with GenBank (Accession No. NM_000388), and is well conserved among many animal species. The "calcium receptor activity" is when binding of a substrate to the calcium receptor activates the guanine nucleotide binding protein and, as a result, transmits one or more signals.

Without wishing to be bound by a particular theory, it is possible that the disclosed taste modulator compositions, acting on the CaSR, may be involved in kokumi taste. In a 2012 paper (Maruyama et al., PLoS ONE, 2012, 7(4): e34489) the activity of the CaSR in taste bud cells was found to be associated with a taste which they refer to as "kokumi taste". In the field of food chemistry and biochemistry, substances having specific tastes have been used for many years. In particular, substances having the five basic tastes, namely, sweet, salty, sour, bitter, and umami (a delicious taste) have been widely used as seasonings. Substances which enhance these basic tastes have also been widely used. One taste that does not fall within these five basic tastes is "kokumi". Kokumi means a taste that is not one of the five basic tastes. Kokumi is a taste that not only enhances the five basic tastes but also enhances the marginal tastes of the basic tastes, such as thickness, growth (mouthfulness), continuity, and harmony. Several methods for imparting kokumi have been reported so far. Substances that have been reported to impart kokumi include glutathione (e.g., Japanese Patent No. 1464928), heated products of gelatin and tropomyosin (e.g., Japanese Patent Laid-open Publication (KOKAI) No. 10-276709), sulfone group-containing compounds (e.g., Japanese Patent Laid-open Publication (KOKAI) No. 8-289760), a peptide containing the Asn-His sequence (e.g., WO2004/096836), and so forth.

Accordingly, without wishing to be bound by a particular theory, improvement in the Taste Quality metric by the disclosed taste modulator compositions herein is via kokumi taste mediated at least in part via the CaSR.

Sweetening Agents

The sweetening agent used in the disclosed sweetener compositions can be a single sweetening agent or mixture of sweetening agents. It is understood that a natural sweetener, a synthetic sweetener, a semi-synthetic sweetener, and combinations thereof, are all within the scope of the disclosed sweetener compositions. Natural sweeteners can include, but are not limited to, natural HP sweeteners, natural polyol sweeteners, natural protein sweeteners, and/or natural carbohydrate sweeteners.

Certain naturally-occurring terpene glycosides are both intensely sweet and non-calorific. For these reasons, terpene glycosides are very attractive for use as a sweetening agent in the food, beverage and dietary supplement industries. Accordingly, in various aspects, the disclosed sweetening agent can comprise a naturally occurring terpene glycoside derived from or present in a plant.

In a further aspects the sweetening agent can be a natural HP sweetener such as a Stevia rebaudiana-derived sweetener (i.e., a Stevia sweetener), a Siraitia grosvenorii-derived sweetener, a protein sweetener, or combinations thereof.

Stevia is a genus of about 240 species of herbs and shrubs in the sunflower family (Asteraceae), native to subtropical and tropical regions from western North America to South America. The plant has been successfully grown under a wide range of conditions from its native subtropics to the cold northern latitudes. Steviol glycosides have zero calories and can be used wherever sugar is used. They are ideal for diabetic and low calorie diets. In addition, the sweet steviol glycosides possess functional and sensory properties superior to those of many high potency sweeteners.

The species Stevia rebaudiana, commonly known as sweetleaf, sweet leaf, sugarleaf, or simply Stevia, is a perennial shrub of the Asteraceae (Compositae) family native to certain regions of South America widely grown for its sweet leaves. Stevia rebaudiana is best known for its sweetness, although the genus includes other members (e.g., S. eupatoria, S. ovata, S plummerae, S. salicifolia, and S. serrata), which may also produce sweet tasting glycosides. The leaves have been traditionally used for hundreds of years in Paraguay and Brazil to sweeten local beverages, foods and medicines. Stevia-based sweeteners can be obtained by extracting one or more sweet compounds from the leaves. Many of these compounds are steviol glycosides. These can be purified from the leaves in various ways, including as extracts. As sweeteners and sugar substitutes, many steviol glycoside extracts have a slower sweetness onset and longer duration than that of sugar. Some of the extracts may have a bitter or licorice-like aftertaste, particularly at high concentrations, hence the usefulness of the presently disclosed taste modulators. Examples of steviol glycosides are described in WO 2013/096420 (see, e.g., listing in FIG. 1); in Ohta et al., "Characterization of Novel Steviol Glycosides from Leaves of Stevia rebaudiana Morita," J. Appl. Glycosi., 57, 199-209 (2010) (See, e.g., Table 5 at p. 204); and in G. J. Gerwig et al., "Stevia Glycosides: Chemical and Enzymatic Modifications of Their Carbohydrate Moieties to Improve the Sweet-Tasting Quality", Chapter 1 in Advances in Carbohydrate Chemistry and Biochemistry, 2016, 73, pp. 1-72.

Stevia rebaudiana Bertoni, as one example, is a perennial shrub of the Asteraceae (Compositae) family native to certain regions of South America. Its leaves have been traditionally used for hundreds of years in Paraguay and Brazil to sweeten local teas and medicines. The plant is commercially cultivated in Japan, Singapore, Taiwan, Malaysia, South Korea, China, Israel, India, Brazil, Australia and Paraguay. Other varieties such as Stevia rebaudiana. Morita and the like, also are known.

The Stevia rebaudiana plant contain a mixture of different diterpene glycosides that can accumulate in leaves in an amount ranging up to about 10 to 20% of the total dry weight. These diterpene glycosides are about 150 to 450 times more potent than sugar. Structurally, the diterpene glycosides are characterized by a single aglycone, steviol, and differ by the presence of varying carbohydrate residues at positions C13 and C19 (for example, see also PCT Patent Publication WO 20013/096420). Typically, on a dry weight basis, the four major steviol glycosides found in the leaves of *Stevia* are Dulcoside A (0.3%), Rebaudioside C (0.6-1.0%), Rebaudioside A (3.8%) and Stevioside (9.1%). Other glycosides identified in *Stevia* extract include one or more of Rebaudioside B, D, E, F, G, H, I, J, K, L, M, N, O, Steviolbioside and Rubusoside. The leaves of other cultivars of *Stevia* are able to accumulate up to 10-20% (on dry weight basis) steviol glycosides. The major glycosides found in *Stevia* leaves are Rebaudioside A (2-10%), stevioside (2-10%), and Rebaudioside C (1-2%). Other glycosides such as Rebaudioside B, D, E, and F, Steviolbioside and Rubusoside are found at much lower levels (approx. 0-0.2%). As used herein, the term "REB" is used as a shorthand for rebaudioside. For example, REBN refers to Rebaudioside N.

Steviol glycosides differ from each other not only by molecular structure, but also by their taste properties. The physical and sensory properties are well studied for a number of the steviol glycosides. Steviol glycoside extracts can be on the order of 10× or even 500× times the sweetness potency of sugar. Because *Stevia* glycoside extracts tend to have a reducing effect on blood glucose levels as compared to sucrose, glucose, and fructose, sweetener compositions based on one or more steviol glycosides are attractive to people on carbohydrate-controlled diets. For example, the sweetness potency of Stevioside is around 110-270 times higher than sucrose, Rebaudioside A between 150 and 320 times, and Rebaudioside C between 40-60 times more potent than sucrose. Dulcoside A is 30 times more potent than sucrose. The *Stevia* extract containing Rebaudioside A and Stevioside as major components showed sweetness potency around 250 times. Rebaudioside A has the least astringent, the least bitter, and the least persistent aftertaste thus possessing the most favorable sensory attributes in major steviol glycosides (Tanaka O. (1987) Improvement of taste of natural sweeteners. *Pure Appl. Chem.* 69:675-683; Phillips K. C. (1989) *Stevia*: steps in developing a new sweeteners. In: Grenby T. H. ed. Developments in sweeteners, vol. 3. Elsevier Applied Science, London. 1-43).

Previous studies show a certain correlation between number of glycosidic residues and taste quality of a steviol glycoside. When comparing steviol glycosides, rebaudioside A (G4, having 4 glucose residues) clearly surpasses stevioside and rebaudioside B (G3, each having 3 glucose residues) in taste quality. Steviolbioside and rubusoside (G2, each having 2 glucose residues) have a taste quality that is proven to be significantly inferior to that of stevioside (G3). In addition, the taste quality of rhamnosylated glycosides is inferior compared to that of glucosylated glycosides. Tanaka, O., "Improvement of Taste of Natural Sweeteners," Pure & Appl. Chem., Vol. 69, No. 4, pp. 675-683 (1997). Steviol glycosides with a greater number of glucose residues, for example, more than two glucose residues, show a better taste quality. Particularly mono- and di-glucosyl forms of stevioside (having 4 glucose residues (G4) and 5 glucose residues (G5) respectively) possess significantly better taste quality. Tanaka, O., "Improvement of Taste of Natural Sweeteners," Pure & Appl. Chem., Vol. 69, No. 4, pp. 675-683 (1997).

Figure 2:
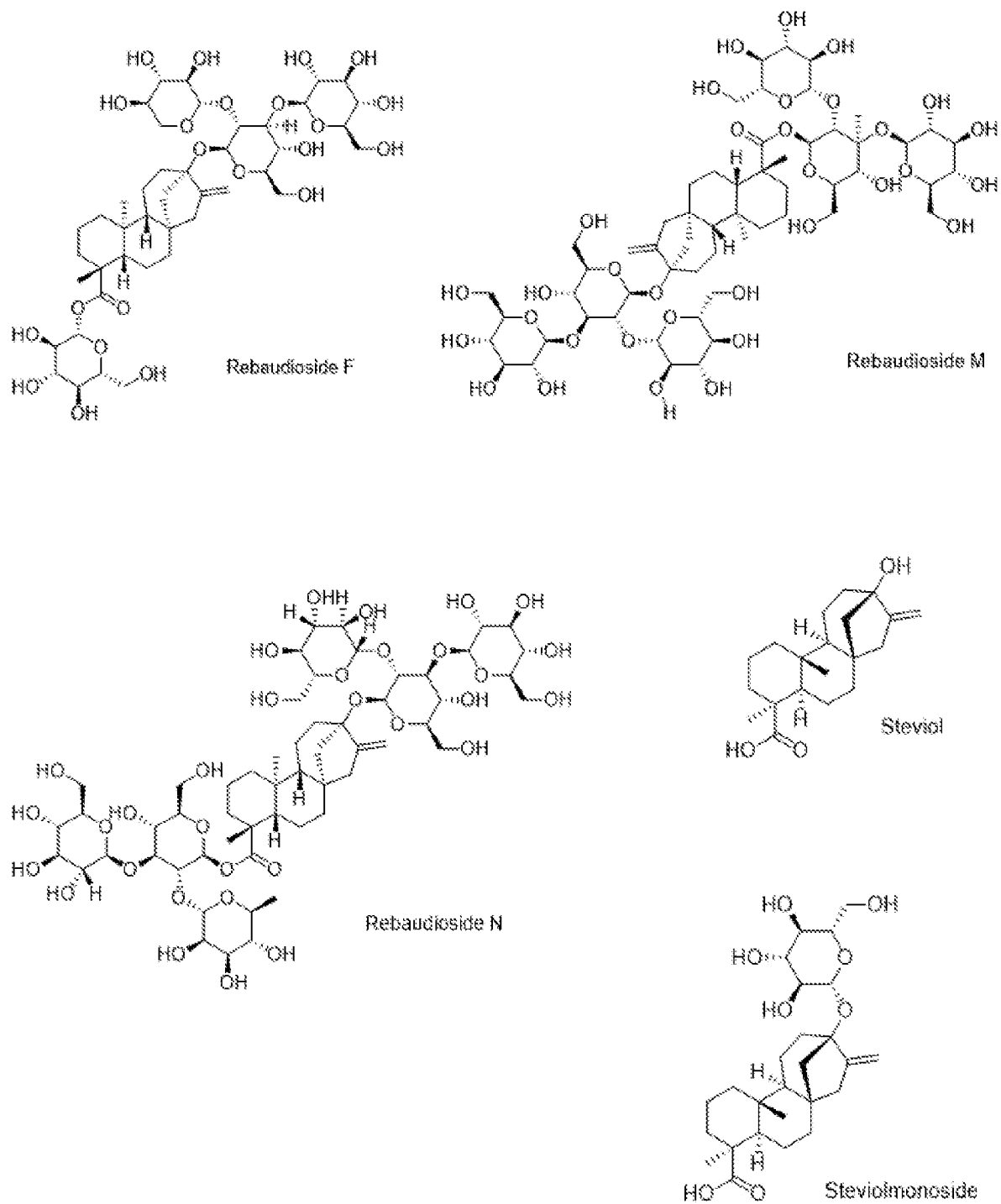
FIG. 2 shows chemical structures for representative *Stevia*-derived compounds as indicated (Rebaudioside F, Rebaudioside M, Rebaudioside N, Steviol, and Steviolmonoside).
Figure 3:
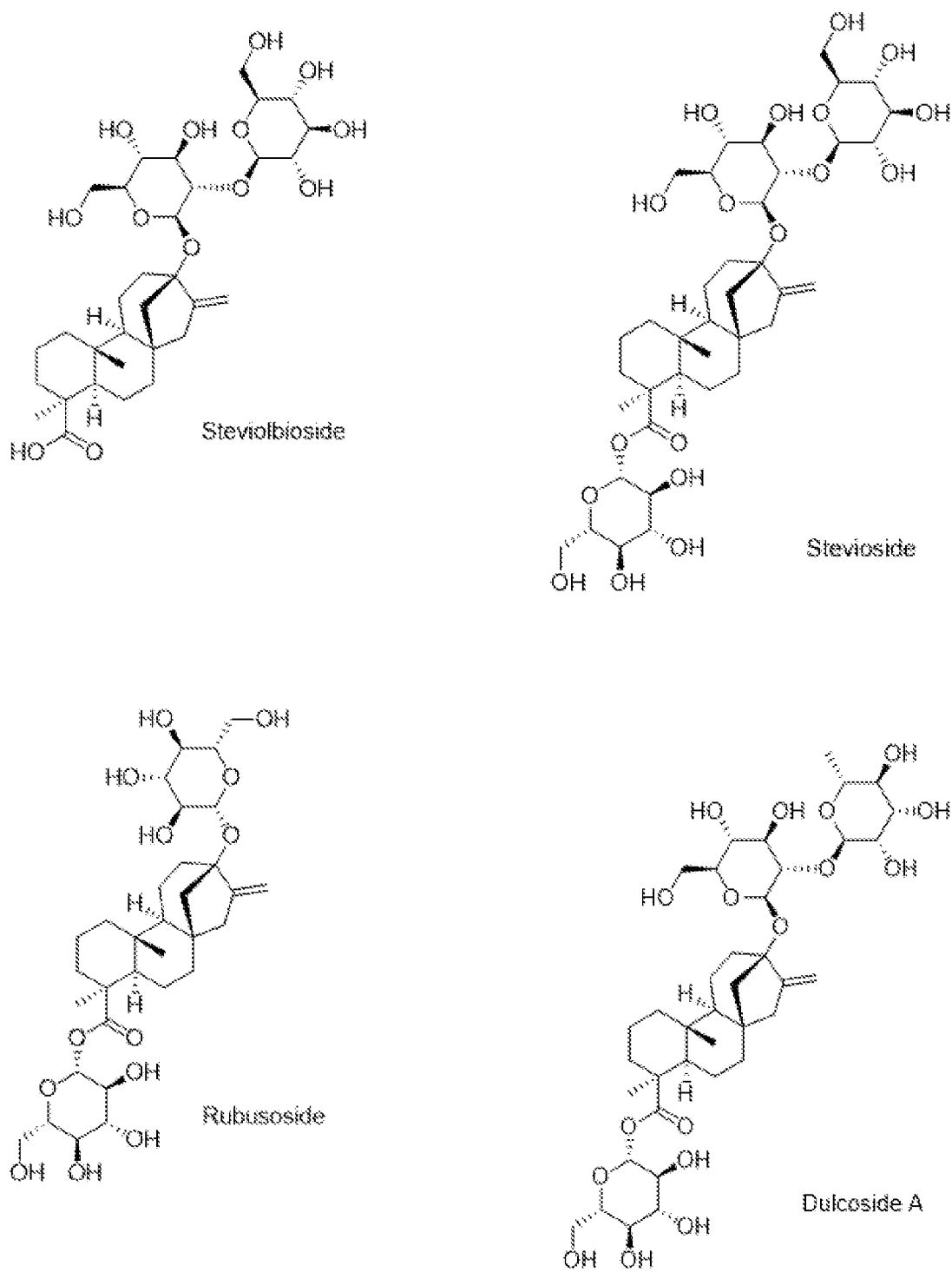
FIG. 3 shows chemical structures for representative *Stevia*-derived compounds as indicated (Stevioside, Dulcoside A, Steviolbioside, and Rubusoside).

The chemical structures of some diterpene glycosides of *Stevia rebaudiana* are presented in FIGS. 1, 2 and 3. In a further aspect, a *Stevia* sweetener can comprise one or more of the *Stevia* sweeteners shown in Table 1 below and in FIGS. 1 and 2.

TABLE 1

| Common Name | Shortened Name | Chemical Formula | Molecular Weight |
|---|---|---|---|
| Rebaudioside A | REBA | $C_{44}H_{70}O_{23}$ | 967.02 |
| Rebaudioside B | REBB | $C_{38}H_{60}O_{18}$ | 804.88 |
| Rebaudioside C | REBC | $C_{44}H_{70}O_{22}$ | 951.02 |
| Rebaudioside D | REBD | $C_{50}H_{80}O_{28}$ | 1129.16 |
| Rebaudioside E | REBE | $C_{44}H_{70}O_{23}$ | 967.02 |
| Rebaudioside F | REBF | $C_{43}H_{68}O_{22}$ | 937.00 |
| Rebaudioside M | REBM | $C_{57}H_{92}O_{33}$ | 1305.33 |
| Rebaudioside N | REBN | $C_{56}H_{90}O_{32}$ | 1275.30 |

TABLE 3

| Common Name | IUPAC Name |
|---|---|
| Rebaudioside A | (3R,4S,5S,6R)-3,4,5-trihydroxy-6-(hydroxymethyl) tetrahydro-2H-pyran-2-yl(4R,4αS,11αR,11βS)-10-(((2R,3R,5R,6R)-5-hydroxy-6-(hydroxymethyl)-3,4-bis(((2S,3R,4S,5S,6R)-3,4,5-trihydroxy-6-(hydroxymethyl)tetrahydro-2H-pyran-2-yl)oxy) tetrahydro-2H-pyran-2-yl)oxy)-4,11β-dimethyl-8-methylenetetradecahydro-6α,9-methanocyclohepta[a]naphthalene-4-carboxylate |
| Rebaudioside B | (4R,4αS,6αR,9S,11αR,11βS)-9-(((2S,3R,5R,6R)-5-hydroxy-6-(hydroxymethyl)-4-(((2S,3R,4S,5S,6R)-3,4,5-trihydroxy-6-(hydroxymethyl)tetrahydro-2H-pyran-2-yl)oxy)-3-(((3R,4S,5S,6R)-3,4,5-trihydroxy-6-(hydroxymethyl)tetrahydro-2H-pyran-2-yl)oxy) tetrahydro-2H-pyran-2-yl)oxy)-4,11β-dimethyl-8-methylenetetradecahydro-6α,9-methanocyclohepta[a]naphthalene-4-carboxylic acid |
| Rebaudioside C | (3R,4S,5S,6R)-3,4,5-trihydroxy-6-(hydroxymethyl) tetrahydro-2H-pyran-2-yl (4R,6αR,9S,11βS)-9-(((2S,3R,4S,5R,6R)-5-hydroxy-6-(hydroxymethyl)-4-(((2S,3R,4S,5S,6R)-3,4,5-trihydroxy-6-(hydroxymethyl)tetrahydro-2H-pyran-2-yl)oxy)-3-(((2R,3S,4S,5S,6R)-3,4,5-trihydroxy-6-methyltetrahydro-2H-pyran-2-yl)oxy)tetrahydro-2H-pyran-2-yl)oxy)-4,11β-dimethyl-8-methylenetetradecahydro-6α,9-methanocyclohepta[a]naphthalene-4-carboxylate |
| Rebaudioside D | (2S,3R,4S,5S,6R)-4,5-dihydroxy-6-(hydroxymethyl)-3-(((2S,3R,4S,5S,6R)-3,4,5-trihydroxy-6-(hydroxymethyl)tetrahydro-2H-pyran-2-yl)oxy) tetrahydro-2H-pyran-2-yl (4R,4αS,6αR,9S,11αR,11βS)-9-(((2S,3R,4S,5R,6R)-5-hydroxy-6-(hydroxymethyl)-3,4-bis(((2S,3R,4S,5S,6R)-3,4,5-trihydroxy-6-(hydroxymethyl)tetrahydro-2H-pyran-2-yl)oxy) tetrahydro-2H-pyran-2-yl)oxy)-4,11β-dimethyl-8-methylenetetradecahydro-6α,9-methanocyclohepta[a]naphthalene-4-carboxylate |
| Rebaudioside E | [(2S,3R,4S,5S,6R)-4,5-dihydroxy-6-(hydroxymethyl)-3-[(2S,3R,4S,5S,6R)-3,4,5-trihydroxy-6-(hydroxymethyl) oxan-2-yl]oxyoxan-2-yl](1R,4S,5R,9S,10R,13S)-13-[(2S,3R,4S,5S,6R)-4,5-dihydroxy-6-(hydroxymethyl)-3-[(2S,3R,4S,5S,6R)-3,4,5-trihydroxy-6-(hydroxymethyl) oxan-2-yl]oxyoxan-2-yl]oxy-5,9-dimethyl-14-methylidenetetracyclo[11.2.1.01,10.04,9]hexadecane-5-carboxylate |
| Rebaudioside F | (2S,3R,4S,5S,6R)-3,4,5-trihydroxy-6-(hydroxymethyl) tetrahydro-2H-pyran-2-yl(4R,4αS,6αR,9S,11αR,11βS)-9-(((2S,3R,4S,5R,6R)-5-hydroxy-6-(hydroxymethyl)-4-(((2S,3R,4S,5S,6R)-3,4,5-trihydroxy-6-(hydroxymethyl)tetrahydro-2H-pyran-2-yl)oxy)-3-(((2S,3R,4S,5R)-3,4,5-trihydroxytetrahydro-2H-pyran-2-yl)oxy)tetrahydro-2H-pyran-2-yl)oxy)-4,11β-dimethyl-8-methylenetetradecahydro-6α,9-methanocyclohepta[a]naphthalene-4-carboxylate |
| Rebaudioside M | (2S,3R,4S,5R,6R)-5-hydroxy-6-(hydroxymethyl)-4-methyl-3,4-bis(((2S,3R,4S,5S,6R)-3,4,5-trihydroxy-6-(hydroxymethyl)tetrahydro-2H-pyran-2-yl)oxy) tetrahydro-2H-pyran-2-yl (4R,4αS,6αR,9S,11αR,11βS)-9-(((2S,3R,4S,5R,6R)-5-hydroxy-6-(hydroxymethyl)-3,4-bis(((2S,3R,4S,5S,6R)-3,4,5-trihydroxy-6-(hydroxymethyl)tetrahydro-2H-pyran-2-yl)oxy)tetrahydro-2H-pyran-2-yl)oxy)-4,11β-dimethyl- |

TABLE 3-continued

| Common Name | IUPAC Name |
|---|---|
| Rebaudioside N | 8-methylenetetradecahydro-6α,9-methanocyclohepta[a]naphthalene-4-carboxylate (2S,3R,4S,5R,6R)-5-hydroxy-6-(hydroxymethyl)-4-(((2S,3R,4S,5S,6R)-3,4,5-trihydroxy-6-(hydroxymethyl)tetrahydro-2H-pyran-2-yl)oxy)-3-(((2S,3R,4R,5R,6S)-3,4,5-trihydroxy-6-methyltetrahydro-2H-pyran-2-yl)oxy)tetrahydro-2H-pyran-2-yl (4R,4αS,6αR,9S,11αR,11βS)-9-(((2S,3R,4S,5R,6R)-5-hydroxy-6-(hydroxymethyl)-3,4-bis(((2S,3R,4S,5S,6R)-3,4,5-trihydroxy-6-(hydroxymethyl)tetrahydro-2H-pyran-2-yl)oxy)tetrahydro-2H-pyran-2-yl)oxy)-4,11β-dimethyl-8-methylenetetradecahydro-6,9-methanocyclohepta[a]naphthalene-4-carboxylate |

Steviol glycosides can be obtained from leaves in a variety of ways, including extraction techniques using either water or organic solvent extraction. Supercritical fluid extraction and steam distillation methods have also been described. Methods for the recovery of diterpenoid sweet glycosides from *Stevia rebaudiana* using supercritical $CO_2$, membrane technology, and water or organic solvents, such as methanol and ethanol, can also be used. Methods for the extraction and purification of sweet glycosides from the *Stevia rebaudiana* plant using water and/or organic solvents are described in, for example, U.S. Pat. Nos. 4,361,697; 4,082,858; 4,892,938; 5,972,120; 5,962,678; 7,838,044 and 7,862,845. However, even in a highly purified state, steviol glycosides still possess undesirable taste attributes such as bitterness, sweet aftertaste, licorice flavor, etc. It was shown that these flavor notes become more prominent as the concentration of steviol glycosides increases (Prakash I., DuBois G. E., Clos J. F., Wilkens K. L., Fosdick L. E. (2008) Development of Rebiana, a natural, HP sweetener. Food Chem. Toxicol., 46, S75-S82).

Rebaudioside B (CAS No: 58543-17-2), or REBB, also known as stevioside $A_4$ (Kennelly E. J. (2002) Constituents of *Stevia rebaudiana* In *Stevia*: The genus *Stevia*, Kinghom A. D. (Ed), Taylor & Francis, London, p. 71), is one of the sweet glycosides found in *Stevia rebaudiana*. Sensory evaluations show that REBB was approximately 300-350 times more potent than sucrose, while for REBA this value was approximately 350-450 (Crammer, B. and Ikan, R. (1986) Sweet glycosides from the *Stevia* plant. Chemistry in Britain 22, 915-916, and 918). It was believed that REBB forms from partial hydrolysis of Rebaudioside A during the extraction process (Kobayashi, M., Horikawa, S., Degrandi, I. H., Ueno, J. and Mitsuhashi, H. (1977) Dulcosides A and B, new diterpenoid glycosides from *Stevia rebaudiana*. Phytochemistry 16, 1405-1408).

However further research shows that REBB occurs naturally in the leaves of *Stevia rebaudiana* and currently it is one of nine steviol glycosides recognized by FAO/JECFA (United Nations' Food and Agriculture Organization/Joint Expert Committee on Food Additives) in calculating total steviol glycosides' content in commercial steviol glycosides preparations (FAO JECFA (2010) Steviol Glycosides, Compendium of Food Additive Specifications, FAO JECFA Monographs 10, 17-21). On the other hand, the water solubility of REBB is reported to be about 0.1% (Kinghorn A. D. (2002) Constituents of *Stevia rebaudiana* In *Stevia*: The genus *Stevia*, Kinghorn A. D. (Ed), Taylor & Francis, London, p. 8). In many food processes where highly concentrated ingredients are used, a highly soluble form of REBB can be desirable. Rebaudioside D (CAS No: 63279-13-0), is one of the sweet glycosides found in *Stevia rebaudiana*. Studies have shown that highly purified forms of Rebaudioside D (REBD) possess a very desirable taste profile, almost lacking the bitterness and lingering licorice aftertaste typical for other steviol glycosides.

It is known that some of the undesired taste attributes associated with steviol glycoside molecules can be substantially reduced by the reaction of intermolecular transglycosylation of various enzymes, upon which the attachment of new carbohydrates at positions C13 and C19 of steviol glycosides takes place. The effect of adding glucose molecules to purified stevioside molecules by transglycosylation was previously evaluated (Tanaka, O., "Improvement of Taste of Natural Sweeteners," Pure & Appl. Chem., Vol. 69, No. 4, pp. 675-683 (1997)). The resulting glucosylated steviosides were evaluated for their sweetness and taste quality and it was observed that the improvement of taste quality was greater when the glucose units were added to the C19 position rather than at the C13 position.

Various enzymes have been used to conduct such transglycosylation. Pullulanase, isomaltase (Lobov, S. V. et al., "Enzymic Production of Sweet Stevioside Derivatives: Transglucosylation by Glucosidases," Agric. Biol. Chem., Vol. 55, No. 12, pp. 2959-2965 (1991)), β-galactosidase (Kitahata, S. et al., "Production of Rubusoside Derivatives by Transgalactosylation of Various β-Galactosidases," Agric. Biol. Chem., Vol. 53, No. 11, pp. 2923-2928 (1989)), and dextrine saccharase (Yamamoto, K. et al., Biosci. Biotech. Biochem., Vol. 58, No. 9, pp. 1657-1661 (1994)) were used as enzymes with pullulan, maltose, lactose, and partially hydrolyzed starch being donors. The transglucosylation of steviol glycosides was also achieved by the action of cyclodextrin glucanotransferases (CGTase). The obtained sweeteners possessed improved sweetness without bitterness and licorice taste (U.S. Pat. Nos. 4,219,571, 7,838,044, and 7,807,206).

It has been observed that an increase in the number of glucose units in steviol glycoside molecules (for example, from stevioside to Rebaudioside A), is associated with an increase in the sweetness intensity and improvement in the sweetness profile (taste). It is known that the sweetness quality generally improves with the addition of glucose units. The number of glucose units in a glucosylated steviol glycoside can be as described in International Patent Publ. No. WO2012129451A1, e.g., at least one glucose unit, at least one glucose units, or at least one glucose units. In some instances, the least one glucose unit, at least one glucose units, or at least one glucose units is at the C-13, C-19, or both the C-13 and C-19 of the glucosylated steviol glycoside. In other instances, at least one glucose unit occurs at position C-19 of the glucosylated steviol glycoside.

The fruit of the Cucurbitaceae family is one source for naturally-occurring terpene glycosides. An example of such fruit is monk fruit, also known by its Chinese name luo han guo (*Siraitia grosvenorii*, formerly known as *Momordica grosvenorii*). Monk fruit is grown in the South East provinces of China, mainly in the Guangxi region. This fruit has been cultivated and used for hundreds of years as a traditional Chinese remedy for coughs and congestion of the lungs, and also as a sweetener and flavoring agent in soups and teas.

Monk fruit and some other fruits of the Cucurbitaceae family contain terpene glycosides, such as mogrosides and siamenosides, which are typically present at a level of around 1% in the fleshy part of the fruit. These terpene glycosides have been described and characterized in Matsumoto et al., Chem. Pharm. Bull., 38(7), 2030-2032 (1990).

The most abundant mogroside in monk fruit is mogroside V, which has been estimated to have a sweetness of approximately 250 times cane sugar on a weight basis. The fruit has terpene glycosides, wherein at least one of the terpene glycosides is mogroside V. The fruit of the Cucurbitaceae family may be monk fruit or other terpene glycoside-containing fruits. The juice obtained from fruit of the Cucurbitaceae family also has terpene glycosides, wherein at least one of the terpene glycosides is mogroside V. The juice may be a fruit juice, a juice concentrate, or a diluted juice. In one aspect, the sweet juice composition produced from the method retains at least about 20%, 25%, 30%, 35%, 40%, 45%, 50%, 55%, 60%, 65%, 70% on a dry weight basis, as determined by HPLC, of mogroside V from the juice; or a range of mogroside V on a dry weight basis comprising as an lower and upper limit two values selected from the foregoing values.

Monk fruit and other terpene glycoside-containing fruits of the Cucurbitaceae family, although sweet, are generally unsuitable for widespread use as a non-nutritive sweetener without additional processing. Raw fruit of the Cucurbitaceae family has a tendency to easily form off-flavors, and pectin in the fruit may cause gelling. The fruit can be preserved by drying, but this can cause the formation of other undesirable bitter, astringent and cooked flavors. Existing sweet juice compositions derived from monk fruit and other terpene glycoside-containing fruits of the Cucurbitaceae family suffer from the disadvantages of having a brown/yellow color, poor stability and noticeable undesirable flavors.

Various methods and techniques are currently known in the art to remove off-flavor components from the juice of monk fruit and other terpene glycoside-containing fruits of the Cucurbitaceae family; however, these methods also remove significant amounts of mogrosides from the juice. For example, see U.S. Pat. No. 5,411,755; U.S. Patent Application Nos. 2009/0196966 and 2009/0311404. Other methods of producing a sweet juice with a clean flavor from monk fruit and other terpene glycoside-containing fruits of the Cucurbitaceae family containing terpene glycosides have been reported comprising utilizing a cation exchange resin and an anion exchange resin, either as separate resins or as a mixed bed of cation and anion exchange resins, to produce a sweet juice composition. For example, see U.S. Patent Application No. 2018/0000140. This latter method can be used to purify juice obtained from monk fruit; however, juice from other fruits comprise terpene glycosides, e.g., mogroside V or a terpene glycoside-rich fruit or mogroside V-rich fruit. Suitable fruits may be from a plant of the family Cucurbitaceae, and more specifically, from tribe Jollifieae, subtribe Thladianthinae, and more even specifically, genus *Siraitia*. For example, the fruit may be from a plant selected from *Siraitia grosvenorii, Siraitia siamensis, Siraitia silomaradjae, Siraitia sikkimensis, Siraitia africana, Siraitia borneensis*, and *Siraitia taiwaniana*. It should be understood that the terpene glycoside content, including the mogroside V content, after purification by the method disclosed U.S. Patent Application No. 2018/0000140, or any other similar method, may vary depending on numerous factors, including the composition of the juice, the type of ion exchange resins selected, and conditions under which the ion exchange resins are used.

In various aspects, a method of purifying a monk fruit juice, extract, composition, or mixture can remove, one or more compounds that contribute to grassy or earthy flavors or odors and bitterness. Such compounds may be selected from, for example, melanoidins, peptides, terpenoids, phenols (including, for example, polyphenols, phenolic oligomers, condensed polyphenols), and terpene glycosides (other than sweet-tasting terpene glycosides described above, including for example mogroside V, mogroside IV, 11-oxo-mogroside V, mogroside VI, and siamenoside I).

In one aspect, the compound is a bitter-tasting melanoidin. In another aspect, the compound is a bitter-tasting peptide. In yet another aspect, the compound is a bitter-tasting terpenoid. In yet another aspect, the compound is a bitter-tasting phenol. In yet another aspect, the compound is a bitter-tasting polyphenol. In one aspect, the compound is a bitter-tasting phenolic oligomer. In another aspect, the compound is a bitter-tasting condensed polyphenol. In yet another aspect, the compound is a bitter-tasting terpene glycoside (other than sweet-tasting terpene glycosides described above, including for example mogroside V, mogroside IV, 11-oxo-mogroside V, mogroside VI, and siamenoside I).

In certain aspects, the methods described herein remove at least 5%, at least 10%, at least 15%, at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, at least 95%, at least 99%, or about 100% of one or more of the bitter-tasting compounds described above on a dry weight basis as determined by HPLC, from the juice (before contact with the resins) to produce the sweet juice composition.

A monk fruit juice, extract, composition, or mixture useful in the any of the disclosed compositions, mixtures, and formulations may be obtained from commercially available source or from monk fruit or other terpene glycoside-containing fruits using any methods known in the art, such as those methods described above, and others as may be known to the skilled artisan. The juice to be purified according to the methods described herein contains one or more terpene glycosides. In certain aspects, at least one of the terpene glycosides is a mogroside, including, but not limited to, mogroside V.

Mogrosides generally have varying number of glucose units, from 2 to 6, attached to carbon 3 and carbon 24 on a triterpene backbone. Mogrosides may include, for example, mogroside II, mogroside III, mogroside IV, mogroside V, mogroside VI, and any derivatives thereof. Mogroside II is the simplest mogroside, with one glucose residue attached to each of carbons 3 and 24. Mogroside III differs in having an additional glucose residue chained to carbon 24, while mogroside IV has 2-unit glucose side chains at both carbon 3 and 24. The progression continues through mogroside VI, which has 3 glucose residues attached at each of the two carbons at locations 3 and 24 of the triterpene backbone.

In other aspects, the one or more terpene glycoside in a monk fruit juice, extract, composition, or mixture are selected from mogroside V, mogroside IV, 11-oxo-mogroside V, and mogroside VI. In a preferred aspect, at least one of the terpene glycosides is mogroside V, which is also known as mogro-3-O-[β-D-glucopyranosyl (1-6)-β-D-glucopyranoside]-24-O-{[β-D-glucopyranosyl(1-2)]-[?-D-glucopyranosyl(1-6)]-β-D-gluco-pyranoside}.

The terpene glycosides present in a monk fruit juice, extract, composition, or mixture may include, for example, mogrosides and siamenosides. In one aspect, the terpene glycosides monk fruit juice, extract, composition, or mixture include mogroside V, mogroside IV, 11-oxo-mogroside V, mogroside VI, and siamenoside I. In another aspect, the terpene glycosides retained include mogroside V, and one or more of mogroside IV, 11-oxo-mogroside V, mogroside VI, and siamenoside I. In other aspects, a monk fruit juice, extract, composition, or mixture may contain other terpene glycosides such as siamenosides. For example, in certain aspects, in addition to mogroside V, one of the terpene glycosides is siamenoside I.

It should be understood that the amount of terpene glycosides present in a monk fruit juice, extract, composition, or mixture may vary depending on the type of fruit used, as well as the method and conditions used to obtain juice from the fruit. It should also be understood that sugars present in the juice to be purified are naturally found in the fruit. In certain aspects, the sugars naturally found in the fruit are simple sugars, including for example, monosaccharides and disaccharides. Such sugars naturally found in the fruit may include, for example, glucose, fructose, and sucrose.

One of skill in the art would recognize suitable analytical techniques that may be used to identify and quantify the amount of mogroside V and other terpene glycosides present in a monk fruit juice, extract, composition, or mixture. For example, in one aspect, high-performance liquid chromatography (also referred to as high-pressure liquid chromatography or HPLC) is a chromatographic technique that can be used for identifying, quantifying, and optionally purifying the individual terpene glycosides in the mixture.

Mogroside V content and terpene glycoside content may be expressed as a percentage on weight basis (% w/w). In one aspect, mogroside V content and terpene glycoside content are expressed as a percentage on dry weight basis. "Dry weight basis" refers to the weight of the mogroside V or terpene glycoside content divided by the weight of dry soluble solids in a given sample. In other aspects, mogroside V content and terpene glycoside content may be expressed in different units, such as percentage on wet weight basis or g/L. For example, one of skill in the art may measure mogroside V content and terpene glycoside content in a diluted juice sample using g/L, since volume of the juice can more easily be measured in a dilute sample. In contrast, one of skill in the art may measure mogroside V content and terpene glycoside content in a concentrated juice sample by weight. Further, one of skill in the art would be able to convert one unit to another.

The disclosed sweetening agent can further comprise one or more polyhydroxy C3-C12 compound. In a further aspect, the disclosed sweetening agent can further comprise a compound such as allulose, allose, sucrose, fructose, glucose, propylene glycol, glycerol, erythritol, arabinitol, maltitol, lactitol, sorbitol, mannitol, xylitol, tagatose, trehalose, galactose, rhamnose, cyclodextrin (e.g., α-cyclodextrin, β-cyclodextrin, and γ-cyclodextrin), ribulose, threose, arabinose, xylose, lyxose, allose, altrose, mannose, idose, lactose, maltose, invert sugar, isotrehalose, neotrehalose, palatinose isomaltulose, erythrose, deoxyribose, gulose, idose, talose, erythrulose, xylulose, allulose, turanose, cellobiose, glucosamine, mannosamine, fucose, fuculose, glucuronic acid, gluconic acid, glucono-lactone, abequose, galactosamine, xylo-oligosaccharides (xylotriose, xylobiose and the like), gentio-oligoscaccharides (gentiobiose, gentiotriose, gentiotetraose and the like), galacto-oligosaccharides, sorbose, ketotriose (dihydroxyacetone), aldotriose (glyceraldehyde), nigero-oligosaccharides, fructooligosaccharides (kestose, nystose and the like), maltotetraose, inaltotriol, tetrasaccharides, mannan-oligosaccharides, malto-oligosaccharides (maltotriose, maltotetraose, maltopentaose, maltohexaose, maltoheptaose and the like), dextrins, lactulose, melibiose, raffinose, rhamnose, ribose, isomerized, liquid sugars such as high fructose corn/starch syrup ("HFCS/HFSS," e.g., HFCS55, HFCS42, or HFCS90), coupling sugars, soybean oligosaccharides, glucose syrup and combinations thereof. It is understood that D- or L-configurations can be used when applicable.

In a further aspect, the disclosed sweetening agent can further comprise at least one carbohydrate sweetener selected from the group consisting of glucose, fructose, sucrose and combinations thereof, in an amount effective to provide a concentration from about 100 ppm to about 140,000 ppm when present in a sweetened composition, such as, for example, a beverage.

In a further aspect, the disclosed sweetening agent can further comprise one or more carbohydrate sweeteners selected from D-allose, D-allulose, L-ribose, D-tagatose, L-glucose, fucose, L-Arabinose, Turanose and combinations thereof, in an amount effective to provide a concentration from about 100 ppm to about 140,000 ppm when present in a sweetened composition, such as, for example, a beverage.

In a further aspect, the disclosed sweetening agent can be one or more synthetic sweeteners. As used herein, the phrase "synthetic sweetener" refers to any composition which is not found naturally in nature. Preferably, a synthetic sweetener has a sweetness potency greater than sucrose, fructose, and/or glucose, yet has less calories than sucrose, fructose, and/or glucose. Non-limiting examples of synthetic HP sweeteners suitable for aspects of this disclosure include sucralose, potassium acesulfame, acesulfame acid and salts thereof, aspartame, alitame, saccharin and salts thereof, neohesperidin dihydrochalcone, cyclamate, cyclamic acid and salts thereof, neotame, advantame, glucosylated steviol glycosides (GSGs) and combinations thereof. The synthetic sweetener is present in the disclosed sweetener composition in an amount effective to provide a concentration from about 0.3 ppm to about 3,500 ppm when present in a sweetened composition, such as, for example, a beverage.

In a further aspect, the disclosed sweetening agent can be one or more natural, HP sweeteners. Suitable natural HP sweeteners include, but are not limited to, rebaudioside A, rebaudioside B, rebaudioside C, rebaudioside D, rebaudioside E, rebaudioside F, rebaudioside I, rebaudioside H, rebaudioside J, rebaudioside L, rebaudioside K, rebaudioside J, rebaudioside M (also known as rebaudioside X), rebaudioside O, dulcoside A, dulcoside B, rubusoside, *Stevia*, stevioside, mogroside IV, mogroside V, Luo Han Guo Sweetener (as noted above, this can be used interchangeably and is the same as Monk Fruit Sweetener or a *Siraitia grosvenorii*-derived sweetener), siratose, siamenoside, monatin and its salts (monatin SS, RR, RS, SR), curculin, glycyrrhizic acid and its salts, thaumatin, monellin, mabinlin, brazzein, hernandulcin, phyllodulcin, glycyphyllin, phloridzin, trilobatin, baiyunoside, osladin, polypodoside A, pterocaryoside A, pterocaryoside B, mukurozioside, phlomisoside I, periandrin I, abrusoside A, steviolbioside and cyclocarioside I. The natural HP sweetener is present in the disclosed sweetener composition in an amount effective to provide a concentration from about 0.1 ppm to about 3,000 ppm when present in a sweetened composition, such as, for example, a beverage.

In a further aspect, the disclosed sweetening agent can comprise one or more chemically (including enzymatically) modified natural HP sweetener. Modified natural HP sweeteners include glycosylated natural HP sweetener such as glucosyl-, galactosyl-, fructosyl-derivatives containing 1-50 glycosidic residues. Glycosylated natural HP sweeteners may be prepared by enzymatic transglycosylation reaction catalyzed by various enzymes possessing transglycosylating activity. Others include one or more sugar alcohols obtained from sugar such by using hydrogenation techniques. In some aspects, a glycosylated natural HP sweetener can be a glucosylated steviol glycoside (which can also be referred to as a "GSG"). An exemplary, but not limiting, GSG that can be used in the disclosed sweetener compositions are those marketed by Almendra under the brand name of Steviaromes™.

Non-limiting examples of HP sweeteners that can be utilized with the disclosed taste modulator compositions include rebaudioside A, rebaudioside B, rebaudioside C, rebaudioside D, rebaudioside E, rebaudioside F, dulcoside A, dulcoside B, rubusoside, *Stevia*, stevioside, mogroside IV, and mogroside V, Luo Han Guo sweetener, siamenoside, monatin and its salts (monatin SS, RR, RS, SR), curculin, glycyrrhizic acid and its salts, thaumatin, monellin, mabinlin, brazzein, hernandulcin, phyllodulcin, glycyphyllin, phloridzin, trilobatin, baiyunoside, osladin, polypodoside A, pterocaryoside A, pterocaryoside B, mukurozioside, phlomisoside 1, periandrin I, abrusoside A, and cyclocarioside I. HP sweeteners also include modified HP sweeteners. Modified HP sweeteners include HP sweeteners which have been altered naturally. For example, a modified HP sweeteners includes, but is not limited to, HP sweeteners which have been fermented, contacted with enzyme, or derivatized or substituted on the HP sweeteners.

In another aspect, the HP sweeteners may be selected from the group consisting of rebaudioside A, rebaudioside B, rebaudioside C, rebaudioside D, rebaudioside E, rebaudioside F, dulcoside A, dulcoside B, rubusoside, *Stevia*, stevioside, mogroside IV, mogroside V, Luo Han Quo sweetener, siamenoside, monatin and its salts (monatin SS, RR, RS, SR), curculin, glycyrrhizic acid and its salts, thaumatin, monellin, mabinlin, brazzein, hernandulcin, phyllodulcin, glycyphyllin, phloridzin, trilobatin, baiyunoside, osladin, polypodoside A, pterocaryoside A, pterocaryoside B, mukurozioside, phlomisoside I, periandrin I, abrusoside A, cyclocarioside I, saccharin and its salts, cyclamic acid and its salts, aspartame, aspartame-acesulfame salt, acesulfame potassium, sucralose, alitame, neotame, neohesperidin dihydrochalone (NHDC), advantame and combinations thereof.

In a further aspect, the disclosed sweetening agent can comprise REBA, REBB, REBC, REDD, REBE, REBF, REBM, REBN, or combinations thereof, and at least one other sweetener that in combination function as the sweetening agent (i.e. the substance or substances that provide sweetness) of a disclosed sweetener composition. The disclosed sweetener compositions often exhibit synergy when individual sweetener compounds are combined and have improved flavor and temporal profiles compared to each sweetener alone. One or more additional sweetening agents can be used in the disclosed sweetener compositions. In a yet further aspect, disclosed sweetener compositions comprise REBA and at least one additional sweetener. In a still further aspect, a sweeteners composition contains REBB and at least one additional sweetener. In an even further aspect, a sweeteners composition contains REBC and at least one additional sweetener. In a still further aspect, a sweeteners composition contains REBD and at least one additional sweetener. In a yet further aspect, a sweeteners composition contains REBE and at least one additional sweetener. In an even further aspect, a sweeteners composition contains REBF and at least one additional sweetener. In a still further aspect, a sweeteners composition contains REBM and at least one additional sweetener. In a yet further aspect, a sweeteners composition contains REBN and at least one additional sweetener.

Sweetener Compositions

In various aspects, the present disclosure, relates to sweetener compositions comprising a sweetening agent and a taste modulator composition. The taste modulator composition improves key properties associated with many sweetening agents, including maximal sweetness response; mitigates flavor profile issues such as bitter and/or licorice-like off-tastes; improves sweetness onset and lingering sweet aftertaste properties; improves desensitization/adaptation profile issues; and improves body/mouthfeel characteristics. As used herein, the term "off-taste(s)" refers to an amount or degree of taste that is not characteristically or usually found in a beverage product or a consumable product of the present disclosure. For example, an off-taste is an undesirable taste of a sweetened consumable to consumers, such as, a bitter taste, a licorice-like taste, a metallic taste, an aversive taste, an astringent taste, a delayed sweetness onset, a lingering sweet aftertaste, and the like, etc. In a further aspect, the disclosed sweetener compositions comprise a taste modulator component comprising a first salt having a first cation selected from $Na^+$, $K^+$, $Ca^{2+}$, and $Mg^{2+}$; and a sweetening agent. The taste modulator component of the disclosed sweetener compositions can optionally further comprise a second cation, a third cation, and a fourth cation.

As noted herein above, frequently HP sweeteners differ significantly from natural caloric sugars in ways that frustrate consumers and limit market penetration of products containing many HP sweeteners. Accepted metrics for commercial viability of a HP sweetener include: 1) Taste Quality; 2) Safety; 3) Solubility; 4) Stability; and 5) Cost. With regard to Taste Quality, HP sweeteners exhibit temporal profiles, maximal responses, flavor profiles, mouthfeels, and often desensitization/adaptation behaviors that differ from sugar. Specifically, HP sweeteners frequently exhibit one or more of the following problems or issues:

$R_m$ Problem: Insufficient Maximal Sweetness Response;

Flavor Profile Problem: Bitter and Licorice-Like Off-tastes;

Temporal Profile Problem: Delay in Sweetness Onset and Lingering Sweet Aftertaste (Sweetness Linger=SL);

Desensitization/Adaptation Profile Problem: Sweetness causing a Desensitization of the Taste System and/or Reduction in Perceived Sweetness on Iterative Tasting; and Body/Mouthfeel Problem: Absence of Body/Mouthfeel common in Sugar-Sweetened Formulations.

Attempts have been made in the industry to address the Taste Quality issues associated with many HP sweeteners. However, although some of the currently available taste modulators are able to address the Taste Quality issues, these known taste modulators add unacceptable cost that make their use in common food and beverage products impractical; provide only limited modulation of Taste Quality problems, thus limiting their widespread use; are associated with regulatory or potential toxicity issues; or combinations of all these shortcomings.

The major application of HP sweeteners has been and will continue to be 0-calorie and calorie-reduced beverages. Thus, with regard to the cost metric discussed above, representative cost considerations for a HP sweetener can be assessed at a first approximation on the basis of cost impact for beverage use. Beverage manufacturers typically determine ingredient costs on a Cost per Unit Case (CUC) basis, where a Unit Case is 24-8 ounce bottles (ca. 5.7 L). For purpose of illustration, in the US at the present time, the sweetener system CUCs for a sucrose-sweetened beverage is about $0.60, a high-fructose corn syrup-sweetened beverage is about $0.50, an aspartame-sweetened beverage is about $0.04 and an aspartame/acesulfame-K sweetened beverage is about $0.03.

In contrast, the use of many HP sweeteners cannot be used in typical beverage or food products because they often require a taste modulator to address the Taste Quality issues noted above. In particular, currently available taste modulators add significant cost to the use of many HP sweeteners. For example, a beverage using a sweetener formulation comprising rebaudioside A is understood in the industry to require the use of a taste modulator such as meso-erythritol in order to achieve desired Taste Quality metrics described above. However, at the levels required for beverage use, a rebaudioside A/meso-erythritol formulation is estimated to cost about $1.20 to about $1.50 on a CUC basis. Thus, although the use of a natural sweetener, such as rebaudioside A, in a beverage product is highly desirable in many respects, the use in such a context is cost prohibitive.

In various aspects, a disclosed sweetener composition comprises: a sweetening agent and a taste modulator component comprising a first salt having a first cation independently selected from $Na^+$, $K^+$, $Ca^{2+}$, and $Mg^{2+}$; optionally a second salt having a second cation independently selected from $Na^+$, $K^+$, $Ca^{2+}$, and $Mg^{2+}$; optionally a third salt having a third cation independently selected from $Na^+$, $K^+$, $Ca^{2+}$, and $Mg^{2+}$; and optionally a fourth salt having a fourth cation independently selected from $Na^+$, $K^+$, $Ca^{2+}$, and $Mg^{2+}$; provided that first cation, second cation, third cation, and fourth cation are not the same.

In a further aspect, a disclosed sweetener composition comprises: a sweetening agent and a taste modulator component comprising a first salt having a first cation and a first anion, such that the first cation is selected from $Na^+$, $K^+$, $Ca^{2+}$, and $Mg^{2+}$; and a first anion is selected from gluconate ($C_6H_{11}O_7^{-1}$), citrate ($C_6H_5O_7^{-3}$), hydrogen citrate ($C_6H_6O_7^{-2}$), dihydrogen citrate ($C_6H_7O_7^{-1}$), malate ($C_4H_6O_5^{-2}$), hydrogen malate ($C_4H_7O_5^{-1}$), maleate ($C_4H_2O_4^{-2}$), hydrogen maleate ($C_4H_3O_4^{-1}$), fumarate ($C_4H_2O_4^{-2}$), hydrogen fumarate ($C_4H_3O_4^{-1}$), succinate ($C_4H_4O_4^{-2}$), hydrogen succinate ($C_4H_5O_4^{-1}$), glutarate ($C_5H_6O_4^{-2}$), hydrogen glutarate ($C_5H_7O_4^{-1}$), adipate $C_6H_8O_4^{-2}$), hydrogen adipate $C_6H_9O_4^{-1}$), lactate ($C_3H_5O_3^{-1}$), tartrate ($C_4H_4O_6^{-2}$), bitartrate ($C_4H_5O_6^{-1}$), phosphate ($PO_4^{-3}$), monohydrogen phosphate ($HPO_4^{-2}$), dihydrogen phosphate ($H_2PO_4^-$), fluoride ($F^-$), chloride ($Cl^-$), sulfate ($SO_4^{-2}$), bisulfate ($HSO_4^{-1}$), nitrate ($NO_3^-$), carbonate ($CO_3^{-2}$), bicarbonate ($HCO_3^-$), glycerate ($C_3H_5O_4^{-1}$), glycolate ($C_2H_3O_3^{-1}$), or combinations thereof. In a specific aspect, the first anion comprises citrate ($C_6H_5O_7^{-3}$), chloride ($Cl^-$), phosphate ($PO_4^{-3}$), carbonate ($CO_3^{-2}$), and combinations thereof. Alternatively, in an aspect, the first anion comprises citrate ($C_6H_5O_7^{-3}$) or the first anion comprises chloride ($Cl^-$).

In a further aspect, a disclosed sweetener composition comprises: a sweetening agent and a taste modulator component comprising a first salt having a first cation and a first anion; optionally a second salt having a second cation and a second anion; optionally a third salt having a third cation and a third anion; and optionally a fourth salt having a fourth cation and a fourth anion; the first cation is independently selected from $Na^+$, $K^+$, $Ca^{2+}$, and $Mg^{2+}$; the second cation is independently selected from $Na^+$, $K^+$, $Ca^{2+}$, and $Mg^{2+}$; the third cation is independently selected from $Na^+$, $K^+$, $Ca^{2+}$, and $Mg^{2+}$; and the fourth cation is independently selected from $Na^+$, $K^+$, $Ca^{2+}$, and $Mg^{2+}$; the first anion is independently selected from gluconate ($C_6H_{11}O_7^{-1}$), citrate ($C_6H_5O_7^{-3}$), hydrogen citrate ($C_6H_6O_7^{-2}$), dihydrogen citrate ($C_6H_7O_7^{-1}$), malate ($C_4H_6O_5^{-2}$), hydrogen malate ($C_4H_7O_5^{-1}$), maleate ($C_4H_2O_4^{-2}$), hydrogen maleate ($C_4H_3O_4^{-1}$), fumarate ($C_4H_2O_4^{-2}$), hydrogen fumarate ($C_4H_3O_4^{-1}$), succinate ($C_4H_4O_4^{-2}$), hydrogen succinate ($C_4H_5O_4^{-1}$), glutarate ($C_5H_6O_4^{-2}$), hydrogen glutarate ($C_5H_7O_4^{-1}$), adipate $C_6H_8O_4^{-2}$), hydrogen adipate $C_6H_9O_4^{-1}$), lactate ($C_3H_5O_3^{-1}$), tartrate ($C_4H_4O_6^{-2}$), bitartrate ($C_4H_5O_6^{-1}$), phosphate ($PO_4^{-3}$), monohydrogen phosphate ($HPO_4^{-2}$), dihydrogen phosphate ($H_2PO_4^-$), fluoride ($F^-$), chloride ($Cl^-$), sulfate ($SO_4^{-2}$), bisulfate ($HSO_4^{-1}$), nitrate ($NO_3^-$), carbonate ($CO_3^{-2}$), bicarbonate ($HCO_3^-$), glycerate ($C_3H_5O_4^{-1}$), glycolate ($C_2H_3O_3^{-1}$), or combinations thereof; the second anion is independently selected from gluconate ($C_6H_{11}O_7^{-1}$), citrate ($C_6H_5O_7^{-3}$), hydrogen citrate ($CH_6H_6O_7^{-2}$), dihydrogen citrate ($C_6H_7O_7^{-1}$), malate ($C_4He_6O_5^{-2}$), hydrogen malate ($C_4H_7O_5^{-1}$), maleate ($C_4H_2O_4^{-2}$), hydrogen maleate ($C_4H_3O_4^{-1}$), fumarate ($C_4H_2O_4^{-2}$), hydrogen fumarate ($C_4H_3O_4^{-1}$), succinate ($C_4H_4O_4^{-2}$), hydrogen succinate ($C_4H_5O_4^{-1}$), glutarate ($C_5H_6O_4^{-2}$), hydrogen glutarate ($C_5H_7O_4^{-1}$), adipate $C_6H_8O_4^{-2}$), hydrogen adipate $C_6H_9O_4^{-1}$), lactate ($C_3H_5O_3^{-1}$), tartrate ($C_4H_4O_6^{-2}$), bitartrate ($C_4H_5O_6^{-1}$), phosphate ($PO_4^{-3}$), monohydrogen phosphate ($HPO_4^{-2}$), dihydrogen phosphate ($H_2PO_4^-$), fluoride ($F^-$), chloride ($Cl^-$), sulfate ($SO_4^{-2}$), bisulfate ($HSO_4^{-1}$), nitrate ($NO_3^-$), carbonate ($CO_3^{-2}$), bicarbonate ($HCO_3^-$), glycerate ($C_3H_5O_4^{-1}$), glycolate ($C_2H_3O_3^{-1}$), or combinations thereof; the third anion is independently selected from gluconate ($C_6H_{11}O_7^{-1}$), citrate ($C_6H_5O_7^{-3}$), hydrogen citrate ($CH_6H_6O_7^{-2}$), dihydrogen citrate ($C_6H_7O_7^{-1}$), malate ($C_4H_6O_5^{-2}$), hydrogen malate ($C_4H_7O_5^{-1}$), maleate ($C_4H_2O_4^{-2}$), hydrogen maleate ($C_4H_3O_4^{-1}$), fumarate ($C_4H_2O_4^{-2}$), hydrogen fumarate ($C_4H_3O_4^{-1}$), succinate ($C_4H_4O_4^{-2}$), hydrogen succinate ($C_4H_5O_4^{-1}$), glutarate ($C_5H_6O_4^{-2}$), hydrogen glutarate ($C_5H_7O_4^{-1}$), adipate $C_6H_8O_4^{-2}$), hydrogen adipate $C_6H_9O_4^{-1}$), lactate ($C_3H_5O_3^{-1}$), tartrate ($C_4H_4O_6^{-2}$), bitartrate ($C_4H_5O_6^{-1}$), phosphate ($PO_4^{-3}$), monohydrogen phosphate ($HPO_4^{-2}$), dihydrogen phosphate ($H_2PO_4^-$), fluoride ($F^-$), chloride ($Cl^-$), sulfate ($SO_4^{-2}$), bisulfate ($HSO_4^{-1}$), nitrate ($NO_3^-$), carbonate ($CO_3^{-2}$), bicarbonate ($HCO_3^-$), glycerate ($C_3H_5O_4^{-1}$), glycolate ($C_2H_3O_3^{-1}$), or combinations thereof; and the fourth anion is independently selected from gluconate ($C_6H_{11}O_7^{-1}$), citrate ($C_6H_5O_7^{-3}$), hydrogen citrate ($C_6H_6O_7^{-2}$), dihydrogen citrate ($C_6H_7O_7^{-1}$), malate ($C_4H_6O_5^{-2}$), hydrogen malate ($C_4H_7O_5^{-1}$), maleate ($C_4H_2O_4^{-2}$), hydrogen maleate ($C_4H_3O_4^{-1}$), fumarate ($C_4H_2O_4^{-2}$), hydrogen fumarate ($C_4H_3O_4^{-1}$), succinate ($C_4H_4O_4^{-2}$), hydrogen succinate ($C_4H_5O_4^{-1}$), glutarate ($C_5H_6O_4^{-2}$), hydrogen glutarate ($C_5H_7O_4^{-1}$), adipate $C_6H_8O_4^{-2}$), hydrogen adipate $C_6H_9O_4^{-1}$), lactate ($C_3H_5O_3^{-1}$), tartrate ($C_4H_4O_6^{-2}$), bitartrate ($C_4H_5O_6^{-1}$), phosphate ($PO_4^{-3}$), monohydrogen phosphate ($HPO_4^{-2}$), dihydrogen phosphate ($H_2PO_4^-$), fluoride ($F^-$), chloride ($Cl^-$), sulfate ($SO_4^{-2}$), bisulfate ($HSO_4^{-1}$), nitrate ($NO_3^-$), carbonate ($CO_3^{-2}$), bicarbonate ($HCO_3^-$), glycerate ($C_3H_5O_4^{-1}$), glycolate ($C_2H_3O_3^{-1}$), or combinations thereof; provided that first cation, second cation, third cation, and fourth cation are not the same.

In various aspects, a disclosed sweetener composition comprises: a sweetening agent and a taste modulator component comprising a first salt having a first cation independently selected from $Na^+$, $K^+$, $Ca^{2+}$, and $Mg^{2+}$; optionally a second salt having a second cation independently selected from $Na^+$, $K^+$, $Ca^{2+}$, and $Mg^{2+}$; optionally a third salt having a third cation independently selected from $Na^+$, $K^+$, $Ca^{2+}$, and $Mg^{2+}$; and optionally a fourth salt having a fourth cation independently selected from $Na^+$, $K^+$, $Ca^{2+}$, and $Mg^{2+}$;

provided that first cation, second cation, third cation, and fourth cation are not the same; and such that the sweetening agent comprises a natural HP sweetener, a synthetic HP sweetener, a carbohydrate/polyol sweetener, or combinations thereof.

In a further aspect, a disclosed sweetener composition comprises: a sweetening agent and a taste modulator component comprising a first salt having a first cation and a first anion, such that the first cation is selected from $Na^+$, $K^+$, $Ca^{2+}$, and $Mg^{2+}$; and a first anion is selected from gluconate ($C_6H_{11}O_7^{-1}$), citrate ($C_6H_5O_7^{-3}$), hydrogen citrate ($C_6H_6O_7^{-2}$), dihydrogen citrate ($C_6H_7O_7^{-1}$), malate ($C_4H_6O_5^{-2}$), hydrogen malate ($C_4H_7O_5^{-1}$), maleate ($C_4H_2O_4^{-2}$), hydrogen maleate ($C_4H_3O_4^{-1}$), fumarate ($C_4H_2O_4^{-2}$), hydrogen fumarate ($C_4H_3O_4^{-1}$), succinate ($C_4H_4O_4^{-2}$), hydrogen succinate ($C_4H_5O_4^{-1}$), glutarate ($C_5H_6O_4^{-2}$), hydrogen glutarate ($C_5H_7O_4^{-1}$), adipate $C_6H_8O_4^{-2}$), hydrogen adipate $C_6H_9O_4^{-1}$), lactate ($C_3H_5O_3^{-1}$), tartrate ($C_4H_4O_6^{-2}$), bitartrate ($C_4H_5O_6^{-1}$), phosphate ($PO_4^{-3}$), monohydrogen phosphate ($HPO_4^{-2}$), dihydrogen phosphate ($H_2PO_4^-$), fluoride ($F^-$), chloride ($Cl^-$), sulfate ($SO_4^{-2}$), bisulfate ($HSO_4^{-1}$), nitrate ($NO_3^-$), carbonate ($CO_3^{-2}$), bicarbonate ($HCO_3^-$), glycerate ($C_3H_5O_4^{-1}$), glycolate ($C_2H_3O_3^{-1}$), or combinations thereof. In a specific aspect, the first anion comprises citrate ($C_6H_5O_7^{-3}$), chloride ($Cl^-$), phosphate ($PO_4^{-3}$), carbonate ($CO_3^{-2}$), and combinations thereof; and such that the sweetening agent comprises a natural HP sweetener, a synthetic HP sweetener, a carbohydrate/polyol sweetener, or combinations thereof. Alternatively, in an aspect, the first anion comprises citrate ($C_6H_5O_7^{-3}$) or the first anion comprises chloride ($Cl^-$).

In a further aspect, a disclosed sweetener composition comprises: a sweetening agent and a taste modulator component comprising a first salt having a first cation and a first anion; optionally a second salt having a second cation and a second anion; optionally a third salt having a third cation and a third anion; and optionally a fourth salt having a fourth cation and a fourth anion; the first cation is independently selected from $Na^+$, $K^+$, $Ca^{2+}$, and $Mg^{2+}$; the second cation is independently selected from $Na^+$, $K^+$, $Ca^{2+}$, and $Mg^{2+}$; the third cation is independently selected from $Na^+$, $K^+$, $Ca^{2+}$, and $Mg^{2+}$; and the fourth cation is independently selected from $Na^+$, $K^+$, $Ca^{2+}$, and $Mg^{2+}$; the first anion is independently selected from gluconate ($C_6H_{11}O_7^{-1}$), citrate ($C_6H_5O_7^{-3}$), hydrogen citrate ($C_6H_6O_7^{-2}$), dihydrogen citrate ($C_6H_7O_7^{-1}$), malate ($C_4H_6O_5^{-2}$), hydrogen malate ($C_4H_7O_5^{-1}$), maleate ($C_4H_2O_4^{-2}$), hydrogen maleate ($C_4H_3O_4^{-1}$), fumarate ($C_4H_2O_4^{-2}$), hydrogen fumarate ($C_4H_3O_4^{-1}$), succinate ($C_4H_4O_4^{-2}$), hydrogen succinate ($C_4H_5O_4^{-1}$), glutarate ($C_5H_6O_4^{-2}$), hydrogen glutarate ($C_5H_7O_4^{-1}$), adipate $C_6H_8O_4^{-2}$), hydrogen adipate $C_6H_9O_4^{-1}$), lactate ($C_3H_5O_3^{-1}$), tartrate ($C_4H_4O_6^{-2}$), bitartrate ($C_4H_5O_6^{-1}$), phosphate ($PO_4^{-3}$), monohydrogen phosphate ($HPO_4^{-2}$), dihydrogen phosphate ($H_2PO_4^-$), fluoride ($F^-$), chloride ($Cl^-$), sulfate ($SO_4^{-2}$), bisulfate ($HSO_4^{-1}$), nitrate ($NO_3^-$), carbonate ($CO_3^{-2}$), bicarbonate ($HCO_3^-$), glycerate ($C_3H_5O_4^{-1}$), glycolate ($C_2H_3O_3^{-1}$), or combinations thereof; the second anion is independently selected from gluconate ($C_6H_{11}O_7^{-1}$), citrate ($C_6H_5O_7^{-3}$), hydrogen citrate ($C_6H_6O_7^{-2}$), dihydrogen citrate ($C_6H_7O_7^{-1}$), malate ($C_4H_6O_5^{-2}$), hydrogen malate ($C_4H_7O_5^{-1}$), maleate ($C_4H_2O_4^{-2}$), hydrogen maleate ($C_4H_3O_4^{-1}$), fumarate ($C_4H_2O_4^{-2}$), hydrogen fumarate ($C_4H_3O_4^{-1}$), succinate ($C_4H_4O_4^{-2}$), hydrogen succinate ($C_4H_5O_4^{-1}$), glutarate ($C_5H_6O_4^{-2}$), hydrogen glutarate ($C_5H_7O_4^{-1}$), adipate $C_6H_8O_4^{-2}$), hydrogen adipate $C_6H_9O_4^{-1}$), lactate ($C_3H_5O_3^{-1}$), tartrate ($C_4H_4O_6^{-2}$), bitartrate ($C_4H_5O_6^{-1}$), phosphate ($PO_4^{-3}$), monohydrogen phosphate ($HPO_4^{-2}$), dihydrogen phosphate ($H_2PO_4^-$), fluoride ($F^-$), chloride ($Cl^-$), sulfate ($SO_4^{-2}$), bisulfate ($HSO_4^{-1}$), nitrate ($NO_3^-$), carbonate ($CO_3^{-2}$), bicarbonate ($HCO_3^-$), glycerate ($C_3H_5O_4^{-1}$), glycolate ($C_2H_3O_3^{-1}$), or combinations thereof; the third anion is independently selected from gluconate ($C_6H_{11}O_7^{-1}$), citrate ($C_6H_5O_7^{-3}$), hydrogen citrate ($C_6H_6O_7^{-2}$), dihydrogen citrate ($C_6H_7O_7^{-1}$), malate ($C_4H_6O_5^{-2}$), hydrogen malate ($C_4H_7O_5^{-1}$), maleate ($C_4H_2O_4^{-2}$), hydrogen maleate ($C_4H_3O_4^{-1}$), fumarate ($C_4H_2O_4^{-2}$), hydrogen fumarate ($C_4H_3O_4^{-1}$), succinate ($C_4H_4O_4^{-2}$), hydrogen succinate ($C_4H_5O_4^{-1}$), glutarate ($C_5H_6O_4^{-2}$), hydrogen glutarate ($C_5H_7O_4^{-1}$), adipate $C_6H_8O_4^{-2}$), hydrogen adipate $C_6H_9O_4^{-1}$), lactate ($C_3H_5O_3^{-1}$), tartrate ($C_4H_4O_6^{-2}$), bitartrate ($C_4H_5O_6^{-1}$), phosphate ($PO_4^{-3}$), monohydrogen phosphate ($HPO_4^{-2}$), dihydrogen phosphate ($H_2PO_4^-$), fluoride ($F^-$), chloride ($Cl^-$), sulfate ($SO_4^{-2}$), bisulfate ($HSO_4^{-1}$), nitrate ($NO_3^-$), carbonate ($CO_3^{-2}$), bicarbonate ($HCO_3^-$), glycerate ($C_3H_5O_4^{-1}$), glycolate ($C_2H_3O_3^{-1}$), or combinations thereof; and the fourth anion is independently selected from gluconate ($C_6H_{11}O_7^{-1}$), citrate ($C_6H_5O_7^{-3}$), hydrogen citrate ($C_6H_6O_7^{-2}$), dihydrogen citrate ($C_6H_7O_7^{-1}$), malate ($C_4H_6O_5^{-2}$), hydrogen malate ($C_4H_7O_5^{-1}$), maleate ($C_4H_2O_4^{-2}$), hydrogen maleate ($C_4H_3O_4^{-1}$), fumarate ($C_4H_2O_4^{-2}$), hydrogen fumarate ($C_4H_3O_4^{-1}$), succinate ($C_4H_4O_4^{-2}$), hydrogen succinate ($C_4H_5O_4^{-1}$), glutarate ($C_5H_6O_4^{-2}$), hydrogen glutarate ($C_5H_7O_4^{-1}$), adipate $C_6H_8O_4^{-2}$), hydrogen adipate $C_6H_9O_4^{-1}$), lactate ($C_3H_5O_3^{-1}$), tartrate ($C_4H_4O_6^{-2}$), bitartrate ($C_4H_5O_6^{-1}$), phosphate ($PO_4^{-3}$), monohydrogen phosphate ($HPO_4^{-2}$), dihydrogen phosphate ($H_2PO_4^-$), fluoride ($F^-$), chloride ($Cl^-$), sulfate ($SO_4^{-2}$), bisulfate ($HSO_4^{-1}$), nitrate ($NO_3^-$), carbonate ($CO_3^{-2}$), bicarbonate ($HCO_3^-$), glycerate ($C_3H_5O_4^{-1}$), glycolate ($C_2H_3O_3^{-1}$), or combinations thereof; provided that first cation, second cation, third cation, and fourth cation are not the same; and such that the sweetening agent comprises a natural HP sweetener, a synthetic HP sweetener, a carbohydrate/polyol sweetener, or combinations thereof.

In various aspects, a disclosed sweetener composition comprises: a sweetening agent and a taste modulator component comprising a first salt having a first cation independently selected from $Na^+$, $K^+$, $Ca^{2+}$, and $Mg^{2+}$; optionally a second salt having a second cation independently selected from $Na^+$, $K^+$, $Ca^{2+}$, and $Mg^{2+}$; optionally a third salt having a third cation independently selected from $Na^+$, $K^+$, $Ca^{2+}$, and $Mg^{2+}$; and optionally a fourth salt having a fourth cation independently selected from $Na^+$, $K^+$, $Ca^{2+}$, and $Mg^{2+}$; provided that first cation, second cation, third cation, and fourth cation are not the same; and such that the sweetening agent comprises a *Stevia* sweetener selected from stevioside, rubusoside, steviolbioside, dulcoside A, rebaudioside A, rebaudioside B, rebaudioside C, rebaudioside D, rebaudioside E, rebaudioside F, rebaudioside M, a glucosylated steviol glycoside, a mixture of glucosylated steviol glycosides, or combinations thereof.

In a further aspect, a disclosed sweetener composition comprises: a sweetening agent and a taste modulator component comprising a first salt having a first cation and a first anion, such that the first cation is selected from $Na^+$, $K^+$, $Ca^{2+}$, and $Mg^{2+}$; and a first anion is selected from gluconate ($C_6H_{11}O_7^{-1}$), citrate ($C_6H_5O_7^{-3}$), hydrogen citrate ($C_6H_6O_7^{-2}$), dihydrogen citrate ($C_6H_7O_7^{-1}$), malate ($C_4H_6O_5^{-2}$), hydrogen malate ($C_4H_7O_5^{-1}$), maleate ($C_4H_2O_4^{-2}$), hydrogen maleate ($C_4H_3O_4^{-1}$), fumarate ($C_4H_2O_4^{-2}$), hydrogen fumarate ($C_4H_3O_4^{-1}$), succinate ($C_4H_4O_4^{-2}$), hydrogen succinate ($C_4H_5O_4^{-1}$), glutarate ($C_5H_6O_4^{-2}$), hydrogen glutarate ($C_5H_7O_4^{-1}$), adipate $C_6H_8O_4^{-2}$), hydrogen adipate $C_6H_9O_4^{-1}$), lactate ($C_3H_5O_3^{-1}$), tartrate ($C_4H_4O_6^{-2}$), bitartrate ($C_4H_5O_6^{-1}$), phosphate ($PO_4^{-3}$), monohydrogen phosphate ($HPO_4^{-2}$), dihydrogen phosphate ($H_2PO_4^-$), fluoride ($F^-$), chloride ($Cl^-$), sulfate ($SO_4^{-2}$), bisulfate ($HSO_4^{-1}$), nitrate ($NO_3^-$), carbonate ($CO_3^{-2}$), bicarbonate ($HCO_3^-$), glycerate ($C_3H_5O_4^{-1}$), glycolate ($C_2H_3O_3^{-1}$), or combinations thereof. In a specific aspect, the first anion comprises citrate ($C_6H_5O_7^{-3}$), chloride ($Cl^-$), phosphate ($PO_4^{-3}$), carbonate ($CO_3^{-2}$), and combinations thereof; and such that the sweetening agent comprises a *Stevia* sweetener selected from stevioside, rubusoside, steviolbioside, dulcoside A, rebaudioside A, rebaudioside B, rebaudioside C, rebaudioside D, rebaudioside E, rebaudioside F, rebaudioside M, a glucosylated steviol glycoside, a mixture of glucosylated steviol glycosides, or combinations thereof.

In a further aspect, a disclosed sweetener composition comprises: a sweetening agent and a taste modulator component comprising a first salt having a first cation and a first anion; optionally a second salt having a second cation and a second anion; optionally a third salt having a third cation and a third anion; and optionally a fourth salt having a fourth cation and a fourth anion; the first cation is independently selected from $Na^+$, $K^+$, $Ca^{2+}$, and $Mg^{2+}$; the second cation is independently selected from $Na^+$, $K^+$, $Ca^{2+}$, and $Mg^{2+}$; the third cation is independently selected from $Na^+$, $K^+$, $Ca^{2+}$, and $Mg^{2+}$; and the fourth cation is independently selected from $Na^+$, $K^+$, $Ca^{2+}$, and $Mg^{2+}$; the first anion is independently selected from gluconate ($C_6H_{11}O_7^{-1}$), citrate ($C_6H_5O_7^{-3}$), hydrogen citrate ($C_6H_6O_7^{-2}$), dihydrogen citrate ($C_6H_7O_7^{-1}$), malate ($C_4H_6O_5^{-2}$), hydrogen malate ($C_4H_7O_5^{-1}$), maleate ($C_4H_2O_4^{-2}$), hydrogen maleate ($C_4H_3O_4^{-1}$), fumarate ($C_4H_2O_4^{-2}$), hydrogen fumarate ($C_4H_3O_4^{-1}$), succinate ($C_4H_4O_4^{-2}$), hydrogen succinate ($C_4H_5O_4^{-1}$), glutarate ($C_5H_6O_4^{-2}$), hydrogen glutarate ($C_5H_7O_4^{-1}$), adipate $C_6H_8O_4^{-2}$), hydrogen adipate $C_6H_9O_4^{-1}$), lactate ($C_3H_5O_3^{-1}$), tartrate ($C_4H_4O_6^{-2}$), bitartrate ($C_4H_5O_6^{-1}$), phosphate ($PO_4^{-3}$), monohydrogen phosphate ($HPO_4^{-2}$), dihydrogen phosphate ($H_2PO_4^-$), fluoride ($F^-$), chloride ($Cl^-$), sulfate ($SO_4^{-2}$), bisulfate ($HSO_4^{-1}$), nitrate ($NO_3^-$), carbonate ($CO_3^{-2}$), bicarbonate ($HCO_3^-$), glycerate ($C_3H_5O_4^{-1}$), glycolate ($C_2H_3O_3^{-1}$), or combinations thereof; the second anion is independently selected from gluconate ($C_6H_{11}O_7^{-1}$), citrate ($C_6H_5O_7^{-3}$), hydrogen citrate ($C_6H_6O_7^{-2}$), dihydrogen citrate ($C_6H_7O_7^{-1}$), malate ($C_4H_6O_5^{-2}$), hydrogen malate ($C_4H_7O_5^{-1}$), maleate ($C_4H_2O_4^{-2}$), hydrogen maleate ($C_4H_3O_4^{-1}$), fumarate ($C_4H_2O_4^{-2}$), hydrogen fumarate ($C_4H_3O_4^{-1}$), succinate ($C_4H_4O_4^{-2}$), hydrogen succinate ($C_4H_5O_4^{-1}$), glutarate ($C_5H_6O_4^{-2}$), hydrogen glutarate ($C_5H_7O_4^{-1}$), adipate $C_6H_8O_4^{-2}$), hydrogen adipate $C_6H_9O_4^{-1}$), lactate ($C_3H_5O_3^{-1}$), tartrate ($C_4H_4O_6^{-2}$), bitartrate ($C_4H_5O_6^{-1}$), phosphate ($PO_4^{-3}$), monohydrogen phosphate ($HPO_4^{-2}$), dihydrogen phosphate ($H_2PO_4^-$), fluoride ($F^-$), chloride ($Cl^-$), sulfate ($SO_4^{-2}$), bisulfate ($HSO_4^{-1}$), nitrate ($NO_3^-$), carbonate ($CO_3^{-2}$), bicarbonate ($HCO_3^-$), glycerate ($C_3H_5O_4^{-1}$), glycolate ($C_2H_3O_3^{-1}$), or combinations thereof; the third anion is independently selected from gluconate ($C_6H_{11}O_7^{-1}$), citrate ($C_6H_5O_7^{-3}$), hydrogen citrate ($C_6H_6O_7^{-2}$), dihydrogen citrate ($C_6H_7O_7^{-1}$), malate ($C_4H_6O_5$-2), hydrogen malate ($C_4H_7O_5^{-1}$), maleate ($C_4H_2O_4^{-2}$), hydrogen maleate ($C_4H_3O_4^{-1}$), fumarate ($C_4H_2O_4^{-2}$), hydrogen fumarate ($C_4H_3O_4^{-1}$), succinate ($C_4H_4O_4^{-2}$), hydrogen succinate ($C_4H_5O_4^{-1}$), glutarate ($C_5H_6O_4^{-2}$), hydrogen glutarate ($C_5H_7O_4^{-1}$), adipate $C_6H_8O_4^{-2}$), hydrogen adipate $C_6H_9O_4^{-1}$), lactate ($C_3H_5O_3^{-1}$), tartrate ($C_4H_4O_6^{-2}$), bitartrate ($C_4H_5O_6^{-1}$), phosphate ($PO_4^{-3}$), monohydrogen phosphate ($HPO_4^{-2}$), dihydrogen phosphate ($H_2PO_4^-$), fluoride ($F^-$), chloride ($Cl^-$), sulfate ($SO_4^{-2}$), bisulfate ($HSO_4^{-1}$), nitrate ($NO_3^-$), carbonate ($CO_3^{-2}$), bicarbonate ($HCO_3^-$), glycerate ($C_3H_5O_4^{-1}$), glycolate ($C_2H_3O_3^{-1}$), or combinations thereof; and the fourth anion is independently selected from gluconate ($C_6H_{11}O_7^{-1}$), citrate ($C_6H_5O_7^{-3}$), hydrogen citrate ($C_6H_6O_7^{-2}$), dihydrogen citrate ($C_6H_7O_7^{-1}$), malate ($C_4H_6O_5^{-2}$), hydrogen malate ($C_4H_7O_5^{-1}$), maleate ($C_4H_2O_4^{-2}$), hydrogen maleate ($C_4H_3O_4^{-1}$), fumarate ($C_4H_2O_4^{-2}$), hydrogen fumarate ($C_4H_3O_4^{-1}$), succinate ($C_4H_4O_4^{-2}$), hydrogen succinate ($C_4H_5O_4^{-1}$), glutarate ($C_5H_6O_4^{-2}$), hydrogen glutarate ($C_5H_7O_4^{-1}$), adipate $C_6H_8O_4^{-2}$), hydrogen adipate $C_6H_9O_4^{-1}$), lactate ($C_3H_5O_3^{-1}$), tartrate ($C_4H_4O_6^{-2}$), bitartrate ($C_4H_5O_6^{-1}$), phosphate ($PO_4^{-3}$), monohydrogen phosphate ($HPO_4^{-2}$), dihydrogen phosphate ($H_2PO_4^-$), fluoride ($F^-$), chloride ($Cl^-$), sulfate ($SO_4^{-2}$), bisulfate ($HSO_4^{-1}$), nitrate ($NO_3^-$), carbonate ($CO_3^{-2}$), bicarbonate ($HCO_3^-$), glycerate ($C_3H_5O_4^{-1}$), glycolate ($C_2H_3O_3^{-1}$), or combinations thereof; provided that first cation, second cation, third cation, and fourth cation are not the same; and such that the sweetening agent comprises a *Stevia* sweetener selected from stevioside, rubusoside, steviolbioside, dulcoside A, rebaudioside A, rebaudioside B, rebaudioside C, rebaudioside D, rebaudioside E, rebaudioside F, rebaudioside M, a glucosylated steviol glycoside, a mixture of glucosylated steviol glycosides, or combinations thereof.

In various aspects, a disclosed sweetener composition comprises: a sweetening agent and a taste modulator component comprising a first salt having a first cation independently selected from $Na^+$, $K^+$, $Ca^{2+}$, and $Mg^{2+}$; optionally a second salt having a second cation independently selected from $Na^+$, $K^+$, $Ca^{2+}$, and $Mg^{2+}$; optionally a third salt having a third cation independently selected from $Na^+$, $K^+$, $Ca^{2+}$, and $Mg^{2+}$; and optionally a fourth salt having a fourth cation independently selected from $Na^+$, $K^+$, $Ca^{2+}$, and $Mg^{2+}$; provided that first cation, second cation, third cation, and fourth cation are not the same; and such that the sweetening agent comprises a *Stevia* sweetener selected from rebaudioside A, rebaudioside D, rebaudioside M, a glucosylated steviol glycoside, a mixture of glucosylated steviol glycosides, or combinations thereof.

In a further aspect, a disclosed sweetener composition comprises: a sweetening agent and a taste modulator component comprising a first salt having a first cation and a first anion, such that the first cation is selected from $Na^+$, $K^+$, $Ca^{2+}$, and $Mg^{2+}$; and a first anion is selected from gluconate ($C_6H_{11}O_7^{-1}$), citrate ($C_6H_5O_7^{-3}$), hydrogen citrate ($C_6H_6O_7^{-2}$), dihydrogen citrate ($C_6H_7O_7^{-1}$), malate ($C_4H_6O_5^{-2}$), hydrogen malate ($C_4H_7O_5^{-1}$), maleate ($C_4H_2O_4^{-2}$), hydrogen maleate ($C_4H_3O_4^{-1}$), fumarate ($C_4H_2O_4^{-2}$), hydrogen fumarate ($C_4H_3O_4^{-1}$), succinate ($C_4H_4O_4^{-2}$), hydrogen succinate ($C_4H_5O_4^{-1}$), glutarate ($C_5H_6O_4^{-2}$), hydrogen glutarate ($C_5H_7O_4^{-1}$), adipate $C_6H_8O_4^{-2}$), hydrogen adipate $C_6H_9O_4^{-1}$), lactate ($C_3H_5O_3^{-1}$), tartrate ($C_4H_4O_6^{-2}$), bitartrate ($C_4H_5O_6^{-1}$), phosphate ($PO_4^{-3}$), monohydrogen phosphate ($HPO_4^{-2}$), dihydrogen phosphate ($H_2PO_4^-$), fluoride ($F^-$), chloride ($Cl^-$), sulfate ($SO_4^{-2}$), bisulfate ($HSO_4^{-1}$), nitrate ($NO_3^-$), carbonate ($CO_3^{-2}$), bicarbonate ($HCO_3^-$), glycerate ($C_3H_5O_4^{-1}$), glycolate ($C_2H_3O_3^{-1}$), or combinations thereof. In a specific aspect, the first anion comprises citrate ($C_6H_5O_7^{-3}$), chloride ($Cl^-$), phosphate ($PO_4^{-3}$), carbonate ($CO_3^{-2}$), and combinations thereof; and such that the sweetening agent comprises a *Stevia* sweetener selected from rebaudioside A, rebaudioside D, rebaudioside M, a glucosylated steviol glycoside, a mixture of glucosylated steviol glycosides, or combinations thereof.

In a further aspect, a disclosed sweetener composition comprises: a sweetening agent and a taste modulator component comprising a first salt having a first cation and a first anion; optionally a second salt having a second cation and a second anion; optionally a third salt having a third cation and a third anion; and optionally a fourth salt having a fourth cation and a fourth anion; the first cation is independently selected from Na$^+$, K$^+$, Ca$^{2+}$, and Mg$^{2+}$; the second cation is independently selected from Na$^+$, K$^+$, Ca$^{2+}$, and Mg$^{2+}$; the third cation is independently selected from Na$^+$, K$^+$, Ca$^{2+}$, and Mg$^{2+}$; and the fourth cation is independently selected from Na$^+$, K$^+$, Ca$^{2+}$, and Mg$^{2+}$; the first anion is independently selected from gluconate ($C_6H_{11}O_7^{-1}$), citrate ($C_6H_5O_7^{-3}$), hydrogen citrate ($C_6H_6O_7^{-2}$), dihydrogen citrate ($C_6H_7O_7^{-1}$), malate ($C_4H_6O_5^{-2}$), hydrogen malate ($C_4H_7O_5^{-1}$), maleate ($C_4H_2O_4^{-2}$), hydrogen maleate ($C_4H_3O_4^{-1}$), fumarate ($C_4H_2O_4^{-2}$), hydrogen fumarate ($C_4H_3O_4^{-1}$), succinate ($C_4H_4O_4^{-2}$), hydrogen succinate ($C_4H_5O_4^{-1}$), glutarate ($C_5H_6O_4^{-2}$), hydrogen glutarate ($C_5H_7O_4^{-1}$), adipate $C_6H_8O_4^{-2}$, hydrogen adipate $C_6H_9O_4^{-1}$), lactate ($C_3H_5O_3^{-1}$), tartrate ($C_4H_4O_6^{-2}$), bitartrate ($C_4H_5O_6^{-1}$), phosphate ($PO_4^{-3}$), monohydrogen phosphate ($HPO_4^{-2}$), dihydrogen phosphate ($H_2PO_4^-$), fluoride (F$^-$), chloride (Cl$^-$), sulfate ($SO_4^{-2}$), bisulfate ($HSO_4^{-1}$), nitrate ($NO_3^-$), carbonate ($CO_3^{-2}$), bicarbonate ($HCO_3^-$), glycerate ($C_3H_5O_4^{-1}$), glycolate ($C_2H_3O_3^{-1}$), or combinations thereof; the second anion is independently selected from gluconate ($C_6H_{11}O_7^{-1}$), citrate ($C_6H_5O_7^{-3}$), hydrogen citrate ($C_6H_6O_7^{-2}$), dihydrogen citrate ($C_6H_7O_7^{-1}$), malate ($C_4H_6O_5^{-2}$), hydrogen malate ($C_4H_7O_5^{-1}$), maleate ($C_4H_2O_4^{-2}$), hydrogen maleate ($C_4H_3O_4^{-1}$), fumarate ($C_4H_2O_4^{-2}$), hydrogen fumarate ($C_4H_3O_4^{-1}$), succinate ($C_4H_4O_4^{-2}$), hydrogen succinate ($C_4H_5O_4^{-1}$), glutarate ($C_5H_6O_4^{-2}$), hydrogen glutarate ($C_5H_7O_4^{-1}$), adipate $C_6H_8O_4^{-2}$), hydrogen adipate $C_6H_9O_4^{-1}$), lactate ($C_3H_5O_3^{-1}$), tartrate ($C_4H_4O_6^{-2}$), bitartrate ($C_4H_5O_6^{-1}$), phosphate ($PO_4^{-3}$), monohydrogen phosphate ($HPO_4^{-2}$), dihydrogen phosphate ($H_2PO_4^-$), fluoride (F$^-$), chloride (Cl$^-$), sulfate ($SO_4^{-2}$), bisulfate ($HSO_4^{-1}$), nitrate ($NO_3^-$), carbonate ($CO_3^{-2}$), bicarbonate ($HCO_3^-$), glycerate ($C_3H_5O_4^{-1}$), glycolate ($C_2H_3O_3^{-1}$), or combinations thereof; the third anion is independently selected from gluconate ($C_6H_{11}O_7^{-1}$), citrate ($C_6H_5O_7^{-3}$), hydrogen citrate ($C_6H_6O_7^{-2}$), dihydrogen citrate ($C_6H_7O_7^{-1}$), malate ($C_4H_6O_5^{-2}$), hydrogen malate ($C_4H_7O_5^{-1}$), maleate ($C_4H_2O_4^{-2}$), hydrogen maleate ($C_4H_3O_4^{-1}$), fumarate ($C_4H_2O_4^{-2}$), hydrogen fumarate ($C_4H_3O_4^{-1}$), succinate ($C_4H_4O_4^{-2}$), hydrogen succinate ($C_4H_5O_4^{-1}$), glutarate ($C_5H_6O_4^{-2}$), hydrogen glutarate ($C_5H_7O_4^{-1}$), adipate ($C_6H_8O_4^{-2}$), hydrogen adipate $C_6H_9O_4^{-1}$), lactate ($C_3H_5O_3^{-1}$), tartrate ($C_4H_4O_6^{-2}$), bitartrate ($C_4H_5O_6^{-1}$), phosphate ($PO_4^{-3}$), monohydrogen phosphate ($HPO_4^{-2}$), dihydrogen phosphate ($H_2PO_4^-$), fluoride (F$^-$), chloride (Cl$^-$), sulfate ($SO_4^{-2}$), bisulfate ($HSO_4^{-1}$), nitrate ($NO_3^-$), carbonate ($CO_3^{-2}$), bicarbonate ($HCO_3^-$), glycerate ($C_3H_5O_4^{-1}$), glycolate ($C_2H_3O_3^{-1}$), or combinations thereof; and the fourth anion is independently selected from gluconate ($C_6H_{11}O_7^{-1}$), citrate ($C_6H_5O_7^{-3}$), hydrogen citrate ($C_6H_6O_7^{-2}$), dihydrogen citrate ($C_6H_7O_7^{-1}$), malate ($C_4H_6O_5^{-2}$), hydrogen malate ($C_4H_7O_5^{-1}$), maleate ($C_4H_2O_4^{-2}$), hydrogen maleate ($C_4H_3O_4^{-1}$), fumarate ($C_4H_2O_4^{-2}$), hydrogen fumarate ($C_4H_3O_4^{-1}$), succinate ($C_4H_4O_4^{-2}$), hydrogen succinate ($C_4H_5O_4^{-1}$), glutarate ($C_5H_6O_4^{-2}$), hydrogen glutarate ($C_5H_7O_4^{-1}$), adipate ($C_6H_8O_4^{-2}$), hydrogen adipate $C_6H_9O_4^{-1}$), lactate ($C_3H_5O_3^{-1}$), tartrate ($C_4H_4O_6^{-2}$), bitartrate ($C_4H_5O_6^{-1}$), phosphate ($PO_4^{-3}$), monohydrogen phosphate ($HPO_4^{-2}$), dihydrogen phosphate ($H_2PO_4^-$), fluoride (F$^-$), chloride (Cl$^-$), sulfate ($SO_4^{-2}$), bisulfate ($HSO_4^{-1}$), nitrate ($NO_3^-$), carbonate ($CO_3^{-2}$), bicarbonate ($HCO_3^-$), glycerate ($C_3H_5O_4^{-1}$), glycolate ($C_2H_3O_3^{-1}$), or combinations thereof; provided that first cation, second cation, third cation, and fourth cation are not the same; and such that the sweetening agent comprises a *Stevia* sweetener selected from rebaudioside A, rebaudioside D, rebaudioside M, a glucosylated steviol glycoside, a mixture of glucosylated steviol glycosides, or combinations thereof.

The amount or relative amounts of the sweetening agent and the taste modulator in a disclosed sweetener composition are determined, in part, by the application or use of the disclosed sweetener composition and the product context. That is, the amount of the sweetening agent and the taste modulator in a disclosed sweetener composition in a beverage, a food product, a nutraceutical, a pharmaceutical, and the like will be determined by the requirements for sweetness intensity in a particular product use. In addition, the amount or relative amounts of the sweetening agent and the taste modulator in a disclosed sweetener composition is determined, in part, by established the Dietary Reference Intakes (DRIs) for salts used in the taste modulator, including various regulatory agencies and health or scientific bodies and organizations. For example, exemplary DRIs have been published by the Institute of Medicine of the National Academies of the United States (see: Dietary Reference Requirements: The Essential Guide to Nutrient Requirements, J. J. Otten, J. Pitzi Hellwig, L. D. Meyers, Eds., The National Academies Press, 2006, Washington, D.C.). Thus, the level of the salts (first salt, optional second salt, optional third salt, and optional fourth salt) need to be present in an effective amount to modulate the sweetening agent taste properties, i.e., appropriate mitigation of factors such as maximal sweetness response, bitter and/or licorice-like off-tastes, sweetness linger, desensitization and adaptation, and body/mouthfeel parameters, while at the same time, not presenting concerns with regard to DRIs. Representative DRIs, as published by the Institute of Medicine of the National Academies of the United States, are given in Table 2 below.

TABLE 2

| | DRI (mg/day) | | | |
|---|---|---|---|---|
| Nutrient* | Male | | Female | |
| Sodium | Age 9-50 | 1500 | Age 9-50 | 1500 |
| | Age 50-70 | 1300 | Age 50-70 | 1300 |
| | Age >70 | 1200 | Age >70 | 1200 |
| Potassium | Age 9->70 | 4700 | Age 9-13 | 4500 |
| | | | Age 14->70 | 4700 |
| Magnesium | Age 9-13 | 240 | Age 9-13 | 240 |
| | Age 14-18 | 410 | Age 14-18 | 360 |
| | Age 19-30 | 400 | Age 19-30 | 310 |
| | Age 31->70 | 420 | Age 31->70 | 320 |
| Calcium | Age 9-18 | 1300 | Age 9-18 | 1300 |
| | Age 19-70 | 1000 | Age 19-50 | 1000 |
| | Age >70 | 1200 | Age 51-70 | 1200 |
| | | | Age >70 | 1200 |
| Chloride | Age 9-50 | 2300 | Age 9-50 | 2300 |
| | Age 50-70 | 2000 | Age 50-70 | 2000 |
| | Age >70 | 1800 | Age >70 | 1800 |

* Assumes the nutrient is in the form of an ion.

In various aspects, the sweetening agent is present in the disclosed sweetener compositions in an amount effective to provide a concentration when present in a beverage, food, nutraceutical, pharmaceutical, or cosmetic from about 1 mg/L to about 1000 mg/L; and wherein a total cation present in an amount effective to provide a concentration when present in a beverage, food, nutraceutical, pharmaceutical, or cosmetic less than or equal to 20% of the DRI provided by the Institute of Medicine of the National Academies of the United States; and wherein the total cation represents a sum of the first cation, and when present, the second cation, the third cation, and the fourth cation.

In a further aspect, the sweetening agent is present in the disclosed sweetener compositions in an amount effective to provide a concentration when present in a beverage, food, nutraceutical, pharmaceutical, or cosmetic from about 0.1 mg/L to about 1000 mg/L if the sweetener is a non-caloric sweetener or from about 1.0 wt % to about 15 wt % if the sweetener is a caloric sweetener; and wherein a total cation present in an amount effective to provide a concentration when present in a beverage, food, nutraceutical, pharmaceutical, or cosmetic of less than or equal to about 25 mM $Na^+$, less than or equal to about 25 mM $K^+$, less than or equal to about 15 mM $Mg^{2+}$, and less than or equal to about 25 mM $Ca^{2+}$; and wherein the total cation represents a sum of the first cation, and when present, the second cation, the third cation, and the fourth cation.

In a further aspect, the sweetening agent is present in the disclosed sweetener compositions in an amount effective to provide a concentration when present in a beverage, food, nutraceutical, pharmaceutical, or cosmetic from about 0.1 mg/L to about 1000 mg/L if the sweetener is a non-caloric sweetener or from about 1.0 wt % to about 15 wt % if the sweetener is a caloric sweetener; and wherein a total cation present in an amount effective to provide a concentration when present in a beverage, food, nutraceutical, pharmaceutical, or cosmetic of less than or equal to about 17.5 mM $Na^+$, less than or equal to about 17.5 mM $K^+$, less than or equal to about 10 mM $Mg^{2+}$, and less than or equal to about 17.5 mM $Ca^{2+}$; and wherein the total cation represents a sum of the first cation, and when present, the second cation, the third cation, and the fourth cation.

In a further aspect, the sweetening agent is present in the disclosed sweetener compositions in an amount effective to provide a concentration when present in a beverage, food, nutraceutical, pharmaceutical, or cosmetic from about 0.1 mg/L to about 1000 mg/L if the sweetener is a non-caloric sweetener or from about 1.0 wt % to about 15 wt % if the sweetener is a caloric sweetener; and wherein a total cation present in an amount effective to provide a concentration when present in a beverage, food, nutraceutical, pharmaceutical, or cosmetic of less than or equal to about 10 mM $Na^+$, less than or equal to about 10 mM $K^+$, less than or equal to about 5 mM $Mg^{2+}$, and less than or equal to about 10 mM $Ca^{2+}$; and wherein the total cation represents a sum of the first cation, and when present, the second cation, the third cation, and the fourth cation.

In a further aspect, the sweetening agent is present in the disclosed sweetener compositions in an amount effective to provide a concentration when present in a beverage, food, nutraceutical, pharmaceutical, or cosmetic from about 0.1 mg/L to about 1000 mg/L if the sweetener is a non-caloric sweetener or from about 1.0 wt % to about 15 wt % if the sweetener is a caloric sweetener; and wherein a total cation present in an amount effective to provide a concentration when present in a beverage, food, nutraceutical, pharmaceutical, or cosmetic of less than or equal to about 13 mM $Na^+$, less than or equal to about 24 mM $K^+$, less than or equal to about 2.6 mM $Mg^{2+}$, and less than or equal to about 5.0 mM $Ca^{2+}$; and wherein the total cation represents a sum of the first cation, and when present, the second cation, the third cation, and the fourth cation.

In various aspects, the amount effective described above can be in the form of a concentrate such that when utilized in a beverage, a food item, and the like, it is diluted to the disclosed amounts effective described herein above. As such, a concentrate can have an amount effective that is 2- to 100-fold greater than the amount effective for a concentration that is directly consumed or utilized in a product such as a beverage, a food item, and the like.

A disclosed sweetener composition can be present in the various forms. For example, the disclosed sweetener composition can be present as a powder, a particulate, an agglomerated solid, a solid, a gel, a tablet, or combinations thereof. In some cases, the disclosed sweetener can be present as a powder, a particulate, an agglomerated solid, or another essentially solid form. As used herein, "agglomerated solid" means a plurality of disclosed sweetener composition particles clustered and held together. Examples of agglomerated solids include, but are not limited to, binder held agglomerates, tablets, extrudates, and granules.

In a further aspect, the disclosed sweetener composition can be present in a liquid, gel, or solution form, including such forms as a beverage, a food item, a nutraceutical, a pharmaceutical, a cosmetic item, or concentrate that can be used as an additive to or in the preparation of a beverage, a food item, a nutraceutical, a pharmaceutical, a cosmetic item. The disclosed sweetener composition, can further comprise, a food acceptable buffer such as a citric acid buffer or phosphoric acid buffer. Disclosed forms of the disclosed sweetener compositions include forms that are co-crystallized sweetener compositions with a sugar or a polyol, an agglomerated sweetener composition, a compacted sweetener composition, a dried sweetener composition, a particle sweetener composition, a spheronized sweetener composition, a granular sweetener composition, and a liquid sweetener composition.

In various aspects, a disclosed sweetener composition can further comprise an additive such as a liquid carrier, binder matrix, additional additives, and/or the like as detailed herein below. In some aspects, the disclosed sweetener composition contains additives including, but not limited to, carbohydrates, polyols, amino acids and their corresponding salts, poly-amino acids and their corresponding salts, sugar acids and their corresponding salts, nucleotides, organic acids, inorganic acids, organic salts including organic acid salts and organic base salts, inorganic salts, bitter compounds, flavorants and flavoring ingredients, astringent compounds, proteins or protein hydrolysates, surfactants, emulsifiers, weighting agents, gums, antioxidants, colorants, flavonoids, alcohols, polymers and combinations thereof. In some aspects, the additives act to improve the temporal and flavor profiles of the sweetener to provide a sweetener composition with a favorable taste, such as a taste similar to sucrose.

In a further aspect, the disclosed sweetener composition contain one or more polyols. The term "polyol", as used herein, refers to a molecule that contains more than one hydroxyl group. In some aspects, a polyol may be a diol, triol, or a tetraol which contains 2, 3, and 4 hydroxyl groups respectively. A polyol also may contain more than 4 hydroxyl groups, such as a pentaol, hexaol, heptaol, or the like, which contain 5, 6, 7, or even more hydroxyl groups, respectively. Additionally, a polyol also may be a sugar alcohol, polyhydric alcohol, polymer comprising OH functionality, or polyalcohol which is a reduced form of a carbohydrate, wherein a carbonyl group (aldehyde or ketone, reducing sugar) has been reduced to a primary or secondary hydroxyl group. In various aspects, polyols can include erythritol, xylitol, sorbitol, lactitol, isomalt, maltitol, reduced isomalto-oligosaccharides, reduced xylo-oligosaccharides, reduced gentio-oligosaccharides, reduced maltose syrup, reduced glucose syrup, and combinations thereof. In a further aspect, polyols can include erythritol, xylitol, sorbitol, lactitol, isomalt, galactitol, and maltitol, and combinations thereof. In a further aspect, polyols can include erythritol. In a further aspect, a polyol can be derived by reduction of isomaltulose, or sugar alcohols or any other carbohydrates capable of being reduced which do not adversely affect the taste of the disclosed sweetener composition.

In a further aspect, a polyol can be present in an amount effective to provide a concentration from about 100 ppm to about 250,000 ppm when present in a sweetened composition, such as, for example, a beverage, based on the total weight of the sweetened composition. In other aspects, the polyol is present in the disclosed sweetener composition in an amount effective to provide a concentration from about 400 ppm to about 80,000 ppm when present in a sweetened composition, such as, for example, from about 5,000 ppm to about 40,000 ppm, based on the total weight of the sweetened composition. As used herein, the term "ppm" refers to part(s) per million by weight, for example, of a given material, e.g., a compound, component, sweetening agent, disclosed taste modulator (and components that make up a taste modulator), or additive in a composition or product containing the given material; including, example, the milligrams of a given material per kilogram of a composition or product containing the given material (i.e., mg/kg); the milligrams of a given material per liter of a composition or product containing the given material (i.e., mg/L); or the volume of a given material (in microliters) per liter a composition or product containing the given material (i.e., μl/L).

In a further aspect, suitable amino acid additives include any compound comprising at least one amino functionality and at least one acid functionality. Examples include, but are not limited to, aspartic acid, arginine, glycine, glutamic acid, proline, threonine, theanine, cysteine, cystine, alanine, valine, tyrosine, leucine, trans-4-hydroxyproline, isoleucine, asparagine, serine, lysine, histidine, ornithine, methionine, carnitine, aminobutyric acid (α-, β-, and/or δ-isomers), glutamine, hydroxyproline, taurine, norvaline, sarcosine, and their salt forms such as sodium or potassium salts or acid salts, and mixtures of any of the foregoing. The amino acid additives also may be in the D-configuration, L-configuration, and combinations thereof. Additionally, the amino acids may be α-, β-, γ- and/or δ-isomers if appropriate. Combinations of the foregoing amino acids and their corresponding salts (e.g., sodium, potassium, calcium, magnesium salts or other alkali or alkaline earth metal salts thereof, or acid salts) also are suitable additives in some aspects. The amino acids may be natural or synthetic. The amino acids also may be modified. Modified amino acids refers to any amino acid wherein at least one atom has been added, removed, substituted, or combinations thereof (e.g., N-alkyl amino acid, N-acyl amino acid, or N-methyl amino acid). Non-limiting examples of modified amino acids include amino acid derivatives such as N,N,N-trimethyl glycine, N,N-dimethyl-glycine, N-methyl-glycine, and N-methyl-alanine. As used herein, modified amino acids encompass both modified and unmodified amino acids. As used herein, amino acids also encompass both peptides and polypeptides (e.g., dipeptides, tripeptides, tetrapeptides, and pentapeptides) such as glutathione and L-alanyl-L-glutamine. Suitable polyamino acid additives include poly-L-aspartic acid, poly-L-lysine (e.g., poly-L-α-lysine or poly-L-ε-lysine), poly-L-ornithine (e.g., poly-L-α-ornithine or poly-L-β-ornithine), poly-L-arginine, other polymeric forms of amino acids, and salt forms thereof (e.g., calcium, potassium, sodium, or magnesium salts such as L-glutamic acid mono sodium salt). The poly-amino acid additives also may be in the D- or L-configuration. Additionally, the poly-amino acids may be α-, β-, γ-, δ-, and ε-isomers if appropriate. Combinations of the foregoing poly-amino acids and their corresponding salts (e.g., sodium, potassium, calcium, magnesium salts or other alkali or alkaline earth metal salts thereof or acid salts) also are suitable additives in some aspects. The poly-amino acids described herein also may comprise co-polymers of different amino acids. The poly-amino acids may be natural or synthetic. The poly-amino acids also may be modified, such that at least one atom has been added, removed, substituted, or combinations thereof (e.g., N-alkyl poly-amino acid or N-acyl poly-amino acid). As used herein, poly-amino acids encompass both modified and unmodified poly-amino acids. For example, modified poly-amino acids include, but are not limited to, poly-amino acids of various molecular weights (MW), such as poly-L-α-lysine with a MW of 1,500, MW of 6,000, MW of 25,200, MW of 63,000, MW of 83,000, or MW of 300,000.

In a further aspect, the amino acid is present in the disclosed sweetener composition in an amount effective to provide a concentration from about 10 ppm to about 50,000 ppm when present in a sweetened composition, such as, for example, a beverage, based on the total weight of the sweetened composition. In another aspect, the amino acid is present in the disclosed sweetener composition in an amount effective to provide a concentration from about 1,000 ppm to about 10,000 ppm when present in a sweetened composition, such as, for example, from about 2,500 ppm to about 5,000 ppm or from about 250 ppm to about 7,500 ppm, based on the total weight of the sweetened composition.

In a further aspect, suitable sugar acid additives include, but are not limited to, aldonic, uronic, aldaric, alginic, gluconic, glucuronic, giticaric, galactaric, galacturonic, and salts thereof (e.g., sodium, potassium, calcium, magnesium salts or other physiologically acceptable salts), and combinations thereof.

In a further aspect, suitable nucleotide additives include, but are not limited to, inosine monophosphate ("IMP"), guanosine monophosphate ("GMP"), adenosine monophosphate ("AMP"), cytosine monophosphate (CMP), uracil monophosphate (UMP), inosine diphosphate, guanosine diphosphate, adenosine diphosphate, cytosine diphosphate, uracil diphosphate, inosine triphosphate, guanosine triphosphate, adenosine triphosphate, cytosine triphosphate, uracil triphosphate, alkali or alkaline earth metal salts thereof, and combinations thereof. The nucleotides described herein also may comprise nucleotide-related additives, such as nucleosides or nucleic acid bases e.g., guanine, cytosine, adenine, thymine, uracil). The nucleotide is present in the disclosed sweetener composition can be present in an amount effective to provide a concentration from about 5 ppm to about 1,000 ppm when present in sweetened composition, such as, for example, a beverage, based on the total weight of the sweetened composition.

In a further aspect, suitable organic acid additives include any compound which comprises a —COOH moiety, or an ester derivative thereof, such as, for example, C2-C30 carboxylic acids, substituted hydroxyl C2-C30 carboxylic acids, butyric acid, benzoic acid, substituted benzoic acids (e.g., 2,4-dihydroxybenzoic acid), substituted cinnamic acids, hydroxyacids, substituted hydroxybenzoic acids, anisic acid substituted cyclohexyl carboxylic acids, tannic acid, aconitic acid, lactic acid, tartaric acid, citric acid, isocitric acid, gluconic acid, glucoheptonic acids, adipic acid, hydroxycitric acid, malic acid, fruitaric acid (a blend of malic, fumaric, and tartaric acids), fumaric acid, maleic acid, succinic acid, chlorogenic acid, salicylic acid, creatine, caffeic acid, bile acids, acetic acid, ascorbic acid, alginic acid, erythorbic acid, polyglutamic acid, glucono delta lactone, and their alkali or alkaline earth metal salt derivatives thereof. In addition, the organic acid additives also may be in either the D- or L-configuration.

In a further aspect, suitable organic acid additive salts include, but are not limited to, sodium, calcium, potassium, and magnesium salts of all organic acids, such as salts of citric acid, malic acid, tartaric acid, fumaric acid, lactic acid (e.g., sodium lactate), alginic acid (e.g., sodium alginate), ascorbic acid (e.g., sodium ascorbate), benzoic acid (e.g., sodium benzoate or potassium benzoate), sorbic acid and adipic acid. The examples of the organic acid additives described optionally may be substituted with at least one group chosen from hydrogen, alkyl, alkenyl, alkynyl, halo, haloalkyl, carboxyl, acyl, acyloxy, amino, amido, carboxyl derivatives, alkylamino, dialkylamino, arylamino, alkoxy, aryloxy, nitro, cyano, sulfo, thiol, imino, sulfonyl, sulfenyl, sulfinyl, sulfamyl, carboxalkoxy, carboxamido, phosphonyl, phosphinyl, phosphoryl, phosphino, thioester, thioether, anhydride, oximino, hydrazino, carbamyl, or phosphonato. In particular aspects, the organic acid additive is present in the disclosed sweetener composition in an amount from about 10 ppm to about 5,000 ppm, based on the total weight of the disclosed sweetener composition.

In a further aspect, suitable flavorant and flavoring ingredient additives include, but are not limited to, vanillin, vanilla extract, mango extract, cinnamon, citrus, coconut, ginger, virldiflorol, almond, menthol (including menthol without mint), grape skin extract, and grape seed extract. "Flavorant" and "flavoring ingredient" are synonymous and can include natural or synthetic substances or combinations thereof. Flavorants also include any other substance which imparts flavor and may include natural or non-natural (synthetic) substances which are safe for human or animals when used in a generally accepted range. The flavorant is present in the disclosed sweetener composition in an amount effective to provide a concentration from about 0.1 ppm to about 4,000 ppm when present in a sweetened composition, such as, for example, a beverage, based on the total weight of the sweetened composition. In some instances, a flavorant or flavoring ingredient may also contribute to the sweetness of a composition. For instance, the presence of the additive may cause an increase in the sweetness equivalent of a composition in terms of degrees Brix of sugar. In such an instance, the flavorant is also considered to be a sweetener compound in the practice of the present disclosure.

In a further aspect, suitable polymer additives include, but are not limited to, chitosan, pectin, pectic, pectinic, polyuronic, polygalacturonic acid, starch, food hydrocolloid or crude extracts thereof (e.g., gum acacia Senegal, gum acacia seyal, carageenan), poly-L-lysine (e.g., poly-L-a-lysine or poly-L-e-lysine), poly-L-ornithine (e.g., poly-L-a-ornithine poly-L-e-ornithine), polypropylene glycol, polyethylene glycol, poly(ethylene glycol methyl ether), polyarginine, polyaspartic acid, polyglutamic acid, polyethylene imine, alginic acid, sodium alginate, propylene glycol alginate, and sodium polyethyleneglycolalginate, sodium hexametaphosphate and its salts, and other cationic polymers and anionic polymers. The polymer can be present in the disclosed sweetener composition in an amount effective to provide a concentration from about 30 ppm to about 2,000 ppm when present in a sweetened composition, such as, for example, a beverage, based on the total weight of the sweetened composition.

In a further aspect, suitable protein or protein hydrolysate additives include, but are not limited to, bovine serum albumin (BSA), whey protein (including fractions or concentrates thereof such as 90% instant whey protein isolate, 34% whey protein, 50% hydrolyzed whey protein, and 80% whey protein concentrate), soluble rice protein, soy protein, protein isolates, protein hydrolysates, reaction products of protein hydrolysates, glycoproteins, and/or proteoglycans containing amino acids (e.g., glycine, alanine, serine, threonine, asparagine, glutamine, arginine, valine, isoleucine, leucine, norvaline, methionine, proline, tyrosine, hydroxyproline, and the like), collagen (e.g., gelatin), partially hydrolyzed collagen (e.g., hydrolyzed fish collagen), and collagen hydrolysates (e.g., porcine collagen hydrolysate). The protein hydrolysate can be present in the disclosed sweetener composition in an amount effective to provide a concentration from about 200 ppm to about 50,000 ppm when present in a sweetened composition, such as, for example, a beverage, based on the total weight of the sweetened composition.

In some instances, the present disclosure, relates to sweetener compositions comprising a sweetening agent and a disclosed taste modulator composition that provide a mid-calorie beverage, e.g., a calorie reduction of about 33% to about 75% compared to a standard beverage comprising one or more caloric sweetener such as sucrose, fructose (in the form of HFCS-55 or HFCS-42), and the like similar caloric sweeteners. The beverage industry in recent years has shown strong interest in formulation of such mid-calorie beverages. In such mid-calorie beverage formulations, would contain a caloric sweetener (e.g., sucrose, HFCS-55, HFCS-42 or even glucose), providing 67% to 50% to 25% of the sweetness in the beverage product. The remainder of the sweetness in such products, generally, must be provided by a non-caloric sweetener. And such non-caloric sweeteners may be synthetic non-caloric sweeteners, e.g., saccharin, cyclamate, aspartame, acesulfame-K, sucralose, neotame and advantame; or natural non-caloric sweeteners, e.g., *Stevia* Sweeteners (i.e., REBA, REBD, REBM, etc.), Monk Fruit Sweeteners (i.e., mogroside V, siratose, etc.), Protein Sweeteners (i.e., thaumatin, brazzein, etc.); and mixtures of one more synthetic non-caloric sweeteners, one or more natural non-caloric sweeteners, and combinations thereof. All such blends of caloric sweeteners and non-caloric sweeteners can be improved in taste (i.e., reduction in sweetness linger and increase in body/mouthfeel) by utilizing the disclosed taste modulator compositions and sweetener compositions of the present disclosure.

In discussion of mid-calorie beverages, it is useful to describe a suitable methodology for definition of the compositions of such caloric/non-caloric sweetener blends. One such system is a previously described Concentration/Response (C/R) function useful for many caloric as well as non-caloric sweeteners (see G. E. DuBois, et al., "A Systematic Study of Concentration-Response Relationships of Sweeteners", In Sweeteners: Discovery, Molecular Design and Chemoreception, D E Walters, F Orthoefer and G E DuBois, Eds., ACS Symposium Series 450, ACS Books, Washington, D.C., 1990). Representative examples of C/R functions determined at that time for sweeteners of interest are as given in Table 3 below.

TABLE 3

| Sweetener | C/R Function | Comments* |
|---|---|---|
| 1. Sucrose | R = C | C in % (w/v) |
| 2. Fructose | R = 1.27C + 0.04 | C in % (w/v) |
| 3. Glucose | R = 0.60C − 0.02 | C in % (w/v) |
| 4. Aspartame | R = 16.0C/(560 + C) | C in mg/L |
| 5. Acesulfame-K | R = 11.6C/(470 + C) | C in mg/L |
| 6. Rebaudioside A | R = 10C/(200 + C) | C in mg/L |

*All equations calculate Response (R) in Sucrose Equivalents of Sweetness (i.e., R = 8.0 means sweetness equivalent to 8.0% sucrose); all C/R function data for sugars and polyols were best fit by linear C/R function equations and all C/R function data for HP sweeteners were best fit by hyperbolic functions of the form $R = R_m \times C/(k_d + C)$, where $R_m$ is the Maximal Response and $K_d$ is the apparent Sweetener/Receptor dissociation constant.

The following example serves to show how the C/R function can be utilized in design of a mid-caloric beverage. Assume that the objective is to formulate a 50% calorie-reduced beverage with a blend of sucrose and REBA, where the original full-calorie beverage contained 10.0% sucrose. Assuming there is no synergy between sucrose and REBA, such a blend would require 5.0% sucrose and a concentration of REBA equivalent to 5.0% sucrose in sweetness. The requisite concentration (C) of REBA is easily calculated from its C/R function R=10C/(200+C) as follows:

$$5.0 = 10 \times C/(200+C); \text{ and } C = 200 \text{ mg/L}.$$

Accordingly, the use of C/R functions, such as illustrated for the example of REBA above, can be used to predict the appropriate concentration of a sweetener of interest. Prototype beverage formulations can then be made and adjustments in sweetener concentration made, as appropriate, to provide the requisite target sweetness intensity level. Such sweetener compositions for beverages would further comprise a disclosed taste modulator composition.

Beverage Compositions

In various aspects, the present disclosure, relates to beverage compositions comprising at least one disclosed sweetening agent and one or more taste modulator components. The taste modulator component improves key properties associated with the sweetening agent in the beverage composition, including overall taste response; mitigation of various flavor profile issues; improves desensitization/adaptation profile issues; and improves body/mouthfeel characteristics. In a further aspect, the disclosed taste modulator compositions comprise a first taste modulator component comprising a first salt having a first cation selected from $Na^+$, $K^+$, $Ca^{2+}$, and $Mg^{2+}$. The beverage compositions can optionally further comprise one or more additional taste modulator components, e.g., a second taste modulator component comprising a second salt having a second cation selected from $Na^+$, $K^+$, $Ca^{2+}$, and $Mg^{2+}$; a third taste modulator component comprising a third salt having a third cation selected from $Na^+$, $K^+$, $Ca^{2+}$, and $Mg^{2+}$; and a fourth taste modulator component comprising a fourth salt having a fourth cation selected from $Na^+$, $K^+$, $Ca^{2+}$, and $Mg^{2+}$. In some instances, the additional taste modulator components each comprise a different cation selected from $Na^+$, $K^+$, $Ca^{2+}$, and $Mg^{2+}$.

In various aspects, a disclosed beverage composition comprises at least one disclosed sweetening agent and a first salt having a first cation independently selected from $Na^+$, $K^+$, $Ca^{2+}$, and $Mg^{2+}$; optionally a second salt having a second cation independently selected from $Na^+$, $K^+$, $Ca^{2+}$, and $Mg^{2+}$; optionally a third salt having a third cation independently selected from $Na^+$, $K^+$, $Ca^{2+}$, and $Mg^{2+}$; and optionally a fourth salt having a fourth cation independently selected from $Na^+$, $K^+$, $Ca^{2+}$, and $Mg^{2+}$; provided that first cation, second cation, third cation, and fourth cation are not the same.

In a further aspect, a disclosed beverage composition comprises at least one disclosed sweetening agent and a first salt having a first cation and a first anion, such that the first cation is selected from $Na^+$, $K^+$, $Ca^{2+}$, and $Mg^{2+}$; and a first anion is selected from gluconate $(C_6H_{11}O_7^{-1})$, citrate $(C_6H_5O_7^{-3})$, hydrogen citrate $(C_6H_6O_7^{-2})$, dihydrogen citrate $(C_6H_7O_7^{-1})$, malate $(C_4H_6O_5^{-2})$, hydrogen malate $(C_4H_7O_5^{-1})$, maleate $(C_4H_2O_4^{-2})$, hydrogen maleate $(C_4H_3O_4^{-1})$, fumarate $(C_4H_2O_4^{-2})$, hydrogen fumarate $(C_4H_3O_4^{-1})$, succinate $(C_4H_4O_4^{-2})$, hydrogen succinate $(C_4H_5O_4^{-1})$, glutarate $(C_5H_6O_4^{-2})$, hydrogen glutarate $(C_5H_7O_4^{-1})$, adipate $C_6H_8O_4^{-2}$, hydrogen adipate $C_6H_9O_4^{-1})$, lactate $(C_3H_5O_3^{-1})$, tartrate $(C_4H_4O_6^{-2})$, bitartrate $(C_4H_5O_6^{-1})$, phosphate $(PO_4^{-3})$, monohydrogen phosphate $(HPO_4^{-2})$, dihydrogen phosphate $(H_2PO_4^-)$, fluoride $(F^-)$, chloride $(Cl^-)$, sulfate $(SO_4^{-2})$, bisulfate $(HSO_4^{-1})$, nitrate $(NO_3^-)$, carbonate $(CO_3^{-2})$, bicarbonate $(HCO_3^-)$, glycerate $(C_3H_5O_4^{-1})$, glycolate $(C_2H_3O_3^{-1})$, or combinations thereof. In a specific aspect, the first anion comprises citrate $(C_6H_5O_7^{-3})$, chloride $(Cl^-)$, phosphate $(PO_4^{-3})$, carbonate $(CO_3^{-2})$, and combinations thereof. Alternatively, in an aspect, the first anion comprises citrate $(C_6H_5O_7^{-3})$ or the first anion comprises chloride $(Cl^-)$.

In a further aspect, a disclosed beverage composition comprises at least one disclosed sweetening agent and a first salt having a first cation and a first anion; optionally a second salt having a second cation and a second anion; optionally a third salt having a third cation and a third anion; and optionally a fourth salt having a fourth cation and a fourth anion; the first cation is independently selected from $Na^+$, $K^+$, $Ca^{2+}$, and $Mg^{2+}$; the second cation is independently selected from $Na^+$, $K^+$, $Ca^{2+}$, and $Mg^{2+}$; the third cation is independently selected from $Na^+$, $K^+$, $Ca^{2+}$, and $Mg^{2+}$; and the fourth cation is independently selected from $Na^+$, $K^+$, $Ca^{2+}$, and $Mg^{2+}$; the first anion is independently selected from gluconate $(C_6H_{11}O_7^{-1})$, citrate $(C_6H_5O_7^{-3})$, hydrogen citrate $(C_6H_6O_7^{-2})$, dihydrogen citrate $(C_6H_7O_7^{-1})$, malate $(C_4H_6O_5^{-2})$, hydrogen malate $(C_4H_7O_5^{-1})$, maleate $(C_4H_2O_4^{-2})$, hydrogen maleate $(C_4H_3O_4^{-1})$, fumarate $(C_4H_2O_4^{-2})$, hydrogen fumarate $(C_4H_3O_4^{-1})$, succinate $(C_4H_4O_4^{-2})$, hydrogen succinate $(C_4H_5O_4^{-1})$, glutarate $(C_5H_6O_4^{-2})$, hydrogen glutarate $(C_5H_7O_4^{-1})$, adipate $C_6H_8O_4^{-2}$, hydrogen adipate $C_6H_9O_4^{-1})$, lactate $(C_3H_5O_3^{-1})$, tartrate $(C_4H_4O_6^{-2})$, bitartrate $(C_4H_5O_6^{-1})$, phosphate $(PO_4^{-3})$, monohydrogen phosphate $(HPO_4^{-2})$, dihydrogen phosphate $(H_2PO_4^-)$, fluoride $(F^-)$, chloride $(Cl^-)$, sulfate $(SO_4^{-2})$, bisulfate $(HSO_4^{-1})$, nitrate $(NO_3^-)$, carbonate $(CO_3^{-2})$, bicarbonate $(HCO_3^-)$, glycerate $(C_3H_5O_4^{-1})$, glycolate $(C_2H_3O_3^{-1})$, or combinations thereof; the second anion is independently selected from gluconate $(C_6H_{11}O_7^{-1})$, citrate $(C_6H_5O_7^{-3})$, hydrogen citrate $(C_6H_6O_7^{-2})$, dihydrogen citrate $(C_6H_7O_7^{-1})$, malate $(C_4H_6O_5^{-2})$, hydrogen malate $(C_4H_7O_5^{-1})$, maleate $(C_4H_2O_4^{-2})$, hydrogen maleate $(C_4H_3O_4^{-1})$, fumarate $(C_4H_2O_4^{-2})$, hydrogen fumarate $(C_4H_3O_4^{-1})$, succinate $(C_4H_4O_4^{-2})$, hydrogen succinate $(C_4H_5O_4^{-1})$, glutarate $(C_5H_6O_4^{-2})$, hydrogen glutarate $(C_5H_7O_4^{-1})$, adipate $C_6H_8O_4^{-2}$, hydrogen adipate $C_6H_9O_4^{-1})$, lactate $(C_3H_5O_3^{-1})$, tartrate $(C_4H_4O_6^{-2})$, bitartrate $(C_4H_5O_6^{-1})$, phosphate $(PO_4^{-3})$, monohydrogen phosphate $(HPO_4^{-2})$, dihydrogen phosphate $(H_2PO_4^-)$, fluoride $(F^-)$, chloride $(Cl^-)$, sulfate $(SO_4^{-2})$, bisulfate $(HSO_4^{-1})$, nitrate $(NO_3^-)$, carbonate $(CO_3^{-2})$, bicarbonate $(HCO_3^-)$, glycerate $(C_3H_5O_4^{-1})$, glycolate $(C_2H_3O_3^{-1})$, or combinations thereof; the third anion is independently selected from gluconate ($C_6H_{11}O_7^{-1}$), citrate ($C_6H_5O_7^{-3}$), hydrogen citrate ($C_6H_6O_7^{-2}$), dihydrogen citrate ($C_6H_7O_7^{-1}$), malate ($C_4H_6O_5^{-2}$), hydrogen malate ($C_4H_7O_5^{-1}$), maleate ($C_4H_2O_4^{-2}$), hydrogen maleate ($C_4H_3O_4^{-1}$), fumarate ($C_4H_2O_4^{-2}$), hydrogen fumarate ($C_4H_3O_4^{-1}$), succinate ($C_4H_4O_4^{-2}$), hydrogen succinate ($C_4H_5O_4^{-1}$), glutarate ($C_5H_6O_4^{-2}$), hydrogen glutarate ($C_5H_7O_4^{-1}$), adipate $C_6H_8O_4^{-2}$), hydrogen adipate $C_6H_9O_4^{-1}$), lactate ($C_3H_5O_3^{-1}$), tartrate ($C_4H_4O_6^{-2}$), bitartrate ($C_4H_5O_6^{-1}$), phosphate ($PO_4^{-3}$), monohydrogen phosphate ($HPO_4^{-2}$), dihydrogen phosphate ($H_2PO_4^{-}$), fluoride ($F^-$), chloride ($Cl^-$), sulfate ($SO_4^{-2}$), bisulfate ($HSO_4^{-1}$), nitrate ($NO_3^-$), carbonate ($CO_3^{-2}$), bicarbonate ($HCO_3^-$), glycerate ($C_3H_5O_4^{-1}$), glycolate ($C_2H_3O_3^{-1}$), or combinations thereof; and the fourth anion is independently selected from gluconate ($C_6H_{11}O_7^{-1}$), citrate ($C_6H_5O_7^{-3}$), hydrogen citrate ($C_6H_6O_7^{-2}$), dihydrogen citrate ($C_6H_7O_7^{-1}$), malate ($C_4H_6O_5^{-2}$), hydrogen malate ($C_4H_7O_5^{-1}$), maleate ($C_4H_2O_4^{-2}$), hydrogen maleate ($C_4H_3O_4^{-1}$), fumarate ($C_4H_2O_4^{-2}$), hydrogen fumarate ($C_4H_3O_4^{-1}$), succinate ($C_4H_4O_4^{-2}$), hydrogen succinate ($C_4H_5O_4^{-1}$), glutarate ($C_5H_6O_4^{-2}$), hydrogen glutarate ($C_5H_7O_4^{-1}$), adipate $C_6H_8O_4^{-2}$), hydrogen adipate $C_6H_9O_4^{-1}$), lactate ($C_3H_5O_3^{-1}$), tartrate ($C_4H_4O_6^{-2}$), bitartrate ($C_4H_5O_6^{-1}$), phosphate ($PO_4^{-3}$), monohydrogen phosphate ($HPO_4^{-2}$), dihydrogen phosphate ($H_2PO_4^{-}$), fluoride ($F^-$), chloride ($Cl^-$), sulfate ($SO_4^{-2}$), bisulfate ($HSO_4^{-1}$), nitrate ($NO_3^-$), carbonate ($CO_3^{-2}$), bicarbonate ($HCO_3^-$), glycerate ($C_3H_5O_4^{-1}$), glycolate ($C_2H_3O_3^{-1}$), or combinations thereof. In some instances, the first cation, the second cation, the third cation, and the fourth cation are not the same. In other instances, some or all of the first cation, the second cation, the third cation, and the fourth cation can be the same, provided that the first anion, the second anion, the third anion, and the fourth anion are not the same.

In a further aspect, a disclosed beverage composition comprises at least one disclosed sweetening agent and a first salt having a first cation and a first anion; a second salt having a second cation and a second anion; optionally a third salt having a third cation and a third anion; and optionally a fourth salt having a fourth cation and a fourth anion; the first cation is independently selected from $Na^+$, $K^+$, $Ca^{2+}$, and $Mg^{2+}$; the second cation is independently selected from $Na^+$, $K^+$, $Ca^{2+}$, and $Mg^{2+}$; the third cation is independently selected from $Na^+$, $K^+$, $Ca^{2+}$, and $Mg^{2+}$; and the fourth cation is independently selected from $Na^+$, $K^+$, $Ca^{2+}$, and $Mg^{2+}$; the first anion is independently selected from gluconate ($C_6H_{11}O_7^{-1}$), citrate ($C_6H_5O_7^{-3}$), hydrogen citrate ($C_6H_6O_7^{-2}$), dihydrogen citrate ($C_6H_7O_7^{-1}$), malate ($C_4H_6O_5^{-2}$), hydrogen malate ($C_4H_7O_5^{-1}$), maleate ($C_4H_2O_4^{-2}$), hydrogen maleate ($C_4H_3O_4^{-1}$), fumarate ($C_4H_2O_4^{-2}$), hydrogen fumarate ($C_4H_3O_4^{-1}$), succinate ($C_4H_4O_4^{-2}$), hydrogen succinate ($C_4H_5O_4^{-1}$), glutarate ($C_5H_6O_4^{-2}$), hydrogen glutarate ($C_5H_7O_4^{-1}$), adipate $C_6H_8O_4^{-2}$), hydrogen adipate $C_6H_9O_4^{-1}$), lactate ($C_3H_5O_3^{-1}$), tartrate ($C_4H_4O_6^{-2}$), bitartrate ($C_4H_5O_6^{-1}$), phosphate ($PO_4^{-3}$), monohydrogen phosphate ($HPO_4^{-2}$), dihydrogen phosphate ($H_2PO_4^{-}$), fluoride ($F^-$), chloride ($Cl^-$), sulfate ($SO_4^{-2}$), bisulfate ($HSO_4^{-1}$), nitrate ($NO_3^-$), carbonate ($CO_3^{-2}$), bicarbonate ($HCO_3^-$), glycerate ($C_3H_5O_4^{-1}$), glycolate ($C_2H_3O_3^{-1}$), or combinations thereof; the second anion is independently selected from gluconate ($C_6H_{11}O_7^{-1}$), citrate ($C_6H_5O_7^{-3}$), hydrogen citrate ($C_6H_6O_7^{-2}$), dihydrogen citrate ($C_6H_7O_7^{-1}$), malate ($C_4H_6O_5^{-2}$), hydrogen malate ($C_4H_7O_5^{-1}$), maleate ($C_4H_2O_4^{-2}$), hydrogen maleate ($C_4H_3O_4^{-1}$), fumarate ($C_4H_2O_4^{-2}$), hydrogen fumarate ($C_4H_3O_4^{-1}$), succinate ($C_4H_4O_4^{-2}$), hydrogen succinate ($C_4H_5O_4^{-1}$), glutarate ($C_5H_6O_4^{-2}$), hydrogen glutarate ($C_5H_7O_4^{-1}$), adipate $C_6H_8O_4^{-2}$), hydrogen adipate $C_6H_9O_4^{-1}$), lactate ($C_3H_5O_3^{-1}$), tartrate ($C_4H_4O_6^{-2}$), bitartrate ($C_4H_5O_6^{-1}$), phosphate ($PO_4^{-3}$), monohydrogen phosphate ($HPO_4^{-2}$), dihydrogen phosphate ($H_2PO_4^{-}$), fluoride ($F^-$), chloride ($Cl^-$), sulfate ($SO_4^{-2}$), bisulfate ($HSO_4^{-1}$), nitrate ($NO_3^-$), carbonate ($CO_3^{-2}$), bicarbonate ($HCO_3^-$), glycerate ($C_3H_5O_4^{-1}$), glycolate ($C_2H_3O_3^{-1}$), or combinations thereof; the third anion is independently selected from gluconate ($C_6H_{11}O_7^{-1}$), citrate ($C_6H_5O_7^{-3}$), hydrogen citrate ($C_6H_6O_7^{-2}$), dihydrogen citrate ($C_6H_7O_7^{-1}$), malate ($C_4H_6O_5^{-2}$), hydrogen malate ($C_4H_7O_5^{-1}$), maleate ($C_4H_2O_4^{-2}$), hydrogen maleate ($C_4H_3O_4^{-1}$), fumarate ($C_4H_2O_4^{-2}$), hydrogen fumarate ($C_4H_3O_4^{-1}$), succinate ($C_4H_4O_4^{-2}$), hydrogen succinate ($C_4H_5O_4^{-1}$), glutarate ($C_5H_6O_4^{-2}$), hydrogen glutarate ($C_5H_7O_4^{-1}$), adipate $C_6H_8O_4^{-2}$), hydrogen adipate $C_6H_9O_4^{-1}$), lactate ($C_3H_5O_3^{-1}$), tartrate ($C_4H_4O_6^{-2}$), bitartrate ($C_4H_5O_6^{-1}$), phosphate ($PO_4^{-3}$), monohydrogen phosphate ($HPO_4^{-2}$), dihydrogen phosphate ($H_2PO_4^{-}$), fluoride ($F^-$), chloride ($Cl^-$), sulfate ($SO_4^{-2}$), bisulfate ($HSO_4^{-1}$), nitrate ($NO_3^-$), carbonate ($CO_3^{-2}$), bicarbonate ($HCO_3^-$), glycerate ($C_3H_5O_4^{-1}$), glycolate ($C_2H_3O_3^{-1}$), or combinations thereof; the third anion is independently selected from gluconate ($C_6H_{11}O_7^{-1}$), citrate ($C_6H_5O_7^{-3}$), hydrogen citrate ($C_6H_6O_7^{-2}$), dihydrogen citrate ($C_6H_7O_7^{-1}$), malate ($C_4H_6O_5^{-2}$), hydrogen malate ($C_4H_7O_5^{-1}$), maleate ($C_4H_2O_4^{-2}$), hydrogen maleate ($C_4H_3O_4^{-1}$), fumarate ($C_4H_2O_4^{-2}$), hydrogen fumarate ($C_4H_3O_4^{-1}$), succinate ($C_4H_4O_4^{-2}$), hydrogen succinate ($C_4H_5O_4^{-1}$), glutarate ($C_5H_6O_4^{-2}$), hydrogen glutarate ($C_5H_7O_4^{-1}$), adipate $C_6H_8O_4^{-2}$), hydrogen adipate $C_6H_9O_4^{-1}$), lactate ($C_3H_5O_3^{-1}$), tartrate ($C_4H_4O_6^{-2}$), bitartrate ($C_4H_5O_6^{-1}$), phosphate ($PO_4^{-3}$), monohydrogen phosphate ($HPO_4^{-2}$), dihydrogen phosphate ($H_2PO_4^{-}$), fluoride ($F^-$), chloride ($Cl^-$), sulfate ($SO_4^{-2}$), bisulfate ($HSO_4^{-1}$), nitrate ($NO_3^-$), carbonate ($CO_3^{-2}$), bicarbonate ($HCO_3^-$), glycerate ($C_3H_5O_4^{-1}$), glycolate ($C_2H_3O_3^{-1}$), or combinations thereof; the fourth anion is independently selected from gluconate ($C_6H_{11}O_7^{-1}$), citrate ($C_6H_5O_7^{-3}$), hydrogen citrate ($C_6H_6O_7^{-2}$), dihydrogen citrate ($C_6H_7O_7^{-1}$), malate ($C_4H_6O_5^{-2}$), hydrogen malate ($C_4H_7O_5^{-1}$), maleate ($C_4H_2O_4^{-2}$), hydrogen maleate ($C_4H_3O_4^{-1}$), fumarate ($C_4H_2O_4^{-2}$), hydrogen fumarate ($C_4H_3O_4^{-1}$), succinate ($C_4H_4O_4^{-2}$), hydrogen succinate ($C_4H_5O_4^{-1}$), glutarate ($C_5H_6O_4^{-2}$), hydrogen glutarate ($C_5H_7O_4^{-1}$), adipate $C_6H_8O_4^{-2}$), hydrogen adipate $C_6H_9O_4^{-1}$), lactate ($C_3H_5O_3^{-1}$), tartrate ($C_4H_4O_6^{-2}$), bitartrate ($C_4H_5O_6^{-1}$), phosphate ($PO_4^{-3}$), monohydrogen phosphate ($HPO_4^{-2}$), dihydrogen phosphate ($H_2PO_4^{-}$), fluoride ($F^-$), chloride ($Cl^-$), sulfate ($SO_4^{-2}$), bisulfate ($HSO_4^{-1}$), nitrate ($NO_3^-$), carbonate ($CO_3^{-2}$), bicarbonate ($HCO_3^-$), glycerate ($C_3H_5O_4^{-1}$), glycolate ($C_2H_3O_3^{-1}$), or combinations thereof. In some instances, the first cation, the second cation, the third cation, and the fourth cation are not the same. In other instances, some or all of the first cation, the second cation, the third cation, and the fourth cation can be the same, provided that the first anion, the second anion, the third anion, and the fourth anion are not the same.

In a further aspect, a disclosed beverage composition comprises at least one disclosed sweetening agent and a first salt having a first cation and a first anion; a second salt having a second cation and a second anion; a third salt having a third cation and a third anion; and optionally a fourth salt having a fourth cation and a fourth anion; the first cation is independently selected from $Na^+$, $K^+$, $Ca^{2+}$, and $Mg^{2+}$; the second cation is independently selected from $Na^+$, $K^+$, $Ca^{2+}$, and $Mg^{2+}$; the third cation is independently selected from $Na^+$, $K^+$, $Ca^{2+}$, and $Mg^{2+}$; and the fourth cation is independently selected from $Na^+$, $K^+$, $Ca^{2+}$, and $Mg^{2+}$; the first anion is independently selected from gluconate ($C_6H_{11}O_7^{-1}$), citrate ($C_6H_5O_7^{-3}$), hydrogen citrate ($C_6H_6O_7^{-2}$), dihydrogen citrate ($C_6H_7O_7^{-1}$), malate ($C_4H_6O_5^{-2}$), hydrogen malate ($C_4H_7O_5^{-1}$), maleate ($C_4H_2O_4^{-2}$), hydrogen maleate ($C_4H_3O_4^{-1}$), fumarate ($C_4H_2O_4^{-2}$), hydrogen fumarate ($C_4H_3O_4^{-1}$), succinate ($C_4H_4O_4^{-2}$), hydrogen succinate ($C_4H_5O_4^{-1}$), glutarate ($C_5H_6O_4^{-2}$), hydrogen glutarate ($C_5H_7O_4^{-1}$), adipate $C_6H_8O_4^{-2}$), hydrogen adipate $C_6H_9O_4^{-1}$), lactate ($C_3H_5O_3^{-1}$), tartrate ($C_4H_4O_6^{-2}$), bitartrate ($C_4H_5O_6^{-1}$), phosphate ($PO_4^{-3}$), monohydrogen phosphate ($HPO_4^{-2}$), dihydrogen phosphate ($H_2PO_4^-$), fluoride ($F^-$), chloride ($Cl^-$), sulfate ($SO_4^{-2}$), bisulfate ($HSO_4^{-1}$), nitrate ($NO_3^-$), carbonate ($CO_3^{-2}$), bicarbonate ($HCO_3^-$), glycerate ($C_3H_5O_4^{-1}$), glycolate ($C_2H_3O_3^{-1}$), or combinations thereof; the second anion is independently selected from gluconate ($C_6H_{11}O_7^{-1}$), citrate ($C_6H_5O_7^{-3}$), hydrogen citrate ($C_6H_6O_7^{-2}$), dihydrogen citrate ($C_6H_7O_7^{-1}$), malate ($C_4H_6O_5^{-2}$), hydrogen malate ($C_4H_7O_5^{-1}$), maleate ($C_4H_2O_4^{-2}$), hydrogen maleate ($C_4H_3O_4^{-1}$), fumarate ($C_4H_2O_4^{-2}$), hydrogen fumarate ($C_4H_3O_4^{-1}$), succinate ($C_4H_4O_4^{-2}$), hydrogen succinate ($C_4H_5O_4^{-1}$), glutarate ($C_5H_6O_4^{-2}$), hydrogen glutarate ($C_5H_7O_4^{-1}$), adipate $C_6H_8O_4^{-2}$), hydrogen adipate $C_6H_9O_4^{-1}$), lactate ($C_3H_5O_3^{-1}$), tartrate ($C_4H_4O_6^{-2}$), bitartrate ($C_4H_5O_6^{-1}$), phosphate ($PO_4^{-3}$), monohydrogen phosphate ($HPO_4^{-2}$), dihydrogen phosphate ($H_2PO_4^-$), fluoride ($F^-$), chloride ($Cl^-$), sulfate ($SO_4^{-2}$), bisulfate ($HSO_4^{-1}$), nitrate ($NO_3^-$), carbonate ($CO_3^{-2}$), bicarbonate ($HCO_3^-$), glycerate ($C_3H_5O_4^{-1}$), glycolate ($C_2H_3O_3^{-1}$), or combinations thereof; the third anion is independently selected from gluconate ($C_6H_{11}O_7^{-1}$), citrate ($C_6H_5O_7^{-3}$), hydrogen citrate ($C_6H_6O_7^{-2}$), dihydrogen citrate ($C_6H_7O_7^{-1}$), malate ($C_4H_6O_5^{-2}$), hydrogen malate ($C_4H_7O_5^{-1}$), maleate ($C_4H_2O_4^{-2}$), hydrogen maleate ($C_4H_3O_4^{-1}$), fumarate ($C_4H_2O_4^{-2}$), hydrogen fumarate ($C_4H_3O_4^{-1}$), succinate ($C_4H_4O_4^{-2}$), hydrogen succinate ($C_4H_5O_4^{-1}$), glutarate ($C_5H_6O_4^{-2}$), hydrogen glutarate ($C_5H_7O_4^{-1}$), adipate $C_6H_8O_4^{-2}$), hydrogen adipate $C_6H_9O_4^{-1}$), lactate ($C_3H_5O_3^{-1}$), tartrate ($C_4H_4O_6^{-2}$), bitartrate ($C_4H_5O_6^{-1}$), phosphate ($PO_4^{-3}$), monohydrogen phosphate ($HPO_4^{-2}$), dihydrogen phosphate ($H_2PO_4^-$), fluoride ($F^-$), chloride ($Cl^-$), sulfate ($SO_4^{-2}$), bisulfate ($HSO_4^{-1}$), nitrate ($NO_3^-$), carbonate ($CO_3^{-2}$), bicarbonate ($HCO_3^-$), glycerate ($C_3H_5O_4^{-1}$), glycolate ($C_2H_3O_3^{-1}$), or combinations thereof; and the fourth anion is independently selected from gluconate ($C_6H_{11}O_7^{-1}$), citrate ($C_6H_5O_7^{-3}$), hydrogen citrate ($C_6H_6O_7^{-2}$), dihydrogen citrate ($C_6H_7O_7^{-1}$), malate ($C_4H_6O_5^{-2}$), hydrogen malate ($C_4H_7O_5^{-1}$), maleate ($C_4H_2O_4^{-2}$), hydrogen maleate ($C_4H_3O_4^{-1}$), fumarate ($C_4H_2O_4^{-2}$), hydrogen fumarate ($C_4H_3O_4^{-1}$), succinate ($C_4H_4O_4^{-2}$), hydrogen succinate ($C_4H_5O_4^{-1}$), glutarate ($C_5H_6O_4^{-2}$), hydrogen glutarate ($C_5H_7O_4^{-1}$), adipate $C_6H_8O_4^{-2}$), hydrogen adipate $C_6H_9O_4^{-1}$), lactate ($C_3H_5O_3^{-1}$), tartrate ($C_4H_4O_6^{-2}$), bitartrate ($C_4H_5O_6^{-1}$), phosphate ($PO_4^{-3}$), monohydrogen phosphate ($HPO_4^{-2}$), dihydrogen phosphate ($H_2PO_4^-$), fluoride ($F^-$), chloride ($Cl^-$), sulfate ($SO_4^{-2}$), bisulfate ($HSO_4^{-1}$), nitrate ($NO_3^-$), carbonate ($CO_3^{-2}$), bicarbonate ($HCO_3^-$), glycerate ($C_3H_5O_4^{-1}$), glycolate ($C_2H_3O_3^{-1}$), or combinations thereof. In some instances, the first cation, the second cation, the third cation, and the fourth cation are not the same. In other instances, some or all of the first cation, the second cation, the third cation, and the fourth cation can be the same, provided that the first anion, the second anion, the third anion, and the fourth anion are not the same.

In a further aspect, a disclosed beverage composition comprises at least one disclosed sweetening agent and a first salt having a first cation and a first anion; a second salt having a second cation and a second anion; a third salt having a third cation and a third anion; the first cation is independently selected from $Na^+$, $K^+$, $Ca^{2+}$, and $Mg^{2+}$; the second cation is independently selected from $Na^+$, $K^+$, $Ca^{2+}$, and $Mg^{2+}$; the third cation is independently selected from $Na^+$, $K^+$, $Ca^{2+}$, and $Mg^{2+}$; the first anion is independently selected from gluconate ($C_6H_{11}O_7^{-1}$), citrate ($C_6H_5O_7^{-3}$), hydrogen citrate ($C_6H_6O_7^{-2}$), dihydrogen citrate ($C_6H_7O_7^{-1}$), malate ($C_4H_6O_5^{-2}$), hydrogen malate ($C_4H_7O_5^{-1}$), maleate ($C_4H_2O_4^{-2}$), hydrogen maleate ($C_4H_3O_4^{-1}$), fumarate ($C_4H_2O_4^{-2}$), hydrogen fumarate ($C_4H_3O_4^{-1}$), succinate ($C_4H_4O_4^{-2}$), hydrogen succinate ($C_4H_5O_4^{-1}$), glutarate ($C_5H_6O_4^{-2}$), hydrogen glutarate ($C_5H_7O_4^{-1}$), adipate ($C_6H_8O_4^{-2}$), hydrogen adipate $C_6H_9O_4^{-1}$), lactate ($C_3H_5O_3^{-1}$), tartrate ($C_4H_4O_6^{-2}$), bitartrate ($C_4H_5O_6^{-1}$), phosphate ($PO_4^{-3}$), monohydrogen phosphate ($HPO_4^{-2}$), dihydrogen phosphate ($H_2PO_4^-$), fluoride ($F^-$), chloride ($Cl^-$), sulfate ($SO_4^{-2}$), bisulfate ($HSO_4^{-1}$), nitrate ($NO_3^-$), carbonate ($CO_3^{-2}$), bicarbonate ($HCO_3^-$), glycerate ($C_3H_5O_4^{-1}$), glycolate ($C_2H_3O_3^{-1}$), or combinations thereof; the second anion is independently selected from gluconate ($C_6H_{11}O_7^{-1}$), citrate ($C_6H_5O_7^{-3}$), hydrogen citrate ($C_6H_6O_7^{-2}$), dihydrogen citrate ($C_6H_7O_7^{-1}$), malate ($C_4H_6O_5^{-2}$), hydrogen malate ($C_4H_7O_5^{-1}$), maleate ($C_4H_2O_4^{-2}$), hydrogen maleate ($C_4H_3O_4^{-1}$), fumarate ($C_4H_2O_4^{-2}$), hydrogen fumarate ($C_4H_3O_4^{-1}$), succinate ($C_4H_4O_4^{-2}$), hydrogen succinate ($C_4H_5O_4^{-1}$), glutarate ($C_5H_6O_4^{-2}$), hydrogen glutarate ($C_5H_7O_4^{-1}$), adipate ($C_6H_8O_4^{-2}$), hydrogen adipate $C_6H_9O_4^{-1}$), lactate ($C_3H_5O_3^{-1}$), tartrate ($C_4H_4O_6^{-2}$), bitartrate ($C_4H_5O_6^{-1}$), phosphate ($PO_4^{-3}$), monohydrogen phosphate ($HPO_4^{-2}$), dihydrogen phosphate ($H_2PO_4^-$), fluoride ($F^-$), chloride ($Cl^-$), sulfate ($SO_4^{-2}$), bisulfate ($HSO_4^{-1}$), nitrate (NOs), carbonate ($CO_3^{-2}$), bicarbonate ($HCO_3^-$), glycerate ($C_3H_5O_4^{-1}$), glycolate ($C_2H_3O_3^{-1}$), or combinations thereof; and the third anion is independently selected from gluconate ($C_6H_{11}O_7^{-1}$), citrate ($C_6H_5O_7^{-3}$), hydrogen citrate ($C_6H_6O_7^{-2}$), dihydrogen citrate ($C_6H_7O_7^{-1}$), malate ($C_4H_6O_5^{-2}$), hydrogen malate ($C_4H_7O_5^{-1}$), maleate ($C_4H_2O_4^{-2}$), hydrogen maleate ($C_4H_3O_4^{-1}$), fumarate ($C_4H_2O_4^{-2}$), hydrogen fumarate ($C_4H_3O_4^{-1}$), succinate ($C_4H_4O_4^{-2}$), hydrogen succinate ($C_4H_5O_4^{-1}$), glutarate ($C_5H_6O_4^{-2}$), hydrogen glutarate ($C_5H_7O_4^{-1}$), adipate ($C_6H_8O_4^{-2}$), hydrogen adipate $C_6H_9O_4^{-1}$), lactate ($C_3H_5O_3^{-1}$), tartrate ($C_4H_4O_6^{-2}$), bitartrate ($C_4H_5O_6^{-1}$), phosphate ($PO_4^{-3}$), monohydrogen phosphate ($HPO_4^{-2}$), dihydrogen phosphate ($H_2PO_4^-$), fluoride ($F^-$), chloride ($Cl^-$), sulfate ($SO_4^{-2}$), bisulfate ($HSO_4^{-1}$), nitrate ($NO_3^-$), carbonate ($CO_3^{-2}$), bicarbonate ($HCO_3^-$), glycerate ($C_3H_5O_4^{-1}$), glycolate ($C_2H_3O_3^{-1}$), or combinations thereof. In some instances, the first cation, the second cation, the third cation, and the fourth cation are not the same. In other instances, some or all of the first cation, the second cation, the third cation, and the fourth cation can be the same, provided that the first anion, the second anion, the third anion, and the fourth anion are not the same.

In a further aspect, a disclosed beverage composition comprises at least one disclosed sweetening agent and a first salt having a first cation and a first anion; a second salt having a second cation and a second anion; a third salt having a third cation and a third anion; the first cation is $K^+$; the second cation is $Mg^{2+}$; the third cation is $Ca^{2+}$; the first anion is independently selected from gluconate ($C_6H_{11}O_7^{-1}$), citrate ($C_6H_5O_7^{-3}$), hydrogen citrate ($C_6H_6O_7^{-2}$), dihydrogen citrate ($C_6H_7O_7^{-1}$), malate ($C_4H_6O_5^{-2}$), hydrogen malate ($C_4H_7O_5^{-1}$), maleate ($C_4H_2O_4^{-2}$), hydrogen maleate ($C_4H_3O_4^{-1}$), fumarate ($C_4H_2O_4^{-2}$), hydrogen fumarate ($C_4H_3O_4^{-1}$), succinate ($C_4H_4O_4^{-2}$), hydrogen succinate ($C_4H_5O_4^{-1}$), glutarate ($C_5H_6O_4^{-2}$), hydrogen glutarate ($C_5H_7O_4^{-1}$), adipate ($C_6H_8O_4^{-2}$), hydrogen adipate $C_6H_9O_4^{-1}$), lactate ($C_3H_5O_3^{-1}$), tartrate ($C_4H_4O_6^{-2}$), bitartrate ($C_4H_5O_6^{-1}$), phosphate ($PO_4^{-3}$), monohydrogen phosphate ($HPO_4^{-2}$), dihydrogen phosphate ($H_2PO_4^-$), fluoride ($F^-$), chloride ($Cl^-$), sulfate ($SO_4^{-2}$), bisulfate ($HSO_4^{-1}$), nitrate ($NO_3^-$), carbonate ($CO_3^{-2}$), bicarbonate ($HCO_3^-$), glycerate ($C_3H_5O_4^{-1}$), glycolate ($C_2H_3O_3^{-1}$), or combinations thereof; the second anion is independently selected from gluconate ($C_6H_{11}O_7^{-1}$), citrate ($C_6H_5O_7^{-3}$), hydrogen citrate ($C_6H_6O_7^{-2}$), dihydrogen citrate ($C_6H_7O_7^{-1}$), malate ($C_4H_6O_5^{-2}$), hydrogen malate ($C_4H_7O_5^{-1}$), maleate ($C_4H_2O_4^{-2}$), hydrogen maleate ($C_4H_3O_4^{-1}$), fumarate ($C_4H_2O_4^{-2}$), hydrogen fumarate ($C_4H_3O_4^{-1}$), succinate ($C_4H_4O_4^{-2}$), hydrogen succinate ($C_4H_5O_4^{-1}$), glutarate ($C_5H_6O_4^{-2}$), hydrogen glutarate ($C_5H_7O_4^{-1}$), adipate $C_6H_8O_4^{-2}$), hydrogen adipate $C_6H_9O_4^{-1}$), lactate ($C_3H_5O_3^{-1}$), tartrate ($C_4H_4O_6^{-2}$), bitartrate ($C_4H_5O_6^{-1}$), phosphate ($PO_4^{-3}$), monohydrogen phosphate ($HPO_4^{-2}$), dihydrogen phosphate ($H_2PO_4^-$), fluoride ($F^-$), chloride ($Cl^-$), sulfate ($SO_4^{-2}$), bisulfate ($HSO_4^{-1}$), nitrate ($NO_3^-$), carbonate ($CO_3^{-2}$), bicarbonate ($HCO_3^-$), glycerate ($C_3H_5O_4^{-1}$), glycolate ($C_2H_3O_3^{-1}$), or combinations thereof; and the third anion is independently selected from gluconate ($C_6H_{11}O_7^{-1}$), citrate ($C_6H_5O_7^{-3}$), hydrogen citrate ($C_6H_6O_7^{-2}$), dihydrogen citrate ($C_6H_7O_7^{-1}$), malate ($C_4H_6O_5^{-2}$), hydrogen malate ($C_4H_7O_5^{-1}$), maleate ($C_4H_2O_4^{-2}$), hydrogen maleate ($C_4H_3O_4^{-1}$), fumarate ($C_4H_2O_4^{-2}$), hydrogen fumarate ($C_4H_3O_4^{-1}$), succinate ($C_4H_4O_4^{-2}$), hydrogen succinate ($C_4H_5O_4^{-1}$), glutarate ($C_5H_6O_4^{-2}$), hydrogen glutarate ($C_5H_7O_4^{-1}$), adipate $C_6H_8O_4^{-2}$), hydrogen adipate $C_6H_9O_4^{-1}$), lactate ($C_3H_5O_3^{-1}$), tartrate ($C_4H_4O_6^{-2}$), bitartrate ($C_4H_5O_6^{-1}$), phosphate ($PO_4^{-3}$), monohydrogen phosphate ($HPO_4^{-2}$), dihydrogen phosphate ($H_2PO_4^-$), fluoride ($F^-$), chloride ($Cl^-$), sulfate ($SO_4^{-2}$), bisulfate ($HSO_4^{-1}$), nitrate ($NO_3^-$), carbonate ($CO_3^{-2}$), bicarbonate ($HCO_3^-$), glycerate ($C_3H_5O_4^{-1}$), glycolate ($C_2H_3O_3^{-1}$), or combinations thereof. In some instances, the first cation, the second cation, the third cation, and the fourth cation are not the same. In other instances, some or all of the first cation, the second cation, the third cation, and the fourth cation can be the same, provided that the first anion, the second anion, the third anion, and the fourth anion are not the same.

In a further aspect, a disclosed beverage composition comprises at least one disclosed sweetening agent and a first salt having a first cation and a first anion; a second salt having a second cation and a second anion; a third salt having a third cation and a third anion; the first cation is $K^+$; the second cation is $Mg^{2+}$; the third cation is $Ca^{2+}$; the first anion is independently selected from citrate ($C_6H_5O_7^{-3}$) or conjugate acid form thereof, chloride ($Cl^-$), sulfate ($SO_4^{-2}$), or bisulfate ($HSO_4^{-1}$), or combinations thereof; the second anion is independently selected from citrate ($C_6H_5O_7^{-3}$) or conjugate acid form thereof, chloride ($Cl^-$), sulfate ($SO_4^{-2}$), or bisulfate ($HSO_4^{-1}$), or combinations thereof; and the third anion is independently selected from citrate ($C_6H_5O_7^{-3}$) or conjugate acid form thereof, chloride ($Cl^-$), sulfate ($SO_4^{-2}$), or bisulfate ($HSO_4^{-1}$), or combinations thereof. In some instances, the first cation, the second cation, the third cation, and the fourth cation are not the same. In other instances, some or all of the first cation, the second cation, the third cation, and the fourth cation can be the same, provided that the first anion, the second anion, the third anion, and the fourth anion are not the same.

In various aspects, a disclosed beverage composition comprises at least one disclosed sweetening agent and a first taste modulator component comprising a first salt having a first cation selected from Na$^+$, K$^+$, Ca$^{2+}$, and Mg$^{2+}$ and a first anion; and a second modulator component comprising a second salt having a second cation selected from Na$^+$, K$^+$, Ca$^{2+}$, and Mg$^{2+}$ and a second anion; such that the first taste modulator component is present at a concentration of from about 0 mM to about 25 mM if the first cation is Na$^+$ or K$^+$, or at a concentration of from about 0 mM to about 10 mM if the first cation is Ca$^{2+}$ or Mg$^{2+}$; and such that the second taste modulator component is present at a concentration of from about 0 mM to about 25 mM if the second cation is Na$^+$ or K$^+$, or at a concentration of from about 0 mM to about 10 mM if the second cation is Ca$^{2+}$ or Mg$^2$.

In various aspects, a disclosed beverage composition comprises at least one disclosed sweetening agent and a first taste modulator component comprising a first salt having a first cation selected from Na$^+$, K$^+$, Ca$^{2+}$, and Mg$^{2+}$ and a first anion; and a second modulator component comprising a second salt having a second cation selected from Na$^+$, K$^+$, Ca$^{2+}$, and Mg$^{2+}$ and a second anion; such that the first taste modulator component is present at a concentration of from about 0 mM to about 25 mM if the first cation is Na$^+$ or K$^+$, or at a concentration of from about 0 mM to about 5 mM if the first cation is Ca$^{2+}$ or Mg$^{2+}$; and such that the second taste modulator component is present at a concentration of from about 0 mM to about 25 mM if the second cation is Na$^+$ or K$^+$, or at a concentration of from about 0 mM to about 10 mM if the second cation is Ca$^{2+}$ or Mg$^{2+}$ or K$^+$, or at a concentration of from about 0 mM to about 10 mM if the third cation is Ca$^{2+}$ or Mg$^{2+}$.

In various aspects, a disclosed beverage composition comprises at least one disclosed sweetening agent and a first taste modulator component comprising a first salt having a first cation selected from Na$^+$, K$^+$, Ca$^{2+}$, and Mg$^{2+}$ and a first anion; and a second modulator component comprising a second salt having a second cation selected from Na$^+$, K$^+$, Ca$^{2+}$, and Mg$^{2+}$ and a second anion; such that the first taste modulator component is present at a concentration of from about 0 mM to about 10 mM if the first cation is Na$^+$ or K$^+$, or at a concentration of from about 0 mM to about 5 mM if the first cation is Ca$^{2+}$ or Mg$^{2+}$; and such that the second taste modulator component is present at a concentration of from about 0 mM to about 10 mM if the second cation is Na$^+$ or K$^+$, or at a concentration of from about 0 mM to about 5 mM if the second cation is Ca$^{2+}$ or Mg$^{2+}$.

In various aspects, a disclosed beverage composition comprises at least one disclosed sweetening agent and a first taste modulator component comprising a first salt having a first cation selected from Na$^+$, K$^+$, Ca$^{2+}$, and Mg$^{2+}$ and a first anion; a second modulator component comprising a second salt having a second cation selected from Na$^+$, K$^+$, Ca$^{2+}$, and Mg$^{2+}$ and a second anion; such that the first taste modulator component is present at a concentration of from about 0.1 mM to about 25 mM if the first cation is Na$^+$ or K$^+$, or at a concentration of from about 0.1 mM to about 10 mM if the first cation is Ca$^{2+}$ or Mg$^{2+}$; and such that the second taste modulator component is present at a concentration of from about 0.1 mM to about 25 mM if the second cation is Na$^+$ or K$^+$, or at a concentration of from about 0.1 mM to about 10 mM if the second cation is Ca$^{2+}$ or Mg$^{2+}$ or Mg$^{2+}$.

In various aspects, a disclosed beverage composition comprises at least one disclosed sweetening agent and a first taste modulator component comprising a first salt having a first cation selected from Na$^+$, K$^+$, Ca$^{2+}$, and Mg$^{2+}$ and a first anion; a second modulator component comprising a second salt having a second cation selected from Na$^+$, K$^+$, Ca$^{2+}$, and Mg$^{2+}$ and a second anion; such that the first taste modulator component is present at a concentration of from about 0.1 mM to about 25 mM if the first cation is Na$^+$ or K$^+$, or at a concentration of from about 0.1 mM to about 5 mM if the first cation is Ca$^{2+}$ or Mg$^{2+}$; and such that the second taste modulator component is present at a concentration of from about 0.1 mM to about 25 mM if the second cation is Na$^+$ or K$^+$, or at a concentration of from about 0.1 mM to about 10 mM if the second cation is Ca$^{2+}$ or Mg$^{2+}$.

In various aspects, a disclosed beverage composition comprises at least one disclosed sweetening agent and a first taste modulator component comprising a first salt having a first cation selected from Na$^+$, K$^+$, Ca$^{2+}$, and Mg$^{2+}$ and a first anion; a second modulator component comprising a second salt having a second cation selected from Na$^+$, K$^+$, Ca$^{2+}$, and Mg$^{2+}$ and a second anion; such that the first taste modulator component is present at a concentration of from about 0.1 mM to about 10 mM if the first cation is Na$^+$ or K$^+$, or at a concentration of from about 0.1 mM to about 5 mM if the first cation is Ca$^{2+}$ or Mg$^{2+}$; and such that the second taste modulator component is present at a concentration of from about 0.1 mM to about 10 mM if the second cation is Na$^+$ or K$^+$, or at a concentration of from about 0.1 mM to about 5 mM if the second cation is Ca$^{2+}$ or Mg$^{2+}$.

In various aspects, a disclosed beverage composition comprises at least one disclosed sweetening agent and a first taste modulator component comprising a first salt having a first cation selected from Na$^+$, K$^+$, Ca$^{2+}$, and Mg$^{2+}$ and a first anion; a second modulator component comprising a second salt having a second cation selected from Na$^+$, K$^+$, Ca$^{2+}$, and Mg$^{2+}$ and a second anion; such that the first taste modulator component is present at a concentration of from about 1 mM to about 25 mM if the first cation is Na$^+$ or K$^+$, or at a concentration of from about 1 mM to about 10 mM if the first cation is Ca$^{2+}$ or Mg$^{2+}$; and such that the second taste modulator component is present at a concentration of from about 1 mM to about 25 mM if the second cation is Na$^+$ or K$^+$, or at a concentration of from about 1 mM to about 10 mM if the second cation is Ca$^{2+}$ or Mg$^{2+}$.

In various aspects, a disclosed beverage composition comprises at least one disclosed sweetening agent and a first taste modulator component comprising a first salt having a first cation selected from Na$^+$, K$^+$, Ca$^{2+}$, and Mg$^{2+}$ and a first anion; a second modulator component comprising a second salt having a second cation selected from Na$^+$, K$^+$, Ca$^{2+}$, and Mg$^{2+}$ and a second anion; such that the first taste modulator component is present at a concentration of from about 1 mM to about 25 mM if the first cation is Na$^+$ or K$^+$, or at a concentration of from about 1 mM to about 5 mM if the first cation is Ca$^{2+}$ or Mg$^{2+}$; and such that the second taste modulator component is present at a concentration of from about 1 mM to about 25 mM if the second cation is Na$^+$ or K$^+$, or at a concentration of from about 1 mM to about 10 mM if the second cation is Ca$^{2+}$ or Mg$^{2+}$.

In various aspects, a disclosed beverage composition comprises at least one disclosed sweetening agent and a first taste modulator component comprising a first salt having a first cation selected from Na$^+$, K$^+$, Ca$^{2+}$, and Mg$^{2+}$ and a first anion; a second modulator component comprising a second salt having a second cation selected from Na$^+$, K$^+$, Ca$^{2+}$, and Mg$^{2+}$ and a second anion; such that the first taste modulator component is present at a concentration of from about 1 mM to about 10 mM if the first cation is Na$^+$ or K$^+$, or at a concentration of from about 1 mM to about 5 mM if the first cation is Ca$^{2+}$ or Mg$^{2+}$; and such that the second taste modulator component is present at a concentration of from about 1 mM to about 10 mM if the second cation is Na$^+$ or K$^+$, or at a concentration of from about 1 mM to about 5 mM if the second cation is Ca$^{2+}$ or Mg$^{2+}$.

In various aspects, a disclosed beverage composition comprises at least one disclosed sweetening agent and a first taste modulator component comprising a first salt having a first cation selected from Na$^+$, K$^+$, Ca$^{2+}$, and Mg$^{2+}$; a second modulator component comprising a second salt having a second cation selected from Na$^+$, K$^+$, Ca$^{2+}$, and Mg$^{2+}$; and a third modulator component comprising a third salt having a third cation selected from Na$^+$, K$^+$, Ca$^{2+}$, and Mg$^{2+}$; such that the first taste modulator component is present at a concentration of from about 0 mM to about 25 mM if the first cation is Na$^+$ or K$^+$, or at a concentration of from about 0 mM to about 10 mM if the first cation is Ca$^{2+}$ or Mg$^{2+}$; such that the second taste modulator component is present at a concentration of from about 0 mM to about 25 mM if the second cation is Na$^+$ or K$^+$, or at a concentration of from about 0 mM to about 10 mM if the second cation is Ca$^{2+}$ or Mg$^{2+}$; and such that the third taste modulator component is present at a concentration of from about 0 mM to about 25 mM if the third cation is Na$^+$ or K$^+$, or at a concentration of from about 0 mM to about 10 mM if the third cation is Ca$^{2+}$ or Mg$^{2+}$.

In various aspects, a disclosed beverage composition comprises at least one disclosed sweetening agent and a first taste modulator component comprising a first salt having a first cation selected from Na$^+$, K$^+$, Ca$^{2+}$, and Mg$^{2+}$; a second modulator component comprising a second salt having a second cation selected from Na$^+$, K$^+$, Ca$^{2+}$, and Mg$^{2+}$; and a third modulator component comprising a third salt having a third cation selected from Na$^+$, K$^+$, Ca$^{2+}$, and Mg$^{2+}$; such that the first taste modulator component is present at a concentration of from about 0 mM to about 25 mM if the first cation is Na$^+$ or K$^+$, or at a concentration of from about 0 mM to about 5 mM if the first cation is Ca$^{2+}$ or Mg$^{2+}$; such that the second taste modulator component is present at a concentration of from about 0 mM to about 25 mM if the second cation is Na$^+$ or K$^+$, or at a concentration of from about 0 mM to about 10 mM if the second cation is Ca$^{2+}$ or Mg$^{2+}$; and such that the third taste modulator component is present at a concentration of from about 0 mM to about 25 mM if the third cation is Na$^+$ or K$^+$, or at a concentration of from about 0 mM to about 10 mM if the third cation is Ca$^{2+}$ or Mg$^{2+}$.

In various aspects, a disclosed beverage composition comprises at least one disclosed sweetening agent and a first taste modulator component comprising a first salt having a first cation selected from Na$^+$, K$^+$, Ca$^{2+}$, and Mg$^{2+}$; a second modulator component comprising a second salt having a second cation selected from Na$^+$, K$^+$, Ca$^{2+}$, and Mg$^{2+}$; and a third modulator component comprising a third salt having a third cation selected from Na$^+$, K$^+$, Ca$^{2+}$, and Mg$^{2+}$; such that the first taste modulator component is present at a concentration of from about 0 mM to about 10 mM if the first cation is Na$^+$ or K$^+$, or at a concentration of from about 0 mM to about 5 mM if the first cation is Ca$^{2+}$ or Mg$^{2+}$; such that the second taste modulator component is present at a concentration of from about 0 mM to about 10 mM if the second cation is Na$^+$ or K$^+$, or at a concentration of from about 0 mM to about 5 mM if the second cation is Ca$^{2+}$ or Mg$^{2+}$; and such that the third taste modulator component is present at a concentration of from about 0 mM to about 10 mM if the third cation is Na$^+$ or K$^+$, or at a concentration of from about 0 mM to about 5 mM if the third cation is Ca$^{2+}$ or Mg$^{2+}$.

In various aspects, a disclosed beverage composition comprises at least one disclosed sweetening agent and a first taste modulator component comprising a first salt having a first cation selected from Na$^+$, K$^+$, Ca$^{2+}$, and Mg$^{2+}$; a second modulator component comprising a second salt having a second cation selected from Na$^+$, K$^+$, Ca$^{2+}$, and Mg$^{2+}$; and a third modulator component comprising a third salt having a third cation selected from Na$^+$, K$^+$, Ca$^{2+}$, and Mg$^{2+}$; such that the first taste modulator component is present at a concentration of from about 0.1 mM to about 25 mM if the first cation is Na$^+$ or K$^+$, or at a concentration of from about 0.1 mM to about 10 mM if the first cation is Ca$^{2+}$ or Mg$^{2+}$; such that the second taste modulator component is present at a concentration of from about 0.1 mM to about 25 mM if the second cation is Na$^+$ or K$^+$, or at a concentration of from about 0.1 mM to about 10 mM if the second cation is Ca$^{2+}$ or Mg$^{2+}$; and such that the third taste modulator component is present at a concentration of from about 0.1 mM to about 25 mM if the third cation is Na$^+$ or K$^+$, or at a concentration of from about 0.1 mM to about 10 mM if the third cation is Ca$^{2+}$ or Mg$^{2+}$.

In various aspects, a disclosed beverage composition comprises at least one disclosed sweetening agent and a first taste modulator component comprising a first salt having a first cation selected from Na$^+$, K$^+$, Ca$^{2+}$, and Mg$^{2+}$; a second modulator component comprising a second salt having a second cation selected from Na$^+$, K$^+$, Ca$^{2+}$, and Mg$^{2+}$; and a third modulator component comprising a third salt having a third cation selected from Na$^+$, K$^+$, Ca$^{2+}$, and Mg$^{2+}$; such that the first taste modulator component is present at a concentration of from about 0.1 mM to about 25 mM if the first cation is Na$^+$ or K$^+$, or at a concentration of from about 0.1 mM to about 5 mM if the first cation is Ca$^{2+}$ or Mg$^{2+}$; such that the second taste modulator component is present at a concentration of from about 0.1 mM to about 25 mM if the second cation is Na$^+$ or K$^+$, or at a concentration of from about 0.1 mM to about 10 mM if the second cation is Ca$^{2+}$ or Mg$^{2+}$; and such that the third taste modulator component is present at a concentration of from about 0.1 mM to about 25 mM if the third cation is Na$^+$ or K$^+$, or at a concentration of from about 0.1 mM to about 10 mM if the third cation is Ca$^{2+}$ or Mg$^{2+}$.

In various aspects, a disclosed beverage composition comprises at least one disclosed sweetening agent and a first taste modulator component comprising a first salt having a first cation selected from Na$^+$, K$^+$, Ca$^{2+}$, and Mg$^{2+}$; a second modulator component comprising a second salt having a second cation selected from Na$^+$, K$^+$, Ca$^{2+}$, and Mg$^{2+}$; and a third modulator component comprising a third salt having a third cation selected from Na$^+$, K$^+$, Ca$^{2+}$, and Mg$^{2+}$; such that the first taste modulator component is present at a concentration of from about 0.1 mM to about 10 mM if the first cation is Na$^+$ or K$^+$, or at a concentration of from about 0.1 mM to about 5 mM if the first cation is Ca$^{2+}$ or Mg$^{2+}$; such that the second taste modulator component is present at a concentration of from about 0.1 mM to about 10 mM if the second cation is Na$^+$ or K$^+$, or at a concentration of from about 0.1 mM to about 5 mM if the second cation is Ca$^{2+}$ or Mg$^{2+}$; and such that the third taste modulator component is present at a concentration of from about 0.1 mM to about 10 mM if the third cation is Na$^+$ or K$^+$, or at a concentration of from about 0.1 mM to about 5 mM if the third cation is Ca$^{2+}$ or Mg$^{2+}$.

In various aspects, a disclosed beverage composition comprises at least one disclosed sweetening agent and a first taste modulator component comprising a first salt having a first cation selected from Na$^+$, K$^+$, Ca$^{2+}$, and Mg$^{2+}$; a second modulator component comprising a second salt having a second cation selected from Na$^+$, K$^+$, Ca$^{2+}$, and Mg$^{2+}$; and a third modulator component comprising a third salt having a third cation selected from Na$^+$, K$^+$, Ca$^{2+}$, and Mg$^{2+}$; such that the first taste modulator component is present at a concentration of from about 1 mM to about 25 mM if the first cation is Na$^+$ or K$^+$, or at a concentration of from about 1 mM to about 10 mM if the first cation is Ca$^{2+}$ or Mg$^{2+}$; such that the second taste modulator component is present at a concentration of from about 1 mM to about 25 mM if the second cation is Na$^+$ or K$^+$, or at a concentration of from about 1 mM to about 10 mM if the second cation is Ca$^{2+}$ or Mg$^{2+}$; and such that the third taste modulator component is present at a concentration of from about 1 mM to about 25 mM if the third cation is Na$^+$ or K$^+$, or at a concentration of from about 1 mM to about 10 mM if the third cation is Ca$^{2+}$ or Mg$^{2+}$.

In various aspects, a disclosed beverage composition comprises at least one disclosed sweetening agent and a first taste modulator component comprising a first salt having a first cation selected from Na$^+$, K$^+$, Ca$^{2+}$, and Mg$^{2+}$; a second modulator component comprising a second salt having a second cation selected from Na$^+$, K$^+$, Ca$^{2+}$, and Mg$^{2+}$; and a third modulator component comprising a third salt having a third cation selected from Na$^+$, K$^+$, Ca$^{2+}$, and Mg$^{2+}$; such that the first taste modulator component is present at a concentration of from about 1 mM to about 25 mM if the first cation is Na$^+$ or K$^+$, or at a concentration of from about 1 mM to about 5 mM if the first cation is Ca$^{2+}$ or Mg$^{2+}$; such that the second taste modulator component is present at a concentration of from about 1 mM to about 25 mM if the second cation is Na$^+$ or K$^+$, or at a concentration of from about 1 mM to about 10 mM if the second cation is Ca$^{2+}$ or Mg$^{2+}$; and such that the third taste modulator component is present at a concentration of from about 1 mM to about 25 mM if the third cation is Na$^+$ or K$^+$, or at a concentration of from about 1 mM to about 10 mM if the third cation is Ca$^{2+}$ or Mg$^{2+}$.

In various aspects, a disclosed beverage composition comprises at least one disclosed sweetening agent and a first taste modulator component comprising a first salt having a first cation selected from Na$^+$, K$^+$, Ca$^{2+}$, and Mg$^{2+}$; a second modulator component comprising a second salt having a second cation selected from Na$^+$, K$^+$, Ca$^{2+}$, and Mg$^{2+}$; and a third modulator component comprising a third salt having a third cation selected from Na$^+$, K$^+$, Ca$^{2+}$, and Mg$^{2+}$; such that the first taste modulator component is present at a concentration of from about 1 mM to about 10 mM if the first cation is Na$^+$ or K$^+$, or at a concentration of from about 1 mM to about 5 mM if the first cation is Ca$^{2+}$ or Mg$^{2+}$; such that the second taste modulator component is present at a concentration of from about 1 mM to about 10 mM if the second cation is Na$^+$ or K$^+$, or at a concentration of from about 1 mM to about 5 mM if the second cation is Ca$^{2+}$ or Mg$^{2+}$; and such that the third taste modulator component is present at a concentration of from about 1 mM to about 10 mM if the third cation is Na$^+$ or K$^+$, or at a concentration of from about 1 mM to about 5 mM if the third cation is Ca$^{2+}$ or Mg$^{2+}$.

In various aspects, a disclosed beverage composition comprises at least one disclosed sweetening agent and a first taste modulator component comprising a first salt having a first cation selected from Na$^+$, K$^+$, Ca$^{2+}$, and Mg$^{2+}$; a second modulator component comprising a second salt having a second cation selected from Na$^+$, K$^+$, Ca$^{2+}$, and Mg$^{2+}$; and a third modulator component comprising a third salt having a third cation selected from Na$^+$, K$^+$, Ca$^{2+}$, and Mg$^{2+}$; such that the first taste modulator component is present at a concentration of from about 0 mM to about 25 mM; and such that each of the second taste modulator component and the third modulator component are independently present at a concentration of from about 0 mM to about 10 mM.

In various aspects, a disclosed beverage composition comprises at least one disclosed sweetening agent and a first taste modulator component comprising a first salt having a first cation selected from Na$^+$, K$^+$, Ca$^{2+}$, and Mg$^{2+}$; a second modulator component comprising a second salt having a second cation selected from Na$^+$, K$^+$, Ca$^{2+}$, and Mg$^{2+}$; and a third modulator component comprising a third salt having a third cation selected from Na$^+$, K$^+$, Ca$^{2+}$, and Mg$^{2+}$; such that the first taste modulator component is present at a concentration of from about 0 mM to about 25 mM; and such that each of the second taste modulator component and the third modulator component are independently present at a concentration of from about 0 mM to about 5 mM.

In various aspects, a disclosed beverage composition comprises at least one disclosed sweetening agent and a first taste modulator component comprising a first salt having a first cation selected from Na$^+$, K$^+$, Ca$^{2+}$, and Mg$^{2+}$; a second modulator component comprising a second salt having a second cation selected from Na$^+$, K$^+$, Ca$^{2+}$, and Mg$^{2+}$; and a third modulator component comprising a third salt having a third cation selected from Na$^+$, K$^+$, Ca$^{2+}$, and Mg$^{2+}$; such that the first taste modulator component is present at a concentration of from about 0 mM to about 10 mM; and such that each of the second taste modulator component and the third modulator component are independently present at a concentration of from about 0 mM to about 5 mM.

In various aspects, a disclosed beverage composition comprises at least one disclosed sweetening agent and a first taste modulator component comprising a first salt having a first cation selected from Na$^+$, K$^+$, Ca$^{2+}$, and Mg$^{2+}$; a second modulator component comprising a second salt having a second cation selected from Na$^+$, K$^+$, Ca$^{2+}$, and Mg$^{2+}$; and a third modulator component comprising a third salt having a third cation selected from Na$^+$, K$^+$, Ca$^{2+}$, and Mg$^{2+}$; such that the first taste modulator component is present at a concentration of from about 0.1 mM to about 25 mM; and such that each of the second taste modulator component and the third modulator component are independently present at a concentration of from about 0.1 mM to about 10 mM.

In various aspects, a disclosed beverage composition comprises at least one disclosed sweetening agent and a first taste modulator component comprising a first salt having a first cation selected from Na$^+$, K$^+$, Ca$^{2+}$, and Mg$^{2+}$; a second modulator component comprising a second salt having a second cation selected from Na$^+$, K$^+$, Ca$^{2+}$, and Mg$^{2+}$; and a third modulator component comprising a third salt having a third cation selected from Na$^+$, K$^+$, Ca$^{2+}$, and Mg$^{2+}$; such that the first taste modulator component is present at a concentration of from about 0.1 mM to about 25 mM; and such that each of the second taste modulator component and the third modulator component are independently present at a concentration of from about 0.1 mM to about 5 mM.

In various aspects, a disclosed beverage composition comprises at least one disclosed sweetening agent and a first taste modulator component comprising a first salt having a first cation selected from Na$^+$, K$^+$, Ca$^{2+}$, and Mg$^{2+}$; a second modulator component comprising a second salt having a second cation selected from Na$^+$, K$^+$, Ca$^{2+}$, and Mg$^{2+}$; and a third modulator component comprising a third salt having a third cation selected from Na$^+$, K$^+$, Ca$^{2+}$, and Mg$^{2+}$; such that the first taste modulator component is present at a concentration of from about 0.1 mM to about 10 mM; and such that each of the second taste modulator component and the third modulator component are independently present at a concentration of from about 0.1 mM to about 5 mM.

In various aspects, a disclosed beverage composition comprises at least one disclosed sweetening agent and a first taste modulator component comprising a first salt having a first cation selected from Na$^+$, K$^+$, Ca$^{2+}$, and Mg$^{2+}$; a second modulator component comprising a second salt having a second cation selected from Na$^+$, K$^+$, Ca$^{2+}$, and Mg$^{2+}$; and a third modulator component comprising a third salt having a third cation selected from Na$^+$, K$^+$, Ca$^{2+}$, and Mg$^{2+}$; such that the first taste modulator component is present at a concentration of from about 1 mM to about 25 mM; and such that each of the second taste modulator component and the third modulator component are independently present at a concentration of from about 1 mM to about 10 mM.

In various aspects, a disclosed beverage composition comprises at least one disclosed sweetening agent and a first taste modulator component comprising a first salt having a first cation selected from Na$^+$, K$^+$, Ca$^{2+}$, and Mg$^{2+}$; a second modulator component comprising a second salt having a second cation selected from Na$^+$, K$^+$, Ca$^{2+}$, and Mg$^{2+}$; and a third modulator component comprising a third salt having a third cation selected from Na$^+$, K$^+$, Ca$^{2+}$, and Mg$^{2+}$; such that the first taste modulator component is present at a concentration of from about 1 mM to about 25 mM; and such that each of the second taste modulator component and the third modulator component are independently present at a concentration of from about 1 mM to about 5 mM.

In various aspects, a disclosed beverage composition comprises at least one disclosed sweetening agent and a first taste modulator component comprising a first salt having a first cation selected from Na$^+$, K$^+$, Ca$^{2+}$, and Mg$^{2+}$; a second modulator component comprising a second salt having a second cation selected from Na$^+$, K$^+$, Ca$^{2+}$, and Mg$^{2+}$; and a third modulator component comprising a third salt having a third cation selected from Na$^+$, K$^+$, Ca$^{2+}$, and Mg$^{2+}$; such that the first taste modulator component is present at a concentration of from about 1 mM to about 10 mM; and such that each of the second taste modulator component and the third modulator component are independently present at a concentration of from about 1 mM to about 5 mM.

In various aspects, a disclosed beverage composition comprises at least one disclosed sweetening agent and a first taste modulator component comprising a first salt having a first cation selected from Na$^+$, K$^+$, Ca$^{2+}$, and Mg$^{2+}$ and a first anion selected from citrate ($C_6H_5O_7^{-3}$), chloride (Cl$^-$), phosphate (PO$_4^{-3}$), carbonate (CO$_3^{-2}$), sulfate (SO$_4^{-2}$), and combinations thereof; a second modulator component comprising a second salt having a second cation selected from Na$^+$, K$^+$, Ca$^{2+}$, and Mg$^{2+}$ and a second anion selected from citrate ($C_6H_5O_7^{-3}$), chloride (Cl$^-$), phosphate (PO$_4^{-3}$), carbonate (CO$_3^{-2}$), sulfate (SO$_4^{-2}$), and combinations thereof; and a third modulator component comprising a third salt having a third cation selected from Na$^+$, K$^+$, Ca$^{2+}$, and Mg$^{2+}$ and a third anion selected from citrate ($C_6H_5O_7^{-3}$), chloride (Cl$^-$), phosphate (PO$_4^{-3}$), carbonate (CO$_3^{-2}$), sulfate (SO$_4^{-2}$), and combinations thereof; such that the first taste modulator component is present at a concentration of from about 0 mM to about 10 mM; and such that each of the second taste modulator component and the third modulator component are independently present at a concentration of from about 0 mM to about 5 mM.

In various aspects, a disclosed beverage composition comprises at least one disclosed sweetening agent and a first taste modulator component comprising a first salt having a first cation selected from Na$^+$, K$^+$, Ca$^{2+}$, and Mg$^{2+}$; a second modulator component comprising a second salt having a second cation selected from Na$^+$, K$^+$, Ca$^{2+}$, and Mg$^{2+}$; and a third modulator component comprising a third salt having a third cation selected from Na$^+$, K$^+$, Ca$^{2+}$, and Mg$^{2+}$; such that the first taste modulator component is present at a concentration of from about 0.1 mM to about 10 mM; and such that each of the second taste modulator component and the third modulator component are independently present at a concentration of from about 0.1 mM to about 5 mM.

In various aspects, a disclosed beverage composition comprises at least one disclosed sweetening agent and a first taste modulator component comprising a first salt having a first cation selected from Na$^+$, K$^+$, Ca$^{2+}$, and Mg$^{2+}$ and a first anion selected from citrate ($C_6H_5O_7^{-3}$), chloride (Cl$^-$), phosphate ($PO_4^{-3}$), carbonate ($CO_3^{-2}$), sulfate ($SO_4^{-2}$), and combinations thereof; a second modulator component comprising a second salt having a second cation selected from $Na^+$, $K^+$, $Ca^{2+}$, and $Mg^{2+}$ and a second anion selected from citrate ($C_6H_5O_7^{-3}$), chloride ($Cl^-$), phosphate ($PO_4^{-3}$), carbonate ($CO_3^{-2}$), sulfate ($SO_4^{-2}$), and combinations thereof; and a third modulator component comprising a third salt having a third cation selected from $Na^+$, $K^+$, $Ca^{2+}$, and $Mg^{2+}$ and a third anion selected from citrate ($C_6H_5O_7^{-3}$), chloride ($Cl^-$), phosphate ($PO_4^{-3}$), carbonate ($CO_3^{-2}$), sulfate ($SO_4^{-2}$), and combinations thereof; such that the first taste modulator component is present at a concentration of from about 0.1 mM to about 10 mM; and such that each of the second taste modulator component and the third modulator component are independently present at a concentration of from about 0.1 mM to about 5 mM.

In various aspects, a disclosed beverage composition comprises at least one disclosed sweetening agent and a first taste modulator component comprising a first salt having a first cation comprising $K^+$; a second modulator component comprising a second salt having a second cation comprising $Mg^{2+}$; and a third modulator component comprising a third salt having a third cation comprising $Ca^{2+}$; such that the first taste modulator component is present at a concentration of from about 0 mM to about 10 mM; and such that each of the second taste modulator component and the third modulator component are independently present at a concentration of from about 0 mM to about 5 mM.

In various aspects, a disclosed beverage composition comprises at least one disclosed sweetening agent and a first taste modulator component comprising a first salt having a first cation comprising $K^+$ and a first anion selected from citrate ($C_6H_5O_7^{-3}$), chloride ($Cl^-$), phosphate ($PO_4^{-3}$), carbonate ($CO_3^{-2}$), sulfate ($SO_4^{-2}$), and combinations thereof; a second modulator component comprising a second salt having a second cation comprising $Mg^{2+}$ and a second anion selected from citrate ($C_6H_5O_7^{-3}$), chloride ($Cl^-$), phosphate ($PO_4^{-3}$), carbonate ($CO_3^{-2}$), sulfate ($SO_4^{-2}$), and combinations thereof; and a third modulator component comprising a third salt having a third cation comprising $Ca^{2+}$ and a third anion selected from citrate ($C_6H_5O_7^{-3}$), chloride ($Cl^-$), phosphate ($PO_4^{-3}$), carbonate ($CO_3^{-2}$), sulfate ($SO_4^{-2}$), and combinations thereof; such that the first taste modulator component is present at a concentration of from about 0 mM to about 10 mM; and such that each of the second taste modulator component and the third modulator component are independently present at a concentration of from about 0 mM to about 5 mM.

In various aspects, a disclosed beverage composition comprises at least one disclosed sweetening agent and a first taste modulator component comprising a first salt having a first cation comprising $K^+$; a second modulator component comprising a second salt having a second cation comprising $Mg^{2+}$; and a third modulator component comprising a third salt having a third cation comprising $Ca^{2+}$; such that the first taste modulator component is present at a concentration of from about 0.1 mM to about 10 mM; and such that each of the second taste modulator component and the third modulator component are independently present at a concentration of from about 0.1 mM to about 5 mM.

In various aspects, a disclosed beverage composition comprises at least one disclosed sweetening agent and a first taste modulator component comprising a first salt having a first cation comprising $K^+$ and a first anion selected from citrate ($C_6H_5O_7^{-3}$), chloride ($Cl^-$), phosphate ($PO_4^{-3}$), carbonate ($CO_3^{-2}$), sulfate ($SO_4^{-2}$), and combinations thereof; a second modulator component comprising a second salt having a second cation comprising $Mg^{2+}$ and a second anion selected from citrate ($C_6H_5O_7^{-3}$), chloride ($Cl^-$), phosphate ($PO_4^{-3}$), carbonate ($CO_3^{-2}$), sulfate ($SO_4^{-2}$), and combinations thereof; and a third modulator component comprising a third salt having a third cation comprising $Ca^{2+}$ and a third anion selected from citrate ($C_6H_5O_7^{-3}$), chloride ($Cl^-$), phosphate ($PO_4^{-3}$), carbonate ($CO_3^{-2}$), sulfate ($SO_4^{-2}$), and combinations thereof; such that the first taste modulator component is present at a concentration of from about 0.1 mM to about 10 mM; and such that each of the second taste modulator component and the third modulator component are independently present at a concentration of from about 0.1 mM to about 5 mM.

In various aspects, the total concentration of the first modulator component, the second modulator component, the third modulator component, and the fourth modulator component taken together can be from about 0.1 mM to about 30 mM. For example, each of the first modulator component, the second modulator component, the third modulator component, and the fourth modulator component are independently present a concentration of from about 0 mM to about 10 mM, provided that the sum of concentrations of the first modulator component, the second modulator component, the third modulator component, and the fourth modulator component is less than about 30 mM. In a further aspect, the total concentration of the first modulator component, the second modulator component, the third modulator component, and the fourth modulator component taken together can be from about 0.1 mM to about 30 mM, about 0.2 mM to about 30 mM, about 0.3 mM to about 30 mM, about 0.4 mM to about 30 mM, about 0.5 mM to about 30 mM, about 0.6 mM to about 30 mM, about 0.7 mM to about 30 mM, about 0.8 mM to about 30 mM, about 0.9 mM to about 30 mM, about 1.0 mM to about 30 mM, about 0.1 mM to about 25 mM, about 0.2 mM to about 25 mM, about 0.3 mM to about 25 mM, about 0.4 mM to about 25 mM, about 0.5 mM to about 25 mM, about 0.6 mM to about 25 mM, about 0.7 mM to about 25 mM, about 0.8 mM to about 25 mM, about 0.9 mM to about 25 mM, about 1.0 mM to about 25 mM, about 0.1 mM to about 20 mM, about 0.2 mM to about 20 mM, about 0.3 mM to about 20 mM, about 0.4 mM to about 20 mM, about 0.5 mM to about 20 mM, about 0.6 mM to about 20 mM, about 0.7 mM to about 20 mM, about 0.8 mM to about 20 mM, about 0.9 mM to about 20 mM, about 1.0 mM to about 20 mM, about 0.1 mM to about 15 mM, about 0.2 mM to about 15 mM, about 0.3 mM to about 15 mM, about 0.4 mM to about 15 mM, about 0.5 mM to about 15 mM, about 0.6 mM to about 15 mM, about 0.7 mM to about 15 mM, about 0.8 mM to about 15 mM, about 0.9 mM to about 15 mM, about 1.0 mM to about 15 mM, about 0.1 mM to about 10 mM, about 0.2 mM to about 10 mM, about 0.3 mM to about 10 mM, about 0.4 mM to about 10 mM, about 0.5 mM to about 10 mM, about 0.6 mM to about 10 mM, about 0.7 mM to about 10 mM, about 0.8 mM to about 10 mM, about 0.9 mM to about 10 mM, about 1.0 mM to about 10 mM; or a concentration or set of concentrations within the foregoing concentration ranges; or a sub-range of any of the foregoing concentration ranges.

In a further aspect, the concentration of the first modulator component can be from about 0.1 mM to about 30 mM, about 0.2 mM to about 30 mM, about 0.3 mM to about 30 mM, about 0.4 mM to about 30 mM, about 0.5 mM to about 30 mM, about 0.6 mM to about 30 mM, about 0.7 mM to about 30 mM, about 0.8 mM to about 30 mM, about 0.9 mM to about 30 mM, about 1.0 mM to about 30 mM, about 0.1 mM to about 25 mM, about 0.2 mM to about 25 mM, about 0.3 mM to about 25 mM, about 0.4 mM to about 25 mM, about 0.5 mM to about 25 mM, about 0.6 mM to about 25 mM, about 0.7 mM to about 25 mM, about 0.8 mM to about 25 mM, about 0.9 mM to about 25 mM, about 1.0 mM to about 25 mM, about 0.1 mM to about 20 mM, about 0.2 mM to about 20 mM, about 0.3 mM to about 20 mM, about 0.4 mM to about 20 mM, about 0.5 mM to about 20 mM, about 0.6 mM to about 20 mM, about 0.7 mM to about 20 mM, about 0.8 mM to about 20 mM, about 0.9 mM to about 20 mM, about 1.0 mM to about 20 mM, about 0.1 mM to about 15 mM, about 0.2 mM to about 15 mM, about 0.3 mM to about 15 mM, about 0.4 mM to about 15 mM, about 0.5 mM to about 15 mM, about 0.6 mM to about 15 mM, about 0.7 mM to about 15 mM, about 0.8 mM to about 15 mM, about 0.9 mM to about 15 mM, about 1.0 mM to about 15 mM, about 0.1 mM to about 10 mM, about 0.2 mM to about 10 mM, about 0.3 mM to about 10 mM, about 0.4 mM to about 10 mM, about 0.5 mM to about 10 mM, about 0.6 mM to about 10 mM, about 0.7 mM to about 10 mM, about 0.8 mM to about 10 mM, about 0.9 mM to about 10 mM, about 1.0 mM to about 10 mM, about 0.1 mM to about 9 mM, about 0.2 mM to about 9 mM, about 0.3 mM to about 9 mM, about 0.4 mM to about 9 mM, about 0.5 mM to about 9 mM, about 0.6 mM to about 9 mM, about 0.7 mM to about 9 mM, about 0.8 mM to about 9 mM, about 0.9 mM to about 9 mM, about 1.0 mM to about 9 mM, about 0.1 mM to about 8 mM, about 0.2 mM to about 8 mM, about 0.3 mM to about 8 mM, about 0.4 mM to about 8 mM, about 0.5 mM to about 8 mM, about 0.6 mM to about 8 mM, about 0.7 mM to about 8 mM, about 0.8 mM to about 8 mM, about 0.9 mM to about 8 mM, about 1.0 mM to about 8 mM, about 0.1 mM to about 7 mM, about 0.2 mM to about 7 mM, about 0.3 mM to about 7 mM, about 0.4 mM to about 7 mM, about 0.5 mM to about 7 mM, about 0.6 mM to about 7 mM, about 0.7 mM to about 7 mM, about 0.8 mM to about 7 mM, about 0.9 mM to about 7 mM, about 1.0 mM to about 7 mM, about 0.1 mM to about 6 mM, about 0.2 mM to about 6 mM, about 0.3 mM to about 6 mM, about 0.4 mM to about 6 mM, about 0.5 mM to about 6 mM, about 0.6 mM to about 6 mM, about 0.7 mM to about 6 mM, about 0.8 mM to about 6 mM, about 0.9 mM to about 6 mM, about 1.0 mM to about 6 mM, about 0.1 mM to about 5 mM, about 0.2 mM to about 5 mM, about 0.3 mM to about 5 mM, about 0.4 mM to about 5 mM, about 0.5 mM to about 5 mM, about 0.6 mM to about 5 mM, about 0.7 mM to about 5 mM, about 0.8 mM to about 5 mM, about 0.9 mM to about 5 mM, about 1.0 mM to about 5 mM, about 0.1 mM to about 4 mM, about 0.2 mM to about 4 mM, about 0.3 mM to about 4 mM, about 0.4 mM to about 4 mM, about 0.5 mM to about 4 mM, about 0.6 mM to about 4 mM, about 0.7 mM to about 4 mM, about 0.8 mM to about 4 mM, about 0.9 mM to about 4 mM, about 1.0 mM to about 4 mM, about 0.1 mM to about 3 mM, about 0.2 mM to about 3 mM, about 0.3 mM to about 3 mM, about 0.4 mM to about 3 mM, about 0.5 mM to about 3 mM, about 0.6 mM to about 3 mM, about 0.7 mM to about 3 mM, about 0.8 mM to about 3 mM, about 0.9 mM to about 3 mM, about 1.0 mM to about 3 mM; or a concentration or set of concentrations within the foregoing concentration ranges; or a sub-range of any of the foregoing concentration ranges.

In a further aspect, the concentration of the second modulator component can be from about 0.1 mM to about 30 mM, about 0.2 mM to about 30 mM, about 0.3 mM to about 30 mM, about 0.4 mM to about 30 mM, about 0.5 mM to about 30 mM, about 0.6 mM to about 30 mM, about 0.7 mM to about 30 mM, about 0.8 mM to about 30 mM, about 0.9 mM to about 30 mM, about 1.0 mM to about 30 mM, about 0.1 mM to about 25 mM, about 0.2 mM to about 25 mM, about 0.3 mM to about 25 mM, about 0.4 mM to about 25 mM, about 0.5 mM to about 25 mM, about 0.6 mM to about 25 mM, about 0.7 mM to about 25 mM, about 0.8 mM to about 25 mM, about 0.9 mM to about 25 mM, about 1.0 mM to about 25 mM, about 0.1 mM to about 20 mM, about 0.2 mM to about 20 mM, about 0.3 mM to about 20 mM, about 0.4 mM to about 20 mM, about 0.5 mM to about 20 mM, about 0.6 mM to about 20 mM, about 0.7 mM to about 20 mM, about 0.8 mM to about 20 mM, about 0.9 mM to about 20 mM, about 1.0 mM to about 20 mM, about 0.1 mM to about 15 mM, about 0.2 mM to about 15 mM, about 0.3 mM to about 15 mM, about 0.4 mM to about 15 mM, about 0.5 mM to about 15 mM, about 0.6 mM to about 15 mM, about 0.7 mM to about 15 mM, about 0.8 mM to about 15 mM, about 0.9 mM to about 15 mM, about 1.0 mM to about 15 mM, about 0.1 mM to about 10 mM, about 0.2 mM to about 10 mM, about 0.3 mM to about 10 mM, about 0.4 mM to about 10 mM, about 0.5 mM to about 10 mM, about 0.6 mM to about 10 mM, about 0.7 mM to about 10 mM, about 0.8 mM to about 10 mM, about 0.9 mM to about 10 mM, about 1.0 mM to about 10 mM, about 0.1 mM to about 9 mM, about 0.2 mM to about 9 mM, about 0.3 mM to about 9 mM, about 0.4 mM to about 9 mM, about 0.5 mM to about 9 mM, about 0.6 mM to about 9 mM, about 0.7 mM to about 9 mM, about 0.8 mM to about 9 mM, about 0.9 mM to about 9 mM, about 1.0 mM to about 9 mM, about 0.1 mM to about 8 mM, about 0.2 mM to about 8 mM, about 0.3 mM to about 8 mM, about 0.4 mM to about 8 mM, about 0.5 mM to about 8 mM, about 0.6 mM to about 8 mM, about 0.7 mM to about 8 mM, about 0.8 mM to about 8 mM, about 0.9 mM to about 8 mM, about 1.0 mM to about 8 mM, about 0.1 mM to about 7 mM, about 0.2 mM to about 7 mM, about 0.3 mM to about 7 mM, about 0.4 mM to about 7 mM, about 0.5 mM to about 7 mM, about 0.6 mM to about 7 mM, about 0.7 mM to about 7 mM, about 0.8 mM to about 7 mM, about 0.9 mM to about 7 mM, about 1.0 mM to about 7 mM, about 0.1 mM to about 6 mM, about 0.2 mM to about 6 mM, about 0.3 mM to about 6 mM, about 0.4 mM to about 6 mM, about 0.5 mM to about 6 mM, about 0.6 mM to about 6 mM, about 0.7 mM to about 6 mM, about 0.8 mM to about 6 mM, about 0.9 mM to about 6 mM, about 1.0 mM to about 6 mM, about 0.1 mM to about 5 mM, about 0.2 mM to about 5 mM, about 0.3 mM to about 5 mM, about 0.4 mM to about 5 mM, about 0.5 mM to about 5 mM, about 0.6 mM to about 5 mM, about 0.7 mM to about 5 mM, about 0.8 mM to about 5 mM, about 0.9 mM to about 5 mM, about 1.0 mM to about 5 mM, about 0.1 mM to about 4 mM, about 0.2 mM to about 4 mM, about 0.3 mM to about 4 mM, about 0.4 mM to about 4 mM, about 0.5 mM to about 4 mM, about 0.6 mM to about 4 mM, about 0.7 mM to about 4 mM, about 0.8 mM to about 4 mM, about 0.9 mM to about 4 mM, about 1.0 mM to about 4 mM, about 0.1 mM to about 3 mM, about 0.2 mM to about 3 mM, about 0.3 mM to about 3 mM, about 0.4 mM to about 3 mM, about 0.5 mM to about 3 mM, about 0.6 mM to about 3 mM, about 0.7 mM to about 3 mM, about 0.8 mM to about 3 mM, about 0.9 mM to about 3 mM, about 1.0 mM to about 3 mM; or a concentration or set of concentrations within the foregoing concentration ranges; or a sub-range of any of the foregoing concentration ranges.

In a further aspect, the concentration of the third modulator component can be from about 0.1 mM to about 30 mM, about 0.2 mM to about 30 mM, about 0.3 mM to about 30 mM, about 0.4 mM to about 30 mM, about 0.5 mM to about 30 mM, about 0.6 mM to about 30 mM, about 0.7 mM to about 30 mM, about 0.8 mM to about 30 mM, about 0.9 mM to about 30 mM, about 1.0 mM to about 30 mM, about 0.1 mM to about 25 mM, about 0.2 mM to about 25 mM, about 0.3 mM to about 25 mM, about 0.4 mM to about 25 mM, about 0.5 mM to about 25 mM, about 0.6 mM to about 25 mM, about 0.7 mM to about 25 mM, about 0.8 mM to about 25 mM, about 0.9 mM to about 25 mM, about 1.0 mM to about 25 mM, about 0.1 mM to about 20 mM, about 0.2 mM to about 20 mM, about 0.3 mM to about 20 mM, about 0.4 mM to about 20 mM, about 0.5 mM to about 20 mM, about 0.6 mM to about 20 mM, about 0.7 mM to about 20 mM, about 0.8 mM to about 20 mM, about 0.9 mM to about 20 mM, about 1.0 mM to about 20 mM, about 0.1 mM to about 15 mM, about 0.2 mM to about 15 mM, about 0.3 mM to about 15 mM, about 0.4 mM to about 15 mM, about 0.5 mM to about 15 mM, about 0.6 mM to about 15 mM, about 0.7 mM to about 15 mM, about 0.8 mM to about 15 mM, about 0.9 mM to about 15 mM, about 1.0 mM to about 15 mM, about 0.1 mM to about 10 mM, about 0.2 mM to about 10 mM, about 0.3 mM to about 10 mM, about 0.4 mM to about 10 mM, about 0.5 mM to about 10 mM, about 0.6 mM to about 10 mM, about 0.7 mM to about 10 mM, about 0.8 mM to about 10 mM, about 0.9 mM to about 10 mM, about 1.0 mM to about 10 mM, about 0.1 mM to about 9 mM, about 0.2 mM to about 9 mM, about 0.3 mM to about 9 mM, about 0.4 mM to about 9 mM, about 0.5 mM to about 9 mM, about 0.6 mM to about 9 mM, about 0.7 mM to about 9 mM, about 0.8 mM to about 9 mM, about 0.9 mM to about 9 mM, about 1.0 mM to about 9 mM, about 0.1 mM to about 8 mM, about 0.2 mM to about 8 mM, about 0.3 mM to about 8 mM, about 0.4 mM to about 8 mM, about 0.5 mM to about 8 mM, about 0.6 mM to about 8 mM, about 0.7 mM to about 8 mM, about 0.8 mM to about 8 mM, about 0.9 mM to about 8 mM, about 1.0 mM to about 8 mM, about 0.1 mM to about 7 mM, about 0.2 mM to about 7 mM, about 0.3 mM to about 7 mM, about 0.4 mM to about 7 mM, about 0.5 mM to about 7 mM, about 0.6 mM to about 7 mM, about 0.7 mM to about 7 mM, about 0.8 mM to about 7 mM, about 0.9 mM to about 7 mM, about 1.0 mM to about 7 mM, about 0.1 mM to about 6 mM, about 0.2 mM to about 6 mM, about 0.3 mM to about 6 mM, about 0.4 mM to about 6 mM, about 0.5 mM to about 6 mM, about 0.6 mM to about 6 mM, about 0.7 mM to about 6 mM, about 0.8 mM to about 6 mM, about 0.9 mM to about 6 mM, about 1.0 mM to about 6 mM, about 0.1 mM to about 5 mM, about 0.2 mM to about 5 mM, about 0.3 mM to about 5 mM, about 0.4 mM to about 5 mM, about 0.5 mM to about 5 mM, about 0.6 mM to about 5 mM, about 0.7 mM to about 5 mM, about 0.8 mM to about 5 mM, about 0.9 mM to about 5 mM, about 1.0 mM to about 5 mM, about 0.1 mM to about 4 mM, about 0.2 mM to about 4 mM, about 0.3 mM to about 4 mM, about 0.4 mM to about 4 mM, about 0.5 mM to about 4 mM, about 0.6 mM to about 4 mM, about 0.7 mM to about 4 mM, about 0.8 mM to about 4 mM, about 0.9 mM to about 4 mM, about 1.0 mM to about 4 mM, about 0.1 mM to about 3 mM, about 0.2 mM to about 3 mM, about 0.3 mM to about 3 mM, about 0.4 mM to about 3 mM, about 0.5 mM to about 3 mM, about 0.6 mM to about 3 mM, about 0.7 mM to about 3 mM, about 0.8 mM to about 3 mM, about 0.9 mM to about 3 mM, about 1.0 mM to about 3 mM; or a concentration or set of concentrations within the foregoing concentration ranges; or a sub-range of any of the foregoing concentration ranges.

The disclosed beverage compositions can at a suitable pH, e.g. a pH of from about pH 2 to about pH 9. In some instances, it may be desirable, e.g., to optimize a Taste Quality Metric such as sweetness linger, and/or body/mouthfeel, to use a lower pH, such as a pH of from about pH 2.0 to about pH 7.0, about pH 2.0 to about pH 6.9, about pH 2.0 to about pH 6.8, about pH 2.0 to about pH 6.7, about pH 2.0 to about pH 6.6, about pH 2.0 to about pH 6.5, about pH 2.0 to about pH 6.4, about pH 2.0 to about pH 6.3, about pH 2.0 to about pH 6.2, about pH 2.0 to about pH 6.1, about pH 2.0 to about pH 6.0, about pH 2.0 to about pH 5.9, about pH 2.0 to about pH 5.8, about pH 2.0 to about pH 5.7, about pH 2.0 to about pH 5.6, about pH 2.0 to about pH 5.5, about pH 2.0 to about pH 5.4, about pH 2.0 to about pH 5.3, about pH 2.0 to about pH 5.2, about pH 2.0 to about pH 5.1, about pH 2.0 to about pH 5.0, about pH 2.0 to about pH 4.9, about pH 2.0 to about pH 4.8, about pH 2.0 to about pH 4.7, about pH 2.0 to about pH 4.6, about pH 2.0 to about pH 4.5, about pH 2.0 to about pH 4.4, about pH 2.0 to about pH 4.3, about pH 2.0 to about pH 4.2, about pH 2.0 to about pH 4.1, about pH 2.0 to about pH 4.0, about pH 2.0 to about pH 3.9, about pH 2.0 to about pH 3.8, about pH 2.0 to about pH 3.7, about pH 2.0 to about pH 3.6, about pH 2.0 to about pH 3.5, about pH 2.0 to about pH 3.4, about pH 2.0 to about pH 3.3, about pH 2.0 to about pH 3.2, about pH 2.0 to about pH 3.1, about pH 2.0 to about pH 3.0, about pH 2.1 to about pH 7.0, about pH 2.1 to about pH 6.9, about pH 2.1 to about pH 6.8, about pH 2.1 to about pH 6.7, about pH 2.1 to about pH 6.6, about pH 2.1 to about pH 6.5, about pH 2.1 to about pH 6.4, about pH 2.1 to about pH 6.3, about pH 2.1 to about pH 6.2, about pH 2.1 to about pH 6.1, about pH 2.1 to about pH 6.0, about pH 2.1 to about pH 5.9, about pH 2.1 to about pH 5.8, about pH 2.1 to about pH 5.7, about pH 2.1 to about pH 5.6, about pH 2.1 to about pH 5.5, about pH 2.1 to about pH 5.4, about pH 2.1 to about pH 5.3, about pH 2.1 to about pH 5.2, about pH 2.1 to about pH 5.1, about pH 2.1 to about pH 5.0, about pH 2.1 to about pH 4.9, about pH 2.1 to about pH 4.8, about pH 2.1 to about pH 4.7, about pH 2.1 to about pH 4.6, about pH 2.1 to about pH 4.5, about pH 2.1 to about pH 4.4, about pH 2.1 to about pH 4.3, about pH 2.1 to about pH 4.2, about pH 2.1 to about pH 4.1, about pH 2.1 to about pH 4.0, about pH 2.1 to about pH 3.9, about pH 2.1 to about pH 3.8, about pH 2.1 to about pH 3.7, about pH 2.1 to about pH 3.6, about pH 2.1 to about pH 3.5, about pH 2.1 to about pH 3.4, about pH 2.1 to about pH 3.3, about pH 2.1 to about pH 3.2, about pH 2.1 to about pH 3.1, about pH 2.1 to about pH 3.0, about pH 2.2 to about pH 7.0, about pH 2.2 to about pH 6.9, about pH 2.2 to about pH 6.8, about pH 2.2 to about pH 6.7, about pH 2.2 to about pH 6.6, about pH 2.2 to about pH 6.5, about pH 2.2 to about pH 6.4, about pH 2.2 to about pH 6.3, about pH 2.2 to about pH 6.2, about pH 2.2 to about pH 6.1, about pH 2.2 to about pH 6.0, about pH 2.2 to about pH 5.9, about pH 2.2 to about pH 5.8, about pH 2.2 to about pH 5.7, about pH 2.2 to about pH 5.6, about pH 2.2 to about pH 5.5, about pH 2.2 to about pH 5.4, about pH 2.2 to about pH 5.3, about pH 2.2 to about pH 5.2, about pH 2.2 to about pH 5.1, about pH 2.2 to about pH 5.0, about pH 2.2 to about pH 4.9, about pH 2.2 to about pH 4.8, about pH 2.2 to about pH 4.7, about pH 2.2 to about pH 4.6, about pH 2.2 to about pH 4.5, about pH 2.2 to about pH 4.4, about pH 2.2 to about pH 4.3, about pH 2.2 to about pH 4.2, about pH 2.2 to about pH 4.1, about pH 2.2 to about pH 4.0, about pH 2.2 to about pH 3.9, about pH 2.2 to about pH 3.8, about pH 2.2 to about pH 3.7, about pH 2.2 to about pH 3.6, about pH 2.2 to about pH 3.5, about pH 2.2 to about pH 3.4, about pH 2.2 to about pH 3.3, about pH 2.2 to about pH 3.2, about pH 2.2 to about pH 3.1, about pH 2.2 to about pH 3.0, about pH 2.3 to about pH 7.0, about pH 2.3 to about pH 6.9, about pH 2.3 to about pH 6.8, about pH 2.3 to about pH 6.7, about pH 2.3 to about pH 6.6, about pH 2.3 to about pH 6.5, about pH 2.3 to about pH 6.4, about pH 2.3 to about pH 6.3, about pH 2.3 to about pH 6.2, about pH 2.3 to about pH 6.1, about pH 2.3 to about pH 6.0, about pH 2.3 to about pH 5.9, about pH 2.3 to about pH 5.8, about pH 2.3 to about pH 5.7, about pH 2.3 to about pH 5.6, about pH 2.3 to about pH 5.5, about pH 2.3 to about pH 5.4, about pH 2.3 to about pH 5.3, about pH 2.3 to about pH 5.2, about pH 2.3 to about pH 5.1, about pH 2.3 to about pH 5.0, about pH 2.3 to about pH 4.9, about pH 2.3 to about pH 4.8, about pH 2.3 to about pH 4.7, about pH 2.3 to about pH 4.6, about pH 2.3 to about pH 4.5, about pH 2.3 to about pH 4.4, about pH 2.3 to about pH 4.3, about pH 2.3 to about pH 4.2, about pH 2.3 to about pH 4.1, about pH 2.3 to about pH 4.0, about pH 2.3 to about pH 3.9, about pH 2.3 to about pH 3.8, about pH 2.3 to about pH 3.7, about pH 2.3 to about pH 3.6, about pH 2.3 to about pH 3.5, about pH 2.3 to about pH 3.4, about pH 2.3 to about pH 3.3, about pH 2.3 to about pH 3.2, about pH 2.3 to about pH 3.1, about pH 2.3 to about pH 3.0, about pH 2.4 to about pH 7.0, about pH 2.4 to about pH 6.9, about pH 2.4 to about pH 6.8, about pH 2.4 to about pH 6.7, about pH 2.4 to about pH 6.6, about pH 2.4 to about pH 6.5, about pH 2.4 to about pH 6.4, about pH 2.4 to about pH 6.3, about pH 2.4 to about pH 6.2, about pH 2.4 to about pH 6.1, about pH 2.4 to about pH 6.0, about pH 2.4 to about pH 5.9, about pH 2.4 to about pH 5.8, about pH 2.4 to about pH 5.7, about pH 2.4 to about pH 5.6, about pH 2.4 to about pH 5.5, about pH 2.4 to about pH 5.4, about pH 2.4 to about pH 5.3, about pH 2.4 to about pH 5.2, about pH 2.4 to about pH 5.1, about pH 2.4 to about pH 5.0, about pH 2.4 to about pH 4.9, about pH 2.4 to about pH 4.8, about pH 2.4 to about pH 4.7, about pH 2.4 to about pH 4.6, about pH 2.4 to about pH 4.5, about pH 2.4 to about pH 4.4, about pH 2.4 to about pH 4.3, about pH 2.4 to about pH 4.2, about pH 2.4 to about pH 4.1, about pH 2.4 to about pH 4.0, about pH 2.4 to about pH 3.9, about pH 2.4 to about pH 3.8, about pH 2.4 to about pH 3.7, about pH 2.4 to about pH 3.6, about pH 2.4 to about pH 3.5, about pH 2.4 to about pH 3.4, about pH 2.4 to about pH 3.3, about pH 2.4 to about pH 3.2, about pH 2.4 to about pH 3.1, about pH 2.4 to about pH 3.0, about pH 2.5 to about pH 7.0, about pH 2.5 to about pH 6.9, about pH 2.5 to about pH 6.8, about pH 2.5 to about pH 6.7, about pH 2.5 to about pH 6.6, about pH 2.5 to about pH 6.5, about pH 2.5 to about pH 6.4, about pH 2.5 to about pH 6.3, about pH 2.5 to about pH 6.2, about pH 2.5 to about pH 6.1, about pH 2.5 to about pH 6.0, about pH 2.5 to about pH 5.9, about pH 2.5 to about pH 5.8, about pH 2.5 to about pH 5.7, about pH 2.5 to about pH 5.6, about pH 2.5 to about pH 5.5, about pH 2.5 to about pH 5.4, about pH 2.5 to about pH 5.3, about pH 2.5 to about pH 5.2, about pH 2.5 to about pH 5.1, about pH 2.5 to about pH 5.0, about pH 2.5 to about pH 4.9, about pH 2.5 to about pH 4.8, about pH 2.5 to about pH 4.7, about pH 2.5 to about pH 4.6, about pH 2.5 to about pH 4.5, about pH 2.5 to about pH 4.4, about pH 2.5 to about pH 4.3, about pH 2.5 to about pH 4.2, about pH 2.5 to about pH 4.1, about pH 2.5 to about pH 4.0, about pH 2.5 to about pH 3.9, about pH 2.5 to about pH 3.8, about pH 2.5 to about pH 3.7, about pH 2.5 to about pH 3.6, about pH 2.5 to about pH 3.5, about pH 2.5 to about pH 3.4, about pH 2.5 to about pH 3.3, about pH 2.5 to about pH 3.2, about pH 2.5 to about pH 3.1, about pH 2.5 to about pH 3.0; or any pH value or sub-range within the foregoing ranges.

Flavoring Compositions, Flavor Modifier Compositions and Flavorings with Modifying Properties The disclosed taste modulator compositions can be used as flavor or taste modifiers, such as a flavoring or flavoring agents and flavor or taste enhancers, more particularly, sweet taste modifiers, sweet flavoring agents, sweet flavor enhancers, for foods, beverages, and other comestible or orally administered medicinal or nutraceutical products or compositions. In some aspects, the disclosed taste modulator compositions can be used without a flavor, flavor modifier, flavor agent, flavor enhancer, or flavoring with modifying properties for comestible products. In other aspects, the disclosed taste modulator compositions are used with one or more a flavor, flavor modifier, flavor agent, flavor enhancer, or flavoring with modifying properties for comestible products. In a further aspect, the disclosed taste modulator compositions can be used in a flavoring with modifying properties composition comprising a disclosed modulator composition and one or more flavor, flavor modifier, flavor agent, flavor enhancer, or flavoring.

The suitable amount of the disclosed taste modulator compositions to use with one or more flavor, flavor modifier, flavor agent, flavor enhancer, or flavoring with modifying properties can be assessed and further optimized using a suitable sensory testing methodology, e.g., the sensory testing methodology described herein below for sensory assessment of sweetness. Moreover, such a sensory test methodology can be useful in identifying suitable disclosed taste modulator compositions (and concentrations of same) to be used in combination with flavor, flavor modifier, flavor agent, flavor enhancer, or flavoring with modifying properties. The sensory test methodology described herein below can be well quantified and controlled by tasting the candidate compounds in aqueous solutions, as compared to control aqueous solution, or alternatively by tasting the disclosed taste modulator compositions of the disclosure in actual food compositions.

In various aspects, the disclosed taste modulator compositions, either alone or in combination with one or more flavor, flavor modifier, flavor agent, flavor enhancer, or flavoring with modifying properties have application in foods, beverages and other comestible compositions wherein sweet compounds are conventionally utilized. These compositions include compositions for human and animal consumption. This includes food or drinks (liquids) for consumption by agricultural animals, pets and zoo animals. Those of ordinary skill in the art of preparing and selling comestible compositions (e.g., edible foods or beverages, or precursors or flavor modifiers thereof) are well aware of a large variety of classes, subclasses and species of the comestible compositions, and utilize well-known and recognized terms of art to refer to those comestible compositions while endeavoring to prepare and sell various of those comestible compositions. Such a list of terms of art is enumerated below, and it is specifically contemplated hereby that the disclosed taste modulator compositions could be used to modify or enhance the sweet flavors of the following list comestible compositions, either singly or in all reasonable combinations or mixtures thereof: one or more confectioneries, chocolate confectionery, tablets, boxed assortments, standard boxed assortments, twist wrapped miniatures, seasonal chocolate, chocolate with toys, other chocolate confectionery, mints, standard mints, power mints, boiled sweets, pastilles, gums, jellies and chews, toffees, caramels and nougat, medicated confectionery, lollipops, licorice, other sugar confectionery, gum, chewing gum, gum with one or more sweeteners, sugar-free gum, functional gum, bubble gum, bread, packaged/industrial bread, unpackaged/artisanal bread, pastries, cakes, packaged/industrial cakes, unpackaged/artisanal cakes, cookies, chocolate coated biscuits, sandwich biscuits, filled biscuits, savory biscuits and crackers, bread substitutes, breakfast cereals, cereals, family breakfast cereals, flakes, muesli, children's breakfast cereals, hot cereals, ice cream, impulse ice cream, single portion dairy ice cream, single portion water ice cream, multi-pack dairy ice cream, multi-pack water ice cream, take-home ice cream, take-home dairy ice cream, ice cream desserts, bulk ice cream, take-home water ice cream, frozen yogurt, artisanal ice cream, dairy products, milk, fresh/pasteurized milk, full fat fresh/pasteurized milk, semi skimmed fresh/pasteurized milk, full fat milk, semi skimmed milk, fat-free milk, goat milk, condensed/evaporated milk, plain condensed/evaporated milk, flavored, functional and other condensed milk, flavored milk drinks, dairy only flavored milk drinks, flavored milk drinks with fruit juice, soy milk, sour milk drinks, fermented dairy drinks, coffee whiteners, powder milk, flavored powder milk drinks, cream, cheese, processed cheese, spreadable processed cheese, non-spreadable processed cheese, unprocessed cheese, spreadable unprocessed cheese, hard cheese, packaged hard cheese, unpackaged hard cheese, yogurt, plain/natural yogurt, flavored yogurt, fruited yogurt, probiotic yogurt, drinking yogurt, regular drinking yogurt, probiotic drinking yogurt, chilled and shelf-stable desserts, dairy-based desserts, soy-based desserts, chilled snacks, sweet and savory snacks, fruit snacks, chips/crisps, extruded snacks, tortilla/corn chips, popcorn, pretzels, nuts, other sweet and savory snacks, snack bars, granola bars, breakfast bars, energy bars, fruit bars, other snack bars, meal replacement products, slimming products, convalescence drinks, ready meals, canned ready meals, frozen ready meals, dried ready meals, chilled ready meals, dinner mixes, frozen pizza, chilled pizza, soup, canned soup, dehydrated soup, instant soup, chilled soup, soup, frozen soup, pasta, canned pasta, dried pasta, chilled/fresh pasta, noodles, plain noodles, instant noodles, cups/bowl instant noodles, pouch instant noodles, chilled noodles, snack noodles, canned food, canned meat and meat products, canned fish/seafood, canned vegetables, canned tomatoes, canned beans, canned fruit, canned ready meals, canned soup, canned pasta, other canned foods, frozen food, frozen processed red meat, frozen processed poultry, frozen processed fish/seafood, frozen processed vegetables, frozen meat substitutes, frozen potatoes, oven baked potato chips, other oven baked potato products, non-oven frozen potatoes, frozen bakery products, frozen desserts, frozen ready meals, frozen pizza, frozen soup, frozen noodles, other frozen food, dried food, dessert mixes, dried ready meals, dehydrated soup, instant soup, dried pasta, plain noodles, instant noodles, cups/bowl instant noodles, pouch instant noodles, chilled food, chilled processed meats, chilled fish/seafood products, chilled processed fish, chilled coated fish, chilled smoked fish, chilled lunch kit, chilled ready meals, chilled pizza, chilled soup, chilled/fresh pasta, chilled noodles, oils and fats, olive oil, vegetable and Seed oil, cooking fats, butter, margarine, spreadable oils and fats, functional spreadable oils and fats, sauces, dressings and condiments, tomato pastes and purees, bouillon/stock cubes, stock cubes, gravy granules, liquid stocks, herbs and spices, fermented sauces, soy based sauces, pasta sauces, wet sauces, dry sauces/powder mixes, ketchup, mayonnaise, regular mayonnaise, mustard, salad dressings, regular salad dressings, low fat salad dressings, vinaigrettes, dips, pickled products, other sauces, dressings and condiments, baby food, milk formula, standard milk formula, follow-on milk formula, toddler milk formula, hypoallergenic milk formula, prepared baby food, dried baby food, other baby food, spreads, jams and preserves, honey, chocolate spreads, nut-based spreads, and yeast-based spreads.

In a further aspect, the disclosed taste modulator compositions can be used to modify or enhance the sweet flavor of one or more of the following sub-groups of comestible compositions: confectioneries, bakery products, ice creams, dairy products, sweet snacks, snack bars, meal replacement products, ready meals, soups, pastas, noodles, canned foods, frozen foods, dried foods, chilled foods, oils and fats, baby foods, or spreads, or a mixture thereof.

In general an ingestible composition will be produced that contains a sufficient amount of the disclosed taste modulator compositions described hereinabove to produce a composition having the desired flavor or taste characteristics such as "sweet" taste characteristics.

Typically at least a sweet flavor modulating amount, of one or more of the disclosed taste modulator compositions can be added to the comestible product, so that the sweet flavor modified comestible product has an increased sweet taste as compared to the comestible product prepared without the disclosed taste modulator compositions, as judged by human beings or animals in general, or in the case of formulations testing, as judged by a majority of a panel of human taste testers, via procedures described elsewhere herein.

The concentration of sweet flavor agent needed to modulate or improve the flavor of the comestible product or composition will of course vary dependent on many variables, including the specific type of ingestible composition, what sweet compounds are already present and the concentrations thereof, the amount of presence of other flavors with modifying properties, and the enhancer effect of the particular compound on such sweet compounds. As noted, an application of the disclosed taste modulator compositions is for modulating (inducing, enhancing or inhibiting) the sweet tastes or other taste properties of other natural or synthetic sweet tastants. A broad range of concentrations of the disclosed taste modulator compositions can be employed to provide such sweet taste enhancement as described herein elsewhere.

Examples of foods and beverages wherein the disclosed taste modulator compositions may be incorporated included by way of example the Wet Soup Category, the Dehydrated and Culinary Food Category, the Beverage Category, the Frozen Food Category, the Snack Food Category, and seasonings or seasoning blends. "Wet Soup Category" means wet/liquid soups regardless of concentration or container, including frozen Soups. For the purpose of this definition soup(s) means a food prepared from meat, poultry, fish, vegetables, grains, fruit and other ingredients, cooked in a liquid which may include visible pieces of some or all of these ingredients. It may be clear (as a broth) or thick (as a chowder), smooth, pureed or chunky, ready-to-serve, semi-condensed or condensed and may be served hot or cold, as a first course or as the main course of a meal or as a between meal snack (sipped like a beverage). Soup may be used as an ingredient for preparing other meal components and may range from broths (consomme) to sauces (cream or cheese-based soups).

"Dehydrated and Culinary Food Category" means: (i) Cooking aid products such as: powders, granules, pastes, concentrated liquid products, including concentrated bouillon, bouillon and bouillon like products in pressed cubes, tablets or powder or granulated form, which are sold separately as a finished product or as an ingredient within a product, sauces and recipe mixes (regardless of technology); (ii) Meal solutions products such as: dehydrated and freeze dried soups, including dehydrated soup mixes, dehydrated instant soups, dehydrated ready-to-cook soups, dehydrated or ambient preparations of ready-made dishes, meals and single serve entrees including pasta, potato and rice dishes; and (iii) Meal embellishment products such as: condiments, marinades, salad dressings, salad toppings, dips, breading, batter mixes, shelf stable spreads, barbecue sauces, liquid recipe mixes, concentrates, sauces or sauce mixes, including recipe mixes for salad, sold as a finished product or as an ingredient within a product, whether dehydrated, liquid or frozen.

"Beverage Category" means beverages, beverage mixes and concentrates, including but not limited to, alcoholic and non-alcoholic ready to drink and dry powdered beverages. Other examples of foods and beverages wherein compounds according to the disclosure may be incorporated included by way of example carbonated and non-carbonated beverages, e.g., sodas, fruit or vegetable juices, alcoholic and non-alcoholic beverages, confectionary products, e.g., cakes, cookies, pies, candies, chewing gums, gelatins, ice creams, sorbets, puddings, jams, jellies, salad dressings, and other condiments, cereal, and other breakfast foods, canned fruits and fruit sauces and the like.

Additionally, the subject compounds can be used in flavor preparations to be added to foods and beverages. In preferred instances the composition will comprise another flavor or taste modifier such as a sweet tastant.

Accordingly, in some aspects, the disclosure relates to methods for modulating the sweet taste of a comestible product comprising: a) providing at least one comestible product, or a precursor thereof, and b) combining the comestible product or precursor thereof with at least a sweet flavor modulating amount of the disclosed taste modulator compositions, so as to form a modified comestible product.

The disclosure also relates to the modified comestible products produced by such processes, and similar processes for producing comestible products well known to those of ordinary skill in the art, especially if such compositions comprise other flavorings with modifying properties. The disclosed taste modulator compositions can be combined with or applied to the comestible or medicinal products or precursor thereof in any of innumerable ways known to cooks the world over, or producers of comestible or medicinal products. For example, the disclosed taste modulator compositions can be dissolved in or dispersed in or one of many known comestibly acceptable liquids, solids, or other carriers, such as water at neutral, acidic, or basic pH, fruit or vegetable juices, vinegar, marinades, beer, wine, natural water/fat emulsions such as milk or condensed milk, edible oils and shortenings, fatty acids, certain low molecular weight oligomers of propylene glycol, glyceryl esters of fatty acids, and dispersions or emulsions of such hydrophobic substances in aqueous media, salts such as sodium chloride, vegetable flours, solvents such as ethanol, solid edible diluents such as vegetable powders or flours, and the like, and then combined with precursors of the comestible or medicinal products, or applied directly to the comestible or medicinal products.

Steviol glycosides, *Stevia*-derived sweeteners, and *Stevia*-derived extracts provide sweetness and other taste attributes at a higher than certain threshold level of concentrations in water. Below the threshold level of concentration, the steviol glycosides, *Stevia*-derived sweeteners, *Stevia*-derived extracts, and their mixtures have no recognizable sweetness taste, but such *Stevia* extract below the threshold level of significant sweetness recognition can be associated with sweet and flavor profile modification in food and beverage applications. Accordingly, in various aspects, the present disclosure pertains to flavorings with modifying properties comprising a disclosed taste modulator composition and at least one steviol glycoside, *Stevia*-derived sweetener, *Stevia*-derived extract, and combinations thereof, such that the at least one steviol glycoside, *Stevia*-derived sweetener, *Stevia*-derived extract, and combinations thereof is present in an amount less than 1.5 wt % sucrose equivalent. In some aspects, the least one steviol glycoside, *Stevia*-derived sweetener, *Stevia*-derived extract, and combinations thereof comprises one or more glucosylated steviol glycoside.

In other aspects, the present disclosure pertains to flavorings with modifying properties comprising a disclosed taste modulator composition and at least one *Siraitia grosvenorii* (luo han guo or monk fruit)-derived sweetener, extract, juice, and combinations thereof, such that the at least least one *Siraitia grosvenorii* (luo han guo or monk fruit)-derived sweetener, extract, juice, and combinations thereof is present in an amount less than 1.5 wt % sucrose equivalent.

In further aspects, the present disclosure pertains to flavorings with modifying properties comprising: (a) a disclosed taste modulator composition; (b) at least one *Siraitia grosvenorii* (luo han guo or monk fruit)-derived sweetener, extract, juice, and combinations thereof, such that the at least one *Siraitia grosvenorii* (luo han guo or monk fruit)-derived sweetener, extract, juice, and combinations thereof is present in an amount less than 1.5 wt % sucrose equivalent; and (c) at least one steviol glycoside, *Stevia*-derived sweetener, *Stevia*-derived extract, and combinations thereof, such that the at least one steviol glycoside, *Stevia*-derived sweetener, *Stevia*-derived extract, and combinations thereof is present in an amount less than 1.5 wt % sucrose equivalent. In some aspects, the least one steviol glycoside, *Stevia*-derived sweetener, *Stevia*-derived extract, and combinations thereof comprises one or more glucosylated steviol glycoside.

The present disclosure is directed to a taste and flavor modifying composition. The disclosed taste and flavor modifying composition, which can modify the intensity of a taste and/or a flavor in a food or beverage product, comprises a disclosed taste modulator composition and at least one steviol glycoside, *Stevia*-derived sweetener, *Stevia*-derived extract, and combinations thereof, comprising one or more steviol glycosides with other water soluble molecules derived from *Stevia* plant, such as non-limiting examples of plant glycosides, flavonoids, labdane diterpene, triterpenes.

The present disclosure is also directed to a food or beverage product having an intense taste and flavor profile, wherein the food or beverage product comprises a disclosed taste and flavor modifying composition, which can modify the intensity of a taste and/or a flavor in a food or beverage product, comprises a disclosed taste modulator composition and at least one steviol glycoside, *Stevia*-derived sweetener, *Stevia*-derived extract, and combinations thereof, comprising one or more steviol glycosides with other water soluble molecules derived from *Stevia* plant, such as non-limiting examples of plant glycosides, flavonoids, labdane diterpene, triterpenes. A wide range of food and beverage products, such as, but not limited to, carbonated soft drinks, fruit juices, dairy foods, dairy beverages, baked goods, cereal products, snack foods, and table top sweeteners, may be made in accordance with the present disclosure. The taste and flavor profile of a food or beverage product comprising a taste and flavor modifying composition, wherein the taste and flavor modifying composition comprising the *Stevia* extract of steviol glycosides and water soluble molecules derived from *Stevia* plant, may be more intense than a comparative taste and flavor profile of a comparative food or beverage product which does not include the taste and flavor modifying composition. Moreover, the mouthfeel and overall taste perception of a food or beverage product comprising the taste and flavor modifying composition, wherein the taste and flavor enhancing composition includes the complex mixture of steviol glycosides and water soluble molecules, may be improved in relation to a mouthfeel and overall taste perception of a comparative food or beverage product which does not include the taste and flavor enhancing composition.

The present disclosure is further directed to a method of increasing the taste and flavor intensity of a food or beverage product, comprising the step of adding a taste and flavor enhancing composition to the food or beverage product, wherein the taste and flavor modifying composition comprising the *Stevia* extract of steviol glycosides and water soluble molecules derived from *Stevia* plant. The present disclosure is also directed to a method of improving the organoleptic properties of a food or beverage product comprising a high fructose syrup, comprising the step of adding the taste and flavor modifying composition to the food or beverage product. For example, adding the taste and flavor modifying composition may cause the high fructose syrup, such as high fructose corn syrup, to taste more like sugar. Also, if the high fructose syrup is high fructose corn syrup 42 (HFCS 42), adding the taste and flavor enhancing composition may cause the HFCS 42 to taste more like high fructose corn syrup 55 (HFCS 55).

The present disclosure is further directed to a method of increasing the taste and flavor intensity of a medical food and pharma product, comprising the step of adding a taste and flavor modifying composition to the food or beverage product, wherein the taste and flavor modifying composition comprising the *Stevia* extract of selected steviol glycosides and water soluble molecules derived from *Stevia* plant. The present disclosure is also directed to a method of improving the organoleptic properties of a medical food or pharma product containing functional food ingredients like vitamins, minerals and amino acids, comprising the step of adding the taste and flavor modifying composition to the food or beverage product. For example, adding the taste and flavor modifying composition may cause the off-taste due to vitamins, mineral, amino acids and other non-limiting functional ingredients, to improve taste and palatability.

The present disclosure is also directed to a method of making a taste and flavor enhancing composition, comprising: extracting steviol glycosides and other water soluble molecules from leaves of a *Stevia rebaudiana* plant, and separating the excess steviol glycosides than the amount and type of steviol glycosides required to contribute the taste and flavor modifying characteristics of the *Stevia* extract, and adding to the extract prepared a disclosed taste modulator composition. The present disclosure also pertains to kits for making a taste and flavor enhancing composition, comprising: (a) a disclosed taste modulator composition; and (b) instructions to utilize the disclosed taste modulator composition with one or more disclosed sweet flavorings, such as at least one *Siraitia grosvenorii* (luo han guo or monk fruit)-derived sweetener, extract, juice, and combinations thereof, such that the at least one *Siraitia grosvenorii* (luo han guo or monk fruit)-derived sweetener, extract, juice, and combinations thereof is present in an amount less than 1.5 wt % sucrose equivalent and/or at least one *Siraitia grosvenorii* (luo han guo or monk fruit)-derived sweetener, extract, juice, and combinations thereof, such that the at least one *Siraitia grosvenorii* (luo han guo or monk fruit)-derived sweetener, extract, juice, and combinations thereof is present in an amount less than 1.5 wt % sucrose equivalent. The kit can further comprise one or more disclosed sweet flavorings, such as at least one *Siraitia grosvenorii* (luo han guo or monk fruit)-derived sweetener, extract, juice, and combinations thereof, such that the at least one *Siraitia grosvenorii* (luo han guo or monk fruit)-derived sweetener, extract, juice, and combinations thereof and/or at least one *Siraitia grosvenorii* (luo han guo or monk fruit)-derived sweetener, extract, juice, and combinations thereof.

The present disclosure is also directed to a taste and flavor profile enhancing composition. The composition includes a disclosed glucosylated steviol glycoside composition and a disclosed taste modulator composition which can enhance the intensity of a taste and/or a flavor in a food or beverage product. In some aspects, the glucosylated steviol glycosides may include a plurality of glucose units. For example, the glucosylated steviol glycosides may include three, four, five, or more than five glucose units. As used herein, "a disclosed glucosylated steviol glycoside composition" refers to any glucosylated steviol composition comprise one or more steviol or steviol derivative as described herein throughout.

The present disclosure is also directed to a food or beverage product having an intense taste and flavor profile, wherein the food or beverage product includes a taste and flavor enhancing composition comprising a glucosylated steviol glycoside composition and a disclosed taste modulator composition. A wide range of food and beverage products, such as, but not limited to, carbonated soft drinks, fruit juices, dairy foods, dairy beverages, baked goods, cereal products, and table top sweeteners, may be made in accordance with the present disclosure. The taste and flavor profile of a food or beverage product including a taste and flavor enhancing composition, wherein the taste and flavor enhancing composition includes a disclosed glucosylated steviol glycoside composition and a disclosed taste modulator composition, may be more intense than a comparative taste and flavor profile of a comparative food or beverage product which does not include the taste and flavor enhancing composition. Moreover, the mouthfeel of a food or beverage product including the taste and flavor enhancing composition, wherein the taste and flavor enhancing composition includes a disclosed glucosylated steviol glycoside composition and a disclosed taste modulator composition, may be improved in relation to a mouthfeel of a comparative food or beverage product which does not include the taste and flavor enhancing composition.

The present disclosure is further directed to a method of increasing the taste and flavor intensity of a food or beverage product, including the step of adding a taste and flavor enhancing composition to the food or beverage product, wherein the taste and flavor enhancing composition includes a disclosed glucosylated steviol glycoside composition and a disclosed taste modulator composition. The present disclosure is also directed to a method of improving the organoleptic properties of a food or beverage product including a high fructose syrup, including the step of adding the taste and flavor enhancing composition to the food or beverage product. For example, adding the taste and flavor enhancing composition may cause the high fructose syrup, such as high fructose corn syrup, to taste more like sugar. Also, if the high fructose syrup is high fructose corn syrup 42 (HFCS 42), adding the taste and flavor enhancing composition may cause the HFCS 42 to taste more like high fructose corn syrup 55 (HFCS 55).

The present disclosure is further directed to a method of making a food or beverage product, including: adding a taste and flavor enhancing composition including a disclosed glucosylated steviol glycoside composition and a disclosed taste modulator composition, and adding a reduced amount of erythritol, wherein the reduced amount of erythritol is less than the amount of erythritol in a comparative food or beverage composition which does not include the taste and flavor enhancing composition. The mouthfeel of the food or beverage product is similar to the mouthfeel of the comparative food or beverage product, even though the comparative food or beverage product contains a higher level of erythritol.

The present disclosure is also directed to a taste and flavor profile enhancing composition. The composition includes a disclosed glucosylated steviol glycoside composition, a disclosed monk fruit composition, and a disclosed taste modulator composition which can enhance the intensity of a taste and/or a flavor in a food or beverage product. In some aspects, the glucosylated steviol glycosides may include a plurality of glucose units. For example, the glucosylated steviol glycosides may include three, four, five, or more than five glucose units. As used herein, "a disclosed glucosylated steviol glycoside composition" refers to any glucosylated steviol composition comprise one or more steviol or steviol derivative as described herein throughout. As used herein, "a disclosed monk fruit composition" refers to any monk fruit juice, extract, composition, or mixture, including a juice, extract, composition, or mixture comprising mogroside V, as described herein throughout.

The present disclosure is also directed to a food or beverage product having an intense taste and flavor profile, wherein the food or beverage product includes a taste and flavor enhancing composition comprising a glucosylated steviol glycoside composition and a disclosed taste modulator composition. A wide range of food and beverage products, such as, but not limited to, carbonated soft drinks, fruit juices, dairy foods, dairy beverages, baked goods, cereal products, and table top sweeteners, may be made in accordance with the present disclosure. The taste and flavor profile of a food or beverage product including a taste and flavor enhancing composition, wherein the taste and flavor enhancing composition includes a disclosed glucosylated steviol glycoside composition, a disclosed monk fruit composition, and a disclosed taste modulator composition, may be more intense than a comparative taste and flavor profile of a comparative food or beverage product which does not include the taste and flavor enhancing composition. Moreover, the mouthfeel of a food or beverage product including the taste and flavor enhancing composition, wherein the taste and flavor enhancing composition includes a disclosed glucosylated steviol glycoside composition, a disclosed monk fruit composition, and a disclosed taste modulator composition, may be improved in relation to a mouthfeel of a comparative food or beverage product which does not include the taste and flavor enhancing composition.

The present disclosure is further directed to a method of increasing the taste and flavor intensity of a food or beverage product, including the step of adding a taste and flavor enhancing composition to the food or beverage product, wherein the taste and flavor enhancing composition includes a disclosed glucosylated steviol glycoside composition, a disclosed monk fruit composition, and a disclosed taste modulator composition. The present disclosure is also directed to a method of improving the organoleptic properties of a food or beverage product including a high fructose syrup, including the step of adding the taste and flavor enhancing composition to the food or beverage product. For example, adding the taste and flavor enhancing composition may cause the high fructose syrup, such as high fructose corn syrup, to taste more like sugar. Also, if the high fructose syrup is high fructose corn syrup 42 (HFCS 42), adding the taste and flavor enhancing composition may cause the HFCS 42 to taste more like high fructose corn syrup 55 (HFCS 55).

The present disclosure is further directed to a method of making a food or beverage product, including: adding a taste and flavor enhancing composition including a disclosed glucosylated steviol glycoside composition, a disclosed monk fruit composition, and a disclosed taste modulator composition, and adding a reduced amount of erythritol, wherein the reduced amount of erythritol is less than the amount of erythritol in a comparative food or beverage composition which does not include the taste and flavor enhancing composition. The mouthfeel of the food or beverage product is similar to the mouthfeel of the comparative food or beverage product, even though the comparative food or beverage product contains a higher level of erythritol.

Methods of Making the Disclosed Sweetening Compositions

In various aspects, the present disclosure, relates to methods for making a disclosed sweetener composition comprising: mixing a taste modulator component comprising a first salt having a first cation selected from $Na^+$, $K^+$, $Ca^{2+}$, and $Mg^{2+}$; and a sweetening agent; wherein the mixing is carried out until a mixture of the taste modulator and the sweetening agent is essentially homogenous. In various aspects, the disclosed methods of making a disclosed sweetener composition can further comprise mixing a solvent with the taste modulator and the sweetening agent; and mixing the taste modulator, the sweetening agent, and the solvent until a solution or a suspension is essentially homogeneous. In a further aspect, the disclosed methods of making a disclosed sweetener composition can further comprise spray-drying or lyophilizing the solution or the suspension. In some aspects, the disclosed methods of making a disclosed sweetener composition can further comprise tableting the mixture of the taste modulator and the sweetening agent.

Products Comprising the Disclosed Compositions

In various aspects, the present disclosure, relates to products comprising a disclosed sweetening composition. In various aspect, the product can be a beverage, a food product, a nutraceutical, a concentrated sweetener composition, pharmaceutical, a dietary supplement, a dental hygienic composition, an edible gel composition, a cosmetic product, and a tabletop flavoring. In a further aspect, the present disclosure relates to a tabletop sweetener composition comprising a disclosed taste modulator composition and one or more disclosed sweetening agent.

As used herein, "food product" or "food item" refers to fruits, vegetables, juices, meat products such as ham, bacon and sausage; egg products, fruit concentrates, gelatins and gelatin-like products such as jams, jellies, preserves, and the like; milk products such as ice cream, sour cream, yogurt, and sherbet; icings, syrups including molasses; corn, wheat, rye, soybean, oat, rice and barley products, cereal products, nut meats and nut products, cakes, cookies, confectionaries such as candies, gums, fruit flavored drops, and chocolates, chewing gum, mints, creams, icing, ice cream, pies and breads. "Food product" or "food item" also refers to condiments such as herbs, spices and seasonings, flavor enhancers, such as monosodium glutamate. "Food product" or "food item" further refers to also includes prepared packaged products, such as dietetic sweeteners, liquid sweeteners, tabletop flavorings, granulated flavor mixes which upon reconstitution with water provide non-carbonated drinks, instant pudding mixes, instant coffee and tea, coffee whiteners, malted milk mixes, pet foods, livestock feed, tobacco, and materials for baking applications, such as powdered baking mixes for the preparation of breads, cookies, cakes, pancakes, donuts and the like. "Food product" or "food item" also refers to diet or low-calorie food and beverages containing little or no sucrose.

As used herein, "dietary supplement(s)" refers to compounds intended to supplement the diet and provide nutrients, such as vitamins, minerals, fiber, fatty acids, amino acids, etc. that may be missing or may not be consumed in sufficient quantities in a diet. Any suitable dietary supplement known in the art may be used. Examples of suitable dietary supplements can be, for example, nutrients, vitamins, minerals, fiber, fatty acids, herbs, botanicals, amino acids, and metabolites.

As used herein, "nutraceutical(s)" refers to compounds, which includes any food or part of a food that may provide medicinal or health benefits, including the prevention and/or treatment of disease or disorder (e.g., fatigue, insomnia, effects of aging, memory loss, mood disorders, cardiovascular disease and high levels of cholesterol in the blood, diabetes, osteoporosis, inflammation, autoimmune disorders, etc.). Any suitable nutraceutical known in the art may be used. In some aspects, nutraceuticals can be used as supplements to food and beverages and as pharmaceutical formulations for enteral or parenteral applications which may be solid formulations, such as capsules or tablets, or liquid formulations, such as solutions or suspensions.

In some aspects, dietary supplements and nutraceuticals can further contain protective hydrocolloids (such as gums, proteins, modified starches), binders, film-forming agents, encapsulating agents/materials, wall/shell materials, matrix compounds, coatings, emulsifiers, surface active agents, solubilizing agents (oils, fats, waxes, lecithins, etc.), adsorbents, carriers, fillers, co-compounds, dispersing agents, wetting agents, processing aids (solvents), flowing agents, taste-masking agents, weighting agents, gelling agents, gel-forming agents, antioxidants and antimicrobials.

As used herein, a "gel" refers to a colloidal system in which a network of particles spans the volume of a liquid medium. Although gels mainly are composed of liquids, and thus exhibit densities similar to liquids, gels have the structural coherence of solids due to the network of particles that spans the liquid medium. For this reason, gels generally appear to be solid, jelly-like materials. Gels can be used in a number of applications. For example, gels can be used in foods, paints, and adhesives. Gels that can be eaten are referred to as "edible gel compositions." Edible gel compositions typically are eaten as snacks, as desserts, as a part of staple foods, or along with staple foods. Examples of suitable edible gel compositions can be, for example, gel desserts, puddings, jams, jellies, pastes, trifles, aspics, marshmallows, gummy candies, and the like. In some aspects, edible gel mixes generally are powdered or granular solids to which a fluid may be added to form an edible gel composition. Examples of suitable fluids can be, for example, water, dairy fluids, dairy analogue fluids, juices, alcohol, alcoholic beverages, and combinations thereof. Examples of suitable dairy fluids can be, for example, milk, cultured milk, cream, fluid whey, and mixtures thereof. Examples of suitable dairy analogue fluids can be, for example, soy milk and non-dairy coffee whitener.

As used herein, the term "gelling ingredient" refers to any material that can form a colloidal system within a liquid medium. Examples of suitable gelling ingredients can be, for example, gelatin, alginate, carageenan, gum, pectin, konjac, agar, food acid, rennet, starch, starch derivatives, and combinations thereof. It is well known to those in the art that the amount of gelling ingredient used in an edible gel mix or an edible gel composition can vary considerably depending on a number of factors such as, for example, the particular gelling ingredient used, the particular fluid base used, and the desired properties of the gel.

Gel mixes and gel compositions of the present disclosure can be prepared by any suitable method known in the art. In some aspects, edible gel mixes and edible gel compositions of the present disclosure can be prepared using other ingredients in addition to a disclosed sweetener composition and the gelling agent. Examples of other suitable ingredients can be, for example, a food acid, a salt of a food acid, a buffering system, a bulking agent, a sequestrant, a cross-linking agent, one or more flavors, one or more colors, and combinations thereof.

In various aspects, a disclosed beverage can be a carbonated beverage product and a non-carbonated beverage product. The disclosed beverage can also be, for example, a soft drink, a fountain beverage, a frozen beverage; a ready-to-drink beverage; a frozen and ready-to-drink beverage, coffee, tea, a dairy beverage, a powdered soft drink, a liquid concentrate, flavored water, enhanced water, fruit juice, a fruit juice flavored drink, a sport drink, and an energy drink. It is understood that the disclosed beverage products can include one or more beverage ingredients such as, for example, acidulants, fruit juices and/or vegetable juices, pulp, etc., flavorings, coloring, preservatives, vitamins, minerals, electrolytes, erythritol, tagatose, glycerine, and carbon dioxide.

In various aspects, disclosed beverages can have any of numerous different specific formulations or constitutions. The formulation of a beverage product of the present disclosure can vary to a certain extent, depending upon such factors as the product's intended market segment, its desired nutritional characteristics, flavor profile, and the like. For example, in certain aspects, it can generally be an option to add further ingredients to the formulation of a particular beverage product. For example, additional (i.e., more and/or other) sweeteners can be added, flavorings, electrolytes, vitamins, fruit juices or other fruit products, tastants, masking agents and the like, flavor enhancers, and/or carbonation typically may be added to any such formulations to vary the taste, mouthfeel, nutritional characteristics, etc. In some aspects, the disclosed beverage can be a cola beverage that contains water, a disclosed sweetener composition, an acidulant, and flavoring. Exemplary flavorings can be, for example, cola flavoring, citrus flavoring, and spice flavorings. In some aspects, carbonation in the form of carbon dioxide can be added for effervescence. In other aspects, preservatives can be added, depending upon the other ingredients, production technique, desired shelf life, etc. In certain aspects, caffeine can be added. In a further aspect, a disclosed beverage can be a cola-flavored carbonated beverage, characteristically containing carbonated water, sweetener, kola nut extract and/or other flavoring, caramel coloring, one or more acids, and optionally other ingredients.

In one aspect of the present disclosure, a disclosed tabletop sweetener composition is provided that includes a HP sweetener and a taste modulator composition. In one aspect of the present disclosure, the weight ratio on a dry basis of the HP sweetener to the taste modulator composition is from about 0.0010:1 to about 1000:1. In another aspect of the present disclosure, the weight ratio on a dry basis of the HP sweetener to the taste modulator composition is from about 0.01:1 to about 286:1. In yet another aspect of the present disclosure, the weight ratio on a dry basis of the HP sweetener to the taste modulator composition is from about 1.8:1 to about 115:1. In a further aspect, a disclosed product is a tabletop sweetener comprising a disclosed sweetener composition. The tabletop composition optionally can further include at least one bulking agent, additive, anti-caking agent, functional ingredient and combinations thereof. The tabletop sweetener composition can be present in the form of a solid or a liquid. The liquid tabletop sweetener can comprise water and/or, other liquid carrier, and optionally additives, such, as for example polyols (e.g. erythritol, sorbitol, propylene glycol or glycerol), acids (e.g. citric acid), antimicrobial agents (e.g. benzoic acid or a salt thereof).

In another aspect of the present disclosure, a disclosed tabletop sweetener composition is provided that includes a bulking material, a HP sweetener and a taste modulator composition. In one aspect of the present disclosure, the weight ratio on a dry basis of the bulking material to the HP sweetener to the taste modulator composition is from about 0.0010:0.1:1 to about 1000:100,000:1. In another aspect of the present disclosure, the weight ratio on a dry basis of the bulking material to the HP sweetener to the taste modulator composition is from about 225:1.80:1 to about 14,370:115:1. In still another aspect, the sweetener may include optional ingredients such as for example, characterizing flavors and colors. Alternatively, optional ingredients may be added to the taste modulator composition. It is also possible that optional ingredients may be added to both the sweetener and the taste modulator composition. Such optional ingredients generally are known to those of skill in the art and may include, for instance, coloring agents, carriers, flavor compounds and the like. For instance, the taste modulator composition may include a strawberry flavor compound to provide a sweetener composition capable of delivering not only a sweet flavor but also a strawberry flavor. This could then be incorporated into a strawberry yogurt product to increase the perception of strawberry flavor compared to a yogurt product without the taste modulator composition. Alternatively, a disclosed tabletop sweetener composition may be colored to a golden brown color to simulate the appearance of raw sugar. Other optional ingredients may include certain carriers and inactive ingredients. These carriers and inactive ingredients may merely facilitate processing of the sweetener. Additionally, a flow agent or anticaking agent such as tricalcium phosphate may be added to improve flowability of a tabletop sweetener.

A disclosed tabletop sweetener composition may take many forms including, but not limited to, a crystal, a powder, a tablet, a cube, a glaze or coating, a granulated product, or combinations thereof.

In some cases, a disclosed tabletop sweetener composition may be provided in the form of a crystal that has an appearance comparable to that of sucrose crystals, e.g., to improve end user acceptance of the sweetener compositions. It may also be desirable to provide the sweetener in the form of a crystal that has similar solubility profile to sucrose, which becomes apparent, e.g., when the sweetener is mixed into an unsweetened beverage.

In some circumstances, the disclosed tabletop sweetener composition is not formulated to mimic the appearance or solubility characteristics of sucrose, is may be formulated to minimize volume, maximize solubility, maximize stability, or otherwise improve product handling and distribution.

One form of a disclosed tabletop sweetener composition may be an admixture. The disclosed tabletop sweetener composition may also be provided in the form of coated granules in which one or more first component of the sweetener composition is coated over one or more second component of the sweetener composition. For example, the taste modulator composition may be coated onto granules, crystals, or other forms of a HP sweetener, such that taste buds are first exposed to the taste modulator composition, and then to the HP sweetener. In this manner, the taste buds are modified by the taste modulator composition in preparation for exposure to the HP sweetener. In another example, the HP sweetener may be coated onto granules, crystals, or other forms of the taste modulator composition, such that taste buds are first exposed to the HP sweetener, followed by exposure to the taste modulator composition, which alters the perceived sweetness of the HP sweetener. This arrangement allows the taste modulator composition to potentially mask a bitter aftertaste associated with a HP sweetener while minimally affecting its initial perception of sweetness. In yet another example, the HP sweetener and taste modulator composition may be coated onto granules, crystals, or other forms of a bulking material, such that taste buds are first exposed to the HP sweetener and taste modulator composition, followed by exposure to the bulking material.

The disclosed tabletop sweetener composition may further include one or more bulking materials. In one aspect of the present disclosure, the bulking material may add bulk to the sweetener thereby making a single serving of the present compositions more similar to that of sucrose. End users of a sweetener may also find it easier to control the amount of sweetener added to a food or beverage, particularly when the serving size is similar to a known sweetener. Bulking materials may also contribute to body, viscosity, and other aspects of mouth-feel in liquids; volume, cell structure, crumb structure, and humectancy in baked goods; control over the freezing and melting points of foods and beverages; and overall visual and textural impressions of foods and beverages that include the present sweetener. In a further aspect, the bulking material itself may contribute to an increased sweet quality of the HP sweetener. In another aspect, the bulking material is low to non-caloric and may provide less than about 0.2 calories per gram of bulking agent.

In still another aspect of the present disclosure, the bulking material has a uniform crystalline structure, i.e. narrow particle size distribution. The uniform crystalline structure may provide for greater control over the ratio of bulking material to HP sweetener to taste modulator composition. In one aspect of the present disclosure, the bulking material has a size of from about 0.125 mm to about 1.0 mm. In another aspect of the present disclosure, the bulking material has a size of from about 0.21 mm to about 0.71 mm. In still another aspect of the present disclosure, the bulking material has a size of from about 0.25 mm to about 0.60 mm.

In yet another aspect of the present disclosure, the bulking agent has a solubility profile that is slower than either the HP sweetener or taste modulator composition. Thus, if the HP sweetener and taste modulator composition were to be deposited onto a bulking agent to form a tabletop sweetener product, the tabletop sweetener product may actually perform more like sugar when introduced into a beverage, particularly a cold beverage, where the granules do not immediately dissolve.

Exemplary bulking materials may be selected from the group consisting of maltodextrin, corn syrup solids, sucrose, fructose, glucose, invert sugar, sorbitol, xylose, ribulose, mannose, xylitol, mannitol, galactitol, erythritol, maltitol, lactitol, isomalt, maltose, tagatose, lactose, inulin, glycerol, propylene glycol, polyols, polydextrose, fructooligosaccharides, cellulose and cellulose derivatives, trehalose, isomaltulose, arabinogalactan, gum Arabic, gum tragacanth, guar gum and hydrolyzed guar gum, and mixtures thereof. It may also be possible to utilize certain starches and modified starches.

In one aspect of the present disclosure, the bulking material is erythritol. In another aspect, the bulking material is glycerol or propylene glycol. These particular bulking materials are available in a liquid form, which may provide for a liquid tabletop sweetener preparation.

The present disclosure further includes methods of preparing the disclosed tabletop sweetener composition. In one aspect, the disclosed tabletop sweetener composition of the present disclosure is prepared by dissolving a HP sweetener and a taste modulator composition in water. The HP sweetener and taste modulator composition may either be dissolved individually to form two aqueous solutions or in combination to form a single aqueous solution containing both the HP sweetener and taste modulator composition. In the event that the HP sweetener and taste modulator composition are dissolved in combination, the HP sweetener and taste modulator composition may be added in any order, including simultaneously. In the event the HP sweetener and taste modulator composition are dissolved individually, they may be later combined into a single, aqueous mixture. In one aspect, the temperature of the water is at room temperature. In another aspect, the temperature of the water is heated, such as for example to from about 10 to about 70° C. In still another aspect, the temperature of the water used for the HP sweetener is heated while the temperature of the water used for the taste modulator composition is at room temperature. Where the taste modulator composition includes more than one component, such as for example, a plurality of congruent flavor volatiles and at least one non-congruent flavor volatile, the components may be delivered in a single fraction or in more than one fraction. For example, the components may be added using a powder fraction containing a blend of dry powdered components and a liquid fraction containing and blend of the remaining components that have been dissolved in an appropriate carrier solution such as water and ethanol. The sweetener can then be processed in a number of ways, such as for example, spray drying, to reduce the moisture level of the sweetener.

In another aspect, is provided a method of preparing a disclosed tabletop sweetener composition. Generally, a HP sweetener and a taste modulator composition are deposited onto a bulking material having a size distribution of from about 0.125 mm to about 1.0 mm. The HP sweetener and taste modulator composition can be deposited in any order, including simultaneously. Methods to deposit the HP sweetener and taste modulator composition will be generally known to one of skill in the art. For example, the bulking material can be placed in a coating vessel (positioned on the right side of the diagram) and air is blown through the vessel (from the bottom of the vessel through the top) in order to cause the bulking material to move about randomly inside of the vessel (i.e., the particles are fluidized). Next, a solution comprising HP sweetener in water is introduced into the vessel and is allowed to deposit on the surface of the bulking material. Heated air is blown through the coating vessel in order to dry the HP sweetener onto the bulking material. After coating the bulking material with HP sweetener, the taste modulator composition is introduced into the coating vessel as a water-based solution. Similar to the HP sweetener, the taste modulator composition deposits on the surface of the bulking material and is dried by blowing air through the coating vessel. In a particular aspect of the present disclosure, the air that is blown through the coating vessel is not heated. This may reduce thermal degradation of the taste modulator composition. The resulting tabletop sweetener composition includes a bulking material with HP sweetener and a taste modulator composition deposited on its surface. The resulting tabletop sweetener may also be prepared by first introducing the taste modulator composition into the vessel and then introducing the HP sweetener solution into the vessel. Alternatively, the HP sweetener solution and liquid taste modulator composition may be added simultaneously into the vessel. In one aspect, the HP sweetener is rebaudioside A and the bulking material is erythritol. In another aspect, the size distribution of the bulking material is such that the tabletop sweetener has a desired taste and serving-to-serving consistency. In particular, the size distribution of the bulking material is selected to provide tabletop sweetener particles that have the desired ratio of HP sweetener to bulking material and HP sweetener to taste modulator composition. Furthermore, the tabletop sweetener particle size is similar to sugar.

In still another aspect, an HP sweetener is dissolved in room temperature water. A taste modulator composition, also at room temperature, is blended into the HP sweetener-water mixture. A bulking material is added to an agglomeration unit where it is suspended by heated air. While suspended, the mixture of HP sweetener, taste modulator composition and water is sprayed into the agglomeration unit in such a way as to allow the components to deposit onto the bulking material. By controlling the temperature in the agglomeration unit the water is removed and the moisture content of tabletop sweetener is comparable to the starting moisture of the bulking material.

In yet another aspect, a HP sweetener is dissolved in heated water. In one aspect, the heated water increases the solubility of the HP sweetener and therefore less water is necessary to fully dissolve the HP sweetener. A bulking material is added to an agglomeration unit where it is suspended by heated air. While suspended, the mixture of HP sweetener and water is sprayed into the agglomeration unit in such a way as to allow the components to deposit onto the bulking material. The HP sweetener is then dried onto the bulking material using heated air. In one aspect, the air is heated to from about 20 to about 130° C. In another aspect, the air is heated to from about 60 to about 70° C. The bulking material deposited with HP sweetener continues to be suspended by air only the temperature of the air is reduced. In one aspect the temperature of the air is reduced to ambient temperature. A mixture of a taste modulator composition and room temperature water is then introduced into the agglomeration unit in such a way as to allow the components to deposit onto the bulking material and HP sweetener. By controlling the temperature in the agglomeration unit the water is removed to obtain final moisture content of the tabletop sweetener comparable to that of the starting moisture of the bulking material. In one aspect, the air temperature is from about 20 to about 130° C. In an aspect, the method produces a tabletop sweetener in which the ratio on a dry weight basis of bulking material to HP sweetener to taste modulator composition is from about 225:1.80:1 to about 14,370:115:1. In a further aspect, the bulking material is erythritol and the HP sweetener is rebaudioside A.

Also provided in the present disclosure are food and beverage products containing either the disclosed tabletop sweetener composition. Exemplary foods and beverages include baked goods, chocolate, candy and confections, chewing gum, ice cream, yogurt, breakfast cereal, oatmeal, pudding, fruit preserves and preparations, breakfast bars, protein bars, granola bars, cereal coatings, syrups, marinades, ketchup, salad dressings, baby food, pet food, animal feed, soft drinks, fruit juices, coffee, tea, sport and energy drinks, and other foods and beverages. A particular class of beverages for which the present compositions and methods are useful is diet soft drinks (or sodas), such as colas, citrus and fruit flavored beverages, and the like. Additionally, pharmaceutical and over the counter drug products may contain either the disclosed tabletop sweetener composition.

Sensory Testing Methodology

In various aspects, the present disclosure pertains to methods of testing the disclosed sweetener compositions, e.g., a sensory methodology or method for sweetener evaluation. In a particular aspect, the sensory methodology used is known as a "Flavor Profile Analysis" as has been previously described (see: B. T. Carr, S. D. Pecore, K. M. Gibes and G. E. DuBois, "Sensory Methods for Sweetener Evaluation", Chapter 11 In Flavor Measurement, C. T. Ho and C. H. Manley, Eds., Marcel Dekker, New York, N.Y., 1993). The full set of sensory parameters that are assessed in the sensory testing method are: (a) Sweetness Intensity (which can be abbreviated in tables herein as "S"); (b) Sourness Intensity ((which can be abbreviated in tables herein as "So"); (c) Saltiness Intensity (which can be abbreviated in tables herein as "Sa"); (d) Bitterness Intensity (which can be abbreviated in tables herein as "B"); (e) Body/Mouthfeel Intensity (which can be abbreviated in tables herein as "B/MF"); (f) Astringency Intensity (which can be abbreviated in tables herein as "A"); (g) Sweetness Linger (which can be abbreviated in tables herein as "SL"); (h) Sweetness Appearance Time (which can be abbreviated in tables herein as "AT"); and (i) Sweetness Desensitization (which can be abbreviated in tables herein as "SD"). In conducting the sensory testing method, both individual and group scores can be averaged and subjected to further statistical analysis.

Typically, a panel of 15 subjects is recruited from a larger group based on a panelist's ability to correctly rank a series of 6, 7, 8, 9 and 10% sucrose solutions in order of increasing sweetness intensity. The panelists are then trained to gain familiarity with the following taste attributes based on the tastes of the stimuli shown in parentheses with the taste attribute: (a) Sweet (Sucrose); (b) Sour (Citric Acid); (c) Salty (Sodium Chloride); (d) Bitter (Caffeine); (e) Body/Mouthfeel (Glucose); and (f) Astringency (Alum). Following familiarization with foregoing six taste attributes, panelists are trained in the technique of intensity scaling with a range of sucrose solutions (2.5, 5, 7.5, 10, 12.5 and 15% sucrose). In the training program, panelists were provided these sucrose standard solutions for the purpose of memorization of their perceived intensities on a 0-15 scale. Panelists are then provided sucrose solutions as unknowns and required to correctly rate their intensities on a 0-15 scale. In the next stage of training, panelists are instructed to rate the intensities of sour (citric acid), salty (sodium chloride), bitter (caffeine), body/mouthfeel (glucose) and astringent (alum) samples based on the learned 0-15 sucrose intensity scale.

In addition to rating the intensities of the foregoing six attributes, panelists are also trained in the rating of in sweetness onset time, sweetness linger and sweetness desensitization. Each of these briefly discussed in the following.

Sweetness Appearance Time (AT):

This time begins when the sample is taken into the mouth and is until maximal sweetness intensity is perceived; Permissible Ratings are: (i) R (Rapid as for 10% Sucrose), and in scoring, R is assigned a numerical score of 0.0; (ii) D (Delay as for 500 PPM REBA), and in scoring, D is assigned a numerical score of 2.5; and (iii) SD (Significant Delay as for 3000 PPM Mono Ammonium Glycyrrhizinate), and in scoring, SD is assigned a numerical score of 5.0.

Sweetness Linger (SL):

On tasting the sample and quantifying Attributes a-g, the sample is expectorated @ 15 sec and the mouth rinsed with water (1×15 mL) and the water expectorated @ 30 sec. The tongue and mouth are then held motionless and attention is paid to sweetness buildup in the mouth over the next 120 sec. The perceived sweetness intensity @ 120 sec is SL. 10% Sucrose and 500 PPM REBA, in water, are standards and exhibit SLs of 0 and 5 under these conditions.

Sweetness Desensitization (SD):

At the end of the SL scaling, the level of desensitization or tongue-numbing perceived is rated. Permissible Ratings are: (i) N (None as for 10% Sucrose), and in scoring, N is assigned a numerical score of 0.0; (ii) S (Slight as for 500 PPM REBA), and in scoring, S is assigned a numerical score of 2.5; and (iii) M (Medium as for 1000 PPM REBA), and in scoring, M is assigned a numerical score of 5.0.

Aspects

The following listing of exemplary aspects supports and is supported by the disclosure provided herein.

Aspect 1. A sweetener composition comprising: a taste modulator component comprising a first salt having a first cation selected from $Na^+$, $K^+$, $Ca^{+2}$, and $Mg^{+2}$; and a sweetening agent.

Aspect 2. The sweetener composition of Aspect 1, wherein the first salt has a first anion comprising gluconate ($C_6H_{11}O_7^{-1}$), citrate ($C_6H_5O_7^{-3}$), hydrogen citrate ($C_6H_6O_7^{-2}$), dihydrogen citrate ($C_6H_7O_7^{-1}$), malate ($C_4H_6O_5^{-2}$), hydrogen malate ($C_4H_7O_5^{-1}$), maleate ($C_4H_2O_4^{-2}$), hydrogen maleate ($C_4H_3O_4^{-1}$), fumarate ($C_4H_2O_4^{-2}$), hydrogen fumarate ($C_4H_3O_4^{-1}$), succinate ($C_4H_4O_4^{-2}$), hydrogen succinate ($C_4H_5O_4^{-1}$), glutarate ($C_5H_6O_4^{-2}$), hydrogen glutarate ($C_5H_7O_4^{-1}$), adipate $C_6H_8O_4^{-2}$), hydrogen adipate ($C_6H_9O_4^{-1}$), lactate ($C_3H_5O_3^{-1}$), tartrate (C4H4O6-2), bitartrate ($C_4H_5O_6^{-1}$), phosphate ($PO_4^{-3}$), monohydrogen phosphate ($HPO_4^{-2}$), dihydrogen phosphate ($H_2PO_4^{-1}$), fluoride ($F^{-1}$), chloride ($Cl^{-1}$), sulfate ($SO_4^{-2}$), bisulfate ($HSO_4^{-1}$), nitrate ($NO_3^{-1}$), carbonate ($CO_3^{-2}$), bicarbonate ($HCO_3^{-1}$), glycerate ($C_3H_5O_4^{-1}$), glycolate ($C_2H_3O_3^{-1}$), or combinations thereof.

Aspect 3. The sweetener composition of Aspect 2, where the first anion comprises citrate ($C_6H_5O_7^{-3}$), chloride ($Cl^{-1}$), phosphate ($PO_4^{-3}$), carbonate ($CO_3^{-2}$), and combinations thereof.

Aspect 4. The sweetener composition of Aspect 2, where the first anion comprises citrate ($C_6H_5O_7^{-3}$).

Aspect 5. The sweetener composition of Aspect 2, where the first anion comprises chloride ($Cl^{-1}$).

Aspect 6. The sweetener composition of any one of Aspect 1-Aspect 5, wherein the taste modulator component further comprises a second salt having a second cation selected from $Na^+$, $K^+$, $Ca^{+2}$, and $Mg^{+2}$; and wherein the first cation and the second cation are not the same.

Aspect 7. The sweetener composition of Aspect 6, wherein the second salt has a second anion comprising gluconate ($C_6H_{11}O_7^{-1}$), citrate ($C_6H_5O_7^{-3}$), hydrogen citrate ($C_6H_6O_7^{-2}$), dihydrogen citrate ($C_6H_7O_7^{-1}$), malate ($C_4H_6O_5^{-2}$), hydrogen malate ($C_4H_7O_5^{-1}$), maleate ($C_4H_2O_4^{-2}$), hydrogen maleate ($C_4H_3O_4^{-1}$), fumarate ($C_4H_2O_4^{-2}$), hydrogen fumarate ($C_4H_3O_4^{-1}$), succinate ($C_4H_4O_4^{-2}$), hydrogen succinate ($C_4H_5O_4^{-1}$), glutarate ($C_5H_6O_4^{-2}$), hydrogen glutarate ($C_5H_7O_4^{-1}$), adipate $C_6H_8O_4^{-2}$), hydrogen adipate ($C_6H_9O_4^{-1}$), lactate ($C_3H_5O_3^{-1}$), tartrate (C4H4O6-2), bitartrate (C4H5O6-1), phosphate ($PO_4^{-3}$), monohydrogen phosphate ($HPO_4^{-2}$), dihydrogen phosphate ($H_2PO_4^{-1}$), fluoride ($F^{-1}$), chloride ($Cl^{-1}$), sulfate ($SO_4^{-2}$), bisulfate ($HSO_4^{-1}$), nitrate ($NO_3^{-1}$), carbonate ($CO_3^{-2}$), bicarbonate ($HCO_3^{-1}$), glycerate ($C_3H_5O_4^{-1}$), glycolate ($C_2H_3O_3^{-1}$), or combinations thereof.

Aspect 8. The sweetener composition of Aspect 7, where the second anion comprises citrate ($C_6H_5O_7^{-3}$), chloride ($C^{-1}$), phosphate ($PO_4^{-3}$), carbonate ($CO_3^{-2}$), and combinations thereof.

Aspect 9. The sweetener composition of Aspect 7, where the second anion comprises citrate ($C_6H_5O_7^{-3}$).

Aspect 10. The sweetener composition of Aspect 7, where the second anion comprises chloride ($Cl^{-1}$).

Aspect 11. The sweetener composition of any one of Aspect 1-Aspect 10, wherein the taste modulator component further comprises a third salt having a third cation selected from $Na^+$, $K^+$, $Ca^{+2}$, and $Mg^{+2}$; and wherein the first cation, the second cation, and the third cation are not the same.

Aspect 12. The sweetener composition of Aspect 11, wherein the third salt has a third anion comprising gluconate ($C_6H_{11}O_7^{-1}$), citrate ($C_6H_5O_7^{-3}$), hydrogen citrate ($C_6H_6O_7^{-2}$), dihydrogen citrate ($C_6H_7O_7^{-1}$), malate ($C_4H_6O_5^{-2}$), hydrogen malate ($C_4H_7O_5^{-1}$), maleate ($C_4H_2O_4^{-2}$), hydrogen maleate ($C_4H_3O_4^{-1}$), fumarate ($C_4H_2O_4^{-2}$), hydrogen fumarate ($C_4H_3O_4^{-1}$), succinate ($C_4H_4O_4^{-2}$), hydrogen succinate ($C_4H_5O_4^{-1}$), glutarate ($C_5H_6O_4^{-2}$), hydrogen glutarate ($C_5H_7O_4^{-1}$), adipate $C_6H_8O_4^{-2}$), hydrogen adipate ($C_6H_9O_4^{-1}$), lactate ($C_3H_5O_3^{-1}$), tartrate (C4H4O6-2), bitartrate (C4H5O6-1), phosphate ($PO_4^{-3}$), monohydrogen phosphate ($HPO_4^{-2}$), dihydrogen phosphate ($H_2PO_4^{-1}$), fluoride ($F^{-1}$), chloride ($Cl^{-1}$), sulfate ($SO_4^{-2}$), bisulfate ($HSO_4^{-1}$), nitrate ($NO_3^{-1}$), carbonate ($CO_3^{-2}$), bicarbonate ($HCO_3^{-1}$), glycerate ($C_3H_5O_4^{-1}$), glycolate ($C_2H_3O_3^{-1}$), or combinations thereof.

Aspect 13. The sweetener composition of Aspect 12, where the third anion comprises citrate ($C_6H_5O_7^{-3}$), chloride ($Cl^{-1}$), phosphate ($PO_4^{-3}$), carbonate ($CO_3^{-2}$), and combinations thereof.

Aspect 14. The sweetener composition of Aspect 12, where the third anion comprises citrate ($C_6H_5O_7^{-3}$).

Aspect 15. The sweetener composition of Aspect 12, where the third anion comprises chloride ($Cl^{-1}$).

Aspect 16. The sweetener composition of any one of Aspect 1-Aspect 15, wherein the taste modulator component further comprises a fourth salt having a fourth cation selected from $Na^+$, $K^+$, $Ca^{+2}$, and $Mg^{+2}$; and wherein the first cation, the second cation, the third cation, and the fourth cation are not the same.

Aspect 17. The sweetener composition of Aspect 16, wherein the fourth salt has a fourth anion comprising gluconate ($C_6H_{11}O_7^{-1}$), citrate ($C_6H_5O_7^{-3}$), hydrogen citrate ($C_6H_6O_7^{-2}$), dihydrogen citrate ($C_6H_7O_7^{-1}$), malate ($C_4H_6O_5^{-2}$), hydrogen malate ($C_4H_7O_5^{-1}$), maleate ($C_4H_2O_4^{-2}$), hydrogen maleate ($C_4H_3O_4^{-1}$), fumarate ($C_4H_2O_4^{-2}$), hydrogen fumarate ($C_4H_3O_4^{-1}$), succinate ($C_4H_4O_4^{-2}$), hydrogen succinate ($C_4H_5O_4^{-1}$), glutarate ($C_5H_6O_4^{-2}$), hydrogen glutarate ($C_5H_7O_4^{-1}$), adipate $C_6H_8O_4^{-2}$), hydrogen adipate ($C_6H_9O_4^{-1}$), lactate ($C_3H_5O_3^{-1}$), tartrate (C4H4O6-2), bitartrate (C4H5O6-1), phosphate ($PO_4^{-3}$), monohydrogen phosphate ($HPO_4^{-2}$), dihydrogen phosphate ($H_2PO_4^{-1}$), fluoride ($F^{-1}$), chloride ($Cl^{-1}$), sulfate ($SO_4^{-2}$), bisulfate ($HSO_4^{-1}$), nitrate ($NO_3^{-1}$), carbonate ($CO_3^{-2}$), bicarbonate ($HCO_3^{-1}$), glycerate ($C_3H_5O_4^{-1}$), glycolate ($C_2H_3O_3^{-1}$), or combinations thereof.

Aspect 18. The sweetener composition of Aspect 17, where the fourth anion comprises citrate ($C_6H_5O_7^{-3}$), chloride ($Cl^{-1}$), phosphate ($PO_4^{-3}$), carbonate ($CO_3^{-2}$), and combinations thereof.

Aspect 19. The sweetener composition of Aspect 17, where the fourth anion comprises citrate ($C_6H_5O_7^{-3}$).

Aspect 20. The sweetener composition of Aspect 17, where the fourth anion comprises chloride ($Cl^{-1}$).

Aspect 21. The sweetener composition of any one of Aspect 1-Aspect 20, wherein the sweetening agent comprises a natural HP sweetener, a synthetic HP sweetener, a carbohydrate/polyol sweetener, or combinations thereof.

Aspect 22. The sweetener composition of Aspect 21, wherein the natural HP sweetener comprises a *Stevia* sweetener, a *Siraitia grosvenorii*-derived sweetener, a protein sweetener, or combinations thereof.

Aspect 23. The sweetener composition of Aspect 22, wherein the *Stevia* sweetener comprises stevioside, rubusoside, steviolbioside, dulcoside A, rebaudioside A, rebaudioside B, rebaudioside C, rebaudioside D, rebaudioside E, rebaudioside F, rebaudioside M, or combinations thereof.

Aspect 24. The sweetener composition of Aspect 23, wherein the *Stevia* sweetener comprises rebaudioside A, rebaudioside B, rebaudioside C, rebaudioside D, rebaudioside E, rebaudioside F, rebaudioside M, or combinations thereof.

Aspect 25. The sweetener composition of Aspect 24, wherein the *Stevia* sweetener comprises rebaudioside A, rebaudioside D, rebaudioside F, rebaudioside M, or combinations thereof.

Aspect 26. The sweetener composition of Aspect 24, wherein the *Stevia* sweetener comprises rebaudioside A.

Aspect 27. The sweetener composition of Aspect 24, wherein the *Stevia* sweetener comprises rebaudioside D.

Aspect 28. The sweetener composition of Aspect 24, wherein the *Stevia* sweetener comprises rebaudioside F.

Aspect 29. The sweetener composition of Aspect 24, wherein the *Stevia* sweetener comprises rebaudioside M.

Aspect 30. The sweetener composition of Aspect 22, wherein the *Stevia* sweetener comprises glucosylated steviol glycosides.

Aspect 31. The sweetener composition of Aspect 22, wherein the *Siraitia grosvenorii*-derived sweetener comprises a solvent extract of a fruit; and wherein the solvent extract comprises greater than or equal to about 60 wt % mogrosides.

Aspect 32. The sweetener composition of Aspect 31, wherein the solvent extract comprises greater than or equal to about 70 wt % total mogrosides.

Aspect 33. The sweetener composition of Aspect 31, wherein the solvent extract comprises greater than or equal to about 80 wt % total mogrosides.

Aspect 34. The sweetener composition of Aspect 31, wherein the solvent extract comprises greater than or equal to about 85 wt % total mogrosides.

Aspect 35. The sweetener composition of Aspect 31, wherein the solvent extract comprises greater than or equal to about 90 wt % total mogrosides.

Aspect 36. The sweetener composition of Aspect 31, wherein the solvent extract comprises greater than or equal to about 70 wt % mogroside V.

Aspect 37. The sweetener composition of Aspect 31, wherein the solvent extract comprises greater than or equal to about 80 wt % mogroside V.

Aspect 38. The sweetener composition of Aspect 31, wherein the solvent extract comprises greater than or equal to about 85 wt % mogroside V.

Aspect 39. The sweetener composition of Aspect 31, wherein the solvent extract comprises greater than or equal to about 90 wt % mogroside V.

Aspect 40. The sweetener composition of Aspect 22, wherein the *Siraitia grosvenorii*-derived sweetener comprises mogroside IV, mogroside V, siratose, or combinations thereof.

Aspect 41. The sweetener composition of Aspect 22, wherein the protein sweetener comprises thaumatin, monellin, single-chain monellin, brazzein, or combinations thereof.

Aspect 42. The sweetener composition of any one of Aspect 21-Aspect 41, wherein the synthetic HP sweetener comprises a peptide sweetener, an N-sulfonyl amide sweetener, a sulfamate sweetener, a halogenated carbohydrate, a polyketide, or combinations thereof.

Aspect 43. The sweetener composition of Aspect 42, wherein the peptide sweetener comprises aspartame, neotame, advantame, a food grade salt thereof, or combinations thereof.

Aspect 44. The sweetener composition of Aspect 42, wherein the N-sulfonyl amide sweetener comprises saccharin, acesulfame, a food grade salt thereof, or combinations thereof.

Aspect 45. The sweetener composition of Aspect 42, wherein the sulfamate sweetener comprises cyclamic acid, a food grade salt thereof, or combinations thereof.

Aspect 46. The sweetener composition of Aspect 42, wherein the halogenated carbohydrate comprises sucralose.

Aspect 47. The sweetener composition of Aspect 42, wherein the polyketide comprises neohesperidin dihydrochalcone.

Aspect 48. The sweetener composition of any one of Aspect 21-Aspect 47, wherein the carbohydrate/polyol sweetener comprises a fully-caloric sweetener, a partially-caloric sweetener, a HP sweetener, or combinations thereof.

Aspect 49. The sweetener composition of Aspect 48, wherein fully-caloric sweetener comprises sucrose, glucose, maltose, fructose, lactose, xylitol, sorbitol, or combinations thereof.

Aspect 50. The sweetener composition of Aspect 48, wherein partially-caloric sweetener comprises maltitol, lactitol, isomalt, threitol, arabitol, D-tagatose, D-psicose, or combinations thereof.

Aspect 51. The sweetener composition of Aspect 48, wherein partially-caloric sweetener comprises one or more fructooligosaccharides.

Aspect 52. The sweetener composition of Aspect 48, wherein the HP sweetener comprises erythritol.

Aspect 53. The sweetener composition of any one of Aspect 1-Aspect 52, wherein the sweetening agent comprises a mixture of aspartame and acesulfame, or a food grade salt thereof.

Aspect 54. The sweetener composition of Aspect 53, further comprising cyclamic acid, or a food grade salt thereof.

Aspect 55. The sweetener composition of any one of Aspect 1-Aspect 52, wherein the sweetening agent comprises a mixture of aspartame and saccharin, or a food grade salt thereof.

Aspect 56. The sweetener composition of Aspect 55, further comprising cyclamic acid, or a food grade salt thereof.

Aspect 57. The sweetener composition of any one of Aspect 1-Aspect 52, wherein the sweetening agent comprises a mixture of aspartame; and cyclamic acid, or a food grade salt thereof.

Aspect 58. The sweetener composition of any one of Aspect 1-Aspect 52, wherein the sweetening agent comprises a mixture of sucralose; and saccharin, or a food grade salt thereof.

Aspect 59. The sweetener composition of any one of Aspect 1-Aspect 52, wherein the sweetening agent comprises a mixture of sucralose; and acesulfame, or a food grade salt thereof.

Aspect 60. The sweetener composition of any one of Aspect 1-Aspect 52, wherein the sweetening agent comprises a mixture of *Stevia* sweeteners.

Aspect 61. The sweetener composition of Aspect 60, wherein the mixture of *Stevia* sweeteners comprises at least two of stevioside, rubusoside, steviolbioside, dulcoside A, rebaudioside A, rebaudioside B, rebaudioside C, rebaudioside D, rebaudioside E, rebaudioside F, rebaudioside M, and glucosylated steviol glycosides.

Aspect 62. The sweetener composition of Aspect 60, wherein the mixture of *Stevia* sweeteners comprises rebaudioside A and glucosylated steviol glycosides.

Aspect 63. The sweetener composition of any one of Aspect 1-Aspect 52, wherein the sweetening agent comprises a mixture of a *Stevia* sweetener and a *Siraitia grosvenorii*-derived sweetener.

Aspect 64. The sweetener composition of Aspect 63, wherein the *Siraitia grosvenorii*-derived sweetener comprises a solvent extract of a fruit; and wherein the solvent extract comprises greater than or equal to about 60 wt % mogrosides.

Aspect 65. The sweetener composition of Aspect 64, wherein the solvent extract comprises greater than or equal to about 70 wt % total mogrosides.

Aspect 66. The sweetener composition of Aspect 64, wherein the solvent extract comprises greater than or equal to about 80 wt % total mogrosides.

Aspect 67. The sweetener composition of Aspect 64, wherein the solvent extract comprises greater than or equal to about 85 wt % total mogrosides.

Aspect 68. The sweetener composition of Aspect 64, wherein the solvent extract comprises greater than or equal to about 90 wt % total mogrosides.

Aspect 69. The sweetener composition of Aspect 64, wherein the solvent extract comprises greater than or equal to about 70 wt % mogroside V.

Aspect 70. The sweetener composition of Aspect 64, wherein the solvent extract comprises greater than or equal to about 80 wt % mogroside V.

Aspect 71. The sweetener composition of Aspect 64, wherein the solvent extract comprises greater than or equal to about 85 wt % mogroside V.

Aspect 72. The sweetener composition of Aspect 64, wherein the solvent extract comprises greater than or equal to about 90 wt % mogroside V.

Aspect 73. The sweetener composition of Aspect 63 wherein the *Siraitia grosvenorii*-derived sweetener comprises mogroside IV, mogroside V, siratose, or combinations thereof.

Aspect 74. The sweetener composition of any one of Aspect 1-Aspect 52, wherein the sweetening agent comprises a mixture comprising a *Stevia* sweetener and thaumatin.

Aspect 75. The sweetener composition of any one of Aspect 1-Aspect 52, wherein the sweetening agent comprises a mixture comprising a *Stevia* sweetener and erythritol.

Aspect 76. The sweetener composition of any one of Aspect 1-Aspect 52, wherein the sweetening agent comprises a mixture comprising a *Stevia* sweetener and D-psicose.

Aspect 77. The sweetener composition of any one of Aspect 63-Aspect 76, wherein the *Stevia* sweetener comprises a stevioside, rubusoside, steviolbioside, dulcoside A, rebaudioside A, rebaudioside B, rebaudioside C, rebaudioside D, rebaudioside E, rebaudioside F, rebaudioside M, a mixture of glucosylated steviol glycosides, or combinations thereof.

Aspect 78. The sweetener composition of Aspect 77, wherein the *Stevia* sweetener comprises rebaudioside A, a mixture of glucosylated steviol glycosides, or combinations thereof.

Aspect 79. The sweetener composition of Aspect 77, wherein the *Stevia* sweetener comprises rebaudioside A.

Aspect 80. The sweetener composition of Aspect 77, wherein the *Stevia* sweetener comprises a mixture of glucosylated steviol glycosides.

Aspect 81. The sweetener composition of any one of Aspect 1-Aspect 80, wherein the sweetening agent and the taste modulator component are present in a ratio of the sweetening agent to a total cation; wherein the sweetening agent is present in an amount of about 100 to about 1000 mg to about 0.1 mmol to about 30 mmol of the total cation; and wherein the total cation represents a sum of the first cation, and when present, the second cation, the third cation, and the fourth cation.

Aspect 82. The sweetener composition of Aspect 81, wherein the ratio of the sweetening agent to the total cation is about 100 to about 1000 mg of the sweetening agent to the total cation comprising about 0.1 mmol to about 10 mmol $Na^+$, when $Na^+$ is present; about 0.1 mmol to about 20 mmol $K^+$, when $K^+$ is present; about 0.1 mmol to about 5 mmol $Mg^{+2}$, when $Mg^{+2}$ is present; about 0.1 mmol to about 5 mmol $Ca^{+2}$, when $Ca^{+2}$ is present; and combinations thereof provided that the total cation is about 0.1 mmol to about 30 mmol.

Aspect 83. The sweetener composition of Aspect 82, wherein the total cation comprises one or more of $Na^+$, $K^+$, $Ca^{+2}$, and $Mg^{+2}$, provided that the total cation is about 0.1 mmol to about 20 mmol.

Aspect 84. The sweetener composition of Aspect 82, wherein the total cation comprises one or more of $Na^+$, $K^+$, $Ca^{+2}$, and $Mg^{+2}$, provided that the total cation is about 0.1 mmol to about 10 mmol.

Aspect 85. The sweetener composition of Aspect 82, wherein the total cation comprises about 1 mmol to about 10 mmol $Na^{+1}$.

Aspect 86. The sweetener composition of Aspect 85, wherein the total cation comprises about 5 mmol to about 10 mmol $Na^{+1}$.

Aspect 87. The sweetener composition of Aspect 82, wherein the total cation comprises about 1 mmol to about 10 mmol $K^{+}1$.

Aspect 88. The sweetener composition of Aspect 87, wherein the total cation comprises about 5 mmol to about 10 mmol $K^{+}1$.

Aspect 89. The sweetener composition of Aspect 82, wherein the total cation comprises about 1 mmol to about 10 mmol $Mg^{+2}$.

Aspect 90. The sweetener composition of Aspect 89, wherein the total cation comprises about 1 mmol to about 5 mmol $Mg^{+2}$.

Aspect 91. The sweetener composition of Aspect 82, wherein the total cation comprises about 1 mmol to about 10 mmol $Ca^{+2}$.

Aspect 92. The sweetener composition of Aspect 91, wherein the total cation comprises about 1 mmol to about 5 mmol $Ca^{+2}$.

Aspect 93. The sweetener composition of Aspect 82, wherein the total cation comprises about 1 mmol to about 10 mmol $Na^{+}1$; and about 1 mmol to about 10 mmol $K^{+}1$.

Aspect 94. The sweetener composition of Aspect 93, wherein the total cation comprises about 3 mmol to about 7 mmol $Na^{+}1$; and about 3 mmol to about 7 mmol $K^{+}1$.

Aspect 95. The sweetener composition of Aspect 93, wherein the total cation comprises about 4 mmol to about 6 mmol $Na^{+}1$; and about 4 mmol to about 6 mmol $K^{+}1$.

Aspect 96. The sweetener composition of Aspect 82, wherein the total cation comprises about 1 mmol to about 10 mmol $Na^{+}1$; and about 1 mmol to about 10 mmol $Mg^{+2}$.

Aspect 97. The sweetener composition of Aspect 96, wherein the total cation comprises about 3 mmol to about 7 mmol $Na^{+}1$; and about 3 mmol to about 7 mmol $Mg^{+2}$.

Aspect 98. The sweetener composition of Aspect 96, wherein the total cation comprises about 4 mmol to about 6 mmol $Na^{+}1$; and about 4 mmol to about 6 mmol $Mg^{+2}$.

Aspect 99. The sweetener composition of Aspect 82, wherein the total cation comprises about 1 mmol to about 10 mmol $Na^{+}1$; and about 1 mmol to about 10 mmol $Ca^{+2}$.

Aspect 100. The sweetener composition of Aspect 99, wherein the total cation comprises about 3 mmol to about 7 mmol $Na^{+}1$; and about 3 mmol to about 7 mmol $Ca^{+2}$.

Aspect 101. The sweetener composition of Aspect 99, wherein the total cation comprises about 4 mmol to about 6 mmol $Na^{+}1$; and about 4 mmol to about 6 mmol $Ca^{+2}$.

Aspect 102. The sweetener composition of Aspect 82, wherein the total cation comprises about 1 mmol to about 10 mmol $K^{+}1$; and about 1 mmol to about 10 mmol $Mg^{+2}$.

Aspect 103. The sweetener composition of Aspect 102, wherein the total cation comprises about 3 mmol to about 7 mmol $K^{+}1$; and about 3 mmol to about 7 mmol $Mg^{+2}$.

Aspect 104. The sweetener composition of Aspect 102, wherein the total cation comprises about 4 mmol to about 6 mmol $K^{+}1$; and about 4 mmol to about 6 mmol $Mg^{+2}$.

Aspect 105. The sweetener composition of Aspect 82, wherein the total cation comprises about 1 mmol to about 10 mmol $K^{+}1$; and about 1 mmol to about 10 mmol $Ca^{+2}$.

Aspect 106. The sweetener composition of Aspect 105, wherein the total cation comprises about 3 mmol to about 7 mmol $K^{+}1$; and about 3 mmol to about 7 mmol $Ca^{+2}$.

Aspect 107. The sweetener composition of Aspect 105, wherein the total cation comprises about 4 mmol to about 6 mmol $K^{+}1$; and about 4 mmol to about 6 mmol $Ca^{+2}$.

Aspect 108. The sweetener composition of Aspect 82, wherein the total cation comprises about 1 mmol to about 10 mmol $Mg^{+2}$; and about 1 mmol to about 10 mmol $Ca^{+2}$.

Aspect 109. The sweetener composition of Aspect 108, wherein the total cation comprises about 2 mmol to about 6 mmol $Mg^{+2}$; and about 2 mmol to about 6 mmol $Ca^{+2}$.

Aspect 110. The sweetener composition of Aspect 108, wherein the total cation comprises about 3 mmol to about 5 mmol $Mg^{+2}$; and about 3 mmol to about 5 mmol $Ca^{+2}$.

Aspect 111. The sweetener composition of Aspect 82, wherein the total cation comprises about 1 mmol to about 10 mmol $Na^{+}1$; about 1 mmol to about 10 mmol $K^{+}1$; and about 1 mmol to about 10 mmol $Mg^{+2}$.

Aspect 112. The sweetener composition of Aspect 111, wherein the total cation comprises about 1 mmol to about 5 mmol $Na^{+}1$; about 1 mmol to about 5 mmol $K^{+}1$; and about 1 mmol to about 5 mmol $Mg^{+2}$.

Aspect 113. The sweetener composition of Aspect 111, wherein the total cation comprises about 2.5 mmol to about 5 mmol $Na^{+}1$; about 2.5 mmol to about 5 mmol $K^{+}1$; and about 2.5 mmol to about 5 mmol $Mg^{+2}$.

Aspect 114. The sweetener composition of Aspect 82, wherein the total cation comprises about 1 mmol to about 10 mmol $Na^{+}1$; about 1 mmol to about 10 mmol $K^{+}1$; and about 1 mmol to about 10 mmol $Ca^{+2}$.

Aspect 115. The sweetener composition of Aspect 114, wherein the total cation comprises about 1 mmol to about 5 mmol $Na^{+}1$; about 1 mmol to about 5 mmol $K^{+}1$; and about 1 mmol to about 5 mmol $Ca^{+2}$.

Aspect 116. The sweetener composition of Aspect 114, wherein the total cation comprises about 2.5 mmol to about 5 mmol $Na^{+}1$; about 2.5 mmol to about 5 mmol $K^{+}1$; and about 2.5 mmol to about 5 mmol $Ca^{+2}$.

Aspect 117. The sweetener composition of Aspect 82, wherein the total cation comprises about 1 mmol to about 10 mmol $K^{+}1$; about 1 mmol to about 10 mmol $Mg^{+2}$; and about 1 mmol to about 10 mmol $Ca^{+2}$.

Aspect 118. The sweetener composition of Aspect 117, wherein the total cation comprises about 1 mmol to about 5 mmol $K^{+}1$; about 1 mmol to about 5 mmol $Mg^{+2}$; and about 1 mmol to about 5 mmol $Ca^{+2}$.

Aspect 119. The sweetener composition of Aspect 117, wherein the total cation comprises about 2.5 mmol to about 5 mmol $K^{+}1$; about 2.5 mmol to about 5 mmol $Mg^{+2}$; and about 2.5 mmol to about 5 mmol $Ca^{+2}$.

Aspect 120. The sweetener composition of Aspect 82, wherein the total cation comprises about 1 mmol to about 10 mmol $Na^{+}1$; about 1 mmol to about 10 mmol $K^{+}1$; about 1 mmol to about 10 mmol $Mg^{+2}$; and about 1 mmol to about 10 mmol $Ca^{+2}$.

Aspect 121. The sweetener composition of Aspect 120, wherein the total cation comprises about 1 mmol to about 4 mmol $Na^{+}1$; about 1 mmol to about 4 mmol $K^{+}1$; about 1 mmol to about 4 mmol $Mg^{+2}$; and about 1 mmol to about 4 mmol $Ca^{+2}$.

Aspect 122. The sweetener composition of Aspect 120, wherein the total cation comprises about 1 mmol to about 3 mmol $Na^{+}1$; about 1 mmol to about 3 mmol $K^{+}1$; about 1 mmol to about 3 mmol $Mg^{+2}$; and about 1 mmol to about 3 mmol $Ca^{+2}$.

Aspect 123. The sweetener composition of any one of Aspect 81-Aspect 122, wherein the ratio of the sweetening agent to the total cation is about 300 to about 1000 mg of the sweetening agent to the total cation.

Aspect 124. The sweetener composition of Aspect 123, wherein the ratio of the sweetening agent to the total cation is about 300 to about 900 mg of the sweetening agent to the total cation.

Aspect 125. The sweetener composition of Aspect 123, wherein the ratio of the sweetening agent to the total cation is about 300 to about 800 mg of the sweetening agent to the total cation.

Aspect 126. The sweetener composition of Aspect 123, wherein the ratio of the sweetening agent to the total cation is about 300 to about 700 mg of the sweetening agent to the total cation.

Aspect 127. The sweetener composition of Aspect 123, wherein the ratio of the sweetening agent to the total cation is about 300 to about 600 mg of the sweetening agent to the total cation.

Aspect 128. The sweetener composition of Aspect 123, wherein the ratio of the sweetening agent to the total cation is about 300 to about 500 mg of the sweetening agent to the total cation.

Aspect 129. The sweetener composition of Aspect 123, wherein the ratio of the sweetening agent to the total cation is about 400 to about 1000 mg of the sweetening agent to the total cation.

Aspect 130. The sweetener composition of Aspect 123, wherein the ratio of the sweetening agent to the total cation is about 400 to about 900 mg of the sweetening agent to the total cation.

Aspect 131. The sweetener composition of Aspect 123, wherein the ratio of the sweetening agent to the total cation is about 400 to about 800 mg of the sweetening agent to the total cation.

Aspect 132. The sweetener composition of Aspect 123, wherein the ratio of the sweetening agent to the total cation is about 400 to about 700 mg of the sweetening agent to the total cation.

Aspect 133. The sweetener composition of Aspect 123, wherein the ratio of the sweetening agent to the total cation is about 400 to about 600 mg of the sweetening agent to the total cation.

Aspect 134. The sweetener composition of Aspect 123, wherein the ratio of the sweetening agent to the total cation is about 400 to about 500 mg of the sweetening agent to the total cation.

Aspect 135. The sweetener composition of any one of Aspect 1-Aspect 134, wherein the sweetening agent is present in an amount effective to provide a concentration when present in a beverage, food, nutraceutical, pharmaceutical, or cosmetic from about 1 mg/L to about 1000 mg/L; and wherein a total cation is present in an effective amount to provide a concentration when present in a beverage, food, nutraceutical, pharmaceutical, or cosmetic from about 0.1 mM to about 30 mM; and wherein the total cation represents a sum of the first cation, and when present, the second cation, the third cation, and the fourth cation.

Aspect 136. The sweetener composition of Aspect 135, wherein the total cation is present in an effective amount to provide a concentration when present in a beverage, food, nutraceutical, pharmaceutical, or cosmetic from about 0.1 mM to about 10 mM $Na^+$, when $Na^+$ is present; from about 0.1 mM to about 20 mM $K^+$, when $K^+$ is present; from about 0.1 mM to about 5 mM Mg+, when Mg+ is present; from about 0.1 mM to about 5 mM $Ca^{+2}$, when $Ca^{+2}$ is present; and combinations thereof provided that the total cation present is from about 0.1 mM to about 50 mM.

Aspect 137. The sweetener composition of Aspect 136, wherein the total cation is present in an effective amount to provide a concentration when present in a beverage, food, nutraceutical, pharmaceutical, or cosmetic from about 0.1 mM to about 40 mM.

Aspect 138. The sweetener composition of Aspect 136, wherein the total cation is present in an effective amount to provide a concentration when present in a beverage, food, nutraceutical, pharmaceutical, or cosmetic from about 0.1 mM to about 30 mM.

Aspect 139. The sweetener composition of Aspect 136, wherein the total cation is present in an effective amount to provide a concentration when present in a beverage, food, nutraceutical, pharmaceutical, or cosmetic from about 0.1 mM to about 20 mM.

Aspect 140. The sweetener composition of Aspect 136, wherein the total cation is present in an effective amount to provide a concentration when present in a beverage, food, nutraceutical, pharmaceutical, or cosmetic from about 0.1 mM to about 10 mM.

Aspect 141. The sweetener composition of Aspect 136, wherein the total cation is present in an effective amount to provide a concentration when present in a beverage, food, nutraceutical, pharmaceutical, or cosmetic from about 1 mM to about 25 mM $Na^{+}1$.

Aspect 142. The sweetener composition of Aspect 141, wherein the total cation is present in an effective amount to provide a concentration when present in a beverage, food, nutraceutical, pharmaceutical, or cosmetic from about 1 mM to about 17.5 mM $Na^{+1}$.

Aspect 143. The sweetener composition of Aspect 141, wherein the total cation is present in an effective amount to provide a concentration when present in a beverage, food, nutraceutical, pharmaceutical, or cosmetic from about 1 mM to about 10 mM $Na^{+1}$.

Aspect 144. The sweetener composition of Aspect 141, wherein the total cation is present in an effective amount to provide a concentration when present in a beverage, food, nutraceutical, pharmaceutical, or cosmetic from about 5 mM to about 10 mM $Na^{+1}$.

Aspect 145. The sweetener composition of Aspect 136, wherein the total cation is present in an effective amount to provide a concentration when present in a beverage, food, nutraceutical, pharmaceutical, or cosmetic from about 1 mM to about 25 mM $K^{+1}$.

Aspect 146. The sweetener composition of Aspect 145, wherein the total cation is present in an effective amount to provide a concentration when present in a beverage, food, nutraceutical, pharmaceutical, or cosmetic from about 1 mM to about 17.5 mM $K^{+1}$.

Aspect 147. The sweetener composition of Aspect 145, wherein the total cation is present in an effective amount to provide a concentration when present in a beverage, food, nutraceutical, pharmaceutical, or cosmetic from about 1 mM to about 10 mM $K^{+1}$.

Aspect 148. The sweetener composition of Aspect 145, wherein the total cation is present in an effective amount to provide a concentration when present in a beverage, food, nutraceutical, pharmaceutical, or cosmetic from about 5 mM to about 10 mM $K^{+1}$.

Aspect 149. The sweetener composition of Aspect 145, wherein the total cation is present in an effective amount to provide a concentration when present in a beverage, food, nutraceutical, pharmaceutical, or cosmetic from about 1 mM to about 15 mM $Mg^{+2}$.

Aspect 150. The sweetener composition of Aspect 145, wherein the total cation is present in an effective amount to provide a concentration when present in a beverage, food, nutraceutical, pharmaceutical, or cosmetic from about 1 mM to about 10 mM $Mg^{+2}$.

Aspect 151. The sweetener composition of Aspect 145, wherein the total cation is present in an effective amount to provide a concentration when present in a beverage, food, nutraceutical, pharmaceutical, or cosmetic from about 3 mM to about 5 mM $Mg^{+2}$.

Aspect 152. The sweetener composition of Aspect 145, wherein the total cation is present in an effective amount to provide a concentration when present in a beverage, food, nutraceutical, pharmaceutical, or cosmetic from about 1 mM to about 5 mM $Mg^{+2}$.

Aspect 153. The sweetener composition of Aspect 136, wherein the total cation is present in an effective amount to provide a concentration when present in a beverage, food, nutraceutical, pharmaceutical, or cosmetic from about 1 mM to about 25 mM $Ca^{+2}$.

Aspect 154. The sweetener composition of Aspect 153, wherein the total cation is present in an effective amount to provide a concentration when present in a beverage, food, nutraceutical, pharmaceutical, or cosmetic from about 1 mM to about 17.5 mM $Ca^{+2}$.

Aspect 155. The sweetener composition of Aspect 153, wherein the total cation is present in an effective amount to provide a concentration when present in a beverage, food, nutraceutical, pharmaceutical, or cosmetic from about 1 mM to about 10 mM $Ca^{+2}$.

Aspect 156. The sweetener composition of Aspect 153, wherein the total cation is present in an effective amount to provide a concentration when present in a beverage, food, nutraceutical, pharmaceutical, or cosmetic from about 3 mM to about 6 mM $Ca^{+2}$.

Aspect 157. The sweetener composition of Aspect 153, wherein the total cation is present in an effective amount to provide a concentration when present in a beverage, food, nutraceutical, pharmaceutical, or cosmetic from about 1 mM to about 5 mM $Ca^{+2}$.

Aspect 158. The sweetener composition of Aspect 136, wherein the total cation is present in an effective amount to provide a concentration when present in a beverage, food, nutraceutical, pharmaceutical, or cosmetic from about 1 mM to about 10 mM $Na^{+1}$; and from about 1 mM to about 10 mM $K^{+1}$.

Aspect 159. The sweetener composition of Aspect 158, wherein the total cation is present in an effective amount to provide a concentration when present in a beverage, food, nutraceutical, pharmaceutical, or cosmetic from about 3 mM to about 7 mM $Na^{+1}$; and from about 3 mM to about 7 mM $K^{+1}$.

Aspect 160. The sweetener composition of Aspect 158, wherein the total cation is present in an effective amount to provide a concentration when present in a beverage, food, nutraceutical, pharmaceutical, or cosmetic from about 4 mM to about 6 mM $Na^{+1}$; and from about 4 mM to about 6 mM $K^{+1}$.

Aspect 161. The sweetener composition of Aspect 136, wherein the total cation is present in an effective amount to provide a concentration when present in a beverage, food, nutraceutical, pharmaceutical, or cosmetic from about 1 mM to about 10 mM $Na^{+1}$; and from about 1 mM to about 10 mM $Mg^{+2}$.

Aspect 162. The sweetener composition of Aspect 161, wherein the total cation is present in an effective amount to provide a concentration when present in a beverage, food, nutraceutical, pharmaceutical, or cosmetic from about 3 mM to about 7 mM $Na^{+1}$; and from about 3 mM to about 7 mM $Mg^{+2}$.

Aspect 163. The sweetener composition of Aspect 161, wherein the total cation is present in an effective amount to provide a concentration when present in a beverage, food, nutraceutical, pharmaceutical, or cosmetic from about 4 mM to about 6 mM $Na^{+1}$; and from about 4 mM to about 6 mM $Mg^{+2}$.

Aspect 164. The sweetener composition of Aspect 136, wherein the total cation is present in an effective amount to provide a concentration when present in a beverage, food, nutraceutical, pharmaceutical, or cosmetic from about 1 mM to about 10 mM $Na^{+1}$; and from about 1 mM to about 10 mM $Ca^{+2}$.

Aspect 165. The sweetener composition of Aspect 164, wherein the total cation is present in an effective amount to provide a concentration when present in a beverage, food, nutraceutical, pharmaceutical, or cosmetic from about 3 mM to about 7 mM $Na^{+1}$; and from about 3 mM to about 7 mM $Ca^{+2}$.

Aspect 166. The sweetener composition of Aspect 164, wherein the total cation is present in an effective amount to provide a concentration when present in a beverage, food, nutraceutical, pharmaceutical, or cosmetic from about 4 mM to about 6 mM $Na^{+1}$; and from about 4 mM to about 6 mM $Ca^{+2}$.

Aspect 167. The sweetener composition of Aspect 136, wherein the total cation is present in an effective amount to provide a concentration when present in a beverage, food, nutraceutical, pharmaceutical, or cosmetic from about 1 mM to about 10 mM $K^{+1}$; and from about 1 mM to about 10 mM $Mg^{+2}$.

Aspect 168. The sweetener composition of Aspect 167, wherein the total cation is present in an effective amount to provide a concentration when present in a beverage, food, nutraceutical, pharmaceutical, or cosmetic from about 3 mM to about 7 mM $K^{+1}$; and from about 3 mM to about 7 mM $Mg^{+2}$.

Aspect 169. The sweetener composition of Aspect 167, wherein the total cation is present in an effective amount to provide a concentration when present in a beverage, food, nutraceutical, pharmaceutical, or cosmetic from about 4 mM to about 6 mM $K^{+1}$; and from about 4 mM to about 6 mM $Mg^{+2}$.

Aspect 170. The sweetener composition of Aspect 136, wherein the total cation is present in an effective amount to provide a concentration when present in a beverage, food, nutraceutical, pharmaceutical, or cosmetic from about 1 mM to about 10 mM $K^{+1}$; and from about 1 mM to about 10 mM $Ca^{+2}$.

Aspect 171. The sweetener composition of Aspect 170, wherein the total cation is present in an effective amount to provide a concentration when present in a beverage, food, nutraceutical, pharmaceutical, or cosmetic from about 3 mM to about 7 mM $K^{+1}$; and from about 3 mM to about 7 mM $Ca^{+2}$.

Aspect 172. The sweetener composition of Aspect 170, wherein the total cation is present in an effective amount to provide a concentration when present in a beverage, food, nutraceutical, pharmaceutical, or cosmetic from about 4 mM to about 6 mM $K^{+1}$; and from about 4 mM to about 6 mM $Ca^{+2}$.

Aspect 173. The sweetener composition of Aspect 136, wherein the total cation is present in an effective amount to provide a concentration when present in a beverage, food, nutraceutical, pharmaceutical, or cosmetic from about 1 mM to about 10 mM $Mg^{+2}$; and from about 1 mM to about 10 mM $Ca^{+2}$.

Aspect 174. The sweetener composition of Aspect 173, wherein the total cation is present in an effective amount to provide a concentration when present in a beverage, food, nutraceutical, pharmaceutical, or cosmetic from about 2 mM to about 6 mM $Mg^{+2}$; and from about 2 mM to about 6 mM $Ca^{+2}$.

Aspect 175. The sweetener composition of Aspect 173, wherein the total cation is present in an effective amount to provide a concentration when present in a beverage, food, nutraceutical, pharmaceutical, or cosmetic from about 3 mM to about 5 mM $Mg^{+2}$; and from about 3 mM to about 5 mM $Ca^{+2}$.

Aspect 176. The sweetener composition of Aspect 136, wherein the total cation is present in an effective amount to provide a concentration when present in a beverage, food, nutraceutical, pharmaceutical, or cosmetic from about 1 mM to about 10 mM $Na^{+1}$; from about 1 mM to about 10 mM $K^{+1}$; and from about 1 mM to about 10 mM $Mg^{+2}$.

Aspect 177. The sweetener composition of Aspect 176, wherein the total cation is present in an effective amount to provide a concentration when present in a beverage, food, nutraceutical, pharmaceutical, or cosmetic of about 1 mM to about 5 mM $Na^{+1}$; about 1 mM to about 5 mM $K^{+1}$; and about 1 mM to about 5 mM $Mg^{+2}$.

Aspect 178. The sweetener composition of Aspect 176, wherein the total cation is present in an effective amount to provide a concentration when present in a beverage, food, nutraceutical, pharmaceutical, or cosmetic from about 2.5 mM to about 5 mM $Na^{+1}$; from about 2.5 mM to about 5 mM $K^{+1}$; and from about 2.5 mM to about 5 mM $Mg^{+2}$.

Aspect 179. The sweetener composition of Aspect 136, wherein the total cation is present in an effective amount to provide a concentration when present in a beverage, food, nutraceutical, pharmaceutical, or cosmetic from about 1 mM to about 10 mM $Na^{+1}$; from about 1 mM to about 10 mM $K^{+1}$; and from about 1 mM to about 10 mM $Ca^{+2}$.

Aspect 180. The sweetener composition of Aspect 179, wherein the total cation is present in an effective amount to provide a concentration when present in a beverage, food, nutraceutical, pharmaceutical, or cosmetic from about 1 mM to about 5 mM $Na^{+1}$; from about 1 mM to about 5 mM $K^{+1}$; and from about 1 mM to about 5 mM $Ca^{+2}$.

Aspect 181. The sweetener composition of Aspect 179, wherein the total cation is present in an effective amount to provide a concentration when present in a beverage, food, nutraceutical, pharmaceutical, or cosmetic from about 2.5 mM to about 5 mM $Na^{+1}$; from about 2.5 mM to about 5 mM $K^{+1}$; and from about 2.5 mM to about 5 mM $Ca^{+2}$.

Aspect 182. The sweetener composition of Aspect 136, wherein the total cation is present in an effective amount to provide a concentration when present in a beverage, food, nutraceutical, pharmaceutical, or cosmetic from about 1 mM to about 10 mM $K^{+1}$; from about 1 mM to about 10 mM $Mg^{+2}$; and from about 1 mM to about 10 mM $Ca^{+2}$.

Aspect 183. The sweetener composition of Aspect 182, wherein the total cation is present in an effective amount to provide a concentration when present in a beverage, food, nutraceutical, pharmaceutical, or cosmetic from about 1 mM to about 5 mM $K^{+1}$; from about 1 mM to about 5 mM $Mg^{+2}$; and from about 1 mM to about 5 mM $Ca^{+2}$.

Aspect 184. The sweetener composition of Aspect 182, wherein the total cation is present in an effective amount to provide a concentration when present in a beverage, food, nutraceutical, pharmaceutical, or cosmetic from about 2.5 mM to about 5 mM $K^{+1}$; from about 2.5 mM to about 5 mM $Mg^{+2}$; and from about 2.5 mM to about 5 mM $Ca^{+2}$.

Aspect 185. The sweetener composition of Aspect 136, wherein the total cation is present in an effective amount to provide a concentration when present in a beverage, food, nutraceutical, pharmaceutical, or cosmetic from about 1 mM to about 10 mM $Na^{+1}$; from about 1 mM to about 10 mM $K^{+1}$; from about 1 mM to about 10 mM $Mg^{+2}$; and from about 1 mM to about 10 mM $Ca^{+2}$.

Aspect 186. The sweetener composition of Aspect 185, wherein the total cation is present in an effective amount to provide a concentration when present in a beverage, food, nutraceutical, pharmaceutical, or cosmetic from about 1 mM to about 4 mM $Na^{+1}$; from about 1 mM to about 4 mM $K^{+1}$; from about 1 mM to about 4 mM $Mg^{+2}$; and from about 1 mM to about 4 mM $Ca^{+2}$.

Aspect 187. The sweetener composition of Aspect 185, wherein the total cation is present in an effective amount to provide a concentration when present in a beverage, food, nutraceutical, pharmaceutical, or cosmetic from about 1 mM to about 3 mM $Na^{+1}$; from about 1 mM to about 3 mM $K^{+1}$; from about 1 mM to about 3 mM $Mg^{+2}$; and from about 1 mM to about 3 mM $Ca^{+2}$.

Aspect 188. The sweetener composition of any one of Aspect 135-Aspect 187, wherein the sweetening agent is present in an amount effective to provide a concentration when present in a beverage, food, nutraceutical, pharmaceutical, or cosmetic from about 1 to about 1000 mg/L.

Aspect 189. The sweetener composition of Aspect 188, wherein the sweetening agent is present in an amount effective to provide a concentration when present in a beverage, food, nutraceutical, pharmaceutical, or cosmetic from about 1 to about 500 mg/L.

Aspect 190. The sweetener composition of Aspect 188, wherein the sweetening agent is present in an amount effective to provide a concentration when present in a beverage, food, nutraceutical, pharmaceutical, or cosmetic from about 1 to about 400 mg/L.

Aspect 191. The sweetener composition of Aspect 188, wherein the sweetening agent is present in an amount effective to provide a concentration when present in a beverage, food, nutraceutical, pharmaceutical, or cosmetic from about 1 to about 300 mg/L.

Aspect 192. The sweetener composition of Aspect 188, wherein the sweetening agent is present in an amount effective to provide a concentration when present in a beverage, food, nutraceutical, pharmaceutical, or cosmetic from about 1 to about 200 mg/L.

Aspect 193. The sweetener composition of Aspect 188, wherein the sweetening agent is present in an amount effective to provide a concentration when present in a beverage, food, nutraceutical, pharmaceutical, or cosmetic from about 1 to about 100 mg/L.

Aspect 194. The sweetener composition of Aspect 188, wherein the sweetening agent is present in an amount effective to provide a concentration when present in a beverage, food, nutraceutical, pharmaceutical, or cosmetic from about 1 to about 50 mg/L.

Aspect 195. The sweetener composition of Aspect 188, wherein the sweetening agent is present in an amount of about 1 to about 25 mg/L.

Aspect 196. The sweetener composition of Aspect 188, wherein the sweetening agent is present in an amount effective to provide a concentration when present in a beverage, food, nutraceutical, pharmaceutical, or cosmetic from about 1 to about 10 mg/L.

Aspect 197. The sweetener composition of Aspect 188, wherein the sweetening agent is present in an amount effective to provide a concentration when present in a beverage, food, nutraceutical, pharmaceutical, or cosmetic from about 300 to about 900 mg/L.

Aspect 198. The sweetener composition of Aspect 188, wherein the sweetening agent is present in an amount effective to provide a concentration when present in a beverage, food, nutraceutical, pharmaceutical, or cosmetic from about 300 to about 800 mg/L.

Aspect 199. The sweetener composition of Aspect 188, wherein the sweetening agent is present in an amount effective to provide a concentration when present in a beverage, food, nutraceutical, pharmaceutical, or cosmetic from about 300 to about 700 mg/L.

Aspect 200. The sweetener composition of Aspect 188, wherein the sweetening agent is present in an amount effective to provide a concentration when present in a beverage, food, nutraceutical, pharmaceutical, or cosmetic from about 300 to about 600 mg/L.

Aspect 201. The sweetener composition of Aspect 188, wherein the sweetening agent is present in an amount effective to provide a concentration when present in a beverage, food, nutraceutical, pharmaceutical, or cosmetic from about 300 to about 500 mg/L.

Aspect 202. The sweetener composition of Aspect 188, wherein the sweetening agent is present in an amount effective to provide a concentration when present in a beverage, food, nutraceutical, pharmaceutical, or cosmetic from about 400 to about 1000 mg/L.

Aspect 203. The sweetener composition of Aspect 188, wherein the sweetening agent is present in an amount effective to provide a concentration when present in a beverage, food, nutraceutical, pharmaceutical, or cosmetic from about 400 to about 800 mg/L.

Aspect 204. The sweetener composition of Aspect 188, wherein the sweetening agent is present in an amount effective to provide a concentration when present in a beverage, food, nutraceutical, pharmaceutical, or cosmetic from about 400 to about 700 mg/L.

Aspect 205. The sweetener composition of Aspect 188, wherein the sweetening agent is present in an amount effective to provide a concentration when present in a beverage, food, nutraceutical, pharmaceutical, or cosmetic from about 400 to about 600 mg/L.

Aspect 206. The sweetener composition of Aspect 188, wherein the sweetening agent is present in an amount effective to provide a concentration when present in a beverage, food, nutraceutical, pharmaceutical, or cosmetic from 400 to about 500 mg/L.

Aspect 207. The sweetener composition of any one of Aspect 1-Aspect 206, wherein the sweetener composition is a powder, a particulate, an agglomerated solid, a solid, a gel, or combinations thereof.

Aspect 208. The sweetener composition of Aspect 207, wherein the sweetener composition is a powder.

Aspect 209. The sweetener composition of Aspect 207, wherein the sweetener composition is an agglomerated solid.

Aspect 210. The sweetener composition of Aspect 207, wherein the sweetener composition is a particulate; and wherein the particulate comprises a nanoparticle, a microparticle, or combinations thereof.

Aspect 211. A method for making the sweetener composition of any one of Aspect 1-Aspect 210, comprising: mixing a taste modulator component comprising a first salt having a first cation selected from $Na^+$, $K^+$, $Ca^{+2}$, and $Mg^{+2}$; and a sweetening agent; wherein the mixing is carried out until a mixture of the taste modulator and the sweetening agent is essentially homogenous.

Aspect 212. The method of Aspect 211, wherein mixing is carried out using a rotating drum mixer.

Aspect 213. The method of Aspect 211 or Aspect 212, further comprising mixing a solvent with the taste modulator and the sweetening agent; and mixing the taste modulator, the sweetening agent, and the solvent until a solution or a suspension is essentially homogeneous.

Aspect 214. The method of Aspect 213, wherein the solvent comprises water.

Aspect 215. The method of Aspect 213 or Aspect 214, further comprising spray-drying the solution or the suspension.

Aspect 216. The method of Aspect 213 or Aspect 214, further comprising lyophilizing the solution or the suspension.

Aspect 217. The method of Aspect 211 or Aspect 212, further comprising tableting the mixture.

Aspect 218. A product comprising the sweetener composition of any one of Aspect 1-Aspect 210.

Aspect 219. The product of Aspect 218, wherein the product is a beverage, a food, a nutraceutical, or a concentrated sweetener composition.

Aspect 220. The product of Aspect 219, wherein the product is a beverage.

Aspect 221. The product of any one of Aspect 218-Aspect 220, wherein the product is a carbonated beverage.

Aspect 222. The product of any one of Aspect 218-Aspect 220, wherein the product is a non-carbonated beverage.

Aspect 223. The product of any one of Aspect 218-Aspect 222, wherein the sweetener composition comprises from about 0.1 mM to about 30 mM of a total cation; and wherein the total cation represents a sum of the first cation, and when present, the second cation, the third cation, and the fourth cation.

Aspect 224. The product of Aspect 223, wherein the total cation is present in an amount from about 0.1 mM to about 10 mM $Na^+$, when $Na^+$ is present; from about 0.1 mM to about 20 mM $K^+$, when $K^+$ is present; from about 0.1 mM to about 5 mM Mg+, when Mg+ is present; from about 0.1 mM to about 5 mM $Ca^{+2}$, when $Ca^{+2}$ is present; and combinations thereof provided that the total cation present is from about 0.1 mM to about 50 mM.

Aspect 225. The product of Aspect 224, wherein the total cation present is from about 0.1 mM to about 40 mM.

Aspect 226. The product of Aspect 224, wherein the total cation present is from about 0.1 mM to about 30 mM.

Aspect 227. The product of Aspect 224, wherein the total cation present is from about 0.1 mM to about 20 mM.

Aspect 228. The product of Aspect 224, wherein the total cation present is from about 0.1 mM to about 10 mM.

Aspect 229. The product of Aspect 224, wherein the total cation present is from about 1 mM to about 25 mM $Na^+1$.

Aspect 230. The product of Aspect 229, wherein the total cation present is from about 1 mM to about 17.5 mM $Na^+1$.

Aspect 231. The product of Aspect 229, wherein the total cation present is from about 1 mM to about 10 mM $Na^+1$.

Aspect 232. The product of Aspect 229, wherein the total cation present is from about 5 mM to about 10 mM $Na^+1$.

Aspect 233. The product of Aspect 224, wherein the total cation present is from about 1 mM to about 25 mM $K^+1$.

Aspect 234. The product of Aspect 233, wherein the total cation present is from about 1 mM to about 17.5 mM $K^+1$.

Aspect 235. The product of Aspect 233, wherein the total cation present is from about 1 mM to about 10 mM $K^+1$.

Aspect 236. The product of Aspect 233, wherein the total cation present is from about 5 mM to about 10 mM $K^+1$.

Aspect 237. The product of Aspect 233, wherein the total cation present is from about 1 mM to about 15 mM $Mg^{+2}$.

Aspect 238. The product of Aspect 233, wherein the total cation present is from about 1 mM to about 10 mM $Mg^{+2}$.

Aspect 239. The product of Aspect 233, wherein the total cation present is from about 3 mM to about 5 mM $Mg^{+2}$.

Aspect 240. The product of Aspect 233, wherein the total cation present is from about 1 mM to about 5 mM $Mg^{+2}$.

Aspect 241. The product of Aspect 224, wherein the total cation present is from about 1 mM to about 25 mM $Ca^{+2}$.

Aspect 242. The product of Aspect 241, wherein the total cation present is from about 1 mM to about 17.5 mM $Ca^{+2}$.

Aspect 243. The product of Aspect 241, wherein the total cation present is from about 1 mM to about 10 mM $Ca^{+2}$.

Aspect 244. The product of Aspect 241, wherein the total cation present is from about 3 mM to about 6 mM $Ca^{+2}$.

Aspect 245. The product of Aspect 241, wherein the total cation present is from about 1 mM to about 5 mM $Ca^{+2}$.

Aspect 246. The product of Aspect 224, wherein the total cation present is from about 1 mM to about 10 mM $Na^+1$; and from about 1 mM to about 10 mM $K^+1$.

Aspect 247. The product of Aspect 246, wherein the total cation present is from about 3 mM to about 7 mM $Na^+1$; and from about 3 mM to about 7 mM $K^+1$.

Aspect 248. The product of Aspect 246, wherein the total cation present is from about 4 mM to about 6 mM $Na^+1$; and from about 4 mM to about 6 mM $K^+1$.

Aspect 249. The product of Aspect 224, wherein the total cation present is from about 1 mM to about 10 mM $Na^+1$; and from about 1 mM to about 10 mM $Mg^{+2}$.

Aspect 250. The product of Aspect 249, wherein the total cation present is from about 3 mM to about 7 mM $Na^+1$; and from about 3 mM to about 7 mM $Mg^{+2}$.

Aspect 251. The product of Aspect 249, wherein the total cation present is from about 4 mM to about 6 mM $Na^+1$; and from about 4 mM to about 6 mM $Mg^{+2}$.

Aspect 252. The product of Aspect 224, wherein the total cation present is from about 1 mM to about 10 mM $Na^+1$; and from about 1 mM to about 10 mM $Ca^{+2}$.

Aspect 253. The product of Aspect 252, wherein the total cation present is from about 3 mM to about 7 mM $Na^+1$; and from about 3 mM to about 7 mM $Ca^{+2}$.

Aspect 254. The product of Aspect 252, wherein the total cation present is from about 4 mM to about 6 mM $Na^+1$; and from about 4 mM to about 6 mM $Ca^{+2}$.

Aspect 255. The product of Aspect 224, wherein the total cation present is from about 1 mM to about 10 mM $K^+1$; and from about 1 mM to about 10 mM $Mg^{+2}$.

Aspect 256. The product of Aspect 255, wherein the total cation present is from about 3 mM to about 7 mM $K^+1$; and from about 3 mM to about 7 mM $Mg^{+2}$.

Aspect 257. The product of Aspect 255, wherein the total cation present is from about 4 mM to about 6 mM $K^+1$; and from about 4 mM to about 6 mM $Mg^{+2}$.

Aspect 258. The product of Aspect 224, wherein the total cation present is from about 1 mM to about 10 mM $K^+1$; and from about 1 mM to about 10 mM $Ca^{+2}$.

Aspect 259. The product of Aspect 258, wherein the total cation present is from about 3 mM to about 7 mM $K^+1$; and from about 3 mM to about 7 mM $Ca^{+2}$.

Aspect 260. The product of Aspect 258, wherein the total cation present is from about 4 mM to about 6 mM $K^+1$; and from about 4 mM to about 6 mM $Ca^{+2}$.

Aspect 261. The product of Aspect 224, wherein the total cation present is from about 1 mM to about 10 mM $Mg^{+2}$; and from about 1 mM to about 10 mM $Ca^{+2}$.

Aspect 262. The product of Aspect 261, wherein the total cation present is from about 2 mM to about 6 mM $Mg^{+2}$; and from about 2 mM to about 6 mM $Ca^{+2}$.

Aspect 263. The product of Aspect 261, wherein the total cation present is from about 3 mM to about 5 mM $Mg^{+2}$; and from about 3 mM to about 5 mM $Ca^{+2}$.

Aspect 264. The product of Aspect 224, wherein the total cation present is from about 1 mM to about 10 mM $Na^+1$; from about 1 mM to about 10 mM $K^+1$; and from about 1 mM to about 10 mM $Mg^{+2}$.

Aspect 265. The product of Aspect 264, wherein the total cation present is from about 1 mM to about 5 mM $Na^+1$; from about 1 mM to about 5 mM $K^+1$; and from about 1 mM to about 5 mM $Mg^{+2}$.

Aspect 266. The product of Aspect 264, wherein the total cation present is from about 2.5 mM to about 5 mM $Na^+1$; from about 2.5 mM to about 5 mM $K^+1$; and from about 2.5 mM to about 5 mM $Mg^{+2}$.

Aspect 267. The product of Aspect 224, wherein the total cation present is from about 1 mM to about 10 mM $Na^+1$; from about 1 mM to about 10 mM $K^+1$; and from about 1 mM to about 10 mM $Ca^{+2}$.

Aspect 268. The product of Aspect 267, wherein the total cation present is from about 1 mM to about 5 mM $Na^+1$; from about 1 mM to about 5 mM $K^+1$; and from about 1 mM to about 5 mM $Ca^{+2}$.

Aspect 269. The product of Aspect 267, wherein the total cation present is from about 2.5 mM to about 5 mM $Na^+1$; from about 2.5 mM to about 5 mM $K^+1$; and from about 2.5 mM to about 5 mM $Ca^{+2}$.

Aspect 270. The product of Aspect 224, wherein the total cation present is from about 1 mM to about 10 mM $K^+1$; from about 1 mM to about 10 mM $Mg^{+2}$; and from about 1 mM to about 10 mM $Ca^{+2}$.

Aspect 271. The product of Aspect 270, wherein the total cation present is from about 1 mM to about 5 mM $K^+1$; from about 1 mM to about 5 mM $Mg^{+2}$; and from about 1 mM to about 5 mM $Ca^{+2}$.

Aspect 272. The product of Aspect 270, wherein the total cation present is from about 2.5 mM to about 5 mM $K^+1$; from about 2.5 mM to about 5 mM $Mg^{+2}$; and from about 2.5 mM to about 5 mM $Ca^{+2}$.

Aspect 273. The product of Aspect 224, wherein the total cation present is from about 1 mM to about 10 mM $Na^+1$; from about 1 mM to about 10 mM $K^+1$; from about 1 mM to about 10 mM $Mg^{+2}$; and from about 1 mM to about 10 mM $Ca^{+2}$.

Aspect 274. The product of Aspect 273, wherein the total cation present is from about 1 mM to about 4 mM $Na^+1$; from about 1 mM to about 4 mM $K^+1$; from about 1 mM to about 4 mM $Mg^{+2}$; and from about 1 mM to about 4 mM $Ca^{+2}$.

Aspect 275. The product of Aspect 273, wherein the total cation present is from about 1 mM to about 3 mM $Na^+1$; from about 1 mM to about 3 mM $K^+1$; from about 1 mM to about 3 mM $Mg^{+2}$; and from about 1 mM to about 3 mM $Ca^{+2}$.

Aspect 276. The product of any one of Aspect 218-Aspect 275, wherein the sweetening agent is present in an amount from about 1 to about 1000 mg/L.

Aspect 277. The product of Aspect 276, wherein the sweetening agent is present in an amount from about 1 to about 500 mg/L.

Aspect 278. The product of Aspect 276, wherein the sweetening agent is present in an amount from about 1 to about 400 mg/L.

Aspect 279. The product of Aspect 276, wherein the sweetening agent is present in an amount from about 1 to about 300 mg/L.

Aspect 280. The product of Aspect 276, wherein the sweetening agent is present in an amount from about 1 to about 200 mg/L.

Aspect 281. The product of Aspect 276, wherein the sweetening agent is present in an amount from about 1 to about 100 mg/L.

Aspect 282. The product of Aspect 276, wherein the sweetening agent is present in an amount from about 1 to about 50 mg/L.

Aspect 283. The product of Aspect 276, wherein the sweetening agent is present in an amount from about 1 to about 25 mg/L.

Aspect 284. The product of Aspect 276, wherein the sweetening agent is present in an amount from about 1 to about 10 mg/L.

Aspect 285. The product of Aspect 276, wherein the sweetening agent is present in an amount from about 300 to about 900 mg/L.

Aspect 286. The product of Aspect 276, wherein the sweetening agent is present in an amount from about 300 to about 800 mg/L.

Aspect 287. The product of Aspect 276, wherein the sweetening agent is present in an amount from about 300 to about 700 mg/L.

Aspect 288. The product of Aspect 276, wherein the sweetening agent is present in an amount from about 300 to about 600 mg/L.

Aspect 289. The product of Aspect 276, wherein the sweetening agent is present in an amount from about 300 to about 500 mg/L.

Aspect 290. The product of Aspect 276, wherein the sweetening agent is present in an amount from about 400 to about 1000 mg/L.

Aspect 291. The product of Aspect 276, wherein the sweetening agent is present in an amount from about 400 to about 900 mg/L.

Aspect 292. The product of Aspect 276, wherein the sweetening agent is present in an amount from about 400 to about 800 mg/L.

Aspect 293. The product of Aspect 276, wherein the sweetening agent is present in an amount from about 400 to about 700 mg/L.

Aspect 294. The product of Aspect 276, wherein the sweetening agent is present in an amount from about 400 to about 600 mg/L.

Aspect 295. The product of Aspect 276, wherein the sweetening agent is present in an amount from about 400 to about 500 mg/L.

Aspect 296. A taste modulator composition comprising: a first taste modulator component comprising a first salt having a first cation selected from $Na^+$, $K^+$, $Ca^{+2}$, and $Mg^{+2}$.

Aspect 297. The taste modulator composition of Aspect 296, wherein the first salt has a first anion comprising gluconate ($C_6H_{11}O_7^{-1}$), citrate ($C_6H_5O_7^{-3}$), hydrogen citrate ($C_6H_6O_7^{-2}$), dihydrogen citrate ($C_6H_7O_7^{-1}$), malate ($C_4H_6O_5^{-2}$), hydrogen malate ($C_4H_7O_5^{-1}$), maleate ($C_4H_2O_4^{-2}$), hydrogen maleate ($C_4H_3O_4^{-1}$), fumarate ($C_4H_2O_4^{-2}$), hydrogen fumarate ($C_4H_3O_4^{-1}$), succinate ($C_4H_4O_4^{-2}$), hydrogen succinate ($C_4H_5O_4^{-1}$), glutarate ($C_5H_6O_4^{-2}$), hydrogen glutarate ($C_5H_7O_4^{-1}$), adipate $C_6H_8O_4^{-2}$), hydrogen adipate ($C_6H_9O_4^{-1}$), lactate ($C_3H_5O_3^{-1}$), tartrate (C4H4O6-2), bitartrate (C4H5O6-1), phosphate ($PO_4^{-3}$), monohydrogen phosphate ($HPO_4^{-2}$), dihydrogen phosphate ($H_2PO_4^{-1}$), fluoride ($F^{-1}$), chloride ($Cl^{-1}$), sulfate ($SO_4^{-2}$), bisulfate ($HSO_4^{-1}$), nitrate ($NO_3^{-1}$), carbonate ($CO_3^{-2}$), bicarbonate ($HCO_3^{-1}$), glycerate ($C_3H_5O_4^{-1}$), glycolate ($C_2H_3O_3^{-1}$), or combinations thereof.

Aspect 298. The taste modulator composition of Aspect 297, where the first anion comprises citrate ($C_6H_5O_7^{-3}$), chloride ($Cl^{-1}$), phosphate ($PO_4^{-3}$), carbonate ($CO_3^{-2}$), sulfate ($SO_4^{-2}$), and combinations thereof.

Aspect 299. The taste modulator composition of Aspect 297, where the first anion comprises citrate ($C_6H_5O_7^{-3}$), sulfate ($SO_4^{-2}$), or combinations thereof.

Aspect 300. The taste modulator composition of Aspect 297, where the first anion comprises sulfate ($SO_4^{-2}$).

Aspect 301. The taste modulator composition of Aspect 297, where the first anion comprises citrate ($C_6H_5O_7^{-3}$).

Aspect 302. The taste modulator composition of Aspect 297, where the first anion comprises chloride ($Cl^{-1}$).

Aspect 303. The taste modulator composition of any one of Aspect 296-Aspect 302, wherein the taste modulator composition further comprises a second modulator component comprising a second salt having a second cation selected from $Na^+$, $K^+$, $Ca^{+2}$, and $Mg^{+2}$.

Aspect 304. The taste modulator composition of Aspect 303, wherein the first cation and the second cation are not the same.

Aspect 305. The taste modulator composition of Aspect 304, wherein the first cation and the second cation are not the same; and wherein the first anion and the second anion are the same.

Aspect 306. The taste modulator composition of Aspect 303, wherein the first cation and the second cation are the same; and wherein the first anion and the second anion are not the same.

Aspect 307. The taste modulator composition of any one of Aspect 303-Aspect 306, wherein the second salt has a second anion comprising gluconate ($C_6H_{11}O_7^{-1}$), citrate ($C_6H_5O_7^{-3}$), hydrogen citrate ($C_6H_6O_7^{-2}$), dihydrogen citrate ($C_6H_7O_7^{-1}$), malate ($C_4H_6O_5^{-2}$), hydrogen malate ($C_4H_7O_5^{-1}$), maleate ($C_4H_2O_4^{-2}$), hydrogen maleate ($C_4H_3O_4^{-1}$), fumarate ($C_4H_2O_4^{-2}$), hydrogen fumarate ($C_4H_3O_4^{-1}$), succinate ($C_4H_4O_4^{-2}$), hydrogen succinate ($C_4H_5O_4^{-1}$), glutarate ($C_5H_6O_4^{-2}$), hydrogen glutarate ($C_5H_7O_4^{-1}$), adipate $C_6H_8O_4^{-2}$), hydrogen adipate ($C_6H_9O_4^{-1}$), lactate ($C_3H_5O_3^{-1}$), tartrate (C4H4O6-2), bitartrate (C4H5O6-1), phosphate ($PO_4^{-3}$), monohydrogen phosphate ($HPO_4^{-2}$), dihydrogen phosphate ($H_2PO_4^{-1}$), fluoride ($F^{-1}$), chloride ($Cl^{-1}$), sulfate ($SO_4^{-2}$), bisulfate ($HSO_4^{-1}$), nitrate ($NO_3^{-1}$), carbonate ($CO_3^{-2}$), bicarbonate ($HCO_3^{-1}$), glycerate ($C_3H_5O_4^{-1}$), glycolate ($C_2H_3O_3^{-1}$), or combinations thereof.

Aspect 308. The taste modulator composition of Aspect 307, where the second anion comprises citrate ($C_6H_5O_7^{-3}$), chloride ($Cl^{-1}$), phosphate ($PO_4^{-3}$), carbonate ($CO_3^{-2}$), sulfate ($SO_4^{-2}$), and combinations thereof.

Aspect 309. The taste modulator composition of Aspect 307, where the second anion comprises citrate ($C_6H_5O_7^{-3}$), sulfate ($SO_4^{-2}$), or combinations thereof.

Aspect 310. The taste modulator composition of Aspect 307, where the second anion comprises sulfate ($SO_4^{-2}$).

Aspect 311. The taste modulator composition of Aspect 307, where the second anion comprises citrate ($C_6H_5O_7^{-3}$).

Aspect 312. The taste modulator composition of Aspect 307, where the second anion comprises chloride ($Cl^{-1}$).

Aspect 313. The taste modulator composition of any one of Aspect 296-Aspect 312, wherein the taste modulator composition further comprises a third modulator component comprising a third salt having a third cation selected from $Na^+$, $K^+$, $Ca^{+2}$, and $Mg^{+2}$.

Aspect 314. The taste modulator composition of Aspect 313, wherein the first cation, the second cation, and the third cation are not the same.

Aspect 315. The taste modulator composition of Aspect 314, wherein the first cation, the second cation, and the third cation are not the same; and wherein the first anion, the second anion, and the third anion are the same.

Aspect 316. The taste modulator composition of Aspect 313, wherein the first cation, the second cation, and the third cation are the same; and wherein the first anion, the second anion, and the third anion are not the same.

Aspect 317. The taste modulator composition of any one of Aspect 313-Aspect 316, wherein the third salt has a third anion comprising gluconate ($C_6H_{11}O_7^{-1}$), citrate ($C_6H_5O_7^{-3}$), hydrogen citrate ($C_6H_6O_7^{-2}$), dihydrogen citrate ($C_6H_7O_7^{-1}$), malate ($C_4H_6O_5^{-2}$), hydrogen malate ($C_4H_7O_5^{-1}$), maleate ($C_4H_2O_4^{-2}$), hydrogen maleate ($C_4H_3O_4^{-1}$), fumarate ($C_4H_2O_4^{-2}$), hydrogen fumarate ($C_4H_3O_4^{-1}$), succinate ($C_4H_4O_4^{-2}$), hydrogen succinate ($C_4H_5O_4^{-1}$), glutarate ($C_5H_6O_4^{-2}$), hydrogen glutarate ($C_5H_7O_4^{-1}$), adipate $C_6H_8O_4^{-2}$), hydrogen adipate ($C_6H_9O_4^{-1}$), lactate ($C_3H_5O_3^{-1}$), tartrate (C4H4O6-2), bitartrate (C4H5O6-1), phosphate ($PO_4^{-3}$), monohydrogen phosphate ($HPO_4^{-2}$), dihydrogen phosphate ($H_2PO_4^{-1}$), fluoride ($F^{-1}$), chloride ($Cl^{-1}$), sulfate ($SO_4^{-2}$), bisulfate ($HSO_4^{-1}$), nitrate ($NO_3^{-1}$), carbonate ($CO_3^{-2}$), bicarbonate ($HCO_3^{-1}$), glycerate ($C_3H_5O_4^{-1}$), glycolate ($C_2H_3O_3^{-1}$), or combinations thereof.

Aspect 318. The taste modulator composition of Aspect 317, where the third anion comprises citrate ($C_6H_5O_7^{-3}$), chloride ($Cl^{-1}$), phosphate ($PO_4^{-3}$), carbonate ($CO_3^{-2}$), sulfate ($SO_4^{-2}$), and combinations thereof.

Aspect 319. The taste modulator composition of Aspect 317, where the third anion comprises citrate ($C_6H_5O_7^{-3}$), sulfate ($SO_4^{-2}$), or combinations thereof.

Aspect 320. The taste modulator composition of Aspect 317, where the third anion comprises sulfate ($SO_4^{-2}$).

Aspect 321. The taste modulator composition of Aspect 317, where the third anion comprises citrate ($C_6H_5O_7^{-3}$).

Aspect 322. The taste modulator composition of Aspect 317, where the third anion comprises chloride ($Cl^{-1}$).

Aspect 323. The taste modulator composition of any one of Aspect 296-Aspect 322, wherein the taste modulator composition further comprises a fourth modulator component comprising a fourth salt having a fourth cation selected from $Na^+$, $K^+$, $Ca^{+2}$, and $Mg^{+2}$.

Aspect 324. The taste modulator composition of Aspect 323, wherein the first cation, the second cation, third cation, and the fourth cation are not the same.

Aspect 325. The taste modulator composition of Aspect 324, wherein the first cation, the second cation, third cation, and the fourth cation are not the same; and wherein the first anion, the second anion, the third anion, and the fourth anion are the same.

Aspect 326. The taste modulator composition of Aspect 323, wherein the first cation, the second cation, third cation, and the fourth cation are the same; and wherein the first anion, the second anion, the third anion, and the fourth anion are not the same.

Aspect 327. The taste modulator composition of any one of Aspect 317-Aspect 326, wherein the fourth salt has a fourth anion comprising gluconate ($C_6H_{11}O_7^{-1}$), citrate ($C_6H_5O_7^{-3}$), hydrogen citrate ($C_6H_6O_7^{-2}$), dihydrogen citrate ($C_6H_7O_7^{-1}$), malate ($C_4H_6O_5^{-2}$), hydrogen malate ($C_4H_7O_5^{-1}$), maleate ($C_4H_2O_4^{-2}$), hydrogen maleate ($C_4H_3O_4^{-1}$), fumarate ($C_4H_2O_4^{-2}$), hydrogen fumarate ($C_4H_3O_4^{-1}$), succinate ($C_4H_4O_4^{-2}$), hydrogen succinate ($C_4H_5O_4^{-1}$), glutarate ($C_5H_6O_4^{-2}$), hydrogen glutarate ($C_5H_7O_4^{-1}$), adipate $C_6H_8O_4^{-2}$), hydrogen adipate ($C_6H_9O_4^{-1}$), lactate ($C_3H_5O_3^{-1}$), tartrate (C4H4O6-2), bitartrate (C4H5O6-1), phosphate ($PO_4^{-3}$), monohydrogen phosphate ($HPO_4^{-2}$), dihydrogen phosphate ($H_2PO_4^{-1}$), fluoride ($F^{-1}$), chloride ($Cl^{-1}$), sulfate ($SO_4^{-2}$), bisulfate ($HSO_4^{-1}$), nitrate ($NO_3^{-1}$), carbonate ($CO_3^{-2}$), bicarbonate ($HCO_3^{-1}$), glycerate ($C_3H_5O_4^{-1}$), glycolate ($C_2H_3O_3^{-1}$), or combinations thereof.

Aspect 328. The taste modulator composition of Aspect 327, where the fourth anion comprises citrate ($C_6H_5O_7^{-3}$), chloride ($Cl^{-1}$), phosphate ($PO_4^{-3}$), carbonate ($CO_3^{-2}$), sulfate ($SO_4^{-2}$), and combinations thereof.

Aspect 329. The taste modulator composition of Aspect 327, where the fourth anion comprises citrate ($C_6H_5O_7^{-3}$), sulfate ($SO_4^{-2}$), or combinations thereof.

Aspect 330. The taste modulator composition of Aspect 327, where the fourth anion comprises sulfate ($SO_4^{-2}$).

Aspect 331. The taste modulator composition of Aspect 327, where the fourth anion comprises citrate ($C_6H_5O_7^{-3}$).

Aspect 332. The taste modulator composition of Aspect 327, where the fourth anion comprises chloride (Cl$^{-1}$).

Aspect 333. The taste modulator composition of any one of Aspect 296-Aspect 332, wherein a total cation is present in an effective amount to provide a concentration when present in a beverage, food, nutraceutical, pharmaceutical, or cosmetic from about 0.1 mM to about 30 mM; and wherein the total cation represents a sum of the first cation, and when present, the second cation, the third cation, and the fourth cation.

Aspect 334. The taste modulator composition of Aspect 135, wherein the total cation is present in an effective amount to provide a concentration when present in a beverage, food, nutraceutical, pharmaceutical, or cosmetic from about 0.1 mM to about 10 mM Na$^+$, when Na$^+$ is present; from about 0.1 mM to about 20 mM K$^+$, when K$^+$ is present; from about 0.1 mM to about 5 mM Mg+, when Mg$^{+2}$ is present; from about 0.1 mM to about 5 mM Ca$^{+2}$, when Ca$^{+2}$ is present; and combinations thereof provided that the total cation present is from about 0.1 mM to about 50 mM.

Aspect 335. The taste modulator composition of Aspect 334, wherein the total cation is present in an effective amount to provide a concentration when present in a beverage, food, nutraceutical, pharmaceutical, or cosmetic from about 0.1 mM to about 40 mM.

Aspect 336. The taste modulator composition of Aspect 334, wherein the total cation is present in an effective amount to provide a concentration when present in a beverage, food, nutraceutical, pharmaceutical, or cosmetic from about 0.1 mM to about 30 mM.

Aspect 337. The taste modulator composition of Aspect 334, wherein the total cation is present in an effective amount to provide a concentration when present in a beverage, food, nutraceutical, pharmaceutical, or cosmetic from about 0.1 mM to about 20 mM.

Aspect 338. The taste modulator composition of Aspect 334, wherein the total cation is present in an effective amount to provide a concentration when present in a beverage, food, nutraceutical, pharmaceutical, or cosmetic from about 0.1 mM to about 10 mM.

Aspect 339. The taste modulator composition of Aspect 334, wherein the total cation is present in an effective amount to provide a concentration when present in a beverage, food, nutraceutical, pharmaceutical, or cosmetic from about 1 mM to about 25 mM Na$^+$1.

Aspect 340. The sweetener composition of Aspect 339, wherein the total cation is present in an effective amount to provide a concentration when present in a beverage, food, nutraceutical, pharmaceutical, or cosmetic from about 1 mM to about 17.5 mM Na$^+$1.

Aspect 341. The taste modulator composition of Aspect 339, wherein the total cation is present in an effective amount to provide a concentration when present in a beverage, food, nutraceutical, pharmaceutical, or cosmetic from about 1 mM to about 10 mM Na$^+$1.

Aspect 342. The taste modulator composition of Aspect 339, wherein the total cation is present in an effective amount to provide a concentration when present in a beverage, food, nutraceutical, pharmaceutical, or cosmetic from about 5 mM to about 10 mM Na$^+$1.

Aspect 343. The taste modulator composition of Aspect 334, wherein the total cation is present in an effective amount to provide a concentration when present in a beverage, food, nutraceutical, pharmaceutical, or cosmetic from about 1 mM to about 25 mM K$^+$1.

Aspect 344. The taste modulator composition of Aspect 343, wherein the total cation is present in an effective amount to provide a concentration when present in a beverage, food, nutraceutical, pharmaceutical, or cosmetic from about 1 mM to about 17.5 mM K$^+$1.

Aspect 345. The taste modulator composition of Aspect 343, wherein the total cation is present in an effective amount to provide a concentration when present in a beverage, food, nutraceutical, pharmaceutical, or cosmetic from about 1 mM to about 10 mM K$^+$1.

Aspect 346. The taste modulator composition of Aspect 343, wherein the total cation is present in an effective amount to provide a concentration when present in a beverage, food, nutraceutical, pharmaceutical, or cosmetic from about 5 mM to about 10 mM K$^+$1.

Aspect 347. The taste modulator composition of Aspect 334, wherein the total cation is present in an effective amount to provide a concentration when present in a beverage, food, nutraceutical, pharmaceutical, or cosmetic from about 1 mM to about 15 mM Mg$^{+2}$.

Aspect 348. The taste modulator composition of Aspect 347, wherein the total cation is present in an effective amount to provide a concentration when present in a beverage, food, nutraceutical, pharmaceutical, or cosmetic from about 1 mM to about 10 mM Mg$^{+2}$.

Aspect 349. The taste modulator composition of Aspect 347, wherein the total cation is present in an effective amount to provide a concentration when present in a beverage, food, nutraceutical, pharmaceutical, or cosmetic from about 3 mM to about 5 mM Mg$^{+2}$.

Aspect 350. The taste modulator composition of Aspect 347, wherein the total cation is present in an effective amount to provide a concentration when present in a beverage, food, nutraceutical, pharmaceutical, or cosmetic from about 1 mM to about 5 mM Mg$^{+2}$.

Aspect 351. The taste modulator composition of Aspect 334, wherein the total cation is present in an effective amount to provide a concentration when present in a beverage, food, nutraceutical, pharmaceutical, or cosmetic from about 1 mM to about 25 mM Ca$^{+2}$.

Aspect 352. The taste modulator composition of Aspect 351, wherein the total cation is present in an effective amount to provide a concentration when present in a beverage, food, nutraceutical, pharmaceutical, or cosmetic from about 1 mM to about 17.5 mM Ca$^{+2}$.

Aspect 353. The taste modulator composition of Aspect 351, wherein the total cation is present in an effective amount to provide a concentration when present in a beverage, food, nutraceutical, pharmaceutical, or cosmetic from about 1 mM to about 10 mM Ca$^{+2}$.

Aspect 354. The taste modulator composition of Aspect 351, wherein the total cation is present in an effective amount to provide a concentration when present in a beverage, food, nutraceutical, pharmaceutical, or cosmetic from about 3 mM to about 6 mM Ca$^{+2}$.

Aspect 355. The taste modulator composition of Aspect 351, wherein the total cation is present in an effective amount to provide a concentration when present in a beverage, food, nutraceutical, pharmaceutical, or cosmetic from about 1 mM to about 5 mM Ca$^{+2}$.

Aspect 356. The taste modulator composition of Aspect 334, wherein the total cation is present in an effective amount to provide a concentration when present in a beverage, food, nutraceutical, pharmaceutical, or cosmetic from about 1 mM to about 10 mM Na$^+$1; and from about 1 mM to about 10 mM K$^+$1.

Aspect 357. The taste modulator composition of Aspect 356, wherein the total cation is present in an effective amount to provide a concentration when present in a beverage, food, nutraceutical, pharmaceutical, or cosmetic from about 3 mM to about 7 mM $Na^{+1}$; and from about 3 mM to about 7 mM $K^{+1}$.

Aspect 358. The taste modulator composition of Aspect 356, wherein the total cation is present in an effective amount to provide a concentration when present in a beverage, food, nutraceutical, pharmaceutical, or cosmetic from about 4 mM to about 6 mM $Na^{+1}$; and from about 4 mM to about 6 mM $K^{+1}$.

Aspect 359. The taste modulator composition of Aspect 334, wherein the total cation is present in an effective amount to provide a concentration when present in a beverage, food, nutraceutical, pharmaceutical, or cosmetic from about 1 mM to about 10 mM $Na^{+1}$; and from about 1 mM to about 10 mM $Mg^{+2}$.

Aspect 360. The taste modulator composition of Aspect 359, wherein the total cation is present in an effective amount to provide a concentration when present in a beverage, food, nutraceutical, pharmaceutical, or cosmetic from about 3 mM to about 7 mM $Na^{+1}$; and from about 3 mM to about 7 mM $Mg^{+2}$.

Aspect 361. The taste modulator composition of Aspect 359, wherein the total cation is present in an effective amount to provide a concentration when present in a beverage, food, nutraceutical, pharmaceutical, or cosmetic from about 4 mM to about 6 mM $Na^{+1}$; and from about 4 mM to about 6 mM $Mg^{+2}$.

Aspect 362. The taste modulator composition of Aspect 334, wherein the total cation is present in an effective amount to provide a concentration when present in a beverage, food, nutraceutical, pharmaceutical, or cosmetic from about 1 mM to about 10 mM $Na^{+1}$; and from about 1 mM to about 10 mM $Ca^{+2}$.

Aspect 363. The taste modulator composition of Aspect 362, wherein the total cation is present in an effective amount to provide a concentration when present in a beverage, food, nutraceutical, pharmaceutical, or cosmetic from about 3 mM to about 7 mM $Na^{+1}$; and from about 3 mM to about 7 mM $Ca^{+2}$.

Aspect 364. The taste modulator composition of Aspect 362, wherein the total cation is present in an effective amount to provide a concentration when present in a beverage, food, nutraceutical, pharmaceutical, or cosmetic from about 4 mM to about 6 mM $Na^{+1}$; and from about 4 mM to about 6 mM $Ca^{+2}$.

Aspect 365. The taste modulator composition of Aspect 334, wherein the total cation is present in an effective amount to provide a concentration when present in a beverage, food, nutraceutical, pharmaceutical, or cosmetic from about 1 mM to about 10 mM $K^{+1}$; and from about 1 mM to about 10 mM $Mg^{+2}$.

Aspect 366. The taste modulator composition of Aspect 365, wherein the total cation is present in an effective amount to provide a concentration when present in a beverage, food, nutraceutical, pharmaceutical, or cosmetic from about 3 mM to about 7 mM $K^{+1}$; and from about 3 mM to about 7 mM $Mg^{+2}$.

Aspect 367. The taste modulator composition of Aspect 365, wherein the total cation is present in an effective amount to provide a concentration when present in a beverage, food, nutraceutical, pharmaceutical, or cosmetic from about 4 mM to about 6 mM $K^{+1}$; and from about 4 mM to about 6 mM $Mg^{+2}$.

Aspect 368. The taste modulator composition of Aspect 334, wherein the total cation is present in an effective amount to provide a concentration when present in a beverage, food, nutraceutical, pharmaceutical, or cosmetic from about 1 mM to about 10 mM $K^{+1}$; and from about 1 mM to about 10 mM $Ca^{+2}$.

Aspect 369. The taste modulator composition of Aspect 368, wherein the total cation is present in an effective amount to provide a concentration when present in a beverage, food, nutraceutical, pharmaceutical, or cosmetic from about 3 mM to about 7 mM $K^{+1}$; and from about 3 mM to about 7 mM $Ca^{+2}$.

Aspect 370. The taste modulator composition of Aspect 368, wherein the total cation is present in an effective amount to provide a concentration when present in a beverage, food, nutraceutical, pharmaceutical, or cosmetic from about 4 mM to about 6 mM $K^{+1}$; and from about 4 mM to about 6 mM $Ca^{+2}$.

Aspect 371. The taste modulator composition of Aspect 334, wherein the total cation is present in an effective amount to provide a concentration when present in a beverage, food, nutraceutical, pharmaceutical, or cosmetic from about 1 mM to about 10 mM $Mg^{+2}$; and from about 1 mM to about 10 mM $Ca^{+2}$.

Aspect 372. The taste modulator composition of Aspect 370, wherein the total cation is present in an effective amount to provide a concentration when present in a beverage, food, nutraceutical, pharmaceutical, or cosmetic from about 2 mM to about 6 mM $Mg^{+2}$; and from about 2 mM to about 6 mM $Ca^{+2}$.

Aspect 373. The taste modulator composition of Aspect 370, wherein the total cation is present in an effective amount to provide a concentration when present in a beverage, food, nutraceutical, pharmaceutical, or cosmetic from about 3 mM to about 5 mM $Mg^{+2}$; and from about 3 mM to about 5 mM $Ca^{+2}$.

Aspect 374. The taste modulator composition of Aspect 334, wherein the total cation is present in an effective amount to provide a concentration when present in a beverage, food, nutraceutical, pharmaceutical, or cosmetic from about 1 mM to about 10 mM $Na^{+1}$; from about 1 mM to about 10 mM $K^{+1}$; and from about 1 mM to about 10 mM $Mg^{+2}$.

Aspect 375. The taste modulator composition of Aspect 374, wherein the total cation is present in an effective amount to provide a concentration when present in a beverage, food, nutraceutical, pharmaceutical, or cosmetic of about 1 mM to about 5 mM $Na^{+1}$; about 1 mM to about 5 mM $K^{+1}$; and about 1 mM to about 5 mM $Mg^{+2}$.

Aspect 376. The taste modulator composition of Aspect 374, wherein the total cation is present in an effective amount to provide a concentration when present in a beverage, food, nutraceutical, pharmaceutical, or cosmetic from about 2.5 mM to about 5 mM $Na^{+1}$; from about 2.5 mM to about 5 mM $K^{+1}$; and from about 2.5 mM to about 5 mM $Mg^{+2}$.

Aspect 377. The taste modulator composition of Aspect 334, wherein the total cation is present in an effective amount to provide a concentration when present in a beverage, food, nutraceutical, pharmaceutical, or cosmetic from about 1 mM to about 10 mM $Na^{+1}$; from about 1 mM to about 10 mM $K^{+1}$; and from about 1 mM to about 10 mM $Ca^{+2}$.

Aspect 378. The taste modulator composition of Aspect 377, wherein the total cation is present in an effective amount to provide a concentration when present in a beverage, food, nutraceutical, pharmaceutical, or cosmetic from about 1 mM to about 5 mM $Na^{+1}$; from about 1 mM to about 5 mM $K^{+1}$; and from about 1 mM to about 5 mM $Ca^{+2}$.

Aspect 379. The taste modulator composition of Aspect 377, wherein the total cation is present in an effective amount to provide a concentration when present in a beverage, food, nutraceutical, pharmaceutical, or cosmetic from about 2.5 mM to about 5 mM $Na^{+1}$; from about 2.5 mM to about 5 mM $K^{+1}$; and from about 2.5 mM to about 5 mM $Ca^{+2}$.

Aspect 380. The taste modulator composition of Aspect 334, wherein the total cation is present in an effective amount to provide a concentration when present in a beverage, food, nutraceutical, pharmaceutical, or cosmetic from about 1 mM to about 10 mM $K^{+1}$; from about 1 mM to about 10 mM $Mg^{+2}$; and from about 1 mM to about 10 mM $Ca^{+2}$.

Aspect 381. The taste modulator composition of Aspect 380, wherein the total cation is present in an effective amount to provide a concentration when present in a beverage, food, nutraceutical, pharmaceutical, or cosmetic from about 1 mM to about 5 mM $K^{+1}$; from about 1 mM to about 5 mM $Mg^{+2}$; and from about 1 mM to about 5 mM $Ca^{+2}$.

Aspect 382. The taste modulator composition of Aspect 380, wherein the total cation is present in an effective amount to provide a concentration when present in a beverage, food, nutraceutical, pharmaceutical, or cosmetic from about 2.5 mM to about 5 mM $K^{+1}$; from about 2.5 mM to about 5 mM $Mg^{+2}$; and from about 2.5 mM to about 5 mM $Ca^{+2}$.

Aspect 383. The taste modulator composition of Aspect 334, wherein the total cation is present in an effective amount to provide a concentration when present in a beverage, food, nutraceutical, pharmaceutical, or cosmetic from about 1 mM to about 10 mM $Na^{+1}$; from about 1 mM to about 10 mM $K^{+1}$; from about 1 mM to about 10 mM $Mg^{+2}$; and from about 1 mM to about 10 mM $Ca^{+2}$.

Aspect 384. The taste modulator composition of Aspect 383, wherein the total cation is present in an effective amount to provide a concentration when present in a beverage, food, nutraceutical, pharmaceutical, or cosmetic from about 1 mM to about 4 mM $Na^{+1}$; from about 1 mM to about 4 mM $K^{+1}$; from about 1 mM to about 4 mM $Mg^{+2}$; and from about 1 mM to about 4 mM $Ca^{+2}$.

Aspect 385. The taste modulator composition of Aspect 383, wherein the total cation is present in an effective amount to provide a concentration when present in a beverage, food, nutraceutical, pharmaceutical, or cosmetic from about 1 mM to about 3 mM $Na^{+1}$; from about 1 mM to about 3 mM $K^{+1}$; from about 1 mM to about 3 mM $Mg^{+2}$; and from about 1 mM to about 3 mM $Ca^{+2}$.

Aspect 386. A taste modulator composition comprising: a first taste modulator component comprising a first salt having a first cation selected from $Na^+$, $K^+$, $Ca^{+2}$, and $Mg^{+2}$; and a second modulator component comprising a second salt having a second cation selected from $Na^+$, $K^+$, $Ca^{+2}$, and $Mg^{+2}$.

Aspect 387. The taste modulator composition of Aspect 386, wherein the first cation and the second cation are not the same.

Aspect 388. The taste modulator composition of Aspect 387, wherein the first cation and the second cation are not the same; and wherein the first anion and the second anion are the same.

Aspect 389. The taste modulator composition of Aspect 386, wherein the first cation and the second cation are the same; and wherein the first anion and the second anion are not the same.

Aspect 390. The taste modulator composition of any one of Aspect 386-Aspect 389, wherein the first salt has a first anion comprising gluconate ($C_6H_{11}O_7^{-1}$), citrate ($C_6H_5O_7^{-3}$), hydrogen citrate ($C_6H_6O_7^{-2}$), dihydrogen citrate ($C_6H_7O_7^{-1}$), malate ($C_4H_6O_5^{-2}$), hydrogen malate ($C_4H_7O_5^{-1}$), maleate ($C_4H_2O_4^{-2}$), hydrogen maleate ($C_4H_3O_4^{-1}$), fumarate ($C_4H_2O_4^{-2}$), hydrogen fumarate ($C_4H_3O_4^{-1}$), succinate ($C_4H_4O_4^{-2}$), hydrogen succinate ($C_4H_5O_4^{-1}$), glutarate ($C_5H_6O_4^{-2}$), hydrogen glutarate ($C_5H_7O_4^{-1}$), adipate $C_6H_8O_4^{-2}$), hydrogen adipate ($C_6H_9O_4^{-1}$), lactate ($C_3H_5O_3^{-1}$), tartrate (C4H4O6-2), bitartrate (C4H5O6-1), phosphate ($PO_4^{-3}$), monohydrogen phosphate ($HPO_4^{-2}$), dihydrogen phosphate ($H_2PO_4^{-1}$), fluoride ($F^{-1}$), chloride ($Cl^{-1}$), sulfate ($SO_4^{-2}$), bisulfate ($HSO_4^{-1}$), nitrate ($NO_3^{-1}$), carbonate ($CO_3^{-2}$), bicarbonate ($HCO_3^{-1}$), glycerate ($C_3H_5O_4^{-1}$), glycolate ($C_2H_3O_3^{-1}$), or combinations thereof.

Aspect 391. The taste modulator composition of Aspect 390, where the first anion comprises citrate ($C_6H_5O_7^{-3}$), chloride ($Cl^{-1}$), phosphate ($PO_4^{-3}$), carbonate ($CO_3^{-2}$), sulfate ($SO_4^{-2}$), and combinations thereof.

Aspect 392. The taste modulator composition of Aspect 390, where the first anion comprises citrate ($C_6H_5O_7^{-3}$), sulfate ($SO_4^{-2}$), or combinations thereof.

Aspect 393. The taste modulator composition of Aspect 390, where the first anion comprises sulfate ($SO_4^{-2}$).

Aspect 394. The taste modulator composition of Aspect 390, where the first anion comprises citrate ($C_6H_5O_7^{-3}$).

Aspect 395. The taste modulator composition of Aspect 390, where the first anion comprises chloride ($Cl^{-1}$).

Aspect 396. The taste modulator composition of any one of Aspect 386-Aspect 395, wherein the second salt has a second anion comprising gluconate ($C_6H_{11}O_7^{-1}$), citrate ($C_6H_5O_7^{-3}$), hydrogen citrate ($C_6H_6O_7^{-2}$), dihydrogen citrate ($C_6H_7O_7^{-1}$), malate ($C_4H_6O_5^{-2}$), hydrogen malate ($C_4H_7O_5^{-1}$), maleate ($C_4H_2O_4^{-2}$), hydrogen maleate ($C_4H_3O_4^{-1}$), fumarate ($C_4H_2O_4^{-2}$), hydrogen fumarate ($C_4H_3O_4^{-1}$), succinate ($C_4H_4O_4^{-2}$), hydrogen succinate ($C_4H_5O_4^{-1}$), glutarate ($C_5H_6O_4^{-2}$), hydrogen glutarate ($C_5H_7O_4^{-1}$), adipate $C_6H_8O_4^{-2}$), hydrogen adipate ($C_6H_9O_4^{-1}$), lactate ($C_3H_5O_3^{-1}$), tartrate (C4H4O6-2), bitartrate (C4H5O6-1), phosphate ($PO_4^{-3}$), monohydrogen phosphate ($HPO_4^{-2}$), dihydrogen phosphate ($H_2PO_4^{-1}$), fluoride ($F^{-1}$), chloride ($Cl^{-1}$), sulfate ($SO_4^{-2}$), bisulfate ($HSO_4^{-1}$), nitrate ($NO_3^{-1}$), carbonate ($CO_3^{-2}$), bicarbonate ($HCO_3^{-1}$), glycerate ($C_3H_5O_4^{-1}$), glycolate ($C_2H_3O_3^{-1}$), or combinations thereof.

Aspect 397. The taste modulator composition of Aspect 396, where the second anion comprises citrate ($C_6H_5O_7^{-3}$), chloride ($Cl^{-1}$), phosphate ($PO_4^{-3}$), carbonate ($CO_3^{-2}$), sulfate ($SO_4^{-2}$), and combinations thereof.

Aspect 398. The taste modulator composition of Aspect 396, where the second anion comprises citrate ($C_6H_5O_7^{-3}$), sulfate ($SO_4^{-2}$), or combinations thereof.

Aspect 399. The taste modulator composition of Aspect 396, where the second anion comprises sulfate ($SO_4^{-2}$).

Aspect 400. The taste modulator composition of Aspect 396, where the second anion comprises citrate ($C_6H_5O_7^{-3}$).

Aspect 401. The taste modulator composition of Aspect 396, where the second anion comprises chloride ($Cl^{-1}$).

Aspect 402. The taste modulator composition of any one of Aspect 386-Aspect 401, wherein the taste modulator composition further comprises a third modulator component comprising a third salt having a third cation selected from $Na^+$, $K^+$, $Ca^{+2}$, and $Mg^{+2}$.

Aspect 403. The taste modulator composition of Aspect 402, wherein the first cation, the second cation, and the third cation are not the same.

Aspect 404. The taste modulator composition of Aspect 403, wherein the first cation, the second cation, and the third cation are not the same; and wherein the first anion, the second anion, and the third anion are the same.

Aspect 405. The taste modulator composition of Aspect 404, wherein the first cation, the second cation, and the third cation are the same; and wherein the first anion, the second anion, and the third anion are not the same.

Aspect 406. The taste modulator composition of any one of Aspect 402-Aspect 405, wherein the third salt has a third anion comprising gluconate ($C_6H_{11}O_7^{-1}$), citrate ($C_6H_5O_7^{-3}$), hydrogen citrate ($C_6H_6O_7^{-2}$), dihydrogen citrate ($C_6H_7O_7^{-1}$), malate ($C_4H_6O_5^{-2}$), hydrogen malate ($C_4H_7O_5^{-1}$), maleate ($C_4H_2O_4^{-2}$), hydrogen maleate ($C_4H_3O_4^{-1}$), fumarate ($C_4H_2O_4^{-2}$), hydrogen fumarate ($C_4H_3O_4^{-1}$), succinate ($C_4H_4O_4^{-2}$), hydrogen succinate ($C_4H_5O_4^{-1}$), glutarate ($C_5H_6O_4^{-2}$), hydrogen glutarate ($C_5H_7O_4^{-1}$), adipate $C_6H_8O_4^{-2}$), hydrogen adipate ($C_6H_9O_4^{-1}$), lactate ($C_3H_5O_3^{-1}$), tartrate (C4H4O6-2), bitartrate (C4H5O6-1), phosphate ($PO_4^{-3}$), monohydrogen phosphate ($HPO_4^{-2}$), dihydrogen phosphate ($H_2PO_4^{-1}$), fluoride ($F^{-1}$), chloride ($Cl^{-1}$), sulfate ($SO_4^{-2}$), bisulfate ($HSO_4^{-1}$), nitrate ($NO_3^{-1}$), carbonate ($CO_3^{-2}$), bicarbonate ($HCO_3^{-1}$), glycerate ($C_3H_5O_4^{-1}$), glycolate ($C_2H_3O_3^{-1}$), or combinations thereof.

Aspect 407. The taste modulator composition of Aspect 406, where the third anion comprises citrate ($C_6H_5O_7^{-3}$), chloride ($Cl^{-1}$), phosphate ($PO_4^{-3}$), carbonate ($CO_3^{-2}$), sulfate ($SO_4^{-2}$), and combinations thereof.

Aspect 408. The taste modulator composition of Aspect 406, where the third anion comprises citrate ($C_6H_5O_7^{-3}$), sulfate ($SO_4^{-2}$), or combinations thereof.

Aspect 409. The taste modulator composition of Aspect 406, where the third anion comprises sulfate ($SO_4^{-2}$).

Aspect 410. The taste modulator composition of Aspect 406, where the third anion comprises citrate ($C_6H_5O_7^{-3}$).

Aspect 411. The taste modulator composition of Aspect 406, where the third anion comprises chloride ($Cl^{-1}$).

Aspect 412. The taste modulator composition of any one of Aspect 386-Aspect 411, wherein the taste modulator composition further comprises a fourth modulator component comprising a fourth salt having a fourth cation selected from $Na^+$, $K^+$, $Ca^{+2}$, and $Mg^{+2}$.

Aspect 413. The taste modulator composition of Aspect 412, wherein the first cation, the second cation, third cation, and the fourth cation are not the same.

Aspect 414. The taste modulator composition of Aspect 413, wherein the first cation, the second cation, third cation, and the fourth cation are not the same; and wherein the first anion, the second anion, the third anion, and the fourth anion are the same.

Aspect 415. The taste modulator composition of Aspect 412, wherein the first cation, the second cation, third cation, and the fourth cation are the same; and wherein the first anion, the second anion, the third anion, and the fourth anion are not the same.

Aspect 416. The taste modulator composition of any one of Aspect 412-Aspect 415, wherein the fourth salt has a fourth anion comprising gluconate ($C_6H_{11}O_7^{-1}$), citrate ($C_6H_5O_7^{-3}$), hydrogen citrate ($C_6H_6O_7^{-2}$), dihydrogen citrate ($C_6H_7O_7^{-1}$), malate ($C_4H_6O_5^{-2}$), hydrogen malate ($C_4H_7O_5^{-1}$), maleate ($C_4H_2O_4^{-2}$), hydrogen maleate ($C_4H_3O_4^{-1}$), fumarate ($C_4H_2O_4^{-2}$), hydrogen fumarate ($C_4H_3O_4^{-1}$), succinate ($C_4H_4O_4^{-2}$), hydrogen succinate ($C_4H_5O_4^{-1}$), glutarate ($C_5H_6O_4^{-2}$), hydrogen glutarate ($C_5H_7O_4^{-1}$), adipate $C_6H_8O_4^{-2}$), hydrogen adipate ($C_6H_9O_4^{-1}$), lactate ($C_3H_5O_3^{-1}$), tartrate (C4H4O6-2), bitartrate (C4H5O6-1), phosphate ($PO_4^{-3}$), monohydrogen phosphate ($HPO_4^{-2}$), dihydrogen phosphate ($H_2PO_4^{-1}$), fluoride ($F^{-1}$), chloride ($Cl^{-1}$), sulfate ($SO_4^{-2}$), bisulfate ($HSO_4^{-1}$), nitrate ($NO_3^{-1}$), carbonate ($CO_3^{-2}$), bicarbonate ($HCO_3^{-1}$), glycerate ($C_3H_5O_4^{-1}$), glycolate ($C_2H_3O_3^{-1}$), or combinations thereof.

Aspect 417. The taste modulator composition of Aspect 416, where the fourth anion comprises citrate ($C_6H_5O_7^{-3}$), chloride ($Cl^{-1}$), phosphate ($PO_4^{-3}$), carbonate ($CO_3^{-2}$), sulfate ($SO_4^{-2}$), and combinations thereof.

Aspect 418. The taste modulator composition of Aspect 416, where the fourth anion comprises citrate ($C_6H_5O_7^{-3}$), sulfate ($SO_4^{-2}$), or combinations thereof.

Aspect 419. The taste modulator composition of Aspect 416, where the fourth anion comprises sulfate ($SO_4^{-2}$).

Aspect 420. The taste modulator composition of Aspect 416, where the fourth anion comprises citrate ($C_6H_5O_7^{-3}$).

Aspect 421. The taste modulator composition of Aspect 416, where the fourth anion comprises chloride ($Cl^{-1}$).

Aspect 422. The taste modulator composition of any one of Aspect 386-Aspect 421, wherein a total cation is present in an effective amount to provide a concentration when present in a beverage, food, nutraceutical, pharmaceutical, or cosmetic from about 0.1 mM to about 30 mM; and wherein the total cation represents a sum of the first cation, and when present, the second cation, the third cation, and the fourth cation.

Aspect 423. The taste modulator composition of Aspect 422, wherein the total cation is present in an effective amount to provide a concentration when present in a beverage, food, nutraceutical, pharmaceutical, or cosmetic from about 0.1 mM to about 10 mM $Na^+$, when $Na^+$ is present; from about 0.1 mM to about 20 mM $K^+$, when $K^+$ is present; from about 0.1 mM to about 5 mM Mg+, when $Mg^{+2}$ is present; from about 0.1 mM to about 5 mM $Ca^{+2}$, when $Ca^{+2}$ is present; and combinations thereof provided that the total cation present is from about 0.1 mM to about 50 mM.

Aspect 424. The taste modulator composition of Aspect 422, wherein the total cation is present in an effective amount to provide a concentration when present in a beverage, food, nutraceutical, pharmaceutical, or cosmetic from about 0.1 mM to about 40 mM.

Aspect 425. The taste modulator composition of Aspect 422, wherein the total cation is present in an effective amount to provide a concentration when present in a beverage, food, nutraceutical, pharmaceutical, or cosmetic from about 0.1 mM to about 30 mM.

Aspect 426. The taste modulator composition of Aspect 422, wherein the total cation is present in an effective amount to provide a concentration when present in a beverage, food, nutraceutical, pharmaceutical, or cosmetic from about 0.1 mM to about 20 mM.

Aspect 427. The taste modulator composition of Aspect 422, wherein the total cation is present in an effective amount to provide a concentration when present in a beverage, food, nutraceutical, pharmaceutical, or cosmetic from about 0.1 mM to about 10 mM.

Aspect 428. The taste modulator composition of Aspect 423, wherein the total cation is present in an effective amount to provide a concentration when present in a beverage, food, nutraceutical, pharmaceutical, or cosmetic from about 1 mM to about 25 mM $Na^+1$.

Aspect 429. The sweetener composition of Aspect 428, wherein the total cation is present in an effective amount to provide a concentration when present in a beverage, food, nutraceutical, pharmaceutical, or cosmetic from about 1 mM to about 17.5 mM $Na^+1$.

Aspect 430. The taste modulator composition of Aspect 428, wherein the total cation is present in an effective amount to provide a concentration when present in a beverage, food, nutraceutical, pharmaceutical, or cosmetic from about 1 mM to about 10 mM Na$^+$1.

Aspect 431. The taste modulator composition of Aspect 428, wherein the total cation is present in an effective amount to provide a concentration when present in a beverage, food, nutraceutical, pharmaceutical, or cosmetic from about 5 mM to about 10 mM Na$^+$1.

Aspect 432. The taste modulator composition of Aspect 423, wherein the total cation is present in an effective amount to provide a concentration when present in a beverage, food, nutraceutical, pharmaceutical, or cosmetic from about 1 mM to about 25 mM K$^+$1.

Aspect 433. The taste modulator composition of Aspect 432, wherein the total cation is present in an effective amount to provide a concentration when present in a beverage, food, nutraceutical, pharmaceutical, or cosmetic from about 1 mM to about 17.5 mM K$^+$1.

Aspect 434. The taste modulator composition of Aspect 432, wherein the total cation is present in an effective amount to provide a concentration when present in a beverage, food, nutraceutical, pharmaceutical, or cosmetic from about 1 mM to about 10 mM K$^+$1.

Aspect 435. The taste modulator composition of Aspect 432, wherein the total cation is present in an effective amount to provide a concentration when present in a beverage, food, nutraceutical, pharmaceutical, or cosmetic from about 5 mM to about 10 mM K$^+$1.

Aspect 436. The taste modulator composition of Aspect 423, wherein the total cation is present in an effective amount to provide a concentration when present in a beverage, food, nutraceutical, pharmaceutical, or cosmetic from about 1 mM to about 15 mM Mg$^{+2}$.

Aspect 437. The taste modulator composition of Aspect 436, wherein the total cation is present in an effective amount to provide a concentration when present in a beverage, food, nutraceutical, pharmaceutical, or cosmetic from about 1 mM to about 10 mM Mg$^{+2}$.

Aspect 438. The taste modulator composition of Aspect 436, wherein the total cation is present in an effective amount to provide a concentration when present in a beverage, food, nutraceutical, pharmaceutical, or cosmetic from about 3 mM to about 5 mM Mg$^{+2}$.

Aspect 439. The taste modulator composition of Aspect 436, wherein the total cation is present in an effective amount to provide a concentration when present in a beverage, food, nutraceutical, pharmaceutical, or cosmetic from about 1 mM to about 5 mM Mg$^{+2}$.

Aspect 440. The taste modulator composition of Aspect 423, wherein the total cation is present in an effective amount to provide a concentration when present in a beverage, food, nutraceutical, pharmaceutical, or cosmetic from about 1 mM to about 25 mM Ca$^{+2}$.

Aspect 441. The taste modulator composition of Aspect 440, wherein the total cation is present in an effective amount to provide a concentration when present in a beverage, food, nutraceutical, pharmaceutical, or cosmetic from about 1 mM to about 17.5 mM Ca$^{+2}$.

Aspect 442. The taste modulator composition of Aspect 440, wherein the total cation is present in an effective amount to provide a concentration when present in a beverage, food, nutraceutical, pharmaceutical, or cosmetic from about 1 mM to about 10 mM Ca$^{+2}$.

Aspect 443. The taste modulator composition of Aspect 440, wherein the total cation is present in an effective amount to provide a concentration when present in a beverage, food, nutraceutical, pharmaceutical, or cosmetic from about 3 mM to about 6 mM Ca$^{+2}$.

Aspect 444. The taste modulator composition of Aspect 440, wherein the total cation is present in an effective amount to provide a concentration when present in a beverage, food, nutraceutical, pharmaceutical, or cosmetic from about 1 mM to about 5 mM Ca$^{+2}$.

Aspect 445. The taste modulator composition of Aspect 423, wherein the total cation is present in an effective amount to provide a concentration when present in a beverage, food, nutraceutical, pharmaceutical, or cosmetic from about 1 mM to about 10 mM Na$^+$1; and from about 1 mM to about 10 mM K$^+$1.

Aspect 446. The taste modulator composition of Aspect 445, wherein the total cation is present in an effective amount to provide a concentration when present in a beverage, food, nutraceutical, pharmaceutical, or cosmetic from about 3 mM to about 7 mM Na$^+$1; and from about 3 mM to about 7 mM K$^+$1.

Aspect 447. The taste modulator composition of Aspect 445, wherein the total cation is present in an effective amount to provide a concentration when present in a beverage, food, nutraceutical, pharmaceutical, or cosmetic from about 4 mM to about 6 mM Na$^+$1; and from about 4 mM to about 6 mM K$^+$1.

Aspect 448. The taste modulator composition of Aspect 423, wherein the total cation is present in an effective amount to provide a concentration when present in a beverage, food, nutraceutical, pharmaceutical, or cosmetic from about 1 mM to about 10 mM Na$^+$1; and from about 1 mM to about 10 mM Mg$^{+2}$.

Aspect 449. The taste modulator composition of Aspect 448, wherein the total cation is present in an effective amount to provide a concentration when present in a beverage, food, nutraceutical, pharmaceutical, or cosmetic from about 3 mM to about 7 mM Na$^+$1; and from about 3 mM to about 7 mM Mg$^{+2}$.

Aspect 450. The taste modulator composition of Aspect 448, wherein the total cation is present in an effective amount to provide a concentration when present in a beverage, food, nutraceutical, pharmaceutical, or cosmetic from about 4 mM to about 6 mM Na$^+$1; and from about 4 mM to about 6 mM Mg$^{+2}$.

Aspect 451. The taste modulator composition of Aspect 423, wherein the total cation is present in an effective amount to provide a concentration when present in a beverage, food, nutraceutical, pharmaceutical, or cosmetic from about 1 mM to about 10 mM Na$^+$1; and from about 1 mM to about 10 mM Ca$^{+2}$.

Aspect 452. The taste modulator composition of Aspect 451, wherein the total cation is present in an effective amount to provide a concentration when present in a beverage, food, nutraceutical, pharmaceutical, or cosmetic from about 3 mM to about 7 mM Na$^+$1; and from about 3 mM to about 7 mM Ca$^{+2}$.

Aspect 453. The taste modulator composition of Aspect 451, wherein the total cation is present in an effective amount to provide a concentration when present in a beverage, food, nutraceutical, pharmaceutical, or cosmetic from about 4 mM to about 6 mM Na$^+$1; and from about 4 mM to about 6 mM Ca$^{+2}$.

Aspect 454. The taste modulator composition of Aspect 423, wherein the total cation is present in an effective amount to provide a concentration when present in a beverage, food, nutraceutical, pharmaceutical, or cosmetic from about 1 mM to about 10 mM K$^+$1; and from about 1 mM to about 10 mM Mg$^{+2}$.

Aspect 455. The taste modulator composition of Aspect 454, wherein the total cation is present in an effective amount to provide a concentration when present in a beverage, food, nutraceutical, pharmaceutical, or cosmetic from about 3 mM to about 7 mM $K^+1$; and from about 3 mM to about 7 mM $Mg^{+2}$.

Aspect 456. The taste modulator composition of Aspect 454, wherein the total cation is present in an effective amount to provide a concentration when present in a beverage, food, nutraceutical, pharmaceutical, or cosmetic from about 4 mM to about 6 mM $K^+1$; and from about 4 mM to about 6 mM $Mg^{+2}$.

Aspect 457. The taste modulator composition of Aspect 423, wherein the total cation is present in an effective amount to provide a concentration when present in a beverage, food, nutraceutical, pharmaceutical, or cosmetic from about 1 mM to about 10 mM $K^+1$; and from about 1 mM to about 10 mM $Ca^{+2}$.

Aspect 458. The taste modulator composition of Aspect 457, wherein the total cation is present in an effective amount to provide a concentration when present in a beverage, food, nutraceutical, pharmaceutical, or cosmetic from about 3 mM to about 7 mM $K^+1$; and from about 3 mM to about 7 mM $Ca^{+2}$.

Aspect 459. The taste modulator composition of Aspect 457, wherein the total cation is present in an effective amount to provide a concentration when present in a beverage, food, nutraceutical, pharmaceutical, or cosmetic from about 4 mM to about 6 mM $K^+1$; and from about 4 mM to about 6 mM $Ca^{+2}$.

Aspect 460. The taste modulator composition of Aspect 423, wherein the total cation is present in an effective amount to provide a concentration when present in a beverage, food, nutraceutical, pharmaceutical, or cosmetic from about 1 mM to about 10 mM $Mg^{+2}$; and from about 1 mM to about 10 mM $Ca^{+2}$.

Aspect 461. The taste modulator composition of Aspect 460, wherein the total cation is present in an effective amount to provide a concentration when present in a beverage, food, nutraceutical, pharmaceutical, or cosmetic from about 2 mM to about 6 mM $Mg^{+2}$; and from about 2 mM to about 6 mM $Ca^{+2}$.

Aspect 462. The taste modulator composition of Aspect 460, wherein the total cation is present in an effective amount to provide a concentration when present in a beverage, food, nutraceutical, pharmaceutical, or cosmetic from about 3 mM to about 5 mM $Mg^{+2}$; and from about 3 mM to about 5 mM $Ca^{+2}$.

Aspect 463. The taste modulator composition of Aspect 423, wherein the total cation is present in an effective amount to provide a concentration when present in a beverage, food, nutraceutical, pharmaceutical, or cosmetic from about 1 mM to about 10 mM $Na^+1$; from about 1 mM to about 10 mM $K^+1$; and from about 1 mM to about 10 mM $Mg^{+2}$.

Aspect 464. The taste modulator composition of Aspect 463, wherein the total cation is present in an effective amount to provide a concentration when present in a beverage, food, nutraceutical, pharmaceutical, or cosmetic of about 1 mM to about 5 mM $Na^+1$; about 1 mM to about 5 mM $K^+1$; and about 1 mM to about 5 mM $Mg^{+2}$.

Aspect 465. The taste modulator composition of Aspect 463, wherein the total cation is present in an effective amount to provide a concentration when present in a beverage, food, nutraceutical, pharmaceutical, or cosmetic from about 2.5 mM to about 5 mM $Na^+1$; from about 2.5 mM to about 5 mM $K^+1$; and from about 2.5 mM to about 5 mM $Mg^{+2}$.

Aspect 466. The taste modulator composition of Aspect 423, wherein the total cation is present in an effective amount to provide a concentration when present in a beverage, food, nutraceutical, pharmaceutical, or cosmetic from about 1 mM to about 10 mM $Na^+1$; from about 1 mM to about 10 mM $K^+1$; and from about 1 mM to about 10 mM $Ca^{+2}$.

Aspect 467. The taste modulator composition of Aspect 466, wherein the total cation is present in an effective amount to provide a concentration when present in a beverage, food, nutraceutical, pharmaceutical, or cosmetic from about 1 mM to about 5 mM $Na^+1$; from about 1 mM to about 5 mM $K^+1$; and from about 1 mM to about 5 mM $Ca^{+2}$.

Aspect 468. The taste modulator composition of Aspect 466, wherein the total cation is present in an effective amount to provide a concentration when present in a beverage, food, nutraceutical, pharmaceutical, or cosmetic from about 2.5 mM to about 5 mM $Na^+1$; from about 2.5 mM to about 5 mM $K^+1$; and from about 2.5 mM to about 5 mM $Ca^{+2}$.

Aspect 469. The taste modulator composition of Aspect 423, wherein the total cation is present in an effective amount to provide a concentration when present in a beverage, food, nutraceutical, pharmaceutical, or cosmetic from about 1 mM to about 10 mM $K^+1$; from about 1 mM to about 10 mM $Mg^{+2}$; and from about 1 mM to about 10 mM $Ca^{+2}$.

Aspect 470. The taste modulator composition of Aspect 469, wherein the total cation is present in an effective amount to provide a concentration when present in a beverage, food, nutraceutical, pharmaceutical, or cosmetic from about 1 mM to about 5 mM $K^+1$; from about 1 mM to about 5 mM $Mg^{+2}$; and from about 1 mM to about 5 mM $Ca^{+2}$.

Aspect 471. The taste modulator composition of Aspect 469, wherein the total cation is present in an effective amount to provide a concentration when present in a beverage, food, nutraceutical, pharmaceutical, or cosmetic from about 2.5 mM to about 5 mM $K^+1$; from about 2.5 mM to about 5 mM $Mg^{+2}$; and from about 2.5 mM to about 5 mM $Ca^{+2}$.

Aspect 472. The taste modulator composition of Aspect 423, wherein the total cation is present in an effective amount to provide a concentration when present in a beverage, food, nutraceutical, pharmaceutical, or cosmetic from about 1 mM to about 10 mM $Na^+1$; from about 1 mM to about 10 mM $K^+1$; from about 1 mM to about 10 mM $Mg^{+2}$; and from about 1 mM to about 10 mM $Ca^{+2}$.

Aspect 473. The taste modulator composition of Aspect 472, wherein the total cation is present in an effective amount to provide a concentration when present in a beverage, food, nutraceutical, pharmaceutical, or cosmetic from about 1 mM to about 4 mM $Na^+1$; from about 1 mM to about 4 mM $K^+1$; from about 1 mM to about 4 mM $Mg^{+2}$; and from about 1 mM to about 4 mM $Ca^{+2}$.

Aspect 474. The taste modulator composition of Aspect 472, wherein the total cation is present in an effective amount to provide a concentration when present in a beverage, food, nutraceutical, pharmaceutical, or cosmetic from about 1 mM to about 3 mM $Na^+1$; from about 1 mM to about 3 mM $K^+1$; from about 1 mM to about 3 mM $Mg^{+2}$; and from about 1 mM to about 3 mM $Ca^{+2}$.

Aspect 475. A taste modulator composition comprising: a first taste modulator component comprising a first salt having a first cation selected from $Na^+$, $K^+$, $Ca^{+2}$, and $Mg^{+2}$; a second modulator component comprising a second salt having a second cation selected from Na$^+$, K$^+$, Ca$^{+2}$, and Mg$^{+2}$; and a third modulator component comprising a third salt having a third cation selected from Na$^+$, K$^+$, Ca$^{+2}$, and Mg$^{+2}$.

Aspect 476. The taste modulator composition of Aspect 475, wherein the first cation, the second cation, and the third cation are not the same.

Aspect 477. The taste modulator composition of Aspect 476, wherein t the first cation, the second cation, and the third cation are not the same; and wherein the first anion, the second anion, and the third anion are the same.

Aspect 478. The taste modulator composition of Aspect 475, wherein the first cation, the second cation, and the third cation are the same; and wherein the first anion, the second anion, and the third anion are not the same.

Aspect 479. The taste modulator composition of any one of Aspect 475-Aspect 478, wherein the first salt has a first anion comprising gluconate ($C_6H_{11}O_7^{-1}$), citrate ($C_6H_5O_7^{-3}$), hydrogen citrate ($C_6H_6O_7^{-2}$), dihydrogen citrate ($C_6H_7O_7^{-1}$), malate ($C_4H_6O_5^{-2}$), hydrogen malate ($C_4H_7O_5^{-1}$), maleate ($C_4H_2O_4^{-2}$), hydrogen maleate ($C_4H_3O_4^{-1}$), fumarate ($C_4H_2O_4^{-2}$), hydrogen fumarate ($C_4H_3O_4^{-1}$), succinate ($C_4H_4O_4^{-2}$), hydrogen succinate ($C_4H_5O_4^{-1}$), glutarate ($C_5H_6O_4^{-2}$), hydrogen glutarate ($C_5H_7O_4^{-1}$), adipate $C_6H_8O_4^{-2}$), hydrogen adipate ($C_6H_9O_4^{-1}$), lactate ($C_3H_5O_3^{-1}$), tartrate (C4H4O6-2), bitartrate (C4H5O6-1), phosphate ($PO_4^{-3}$), monohydrogen phosphate ($HPO_4^{-2}$), dihydrogen phosphate ($H_2PO_4^{-1}$), fluoride ($F^{-1}$), chloride ($Cl^{-1}$), sulfate ($SO_4^{-2}$), bisulfate ($HSO_4^{-1}$), nitrate ($NO_3^{-1}$), carbonate ($CO_3^{-2}$), bicarbonate ($HCO_3^{-1}$), glycerate ($C_3H_5O_4^{-1}$), glycolate ($C_2H_3O_3^{-1}$), or combinations thereof.

Aspect 480. The taste modulator composition of Aspect 479, where the first anion comprises citrate ($C_6H_5O_7^{-3}$), chloride ($Cl^{-1}$), phosphate ($PO_4^{-3}$), carbonate ($CO_3^{-2}$), sulfate ($SO_4^{-2}$), and combinations thereof.

Aspect 481. The taste modulator composition of Aspect 479, where the first anion comprises citrate ($C_6H_5O_7^{-3}$), sulfate ($SO_4^{-2}$), or combinations thereof.

Aspect 482. The taste modulator composition of Aspect 479, where the first anion comprises sulfate ($SO_4^{-2}$).

Aspect 483. The taste modulator composition of Aspect 479, where the first anion comprises citrate ($C_6H_5O_7^{-3}$).

Aspect 484. The taste modulator composition of Aspect 479, where the first anion comprises chloride ($Cl^{-1}$).

Aspect 485. The taste modulator composition of any one of Aspect 475-Aspect 484, wherein the second salt has a second anion comprising gluconate ($C_6H_{11}O_7^{-1}$), citrate ($C_6H_5O_7^{-3}$), hydrogen citrate ($C_6H_6O_7^{-2}$), dihydrogen citrate ($C_6H_7O_7^{-1}$), malate ($C_4H_6O_5^{-2}$), hydrogen malate ($C_4H_7O_5^{-1}$), maleate ($C_4H_2O_4^{-2}$), hydrogen maleate ($C_4H_3O_4^{-1}$), fumarate ($C_4H_2O_4^{-2}$), hydrogen fumarate ($C_4H_3O_4^{-1}$), succinate ($C_4H_4O_4^{-2}$), hydrogen succinate ($C_4H_5O_4^{-1}$), glutarate ($C_5H_6O_4^{-2}$), hydrogen glutarate ($C_5H_7O_4^{-1}$), adipate $C_6H_8O_4^{-2}$), hydrogen adipate ($C_6H_9O_4^{-1}$), lactate ($C_3H_5O_3^{-1}$), tartrate (C4H4O6-2), bitartrate (C4H5O6-1), phosphate ($PO_4^{-3}$), monohydrogen phosphate ($HPO_4^{-2}$), dihydrogen phosphate ($H_2PO_4^{-1}$), fluoride ($F^{-1}$), chloride ($Cl^{-1}$), sulfate ($SO_4^{-2}$), bisulfate ($HSO_4^{-1}$), nitrate ($NO_3^{-1}$), carbonate ($CO_3^{-2}$), bicarbonate ($HCO_3^{-1}$), glycerate ($C_3H_5O_4^{-1}$), glycolate ($C_2H_3O_3^{-1}$), or combinations thereof.

Aspect 486. The taste modulator composition of Aspect 485, where the second anion comprises citrate ($C_6H_5O_7^{-3}$), chloride ($Cl^{-1}$), phosphate ($PO_4^{-3}$), carbonate ($CO_3^{-2}$), sulfate ($SO_4^{-2}$), and combinations thereof.

Aspect 487. The taste modulator composition of Aspect 485, where the second anion comprises citrate ($C_6H_5O_7^{-3}$), sulfate ($SO_4^{-2}$), or combinations thereof.

Aspect 488. The taste modulator composition of Aspect 485, where the second anion comprises sulfate ($SO_4^{-2}$).

Aspect 489. The taste modulator composition of Aspect 485, where the second anion comprises citrate ($C_6H_5O_7^{-3}$).

Aspect 490. The taste modulator composition of Aspect 485, where the second anion comprises chloride ($Cl^{-1}$).

Aspect 491. The taste modulator composition of any one of Aspect 475-Aspect 490, wherein the third salt has a third anion comprising gluconate ($C_6H_{11}O_7^{-1}$), citrate ($C_6H_5O_7^{-3}$), hydrogen citrate ($C_6H_6O_7^{-2}$), dihydrogen citrate ($C_6H_7O_7^{-1}$), malate ($C_4H_6O_5^{-2}$), hydrogen malate ($C_4H_7O_5^{-1}$), maleate ($C_4H_2O_4^{-2}$), hydrogen maleate ($C_4H_3O_4^{-1}$), fumarate ($C_4H_2O_4^{-2}$), hydrogen fumarate ($C_4H_3O_4^{-1}$), succinate ($C_4H_4O_4^{-2}$), hydrogen succinate ($C_4H_5O_4^{-1}$), glutarate ($C_5H_6O_4^{-2}$), hydrogen glutarate ($C_5H_7O_4^{-1}$), adipate $C_6H_8O_4^{-2}$), hydrogen adipate ($C_6H_9O_4^{-1}$), lactate ($C_3H_5O_3^{-1}$), tartrate (C4H4O6-2), bitartrate (C4H5O6-1), phosphate ($PO_4^{-3}$), monohydrogen phosphate ($HPO_4^{-2}$), dihydrogen phosphate ($H_2PO_4^{-1}$), fluoride ($F^{-1}$), chloride ($Cl^{-1}$), sulfate ($SO_4^{-2}$), bisulfate ($HSO_4^{-1}$), nitrate ($NO_3^{-1}$), carbonate ($CO_3^{-2}$), bicarbonate ($HCO_3^{-1}$), glycerate ($C_3H_5O_4^{-1}$), glycolate ($C_2H_3O_3^{-1}$), or combinations thereof.

Aspect 492. The taste modulator composition of Aspect 491, where the third anion comprises citrate ($C_6H_5O_7^{-3}$), chloride ($Cl^{-1}$), phosphate ($PO_4^{-3}$), carbonate ($CO_3^{-2}$), sulfate ($SO_4^{-2}$), and combinations thereof.

Aspect 493. The taste modulator composition of Aspect 491, where the third anion comprises citrate ($C_6H_5O_7^{-3}$), sulfate ($SO_4^{-2}$), or combinations thereof.

Aspect 494. The taste modulator composition of Aspect 491, where the third anion comprises sulfate ($SO_4^{-2}$).

Aspect 495. The taste modulator composition of Aspect 491, where the third anion comprises citrate ($C_6H_5O_7^{-3}$).

Aspect 496. The taste modulator composition of Aspect 491, where the third anion comprises chloride ($Cl^{-1}$).

Aspect 497. The taste modulator composition of any one of Aspect 475-Aspect 496, wherein the taste modulator composition further comprises a fourth modulator component comprising a fourth salt having a fourth cation selected from Na$^+$, K$^+$, Ca$^{+2}$, and Mg$^{+2}$.

Aspect 498. The taste modulator composition of Aspect 497, wherein the first cation, the second cation, third cation, and the fourth cation are not the same.

Aspect 499. The taste modulator composition of Aspect 498, wherein the first cation, the second cation, third cation, and the fourth cation are not the same; and wherein the first anion, the second anion, the third anion, and the fourth anion are the same.

Aspect 500. The taste modulator composition of Aspect 497, wherein the first cation, the second cation, third cation, and the fourth cation are the same; and wherein the first anion, the second anion, the third anion, and the fourth anion are not the same.

Aspect 501. The taste modulator composition of any one of Aspect 497-Aspect 500, wherein the fourth salt has a fourth anion comprising gluconate ($C_6H_{11}O_7^{-1}$), citrate ($C_6H_5O_7^{-3}$), hydrogen citrate ($C_6H_6O_7^{-2}$), dihydrogen citrate ($C_6H_7O_7^{-1}$), malate ($C_4H_6O_5^{-2}$), hydrogen malate ($C_4H_7O_5^{-1}$), maleate ($C_4H_2O_4^{-2}$), hydrogen maleate ($C_4H_3O_4^{-1}$), fumarate ($C_4H_2O_4^{-2}$), hydrogen fumarate ($C_4H_3O_4^{-1}$), succinate ($C_4H_4O_4^{-2}$), hydrogen succinate ($C_4H_5O_4^{-1}$), glutarate ($C_5H_6O_4^{-2}$), hydrogen glutarate ($C_5H_7O_4^{-1}$), adipate $C_6H_8O_4^{-2}$), hydrogen adipate ($C_6H_9O_4^{-1}$), lactate ($C_3H_5O_3^{-1}$), tartrate (C4H4O6-2), bitartrate (C4H5O6-1), phosphate ($PO_4^{-3}$), monohydrogen phosphate ($HPO_4^{-2}$), dihydrogen phosphate ($H_2PO_4^{-1}$), fluoride ($F^{-1}$), chloride ($Cl^{-1}$), sulfate ($SO_4^{-2}$), bisulfate ($HSO_4^{-1}$), nitrate ($NO_3^{-1}$), carbonate ($CO_3^{-2}$), bicarbonate ($HCO_3^{-1}$), glycerate ($C_3H_5O_4^{-1}$), glycolate ($C_2H_3O_3^{-1}$), or combinations thereof.

Aspect 502. The taste modulator composition of Aspect 501, where the fourth anion comprises citrate ($C_6H_5O_7^{-3}$), chloride ($Cl^{-1}$), phosphate ($PO_4^{-3}$), carbonate ($CO_3^{-2}$), sulfate ($SO_4^{-2}$), and combinations thereof.

Aspect 503. The taste modulator composition of Aspect 501, where the fourth anion comprises citrate ($C_6H_5O_7^{-3}$), sulfate ($SO_4^{-2}$), or combinations thereof.

Aspect 504. The taste modulator composition of Aspect 501, where the fourth anion comprises sulfate ($SO_4^{-2}$).

Aspect 505. The taste modulator composition of Aspect 501, where the fourth anion comprises citrate ($C_6H_5O_7^{-3}$).

Aspect 506. The taste modulator composition of Aspect 501, where the fourth anion comprises chloride ($Cl^{-1}$).

Aspect 507. The taste modulator composition of any one of Aspect 475-Aspect 506, wherein a total cation is present in an effective amount to provide a concentration when present in a beverage, food, nutraceutical, pharmaceutical, or cosmetic from about 0.1 mM to about 30 mM; and wherein the total cation represents a sum of the first cation, and when present, the second cation, the third cation, and the fourth cation.

Aspect 508. The taste modulator composition of Aspect 507, wherein the total cation is present in an effective amount to provide a concentration when present in a beverage, food, nutraceutical, pharmaceutical, or cosmetic from about 0.1 mM to about 10 mM $Na^+$, when $Na^+$ is present; from about 0.1 mM to about 20 mM $K^+$, when $K^+$ is present; from about 0.1 mM to about 5 mM Mg+, when $Mg^{+2}$ is present; from about 0.1 mM to about 5 mM $Ca^{+2}$, when $Ca^{+2}$ is present; and combinations thereof provided that the total cation present is from about 0.1 mM to about 50 mM.

Aspect 509. The taste modulator composition of Aspect 507, wherein the total cation is present in an effective amount to provide a concentration when present in a beverage, food, nutraceutical, pharmaceutical, or cosmetic from about 0.1 mM to about 40 mM.

Aspect 510. The taste modulator composition of Aspect 507, wherein the total cation is present in an effective amount to provide a concentration when present in a beverage, food, nutraceutical, pharmaceutical, or cosmetic from about 0.1 mM to about 30 mM.

Aspect 511. The taste modulator composition of Aspect 507, wherein the total cation is present in an effective amount to provide a concentration when present in a beverage, food, nutraceutical, pharmaceutical, or cosmetic from about 0.1 mM to about 20 mM.

Aspect 512. The taste modulator composition of Aspect 507, wherein the total cation is present in an effective amount to provide a concentration when present in a beverage, food, nutraceutical, pharmaceutical, or cosmetic from about 0.1 mM to about 10 mM.

Aspect 513. The taste modulator composition of Aspect 508, wherein the total cation is present in an effective amount to provide a concentration when present in a beverage, food, nutraceutical, pharmaceutical, or cosmetic from about 1 mM to about 25 mM $Na^+1$.

Aspect 514. The sweetener composition of Aspect 513, wherein the total cation is present in an effective amount to provide a concentration when present in a beverage, food, nutraceutical, pharmaceutical, or cosmetic from about 1 mM to about 17.5 mM $Na^+1$.

Aspect 515. The taste modulator composition of Aspect 513, wherein the total cation is present in an effective amount to provide a concentration when present in a beverage, food, nutraceutical, pharmaceutical, or cosmetic from about 1 mM to about 10 mM $Na^+1$.

Aspect 516. The taste modulator composition of Aspect 513, wherein the total cation is present in an effective amount to provide a concentration when present in a beverage, food, nutraceutical, pharmaceutical, or cosmetic from about 5 mM to about 10 mM $Na^+1$.

Aspect 517. The taste modulator composition of Aspect 508, wherein the total cation is present in an effective amount to provide a concentration when present in a beverage, food, nutraceutical, pharmaceutical, or cosmetic from about 1 mM to about 25 mM $K^+1$.

Aspect 518. The taste modulator composition of Aspect 517, wherein the total cation is present in an effective amount to provide a concentration when present in a beverage, food, nutraceutical, pharmaceutical, or cosmetic from about 1 mM to about 17.5 mM $K^+1$.

Aspect 519. The taste modulator composition of Aspect 517, wherein the total cation is present in an effective amount to provide a concentration when present in a beverage, food, nutraceutical, pharmaceutical, or cosmetic from about 1 mM to about 10 mM $K^+1$.

Aspect 520. The taste modulator composition of Aspect 517, wherein the total cation is present in an effective amount to provide a concentration when present in a beverage, food, nutraceutical, pharmaceutical, or cosmetic from about 5 mM to about 10 mM $K^+1$.

Aspect 521. The taste modulator composition of Aspect 508, wherein the total cation is present in an effective amount to provide a concentration when present in a beverage, food, nutraceutical, pharmaceutical, or cosmetic from about 1 mM to about 15 mM $Mg^{+2}$.

Aspect 522. The taste modulator composition of Aspect 521, wherein the total cation is present in an effective amount to provide a concentration when present in a beverage, food, nutraceutical, pharmaceutical, or cosmetic from about 1 mM to about 10 mM $Mg^{+2}$.

Aspect 523. The taste modulator composition of Aspect 521, wherein the total cation is present in an effective amount to provide a concentration when present in a beverage, food, nutraceutical, pharmaceutical, or cosmetic from about 3 mM to about 5 mM $Mg^{+2}$.

Aspect 524. The taste modulator composition of Aspect 521, wherein the total cation is present in an effective amount to provide a concentration when present in a beverage, food, nutraceutical, pharmaceutical, or cosmetic from about 1 mM to about 5 mM $Mg^{+2}$.

Aspect 525. The taste modulator composition of Aspect 508, wherein the total cation is present in an effective amount to provide a concentration when present in a beverage, food, nutraceutical, pharmaceutical, or cosmetic from about 1 mM to about 25 mM $Ca^{+2}$.

Aspect 526. The taste modulator composition of Aspect 525, wherein the total cation is present in an effective amount to provide a concentration when present in a beverage, food, nutraceutical, pharmaceutical, or cosmetic from about 1 mM to about 17.5 mM $Ca^{+2}$.

Aspect 527. The taste modulator composition of Aspect 525, wherein the total cation is present in an effective amount to provide a concentration when present in a beverage, food, nutraceutical, pharmaceutical, or cosmetic from about 1 mM to about 10 mM $Ca^{+2}$.

Aspect 528. The taste modulator composition of Aspect 525, wherein the total cation is present in an effective amount to provide a concentration when present in a beverage, food, nutraceutical, pharmaceutical, or cosmetic from about 3 mM to about 6 mM $Ca^{+2}$.

Aspect 529. The taste modulator composition of Aspect 525, wherein the total cation is present in an effective amount to provide a concentration when present in a beverage, food, nutraceutical, pharmaceutical, or cosmetic from about 1 mM to about 5 mM $Ca^{+2}$.

Aspect 530. The taste modulator composition of Aspect 508, wherein the total cation is present in an effective amount to provide a concentration when present in a beverage, food, nutraceutical, pharmaceutical, or cosmetic from about 1 mM to about 10 mM $Na^{+1}$; and from about 1 mM to about 10 mM $K^{+1}$.

Aspect 531. The taste modulator composition of Aspect 530, wherein the total cation is present in an effective amount to provide a concentration when present in a beverage, food, nutraceutical, pharmaceutical, or cosmetic from about 3 mM to about 7 mM $Na^{+1}$; and from about 3 mM to about 7 mM $K^{+1}$.

Aspect 532. The taste modulator composition of Aspect 530, wherein the total cation is present in an effective amount to provide a concentration when present in a beverage, food, nutraceutical, pharmaceutical, or cosmetic from about 4 mM to about 6 mM $Na^{+1}$; and from about 4 mM to about 6 mM $K^{+1}$.

Aspect 533. The taste modulator composition of Aspect 508, wherein the total cation is present in an effective amount to provide a concentration when present in a beverage, food, nutraceutical, pharmaceutical, or cosmetic from about 1 mM to about 10 mM $Na^{+1}$; and from about 1 mM to about 10 mM $Mg^{+2}$.

Aspect 534. The taste modulator composition of Aspect 533, wherein the total cation is present in an effective amount to provide a concentration when present in a beverage, food, nutraceutical, pharmaceutical, or cosmetic from about 3 mM to about 7 mM $Na^{+1}$; and from about 3 mM to about 7 mM $Mg^{+2}$.

Aspect 535. The taste modulator composition of Aspect 533, wherein the total cation is present in an effective amount to provide a concentration when present in a beverage, food, nutraceutical, pharmaceutical, or cosmetic from about 4 mM to about 6 mM $Na^{+1}$; and from about 4 mM to about 6 mM $Mg^{+2}$.

Aspect 536. The taste modulator composition of Aspect 508, wherein the total cation is present in an effective amount to provide a concentration when present in a beverage, food, nutraceutical, pharmaceutical, or cosmetic from about 1 mM to about 10 mM $Na^{+1}$; and from about 1 mM to about 10 mM $Ca^{+2}$.

Aspect 537. The taste modulator composition of Aspect 536, wherein the total cation is present in an effective amount to provide a concentration when present in a beverage, food, nutraceutical, pharmaceutical, or cosmetic from about 3 mM to about 7 mM $Na^{+1}$; and from about 3 mM to about 7 mM $Ca^{+2}$.

Aspect 538. The taste modulator composition of Aspect 536, wherein the total cation is present in an effective amount to provide a concentration when present in a beverage, food, nutraceutical, pharmaceutical, or cosmetic from about 4 mM to about 6 mM $Na^{+1}$; and from about 4 mM to about 6 mM $Ca^{+2}$.

Aspect 539. The taste modulator composition of Aspect 508, wherein the total cation is present in an effective amount to provide a concentration when present in a beverage, food, nutraceutical, pharmaceutical, or cosmetic from about 1 mM to about 10 mM $K^{+1}$; and from about 1 mM to about 10 mM $Mg^{+2}$.

Aspect 540. The taste modulator composition of Aspect 539, wherein the total cation is present in an effective amount to provide a concentration when present in a beverage, food, nutraceutical, pharmaceutical, or cosmetic from about 3 mM to about 7 mM $K^{+1}$; and from about 3 mM to about 7 mM $Mg^{+2}$.

Aspect 541. The taste modulator composition of Aspect 539, wherein the total cation is present in an effective amount to provide a concentration when present in a beverage, food, nutraceutical, pharmaceutical, or cosmetic from about 4 mM to about 6 mM $K^{+1}$; and from about 4 mM to about 6 mM $Mg^{+2}$.

Aspect 542. The taste modulator composition of Aspect 508, wherein the total cation is present in an effective amount to provide a concentration when present in a beverage, food, nutraceutical, pharmaceutical, or cosmetic from about 1 mM to about 10 mM $K^{+1}$; and from about 1 mM to about 10 mM $Ca^{+2}$.

Aspect 543. The taste modulator composition of Aspect 542, wherein the total cation is present in an effective amount to provide a concentration when present in a beverage, food, nutraceutical, pharmaceutical, or cosmetic from about 3 mM to about 7 mM $K^{+1}$; and from about 3 mM to about 7 mM $Ca^{+2}$.

Aspect 544. The taste modulator composition of Aspect 542, wherein the total cation is present in an effective amount to provide a concentration when present in a beverage, food, nutraceutical, pharmaceutical, or cosmetic from about 4 mM to about 6 mM $K^{+1}$; and from about 4 mM to about 6 mM $Ca^{+2}$.

Aspect 545. The taste modulator composition of Aspect 508, wherein the total cation is present in an effective amount to provide a concentration when present in a beverage, food, nutraceutical, pharmaceutical, or cosmetic from about 1 mM to about 10 mM $Mg^{+2}$; and from about 1 mM to about 10 mM $Ca^{+2}$.

Aspect 546. The taste modulator composition of Aspect 545, wherein the total cation is present in an effective amount to provide a concentration when present in a beverage, food, nutraceutical, pharmaceutical, or cosmetic from about 2 mM to about 6 mM $Mg^{+2}$; and from about 2 mM to about 6 mM $Ca^{+2}$.

Aspect 547. The taste modulator composition of Aspect 545, wherein the total cation is present in an effective amount to provide a concentration when present in a beverage, food, nutraceutical, pharmaceutical, or cosmetic from about 3 mM to about 5 mM $Mg^{+2}$; and from about 3 mM to about 5 mM $Ca^{+2}$.

Aspect 548. The taste modulator composition of Aspect 508, wherein the total cation is present in an effective amount to provide a concentration when present in a beverage, food, nutraceutical, pharmaceutical, or cosmetic from about 1 mM to about 10 mM $Na^{+1}$; from about 1 mM to about 10 mM $K^{+1}$; and from about 1 mM to about 10 mM $Mg^{+2}$.

Aspect 549. The taste modulator composition of Aspect 548, wherein the total cation is present in an effective amount to provide a concentration when present in a beverage, food, nutraceutical, pharmaceutical, or cosmetic of about 1 mM to about 5 mM $Na^{+1}$; about 1 mM to about 5 mM $K^{+1}$; and about 1 mM to about 5 mM $Mg^{+2}$.

Aspect 550. The taste modulator composition of Aspect 548, wherein the total cation is present in an effective amount to provide a concentration when present in a beverage, food, nutraceutical, pharmaceutical, or cosmetic from about 2.5 mM to about 5 mM $Na^+1$; from about 2.5 mM to about 5 mM $K^+1$; and from about 2.5 mM to about 5 mM $Mg^{+2}$.

Aspect 551. The taste modulator composition of Aspect 508, wherein the total cation is present in an effective amount to provide a concentration when present in a beverage, food, nutraceutical, pharmaceutical, or cosmetic from about 1 mM to about 10 mM $Na^+1$; from about 1 mM to about 10 mM $K^+1$; and from about 1 mM to about 10 mM $Ca^{+2}$.

Aspect 552. The taste modulator composition of Aspect 551, wherein the total cation is present in an effective amount to provide a concentration when present in a beverage, food, nutraceutical, pharmaceutical, or cosmetic from about 1 mM to about 5 mM $Na^+1$; from about 1 mM to about 5 mM $K^+1$; and from about 1 mM to about 5 mM $Ca^{+2}$.

Aspect 553. The taste modulator composition of Aspect 551, wherein the total cation is present in an effective amount to provide a concentration when present in a beverage, food, nutraceutical, pharmaceutical, or cosmetic from about 2.5 mM to about 5 mM $Na^+1$; from about 2.5 mM to about 5 mM $K^+1$; and from about 2.5 mM to about 5 mM $Ca^{+2}$.

Aspect 554. The taste modulator composition of Aspect 508, wherein the total cation is present in an effective amount to provide a concentration when present in a beverage, food, nutraceutical, pharmaceutical, or cosmetic from about 1 mM to about 10 mM $K^+1$; from about 1 mM to about 10 mM $Mg^{+2}$; and from about 1 mM to about 10 mM $Ca^{+2}$.

Aspect 555. The taste modulator composition of Aspect 554, wherein the total cation is present in an effective amount to provide a concentration when present in a beverage, food, nutraceutical, pharmaceutical, or cosmetic from about 1 mM to about 5 mM $K^+1$; from about 1 mM to about 5 mM $Mg^{+2}$; and from about 1 mM to about 5 mM $Ca^{+2}$.

Aspect 556. The taste modulator composition of Aspect 554, wherein the total cation is present in an effective amount to provide a concentration when present in a beverage, food, nutraceutical, pharmaceutical, or cosmetic from about 2.5 mM to about 5 mM $K^+1$; from about 2.5 mM to about 5 mM $Mg^{+2}$; and from about 2.5 mM to about 5 mM $Ca^{+2}$.

Aspect 557. The taste modulator composition of Aspect 508, wherein the total cation is present in an effective amount to provide a concentration when present in a beverage, food, nutraceutical, pharmaceutical, or cosmetic from about 1 mM to about 10 mM $Na^+1$; from about 1 mM to about 10 mM $K^+1$; from about 1 mM to about 10 mM $Mg^{+2}$; and from about 1 mM to about 10 mM $Ca^{+2}$.

Aspect 558. The taste modulator composition of Aspect 557, wherein the total cation is present in an effective amount to provide a concentration when present in a beverage, food, nutraceutical, pharmaceutical, or cosmetic from about 1 mM to about 4 mM $Na^+1$; from about 1 mM to about 4 mM $K^+1$; from about 1 mM to about 4 mM $Mg^{+2}$; and from about 1 mM to about 4 mM $Ca^{+2}$.

Aspect 559. The taste modulator composition of Aspect 557, wherein the total cation is present in an effective amount to provide a concentration when present in a beverage, food, nutraceutical, pharmaceutical, or cosmetic from about 1 mM to about 3 mM $Na^+1$; from about 1 mM to about 3 mM $K^+1$; from about 1 mM to about 3 mM $Mg^{+2}$; and from about 1 mM to about 3 mM $Ca^{+2}$.

Aspect 560. A sweetener composition comprising: a taste modulator composition of any one of Aspect 296-Aspect 559; and a sweetening agent.

Aspect 561. The sweetener composition of Aspect 560, wherein the sweetening agent comprises a natural HP sweetener, a synthetic HP sweetener, a carbohydrate/polyol sweetener, or combinations thereof.

Aspect 562. The sweetener composition of Aspect 561, wherein the natural HP sweetener comprises a *Stevia* sweetener, a *Siraitia grosvenorii*-derived sweetener, a protein sweetener, or combinations thereof.

Aspect 563. The sweetener composition of Aspect 562, wherein the *Stevia* sweetener comprises stevioside, rubusoside, steviolbioside, dulcoside A, rebaudioside A, rebaudioside B, rebaudioside C, rebaudioside D, rebaudioside E, rebaudioside F, rebaudioside M, or combinations thereof.

Aspect 564. The sweetener composition of Aspect 563, wherein the *Stevia* sweetener comprises rebaudioside A, rebaudioside B, rebaudioside C, rebaudioside D, rebaudioside E, rebaudioside F, rebaudioside M, or combinations thereof.

Aspect 565. The sweetener composition of Aspect 564, wherein the *Stevia* sweetener comprises rebaudioside A, rebaudioside D, rebaudioside F, rebaudioside M, or combinations thereof.

Aspect 566. The sweetener composition of Aspect 564, wherein the *Stevia* sweetener comprises rebaudioside A.

Aspect 567. The sweetener composition of Aspect 564, wherein the *Stevia* sweetener comprises rebaudioside D.

Aspect 568. The sweetener composition of Aspect 564, wherein the *Stevia* sweetener comprises rebaudioside F.

Aspect 569. The sweetener composition of Aspect 564, wherein the *Stevia* sweetener comprises rebaudioside M.

Aspect 570. The sweetener composition of Aspect 564, wherein the *Stevia* sweetener comprises glucosylated steviol glycosides.

Aspect 571. The sweetener composition of Aspect 562, wherein the *Siraitia grosvenorii*-derived sweetener comprises a solvent extract of a fruit; and wherein the solvent extract comprises greater than or equal to about 60 wt % mogrosides.

Aspect 572. The sweetener composition of Aspect 571, wherein the solvent extract comprises greater than or equal to about 70 wt % total mogrosides.

Aspect 573. The sweetener composition of Aspect 571, wherein the solvent extract comprises greater than or equal to about 80 wt % total mogrosides.

Aspect 574. The sweetener composition of Aspect 571, wherein the solvent extract comprises greater than or equal to about 85 wt % total mogrosides.

Aspect 575. The sweetener composition of Aspect 571, wherein the solvent extract comprises greater than or equal to about 90 wt % total mogrosides.

Aspect 576. The sweetener composition of Aspect 571, wherein the solvent extract comprises greater than or equal to about 70 wt % mogroside V.

Aspect 577. The sweetener composition of Aspect 571, wherein the solvent extract comprises greater than or equal to about 80 wt % mogroside V.

Aspect 578. The sweetener composition of Aspect 571, wherein the solvent extract comprises greater than or equal to about 85 wt % mogroside V.

Aspect 579. The sweetener composition of Aspect 571, wherein the solvent extract comprises greater than or equal to about 90 wt % mogroside V.

Aspect 580. The sweetener composition of Aspect 562, wherein the *Siraitia grosvenorii*-derived sweetener comprises mogroside IV, mogroside V, siratose, or combinations thereof.

Aspect 581. The sweetener composition of Aspect 562, wherein the protein sweetener comprises thaumatin, monellin, single-chain monellin, brazzein, or combinations thereof.

Aspect 582. The sweetener composition of any one of Aspect 561-Aspect 581, wherein the synthetic HP sweetener comprises a peptide sweetener, an N-sulfonyl amide sweetener, a sulfamate sweetener, a halogenated carbohydrate, a polyketide, or combinations thereof.

Aspect 583. The sweetener composition of Aspect 582, wherein the peptide sweetener comprises aspartame, neotame, advantame, a food grade salt thereof, or combinations thereof.

Aspect 584. The sweetener composition of Aspect 582, wherein the N-sulfonyl amide sweetener comprises saccharin, acesulfame, a food grade salt thereof, or combinations thereof.

Aspect 585. The sweetener composition of Aspect 582, wherein the sulfamate sweetener comprises cyclamic acid, a food grade salt thereof, or combinations thereof.

Aspect 586. The sweetener composition of Aspect 582, wherein the halogenated carbohydrate comprises sucralose.

Aspect 587. The sweetener composition of Aspect 582, wherein the polyketide comprises neohesperidin dihydrochalcone.

Aspect 588. The sweetener composition of any one of Aspect 561-Aspect 587, wherein the carbohydrate/polyol sweetener comprises a fully-caloric sweetener, a partially-caloric sweetener, a HP sweetener, or combinations thereof.

Aspect 589. The sweetener composition of Aspect 588, wherein fully-caloric sweetener comprises sucrose, glucose, maltose, fructose, lactose, xylitol, sorbitol, or combinations thereof.

Aspect 590. The sweetener composition of Aspect 588, wherein partially-caloric sweetener comprises maltitol, lactitol, isomalt, threitol, arabitol, D-tagatose, D-psicose, or combinations thereof.

Aspect 591. The sweetener composition of Aspect 588, wherein partially-caloric sweetener comprises one or more fructooligosaccharides.

Aspect 592. The sweetener composition of Aspect 588, wherein the HP sweetener comprises erythritol.

Aspect 593. The sweetener composition of any one of Aspect 560-Aspect 592, wherein the sweetening agent comprises a mixture of aspartame and acesulfame, or a food grade salt thereof.

Aspect 594. The sweetener composition of Aspect 593, further comprising cyclamic acid, or a food grade salt thereof.

Aspect 595. The sweetener composition of any one of Aspect 560-Aspect 594, wherein the sweetening agent comprises a mixture of aspartame and saccharin, or a food grade salt thereof.

Aspect 596. The sweetener composition of Aspect 595, further comprising cyclamic acid, or a food grade salt thereof.

Aspect 597. The sweetener composition of any one of Aspect 560-Aspect 592, wherein the sweetening agent comprises a mixture of aspartame; and cyclamic acid, or a food grade salt thereof.

Aspect 598. The sweetener composition of any one of Aspect 560-Aspect 52, wherein the sweetening agent comprises a mixture of sucralose; and saccharin, or a food grade salt thereof.

Aspect 599. The sweetener composition of any one of Aspect 560-Aspect 592, wherein the sweetening agent comprises a mixture of sucralose; and acesulfame, or a food grade salt thereof.

Aspect 600. The sweetener composition of any one of Aspect 560-Aspect 592, wherein the sweetening agent comprises a mixture of *Stevia* sweeteners.

Aspect 601. The sweetener composition of Aspect 600, wherein the mixture of *Stevia* sweeteners comprises at least two of stevioside, rubusoside, steviolbioside, dulcoside A, rebaudioside A, rebaudioside B, rebaudioside C, rebaudioside D, rebaudioside E, rebaudioside F, rebaudioside M, and glucosylated steviol glycosides.

Aspect 602. The sweetener composition of Aspect 600, wherein the mixture of *Stevia* sweeteners comprises rebaudioside A and glucosylated steviol glycosides.

Aspect 603. The sweetener composition of any one of Aspect 560-Aspect 592, wherein the sweetening agent comprises a mixture of a *Stevia* sweetener and a *Siraitia grosvenorii*-derived sweetener.

Aspect 604. The sweetener composition of Aspect 603, wherein the *Siraitia grosvenorii*-derived sweetener comprises a solvent extract of a fruit; and wherein the solvent extract comprises greater than or equal to about 60 wt % mogrosides.

Aspect 605. The sweetener composition of Aspect 604, wherein the solvent extract comprises greater than or equal to about 70 wt % total mogrosides.

Aspect 606. The sweetener composition of Aspect 604, wherein the solvent extract comprises greater than or equal to about 80 wt % total mogrosides.

Aspect 607. The sweetener composition of Aspect 604, wherein the solvent extract comprises greater than or equal to about 85 wt % total mogrosides.

Aspect 608. The sweetener composition of Aspect 604, wherein the solvent extract comprises greater than or equal to about 90 wt % total mogrosides.

Aspect 609. The sweetener composition of Aspect 604, wherein the solvent extract comprises greater than or equal to about 70 wt % mogroside V.

Aspect 610. The sweetener composition of Aspect 604, wherein the solvent extract comprises greater than or equal to about 80 wt % mogroside V.

Aspect 611. The sweetener composition of Aspect 604, wherein the solvent extract comprises greater than or equal to about 85 wt % mogroside V.

Aspect 612. The sweetener composition of Aspect 604, wherein the solvent extract comprises greater than or equal to about 90 wt % mogroside V.

Aspect 613. The sweetener composition of Aspect 603 wherein the *Siraitia grosvenorii*-derived sweetener comprises mogroside IV, mogroside V, siratose, or combinations thereof.

Aspect 614. The sweetener composition of any one of Aspect 560-Aspect 592, wherein the sweetening agent comprises a mixture comprising a *Stevia* sweetener and thaumatin.

Aspect 615. The sweetener composition of any one of Aspect 560-Aspect 592, wherein the sweetening agent comprises a mixture comprising a *Stevia* sweetener and erythritol.

Aspect 616. The sweetener composition of any one of Aspect 560-Aspect 592, wherein the sweetening agent comprises a mixture comprising a *Stevia* sweetener and D-psicose.

Aspect 617. The sweetener composition of any one of Aspect 603-Aspect 616, wherein the *Stevia* sweetener comprises a stevioside, rubusoside, steviolbioside, dulcoside A, rebaudioside A, rebaudioside B, rebaudioside C, rebaudioside D, rebaudioside E, rebaudioside F, rebaudioside M, a mixture of glucosylated steviol glycosides, or combinations thereof.

Aspect 618. The sweetener composition of Aspect 617, wherein the *Stevia* sweetener comprises rebaudioside A, a mixture of glucosylated steviol glycosides, or combinations thereof.

Aspect 619. The sweetener composition of Aspect 617, wherein the *Stevia* sweetener comprises rebaudioside A.

Aspect 620. The sweetener composition of Aspect 617, wherein the *Stevia* sweetener comprises a mixture of glucosylated steviol glycosides.

Aspect 621. The sweetener composition of any one of Aspect 560-Aspect 620, wherein the sweetening agent and the taste modulator component are present in a ratio of the sweetening agent to a total cation; wherein the sweetening agent is present in an amount of about 100 to about 1000 mg to about 0.1 mmol to about 30 mmol of the total cation; and wherein the total cation represents a sum of the first cation, and when present, the second cation, the third cation, and the fourth cation.

Aspect 622. The sweetener composition of Aspect 621, wherein the ratio of the sweetening agent to the total cation is about 100 to about 1000 mg of the sweetening agent to the total cation comprising about 0.1 mmol to about 10 mmol $Na^+$, when $Na^+$ is present; about 0.1 mmol to about 20 mmol $K^+$, when $K^+$ is present; about 0.1 mmol to about 5 mmol $Mg^{+2}$, when $Mg^{+2}$ is present; about 0.1 mmol to about 5 mmol $Ca^{+2}$, when $Ca^{+2}$ is present; and combinations thereof provided that the total cation is about 0.1 mmol to about 30 mmol.

Aspect 623. The sweetener composition of any one of Aspect 560-Aspect 620, wherein the ratio of the sweetening agent to the total cation is about 300 to about 1000 mg of the sweetening agent to the total cation.

Aspect 624. The sweetener composition of Aspect 623, wherein the ratio of the sweetening agent to the total cation is about 300 to about 900 mg of the sweetening agent to the total cation.

Aspect 625. The sweetener composition of Aspect 623, wherein the ratio of the sweetening agent to the total cation is about 300 to about 800 mg of the sweetening agent to the total cation.

Aspect 626. The sweetener composition of Aspect 623, wherein the ratio of the sweetening agent to the total cation is about 300 to about 700 mg of the sweetening agent to the total cation.

Aspect 627. The sweetener composition of Aspect 623, wherein the ratio of the sweetening agent to the total cation is about 300 to about 600 mg of the sweetening agent to the total cation.

Aspect 628. The sweetener composition of Aspect 623, wherein the ratio of the sweetening agent to the total cation is about 300 to about 500 mg of the sweetening agent to the total cation.

Aspect 629. The sweetener composition of Aspect 623, wherein the ratio of the sweetening agent to the total cation is about 400 to about 1000 mg of the sweetening agent to the total cation.

Aspect 630. The sweetener composition of Aspect 623, wherein the ratio of the sweetening agent to the total cation is about 400 to about 900 mg of the sweetening agent to the total cation.

Aspect 631. The sweetener composition of Aspect 623, wherein the ratio of the sweetening agent to the total cation is about 400 to about 800 mg of the sweetening agent to the total cation.

Aspect 632. The sweetener composition of Aspect 623, wherein the ratio of the sweetening agent to the total cation is about 400 to about 700 mg of the sweetening agent to the total cation.

Aspect 633. The sweetener composition of Aspect 623, wherein the ratio of the sweetening agent to the total cation is about 400 to about 600 mg of the sweetening agent to the total cation.

Aspect 634. The sweetener composition of Aspect 623, wherein the ratio of the sweetening agent to the total cation is about 400 to about 500 mg of the sweetening agent to the total cation.

Aspect 635. The sweetener composition of any one of Aspect 560-Aspect 634, wherein the sweetening agent is present in an amount effective to provide a concentration when present in a beverage, food, nutraceutical, pharmaceutical, or cosmetic from about 1 mg/L to about 1000 mg/L; and wherein a total cation is present in an effective amount to provide a concentration when present in a beverage, food, nutraceutical, pharmaceutical, or cosmetic from about 0.1 mM to about 30 mM; and wherein the total cation represents a sum of the first cation, and when present, the second cation, the third cation, and the fourth cation.

Aspect 636. The sweetener composition of Aspect 635, wherein the total cation is present in an effective amount to provide a concentration when present in a beverage, food, nutraceutical, pharmaceutical, or cosmetic from about 0.1 mM to about 10 mM $Na^+$, when $Na^+$ is present; from about 0.1 mM to about 20 mM $K^+$, when $K^+$ is present; from about 0.1 mM to about 5 mM Mg+, when Mg+ is present; from about 0.1 mM to about 5 mM $Ca^{+2}$, when $Ca^{+2}$ is present; and combinations thereof provided that the total cation present is from about 0.1 mM to about 50 mM.

Aspect 637. A beverage composition comprising: a taste modulator composition of any one of Aspect 296-Aspect 559; and a sweetening agent.

Aspect 638. The beverage composition of Aspect 637, wherein the sweetening agent comprises a natural HP sweetener, a synthetic HP sweetener, a carbohydrate/polyol sweetener, or combinations thereof.

Aspect 639. The beverage composition of Aspect 638, wherein the natural HP sweetener comprises a *Stevia* sweetener, a *Siraitia grosvenorii*-derived sweetener, a protein sweetener, or combinations thereof.

Aspect 640. The beverage composition of Aspect 639, wherein the *Stevia* sweetener comprises stevioside, rubusoside, steviolbioside, dulcoside A, rebaudioside A, rebaudioside B, rebaudioside C, rebaudioside D, rebaudioside E, rebaudioside F, rebaudioside M, or combinations thereof.

Aspect 641. The beverage composition of Aspect 640, wherein the *Stevia* sweetener comprises rebaudioside A, rebaudioside B, rebaudioside C, rebaudioside D, rebaudioside E, rebaudioside F, rebaudioside M, or combinations thereof.

Aspect 642. The beverage composition of Aspect 641, wherein the *Stevia* sweetener comprises rebaudioside A, rebaudioside D, rebaudioside F, rebaudioside M, or combinations thereof.

Aspect 643. The beverage composition of Aspect 642, wherein the *Stevia* sweetener comprises rebaudioside A.

Aspect 644. The beverage composition of Aspect 642, wherein the *Stevia* sweetener comprises rebaudioside D.

Aspect 645. The beverage composition of Aspect 642, wherein the *Stevia* sweetener comprises rebaudioside F.

Aspect 646. The beverage composition of Aspect 642, wherein the *Stevia* sweetener comprises rebaudioside M.

Aspect 647. The beverage composition of Aspect 642, wherein the *Stevia* sweetener comprises glucosylated steviol glycosides.

Aspect 648. The beverage composition of Aspect 640, wherein the *Siraitia grosvenorii*-derived sweetener comprises a solvent extract of a fruit; and wherein the solvent extract comprises greater than or equal to about 60 wt % mogrosides.

Aspect 649. The beverage composition of Aspect 648, wherein the solvent extract comprises greater than or equal to about 70 wt % total mogrosides.

Aspect 650. The beverage composition of Aspect 648, wherein the solvent extract comprises greater than or equal to about 80 wt % total mogrosides.

Aspect 651. The beverage composition of Aspect 648, wherein the solvent extract comprises greater than or equal to about 85 wt % total mogrosides.

Aspect 652. The beverage composition of Aspect 648, wherein the solvent extract comprises greater than or equal to about 90 wt % total mogrosides.

Aspect 653. The beverage composition of Aspect 648, wherein the solvent extract comprises greater than or equal to about 70 wt % mogroside V.

Aspect 654. The beverage composition of Aspect 648, wherein the solvent extract comprises greater than or equal to about 80 wt % mogroside V.

Aspect 655. The beverage composition of Aspect 648, wherein the solvent extract comprises greater than or equal to about 85 wt % mogroside V.

Aspect 656. The beverage composition of Aspect 648, wherein the solvent extract comprises greater than or equal to about 90 wt % mogroside V.

Aspect 657. The beverage composition of Aspect 640, wherein the *Siraitia grosvenorii*-derived sweetener comprises mogroside IV, mogroside V, siratose, or combinations thereof.

Aspect 658. The beverage composition of Aspect 640, wherein the protein sweetener comprises thaumatin, monellin, single-chain monellin, brazzein, or combinations thereof.

Aspect 659. The beverage composition of any one of Aspect 639-Aspect 658, wherein the synthetic HP sweetener comprises a peptide sweetener, an N-sulfonyl amide sweetener, a sulfamate sweetener, a halogenated carbohydrate, a polyketide, or combinations thereof.

Aspect 660. The beverage composition of Aspect 659, wherein the peptide sweetener comprises aspartame, neotame, advantame, a food grade salt thereof, or combinations thereof.

Aspect 661. The sweetener composition of Aspect 659, wherein the N-sulfonyl amide sweetener comprises saccharin, acesulfame, a food grade salt thereof, or combinations thereof.

Aspect 662. The beverage composition of Aspect 659, wherein the sulfamate sweetener comprises cyclamic acid, a food grade salt thereof, or combinations thereof.

Aspect 663. The beverage composition of Aspect 659, wherein the halogenated carbohydrate comprises sucralose.

Aspect 664. The beverage composition of Aspect 659, wherein the polyketide comprises neohesperidin dihydrochalcone.

Aspect 665. The beverage composition of any one of Aspect 639-Aspect 664, wherein the carbohydrate/polyol sweetener comprises a fully-caloric sweetener, a partially-caloric sweetener, a HP sweetener, or combinations thereof.

Aspect 666. The beverage composition of Aspect 665, wherein fully-caloric sweetener comprises sucrose, glucose, maltose, fructose, lactose, xylitol, sorbitol, or combinations thereof.

Aspect 667. The beverage composition of Aspect 665, wherein partially-caloric sweetener comprises maltitol, lactitol, isomalt, threitol, arabitol, D-tagatose, D-psicose, or combinations thereof.

Aspect 668. The beverage composition of Aspect 665, wherein partially-caloric sweetener comprises one or more fructooligosaccharides.

Aspect 669. The beverage composition of Aspect 665, wherein the HP sweetener comprises erythritol.

Aspect 670. The beverage composition of any one of Aspect 638-Aspect 669, wherein the sweetening agent comprises a mixture of aspartame and acesulfame, or a food grade salt thereof.

Aspect 671. The beverage composition of Aspect 670, further comprising cyclamic acid, or a food grade salt thereof.

Aspect 672. The beverage composition of any one of Aspect 638-Aspect 669, wherein the sweetening agent comprises a mixture of aspartame and saccharin, or a food grade salt thereof.

Aspect 673. The beverage composition of Aspect 672, further comprising cyclamic acid, or a food grade salt thereof.

Aspect 674. The beverage composition of any one of Aspect 638-Aspect 669, wherein the sweetening agent comprises a mixture of aspartame; and cyclamic acid, or a food grade salt thereof.

Aspect 675. The beverage composition of any one of Aspect 638-Aspect 669, wherein the sweetening agent comprises a mixture of sucralose; and saccharin, or a food grade salt thereof.

Aspect 676. The beverage composition of any one of Aspect 638-Aspect 669, wherein the sweetening agent comprises a mixture of sucralose; and acesulfame, or a food grade salt thereof.

Aspect 677. The beverage composition of any one of Aspect 638-Aspect 669, wherein the sweetening agent comprises a mixture of *Stevia* sweeteners.

Aspect 678. The beverage composition of Aspect 677, wherein the mixture of *Stevia* sweeteners comprises at least two of stevioside, rubusoside, steviolbioside, dulcoside A, rebaudioside A, rebaudioside B, rebaudioside C, rebaudioside D, rebaudioside E, rebaudioside F, rebaudioside M, and glucosylated steviol glycosides.

Aspect 679. The beverage composition of Aspect 677, wherein the mixture of *Stevia* sweeteners comprises rebaudioside A and glucosylated steviol glycosides.

Aspect 680. The beverage composition of any one of Aspect 638-Aspect 669, wherein the sweetening agent comprises a mixture of a *Stevia* sweetener and a *Siraitia grosvenorii*-derived sweetener.

Aspect 681. The beverage composition of Aspect 680, wherein the *Siraitia grosvenorii*-derived sweetener comprises a solvent extract of a fruit; and wherein the solvent extract comprises greater than or equal to about 60 wt % mogrosides.

Aspect 682. The beverage composition of Aspect 681, wherein the solvent extract comprises greater than or equal to about 70 wt % total mogrosides.

Aspect 683. The beverage composition of Aspect 681, wherein the solvent extract comprises greater than or equal to about 80 wt % total mogrosides.

Aspect 684. The beverage composition of Aspect 681, wherein the solvent extract comprises greater than or equal to about 85 wt % total mogrosides.

Aspect 685. The beverage composition of Aspect 681, wherein the solvent extract comprises greater than or equal to about 90 wt % total mogrosides.

Aspect 686. The beverage composition of Aspect 681, wherein the solvent extract comprises greater than or equal to about 70 wt % mogroside V.

Aspect 687. The beverage composition of Aspect 681, wherein the solvent extract comprises greater than or equal to about 80 wt % mogroside V.

Aspect 688. The beverage composition of Aspect 681, wherein the solvent extract comprises greater than or equal to about 85 wt % mogroside V.

Aspect 689. The beverage composition of Aspect 681, wherein the solvent extract comprises greater than or equal to about 90 wt % mogroside V.

Aspect 690. The beverage composition of Aspect 603 wherein the *Siraitia grosvenorii*-derived sweetener comprises mogroside IV, mogroside V, siratose, or combinations thereof.

Aspect 691. The beverage composition of any one of Aspect 638-Aspect 669, wherein the sweetening agent comprises a mixture comprising a *Stevia* sweetener and thaumatin.

Aspect 692. The beverage composition of any one of Aspect 638-Aspect 669, wherein the sweetening agent comprises a mixture comprising a *Stevia* sweetener and erythritol.

Aspect 693. The beverage composition of any one of Aspect 638-Aspect 669, wherein the sweetening agent comprises a mixture comprising a *Stevia* sweetener and D-psicose.

Aspect 694. The beverage composition of any one of Aspect 638-Aspect 693, wherein the sweetening agent is present in an amount of from about 50 mg/L to about 1000 mg/L; and wherein the total cation present is from about 0.1 mM to about 30 mM of the total cation; and wherein the total cation represents a sum of the first cation, and when present, the second cation, the third cation, and the fourth cation.

Aspect 695. The beverage composition of Aspect 694, wherein the sweetening agent is present in an amount of from about 50 mg/L to about 1000 mg/L; and wherein the total cation present is about 0.1 mM to about 10 mM $Na^+$, when $Na^+$ is present; about 0.1 mM to about 20 mM $K^+$, when $K^+$ is present; about 0.1 mM to about 5 mM $Mg^{+2}$, when $Mg^{+2}$ is present; about 0.1 mM to about 5 mM $Ca^{+2}$, when $Ca^{+2}$ is present; and combinations thereof provided that the total cation is about 0.1 mM to about 30 mM.

Aspect 696. The beverage composition of Aspect 694 or Aspect 695, wherein the sweetening agent is present in an amount of about 100 mg/L to about 1000 mg/L.

Aspect 697. The beverage composition of Aspect 696, wherein the sweetening agent is present in an amount of about 100 mg/L to about 900 mg/L.

Aspect 698. The beverage composition of Aspect 696, wherein the sweetening agent is present in an amount of about 100 mg/L to about 800 mg/L.

Aspect 699. The beverage composition of Aspect 696, wherein the sweetening agent is present in an amount of about 100 mg/L to about 700 mg/L.

Aspect 700. The beverage composition of Aspect 696, wherein the sweetening agent is present in an amount of about 100 mg/L to about 600 mg/L.

Aspect 701. The beverage composition of Aspect 696, wherein the sweetening agent is present in an amount of about 100 mg/L to about 500 mg/L.

Aspect 702. The beverage composition of Aspect 696, wherein the sweetening agent is present in an amount of about 100 mg/L to about 400 mg/L.

Aspect 703. The beverage composition of Aspect 696, wherein the sweetening agent is present in an amount of about 100 mg/L to about 300 mg/L.

Aspect 704. The beverage composition of Aspect 696, wherein the sweetening agent is present in an amount of about 200 mg/L to about 900 mg/L.

Aspect 705. The beverage composition of Aspect 696, wherein the sweetening agent is present in an amount of about 200 mg/L to about 800 mg/L.

Aspect 706. The beverage composition of Aspect 696, wherein the sweetening agent is present in an amount of about 200 mg/L to about 700 mg/L.

Aspect 707. The beverage composition of Aspect 696, wherein the sweetening agent is present in an amount of about 200 mg/L to about 600 mg/L.

Aspect 708. The beverage composition of Aspect 696, wherein the sweetening agent is present in an amount of about 200 mg/L to about 500 mg/L.

Aspect 709. The beverage composition of Aspect 696, wherein the sweetening agent is present in an amount of about 200 mg/L to about 400 mg/L.

Aspect 710. The beverage composition of Aspect 696, wherein the sweetening agent is present in an amount of about 200 mg/L to about 300 mg/L.

Aspect 711. The beverage composition of Aspect 696, wherein the sweetening agent is present in an amount of about 300 mg/L to about 900 mg/L.

Aspect 712. The beverage composition of Aspect 696, wherein the sweetening agent is present in an amount of about 300 mg/L to about 800 mg/L.

Aspect 713. The beverage composition of Aspect 696, wherein the sweetening agent is present in an amount of about 300 mg/L to about 700 mg/L.

Aspect 714. The beverage composition of Aspect 696, wherein the sweetening agent is present in an amount of about 300 mg/L to about 600 mg/L.

Aspect 715. The beverage composition of Aspect 696, wherein the sweetening agent is present in an amount of about 300 mg/L to about 500 mg/L.

Aspect 716. The beverage composition of Aspect 696, wherein the sweetening agent is present in an amount of about 300 mg/L to about 400 mg/L.

Aspect 717. The beverage composition of Aspect 696, wherein the sweetening agent is present in an amount of about 400 mg/L to about 900 mg/L.

Aspect 718. The beverage composition of Aspect 696, wherein the sweetening agent is present in an amount of about 400 mg/L to about 800 mg/L.

Aspect 719. The beverage composition of Aspect 696, wherein the sweetening agent is present in an amount of about 400 mg/L to about 700 mg/L.

Aspect 720. The beverage composition of Aspect 696, wherein the sweetening agent is present in an amount of about 400 mg/L to about 600 mg/L.

Aspect 721. The beverage composition of Aspect 696, wherein the sweetening agent is present in an amount of about 400 mg/L to about 500 mg/L.

Aspect 722. The beverage composition of any one of Aspect 695-Aspect 721, wherein $K^+$ is present in an amount from about 0.1 mM to about 20 mM.

Aspect 723. The beverage composition of Aspect 722, wherein $K^+$ is present in an amount from about 0.5 mM to about 20 mM.

Aspect 724. The beverage composition of Aspect 722, wherein $K^+$ is present in an amount from about 1 mM to about 20 mM.

Aspect 725. The beverage composition of Aspect 722, wherein $K^+$ is present in an amount from about 2 mM to about 20 mM.

Aspect 726. The beverage composition of Aspect 722, wherein $K^+$ is present in an amount from about 3 mM to about 20 mM.

Aspect 727. The beverage composition of Aspect 722, wherein $K^+$ is present in an amount from about 4 mM to about 20 mM.

Aspect 728. The beverage composition of Aspect 722, wherein $K^+$ is present in an amount from about 5 mM to about 20 mM.

Aspect 729. The beverage composition of Aspect 722, wherein $K^+$ is present in an amount from about 6 mM to about 20 mM.

Aspect 730. The beverage composition of Aspect 722, wherein $K^+$ is present in an amount from about 7 mM to about 20 mM.

Aspect 731. The beverage composition of Aspect 722, wherein $K^+$ is present in an amount from about 8 mM to about 20 mM.

Aspect 732. The beverage composition of Aspect 722, wherein $K^+$ is present in an amount from about 9 mM to about 20 mM.

Aspect 733. The beverage composition of Aspect 722, wherein $K^+$ is present in an amount from about 10 mM to about 20 mM.

Aspect 734. The beverage composition of Aspect 722, wherein $K^+$ is present in an amount from about 0.5 mM to about 15 mM.

Aspect 735. The beverage composition of Aspect 722, wherein $K^+$ is present in an amount from about 1 mM to about 15 mM.

Aspect 736. The beverage composition of Aspect 722, wherein $K^+$ is present in an amount from about 2 mM to about 15 mM.

Aspect 737. The beverage composition of Aspect 722, wherein $K^+$ is present in an amount from about 3 mM to about 15 mM.

Aspect 738. The beverage composition of Aspect 722, wherein $K^+$ is present in an amount from about 4 mM to about 15 mM.

Aspect 739. The beverage composition of Aspect 722, wherein $K^+$ is present in an amount from about 5 mM to about 15 mM.

Aspect 740. The beverage composition of Aspect 722, wherein $K^+$ is present in an amount from about 6 mM to about 15 mM.

Aspect 741. The beverage composition of Aspect 722, wherein $K^+$ is present in an amount from about 7 mM to about 15 mM.

Aspect 742. The beverage composition of Aspect 722, wherein $K^+$ is present in an amount from about 8 mM to about 15 mM.

Aspect 743. The beverage composition of Aspect 722, wherein $K^+$ is present in an amount from about 9 mM to about 15 mM.

Aspect 744. The beverage composition of Aspect 722, wherein $K^+$ is present in an amount from about 10 mM to about 15 mM.

Aspect 745. The beverage composition of Aspect 722, wherein $K^+$ is present in an amount from about 0.5 mM to about 10 mM.

Aspect 746. The beverage composition of Aspect 722, wherein $K^+$ is present in an amount from about 1 mM to about 10 mM.

Aspect 747. The beverage composition of Aspect 722, wherein $K^+$ is present in an amount from about 2 mM to about 10 mM.

Aspect 748. The beverage composition of Aspect 722, wherein $K^+$ is present in an amount from about 3 mM to about 10 mM.

Aspect 749. The beverage composition of Aspect 722, wherein $K^+$ is present in an amount from about 4 mM to about 10 mM.

Aspect 750. The beverage composition of Aspect 722, wherein $K^+$ is present in an amount from about 5 mM to about 10 mM.

Aspect 751. The beverage composition of Aspect 722, wherein $K^+$ is present in an amount from about 6 mM to about 10 mM.

Aspect 752. The beverage composition of Aspect 722, wherein $K^+$ is present in an amount from about 7 mM to about 10 mM.

Aspect 753. The beverage composition of Aspect 722, wherein $K^+$ is present in an amount from about 8 mM to about 10 mM.

Aspect 754. The beverage composition of Aspect 722, wherein $K^+$ is present in an amount from about 9 mM to about 10 mM.

Aspect 755. The beverage composition of any one of Aspect 695-Aspect 754, wherein $Mg^{+2}$ is present in an amount from about 0.1 mM to about 5 mM.

Aspect 756. The beverage composition of Aspect 755, wherein $Mg^{+2}$ is present in an amount from about 0.2 mM to about 5 mM.

Aspect 757. The beverage composition of Aspect 755, wherein $Mg^{+2}$ is present in an amount from about 0.3 mM to about 5 mM.

Aspect 758. The beverage composition of Aspect 755, wherein $Mg^{+2}$ is present in an amount from about 0.4 mM to about 5 mM.

Aspect 759. The beverage composition of Aspect 755, wherein $Mg^{+2}$ is present in an amount from about 0.5 mM to about 5 mM.

Aspect 760. The beverage composition of Aspect 755, wherein $Mg^{+2}$ is present in an amount from about 0.6 mM to about 5 mM.

Aspect 761. The beverage composition of Aspect 755, wherein $Mg^{+2}$ is present in an amount from about 0.7 mM to about 5 mM.

Aspect 762. The beverage composition of Aspect 755, wherein $Mg^{+2}$ is present in an amount from about 0.8 mM to about 5 mM.

Aspect 763. The beverage composition of Aspect 755, wherein $Mg^{+2}$ is present in an amount from about 0.9 mM to about 5 mM.

Aspect 764. The beverage composition of Aspect 755, wherein $Mg^{+2}$ is present in an amount from about 1.0 mM to about 5 mM.

Aspect 765. The beverage composition of Aspect 755, wherein $Mg^{+2}$ is present in an amount from about 0.1 mM to about 4 mM.

Aspect 766. The beverage composition of Aspect 755, wherein $Mg^{+2}$ is present in an amount from about 0.2 mM to about 4 mM.

Aspect 767. The beverage composition of Aspect 755, wherein $Mg^{+2}$ is present in an amount from about 0.3 mM to about 4 mM.

Aspect 768. The beverage composition of Aspect 755, wherein $Mg^{+2}$ is present in an amount from about 0.4 mM to about 4 mM.

Aspect 769. The beverage composition of Aspect 755, wherein $Mg^{+2}$ is present in an amount from about 0.5 mM to about 4 mM.

Aspect 770. The beverage composition of Aspect 755, wherein $Mg^{+2}$ is present in an amount from about 0.6 mM to about 4 mM.

Aspect 771. The beverage composition of Aspect 755, wherein $Mg^{+2}$ is present in an amount from about 0.7 mM to about 4 mM.

Aspect 772. The beverage composition of Aspect 755, wherein $Mg^{+2}$ is present in an amount from about 0.8 mM to about 4 mM.

Aspect 773. The beverage composition of Aspect 755, wherein $Mg^{+2}$ is present in an amount from about 0.9 mM to about 4 mM.

Aspect 774. The beverage composition of Aspect 755, wherein $Mg^{+2}$ is present in an amount from about 1.0 mM to about 4 mM.

Aspect 775. The beverage composition of Aspect 755, wherein $Mg^{+2}$ is present in an amount from about 0.1 mM to about 3.5 mM.

Aspect 776. The beverage composition of Aspect 755, wherein $Mg^{+2}$ is present in an amount from about 0.2 mM to about 3.5 mM.

Aspect 777. The beverage composition of Aspect 755, wherein $Mg^{+2}$ is present in an amount from about 0.3 mM to about 3.5 mM.

Aspect 778. The beverage composition of Aspect 755, wherein $Mg^{+2}$ is present in an amount from about 0.4 mM to about 3.5 mM.

Aspect 779. The beverage composition of Aspect 755, wherein $Mg^{+2}$ is present in an amount from about 0.5 mM to about 3.5 mM.

Aspect 780. The beverage composition of Aspect 755, wherein $Mg^{+2}$ is present in an amount from about 0.6 mM to about 3.5 mM.

Aspect 781. The beverage composition of Aspect 755, wherein $Mg^{+2}$ is present in an amount from about 0.7 mM to about 3.5 mM.

Aspect 782. The beverage composition of Aspect 755, wherein $Mg^{+2}$ is present in an amount from about 0.8 mM to about 3.5 mM.

Aspect 783. The beverage composition of Aspect 755, wherein $Mg^{+2}$ is present in an amount from about 0.9 mM to about 3.5 mM.

Aspect 784. The beverage composition of Aspect 755, wherein $Mg^{+2}$ is present in an amount from about 1.0 mM to about 3.5 mM.

Aspect 785. The beverage composition of any one of Aspect 695-Aspect 784, wherein $Ca^{+2}$ is present in an amount from about 0.1 mM to about 5 mM.

Aspect 786. The beverage composition of Aspect 785, wherein $Ca^{+2}$ is present in an amount from about 0.2 mM to about 5 mM.

Aspect 787. The beverage composition of Aspect 785, wherein $Ca^{+2}$ is present in an amount from about 0.3 mM to about 5 mM.

Aspect 788. The beverage composition of Aspect 785, wherein $Ca^{+2}$ is present in an amount from about 0.4 mM to about 5 mM.

Aspect 789. The beverage composition of Aspect 785, wherein $Ca^{+2}$ is present in an amount from about 0.5 mM to about 5 mM.

Aspect 790. The beverage composition of Aspect 785, wherein $Ca^{+2}$ is present in an amount from about 0.6 mM to about 5 mM.

Aspect 791. The beverage composition of Aspect 785, wherein $Ca^{+2}$ is present in an amount from about 0.7 mM to about 5 mM.

Aspect 792. The beverage composition of Aspect 785, wherein $Ca^{+2}$ is present in an amount from about 0.8 mM to about 5 mM.

Aspect 793. The beverage composition of Aspect 785, wherein $Ca^{+2}$ is present in an amount from about 0.9 mM to about 5 mM.

Aspect 794. The beverage composition of Aspect 785, wherein $Ca^{+2}$ is present in an amount from about 1.0 mM to about 5 mM.

Aspect 795. The beverage composition of Aspect 785, wherein $Ca^{+2}$ is present in an amount from about 0.1 mM to about 4 mM.

Aspect 796. The beverage composition of Aspect 785, wherein $Ca^{+2}$ is present in an amount from about 0.2 mM to about 4 mM.

Aspect 797. The beverage composition of Aspect 785, wherein $Ca^{+2}$ is present in an amount from about 0.3 mM to about 4 mM.

Aspect 798. The beverage composition of Aspect 785, wherein $Ca^{+2}$ is present in an amount from about 0.4 mM to about 4 mM.

Aspect 799. The beverage composition of Aspect 785, wherein $Ca^{+2}$ is present in an amount from about 0.5 mM to about 4 mM.

Aspect 800. The beverage composition of Aspect 785, wherein $Ca^{+2}$ is present in an amount from about 0.6 mM to about 4 mM.

Aspect 801. The beverage composition of Aspect 785, wherein $Ca^{+2}$ is present in an amount from about 0.7 mM to about 4 mM.

Aspect 802. The beverage composition of Aspect 785, wherein $Ca^{+2}$ is present in an amount from about 0.8 mM to about 4 mM.

Aspect 803. The beverage composition of Aspect 785, wherein $Ca^{+2}$ is present in an amount from about 0.9 mM to about 4 mM.

Aspect 804. The beverage composition of Aspect 785, wherein $Ca^{+2}$ is present in an amount from about 1.0 mM to about 4 mM.

Aspect 805. The beverage composition of Aspect 785, wherein $Ca^{+2}$ is present in an amount from about 0.1 mM to about 3.5 mM.

Aspect 806. The beverage composition of Aspect 785, wherein $Ca^{+2}$ is present in an amount from about 0.2 mM to about 3.5 mM.

Aspect 807. The beverage composition of Aspect 785, wherein $Ca^{+2}$ is present in an amount from about 0.3 mM to about 3.5 mM.

Aspect 808. The beverage composition of Aspect 785, wherein $Ca^{+2}$ is present in an amount from about 0.4 mM to about 3.5 mM.

Aspect 809. The beverage composition of Aspect 785, wherein $Ca^{+2}$ is present in an amount from about 0.5 mM to about 3.5 mM.

Aspect 810. The beverage composition of Aspect 785, wherein $Ca^{+2}$ is present in an amount from about 0.6 mM to about 3.5 mM.

Aspect 811. The beverage composition of Aspect 785, wherein $Mg^{+2}$ is present in an amount from about 0.7 mM to about 3.5 mM.

Aspect 812. The beverage composition of Aspect 785, wherein $Ca^{+2}$ is present in an amount from about 0.8 mM to about 3.5 mM.

Aspect 813. The beverage composition of Aspect 785, wherein $Ca^{+2}$ is present in an amount from about 0.9 mM to about 3.5 mM.

Aspect 814. The beverage composition of Aspect 785, wherein $Ca^{+2}$ is present in an amount from about 1.0 mM to about 3.5 mM.

Aspect 815. A flavoring composition with modifying properties comprising: a taste modulator composition of any one of Aspects 296-559; and, at least one flavoring ingredient; wherein the at least one flavoring ingredient is present at a concentration that does not contribute sweetness; and wherein sweetness is the sweetness intensity equivalent to or exceeding the sweetness recognition threshold of 1.5 wt % sucrose equivalency.

Aspect 816. The flavoring composition with modifying properties of Aspect 815, wherein the disclosed taste modulator composition comprises a first taste modulator component comprising a first salt having a first cation selected from $Na^+$, $K^+$, $Ca^{2+}$, and $Mg^{2+}$ and a first anion; and a second modulator component comprising a second salt having a second cation selected from $Na^+$, $K^+$, $Ca^{2+}$, and $Mg^{2+}$ and a second anion; wherein the first taste modulator component is present at a concentration of from about 0.1 mM to about 25 mM if the first cation is $Na^+$ or $K^+$, or at a concentration of from about 0.1 mM to about 10 mM if the first cation is $Ca^{2+}$ or $Mg^{2+}$; and wherein the second taste modulator component is present at a concentration of from about 0.1 mM to about 25 mM if the second cation is $Na^+$ or $K^+$, or at a concentration of from about 0.1 mM to about 10 mM if the second cation is $Ca^{2+}$ or $Mg^{2+}$.

Aspect 817. The flavoring composition with modifying properties of Aspect 815 or 816, wherein the first cation is $K^+$; and wherein the second cation is $Mg^{2+}$.

Aspect 818. The flavoring composition with modifying properties of Aspect 815 or 816, wherein the first cation is $K^+$; and wherein the second cation is $Ca^{2+}$.

Aspect 819. The flavoring composition with modifying properties of Aspect 815 or 816, wherein the first cation is $Mg^{2+}$; and wherein the second cation is $Ca^{2+}$.

Aspect 820. The flavoring composition with modifying properties of any one of Aspects 815-819, wherein the first taste modulator component is present at a concentration of from about 1 mM to about 25 mM if the first cation is $Na^+$ or $K^+$, or at a concentration of from about 1 mM to about 10 mM if the first cation is $Ca^{2+}$ or $Mg^{2+}$; and wherein the second taste modulator component is present at a concentration of from about 1 mM to about 25 mM if the second cation is $Na^+$ or $K^+$, or at a concentration of from about 1 mM to about 10 mM if the second cation is $Ca^{2+}$ or $Mg^{2+}$.

Aspect 821. The flavoring composition with modifying properties of Aspect 820, wherein the first taste modulator component is present at a concentration of from about 1 mM to about 15 mM if the first cation is $Na^+$ or $K^+$, or at a concentration of from about 1 mM to about 5 mM if the first cation is $Ca^{2+}$ or $Mg^{2+}$; and wherein the second taste modulator component is present at a concentration of from about 1 mM to about 15 mM if the second cation is $Na^+$ or $K^+$, or at a concentration of from about 1 mM to about 5 mM if the second cation is $Ca^{2+}$ or $Mg^{2+}$.

Aspect 822. The flavoring composition with modifying properties of Aspect 820, wherein the first taste modulator component is present at a concentration of from about 5 mM to about 15 mM if the first cation is $Na^+$ or $K^+$, or at a concentration of from about 1.5 mM to about 4 mM if the first cation is $Ca^{2+}$ or $Mg^{2+}$; and wherein the second taste modulator component is present at a concentration of from about 5 mM to about 15 mM if the second cation is $Na^+$ or $K^+$, or at a concentration of from about 1.5 mM to about 4 mM if the second cation is $Ca^{2+}$ or $Mg^{2+}$.

Aspect 823. The flavoring composition with modifying properties of any one of Aspects 815-822, wherein the first anion is selected from citrate, chloride, phosphate, carbonate, sulfate, and combinations thereof.

Aspect 824. The flavoring composition with modifying properties of Aspect 823, wherein the first anion is selected from citrate, sulfate, chloride, and combinations thereof.

Aspect 825. The flavoring composition with modifying properties of any one of Aspects 815-824, wherein the second anion is selected from citrate, chloride, phosphate, carbonate, sulfate, and combinations thereof.

Aspect 826. The flavoring composition with modifying properties of Aspect 825, wherein the second anion is selected from citrate, sulfate, chloride, and combinations thereof.

Aspect 827. The flavoring composition with modifying properties of any one of Aspects 815-826, wherein further comprising a third modulator component comprising a third salt having a third cation selected from $Na^+$, $K^+$, $Ca^{2+}$, and $Mg^{2+}$ and a third anion; and wherein the third taste modulator component is present at a concentration of from about 0.1 mM to about 25 mM if the third cation is $Na^+$ or $K^+$, or at a concentration of from about 0.1 mM to about 20 mM if the third cation is $Ca^{2+}$ or $Mg^{2+}$.

Aspect 828. The flavoring composition with modifying properties of Aspect 827, wherein the pH of the flavoring composition with modifying properties has a pH from about pH 2.5 to about pH 7.

Aspect 829. The flavoring composition with modifying properties of Aspect 828, wherein the pH of the flavoring composition with modifying properties has a pH from about pH 2.5 to about pH 5.

Aspect 830. The flavoring composition with modifying properties of Aspect 827, wherein the third taste modulator component is present at a concentration of from about 1 mM to about 25 mM if the third cation is $Na^+$ or $K^+$, or at a concentration of from about 1 mM to about 15 mM if the third cation is $Ca^{2+}$ or $Mg^{2+}$.

Aspect 831. The flavoring composition with modifying properties of Aspect 830, wherein the third taste modulator component is present at a concentration of from about 1 mM to about 15 mM if the third cation is $Na^+$ or $K^+$, or at a concentration of from about 1 mM to about 5 mM if the third cation is $Ca^{2+}$ or $Mg^{2+}$.

Aspect 832. The flavoring composition with modifying properties of Aspect 830, wherein the third taste modulator component is present at a concentration of from about 5 mM to about 15 mM if the third cation is $Na^+$ or $K^+$, or at a concentration of from about 1.5 mM to about 4 mM if the third cation is $Ca^{2+}$ or $Mg^{2+}$.

Aspect 833. The flavoring composition with modifying properties of Aspect 827, wherein the third anion is selected from citrate, chloride, phosphate, carbonate, sulfate, and combinations thereof.

Aspect 834. The flavoring composition with modifying properties of Aspect 833, wherein the third anion is selected from citrate, sulfate, chloride, and combinations thereof.

Aspect 835. The flavoring composition with modifying properties of Aspect 827, wherein the first cation is Na$^+$; wherein the second cation is Mg$^{2+}$; and wherein the third cation is Ca$^{2+}$.

Aspect 836. The flavoring composition with modifying properties of Aspect 827, wherein the first cation is K$^+$; wherein the second cation is Mg$^{2+}$; and wherein the third cation is Ca$^{2+}$.

Aspect 837. The flavoring composition with modifying properties of any one of Aspects 815-836, wherein the first taste modulator component is selected from potassium chloride, potassium citrate, and a combination thereof; wherein the second taste modulator component is selected from magnesium chloride, magnesium citrate, and a combination thereof; and wherein the third taste modulator component is selected from calcium chloride, calcium citrate, and a combination thereof.

Aspect 838. The flavoring composition with modifying properties of Aspect 837, wherein the concentration of the first taste modulator component is from about 0.1 mM to about 25 mM; wherein the concentration of the second taste modulator component is from about 0.1 mM to about 5 mM; and wherein the concentration of the third taste modulator component is from about 0.1 mM to about 5 mM.

Aspect 839. The flavoring composition with modifying properties of Aspect 837, wherein the concentration of the first taste modulator component is from about 1 mM to about 15 mM; wherein the concentration of the second taste modulator component is from about 1 mM to about 5 mM; and wherein the concentration of the third taste modulator component is from about 1 mM to about 5 mM.

Aspect 840. The flavoring composition with modifying properties of Aspect 837, wherein the concentration of the first taste modulator component is from about 5 mM to about 15 mM; wherein the concentration of the second taste modulator component is from about 1.5 mM to about 4 mM; and wherein the concentration of the third taste modulator component is from about 1.5 mM to about 4 mM.

Aspect 841. The flavoring composition with modifying properties of any one of Aspects 815-840, wherein the at least one flavoring ingredient is selected from cinnamaldehyde; ethyl alcohol; glycerol; glycyrrhizin; ammoniated; licorice extract; licorice extract powder; licorice root; propylene glycol; sodium saccharin; D-sorbitol; L-arabinose; glycine; D-xylose; L-rhamnose; thaumatin; D-ribose; 2,4-dihydroxy-benzoic acid; neohesperidin dihydrochalcone; thaumatin B-Recombinant; L-alanine and DL-alanine; 2-hydroxy-benzoic acid; β-cyclodextrin; betaine; trimethylamine oxide; 3-(4-hydroxy-phenyl)-1-(2,4,6-trihydroxyphenyl)-propan-1-one; naringin dihydrochalcone; choline chloride; trehalose dihydrate; rebaudioside A, 4-amino-5,6-dimethyl-thieno-[2,3-D]-pyrimidin-2(1H)-one; trilobatin; N-(2-methylcyclo-hexyl)-2,3,4,5,6-pentafluoro-benzamide; 3-[(4-amino-2,2-dioxido-1H-2,1,3-benzothiadiazin-5-yl)-oxy]-2,2-dimethyl-N-propylpropan amide; 3',2-dihydroxy-4'-methoxy-flavan; luo han fruit concentrate; N—[N-[3-(3-hydroxy-4-methoxyphenyl)-propyl)-L-alpha-aspartyl)-L-phenylalanine-1-methyl ester; monohydrate; rebaudioside C; 1-(2-hydroxy-phenyl)-3-(pyridin-4-yl)-propan-1-one; 1,3-propylene glycol; glycosylated steviol glycoside; and combinations thereof.

Aspect 842. The flavoring composition with modifying properties of Aspect 841, wherein the glycosylated steviol glycoside comprises one or more glucosylated steviol glycoside.

Aspect 843. The flavoring composition with modifying properties of Aspect 841, wherein the glycosylated steviol glycoside comprises substantially only glucosylated steviol glycoside.

Aspect 844. The flavoring composition with modifying properties of Aspect 841, wherein the at least one flavoring ingredient is selected from 2,4-dihydroxy-benzoic acid; 2-hydroxy-benzoic acid; 4-amino-5,6-dimethylthieno-[2,3-D]-pyrimidin-2(1H)-one; N-(2-methylcyclo-hexyl)-2,3,4,5,6-pentafluoro-benzamide; 3-[(4-amino-2,2-dioxido-1H-2,1,3-benzothiadiazin-5-yl)-oxy]-2,2-dimethyl-N-propylpropanamide; 3',2-dihydroxy-4'-methoxy-flavan; rebaudioside A; rebaudioside C; a glycosylated steviol glycoside; a luo han fruit concentrate; and combinations thereof.

Aspect 845. The flavoring composition with modifying properties of Aspect 841, wherein the at least one flavoring ingredient is selected from rebaudioside A; glycosylated steviol glycoside; luo han fruit concentrate; and combinations thereof.

Aspect 846. The flavoring composition with modifying properties of Aspect 841, wherein the at least one flavoring ingredient is rebaudioside A; and wherein the rebaudioside A is present in an amount of from about 0.1 ppm to about 30 ppm.

Aspect 847. The flavoring composition with modifying properties of Aspect 846, wherein the at least one flavoring ingredient is rebaudioside A; and wherein the rebaudioside A is present in an amount of from about 1 ppm to about 20 ppm.

Aspect 848. The flavoring composition with modifying properties of Aspect 841, wherein the at least one flavoring ingredient is a glycosylated steviol glycoside; and wherein the glycosylated steviol glycoside is present in an amount of from about 0.1 ppm to about 175 ppm.

Aspect 849. The flavoring composition with modifying properties of Aspect 72, wherein the glycosylated steviol glycoside is present in an amount of from about 10 ppm to about 125 ppm.

Aspect 850. The flavoring composition with modifying properties of Aspect 841, wherein the at least one flavoring ingredient is a luo han fruit concentrate; and wherein the luo han fruit concentrate is present in an amount of from about 0.1 ppm to about 60 ppm.

Aspect 851. The flavoring composition with modifying properties of Aspect 850, wherein the luo han fruit concentrate is present in an amount of from about 1 ppm to about 40 ppm.

Aspect 852. The flavoring composition with modifying properties of Aspect 841, wherein the at least one flavoring ingredient comprises a first flavoring ingredient selected from 2,4-dihydroxy-benzoic acid; 2-hydroxy-benzoic acid; 4-amino-5,6-dimethylthieno-[2,3-D]-pyrimidin-2(1H)-one; N-(2-methylcyclo-hexyl)-2,3,4,5,6-pentafluoro-benzamide; 3-[(4-amino-2,2-dioxido-1H-2,1,3-benzothiadiazin-5-yl)-oxy]-2,2-dimethyl-N-propylpropan-amide; 3',2-dihydroxy-4'-methoxy-flavan; rebaudioside A; rebaudioside C; a glycosylated steviol glycoside; a luo han fruit concentrate; and combinations thereof; and wherein the at least one flavoring ingredient comprises a second flavoring ingredient selected from 2,4-dihydroxy-benzoic acid; 2-hydroxy-benzoic acid; 4-amino-5,6-dimethylthieno-[2,3-D]-pyrimidin-2(1H)-one; N-(2-methylcyclo-hexyl)-2,3,4,5,6-pentafluoro-benzamide; 3-[(4-amino-2,2-dioxido-1H-2,1,3-benzothiadiazin-5-yl)-oxy]-2,2-dimethyl-N-propylpropan amide; 3',2-dihydroxy-4'-methoxy-flavan; rebaudioside A; rebaudioside C; a glycosylated steviol glycoside; a luo han fruit concentrate; and combinations thereof; and wherein the first flavoring ingredient and the second flavoring ingredient are not the same.

Aspect 853. The flavoring composition with modifying properties of Aspect 852, wherein the glycosylated steviol glycoside comprises one or more glucosylated steviol glycoside.

Aspect 854. The flavoring composition with modifying properties of Aspect 852, wherein the glycosylated steviol glycoside comprises substantially only glucosylated steviol glycoside.

Aspect 855. The flavoring composition with modifying properties of Aspect 852, wherein the first flavoring ingredient is selected from rebaudioside A, a glycosylated steviol glycoside, a luo han fruit concentrate, and combinations thereof; wherein the second flavoring ingredient is selected from rebaudioside A, a glycosylated steviol glycoside, a luo han fruit concentrate, and combinations thereof; and wherein the first flavoring ingredient and the second flavoring ingredient are not the same.

Aspect 856. The flavoring composition with modifying properties of Aspect 855, wherein the rebaudioside A, when present, is present in an amount of from about 0.1 ppm to about 30 ppm; wherein the glycosylated steviol glycoside, when present, is present in an amount of from about 0.1 ppm to about 175 ppm; and wherein the luo han fruit concentrate, when present, is present in an amount of from about 0.1 ppm to about 60 ppm.

Aspect 857. The flavoring composition with modifying properties of Aspect 856, wherein the rebaudioside A, when present, is present in an amount of from about 1 ppm to about 20 ppm; wherein the glycosylated steviol glycoside, when present, is present in an amount of from about 10 ppm to about 125 ppm; and wherein the luo han fruit concentrate, when present, is present in an amount of from about 1 ppm to about 40 ppm.

Aspect 858. The flavoring composition with modifying properties of Aspect 815, wherein the pH of the flavoring composition with modifying properties has a pH from about pH 2.5 to about pH 7.

Aspect 859. The flavoring composition with modifying properties of Aspect 858, wherein the pH of the flavoring composition with modifying properties has a pH from about pH 2.5 to about pH 5.

From the foregoing, it will be seen that aspects herein are well adapted to attain all the ends and objects hereinabove set forth together with other advantages which are obvious and which are inherent to the structure.

While specific elements and steps are discussed in connection to one another, it is understood that any element and/or steps provided herein is contemplated as being combinable with any other elements and/or steps regardless of explicit provision of the same while still being within the scope provided herein.

It will be understood that certain features and sub-combinations are of utility and may be employed without reference to other features and sub-combinations. This is contemplated by and is within the scope of the claims.

Since many possible aspects may be made without departing from the scope thereof, it is to be understood that all matter herein set forth or shown in the accompanying drawings and detailed description is to be interpreted as illustrative and not in a limiting sense.

It is also to be understood that the terminology used herein is for the purpose of describing particular aspects only, and is not intended to be limiting. The skilled artisan will recognize many variants and adaptations of the aspects described herein. These variants and adaptations are intended to be included in the teachings of this disclosure and to be encompassed by the claims herein.

Now having described the aspects of the present disclosure, in general, the following Examples describe some additional aspects of the present disclosure. While aspects of the present disclosure are described in connection with the following examples and the corresponding text and figures, there is no intent to limit aspects of the present disclosure to this description. On the contrary, the intent is to cover all alternatives, modifications, and equivalents included within the spirit and scope of the present disclosure.

EXAMPLES

The following examples are put forth so as to provide those of ordinary skill in the art with a complete disclosure and description of how the compounds, compositions, articles, devices and/or methods claimed herein are made and evaluated, and are intended to be purely exemplary of the disclosure and are not intended to limit the scope of what the inventors regard as their disclosure. Efforts have been made to ensure accuracy with respect to numbers (e.g., amounts, temperature, etc.), but some errors and deviations should be accounted for. Unless indicated otherwise, ingredient concentrations are weight/volume (e.g., mg/L) or molar/millimolar, temperature is in ° C. or is at ambient temperature, and pressure is at or near atmospheric.

It should be noted that certain tables (Tables 4-13 and 59) referred to herein below follow this section and before the claims in full-page format in landscape orientation and rotated 90° counterclockwise to the text preceding and following these tables.

Example 1. Materials and Methods

Representative formulations within the scope of the disclosed formulations were prepared and subjected to sensory testing by the methods described above in the section entitled Testing Methodology, where formulations are rated on a 0-15 scales for the Taste Attributes: Sweetness Intensity (SI), Saltiness Intensity (SaI), Sourness Intensity (SoI), Bitterness Intensity (BI), Astringency Intensity (AI), Body/Mouthfeel Intensity (B/MF) and Sweetness Linger (SL). And, in addition, formulations are rated for the additional Taste Attributes of Sweetness Appearance Time (AT) and Sweetness Desensitization (SD). AT was rated by the verbal descriptors Rapid (R), Delay (D) or SD (Significant Delay) and SD was rated by the verbal descriptors None (N), Slight (S) or Medium (M). In sensory test sessions, the number of samples evaluated was limited to 6. In the initial phase of formulation screening, testing was carried out in triplicate with a single subject extensively experienced in the technique of flavor profile analysis. Following formulation screening, testing on promising formulations was carried out with a trained panel as described above. Briefly, the sensory test protocol, during formulation screening as well as in full-panel testing was carried out as follows: (1) scramble samples so that all are unknowns; (2) rinse mouth with 15 mL distilled water while swishing vigorously followed by expectoration of the rinse water; (3) take 15 mL of the sample into the mouth and swish around vigorously for 15 sec, and scale Sweetness Intensity (SI), Saltiness Intensity (SaI), Sourness Intensity (SoI), Bitterness Intensity (BI), Astringency Intensity (AI) and Body/Mouthfeel Intensity (B/MF) on 0-15 scales during this period, record SI, SaI, SoI, BI, B/MF, and AI, as well as record the Appearance Time (AT) as Rapid (R), Delay (D) or Significant Delay (SD); (4) expectorate sample, rinse mouth with 15 mL distilled water and expectorate rinse water at 30 sec; (5) note any change in perceived sweetness intensity over the next 2.0 min and also any other sensations and record SI at 2.0 min (SL) in table, as well as Sweetness Desensitization/ Tongue-Numbing (SD) that occurs in this 2 min period and rate it as None (N), Slight (S) or Medium (M); (6) rinse mouth with 15 mL distilled water with vigorous agitation for 15 sec and expectorate; (7) wait a minimum of 15 min and repeat with next sample; and (8) after completion of all samples, break sample code to identify samples. Variations on the foregoing Testing Methodology are as noted herein below.

Materials used in these studies were as follows: REBA was Almendra Steviose™ 100 and GSG was either Almendra Steviarome™ 2050 (GSG-2050) and Almendra Steviarome™ 5000 (GSG-5000), each was obtained from Almendra (Thailand) Ltd., Bangkok, Thailand; Potassium Chloride (Now Foods, Bloomingdale, Ill., USA); Magnesium Chloride was $MgCl_2.6H_2O$ (Heiltropfen Lab. LLP, London, United Kingdom); Calcium Chloride was $CaCl_2$, anhydrous, ≥93.0% (Sigma-Aldrich Corporation, St. Louis, Mo., USA); Magnesium Citrate was $Mg_3(Citrate)_2.9H_2O$ (Sigma-Aldrich Corporation ≥95%); Calcium Citrate was $Ca_3(Citrate)_2.4H_2O$ (Sigma-Aldrich Corporation. ≥98%); REBD was SweetLeaf Stevia® Sweetener (Lot No. RD-20160702; Wisdom Natural Brands, Gilbert, Ariz., USA); REBM was Sweegen BESTEVIA™ 95% REBM; Citric Acid was Citric Acid.$H_2O$ (Chemipan Corporation Co., Ltd, (Thailand)); sucrose was Domino Pure Cane Granulated Sugar (obtained from a local Kroger Grocery Store, Kroger Co.); water was Kroger® Distilled Water (Kroger); and lemon-lime flavoring ("LL flavor" or "Lemon-Lime") was Natural Lemon Lime Flavor Extract W.S. No. 7546 (GSB & Associates Flavor Creators, Kennesaw, Ga., USA).

Example 2. Testing of a Representative Disclosed Taste Modulation Formulation: Effect of Single $Mg^{2+}$ and $Ca^{2+}$ Mineral Salts on Modulating REBA Taste Example 2.1

This study assessed the effect of $Mg^{2+}$ and $Ca^{2+}$ (from $MgCl_2$ and $CaCl_2$ salts) used individually in a disclosed Taste Modulator Composition on Appearance Time (AT), Sweetness Linger (SL), Body/Mouthfeel (B/MF) and Sweetness Desensitization (SD) of REBA in water and, if so, the concentrations required. it was concluded that $Mg^{2+}$ and $Ca^{2+}$ do affect the AT, SL, B/MF and SD of REBA in water, but concentrations of 30-100 mM were required to realize these effects when used individually. Data are provided in Table 4.

Example 2.2

This study assessed the effect of $Mg^{2+}$ and $Ca^{2+}$ (from $MgCl_2$ and $CaCl_2$ salts) used individually in a disclosed Taste Modulator Composition on the Appearance Time (AT), Sweetness Linger (SL), Body/Mouthfeel (B/MF) and Sweetness Desensitization (SD) of REBA in Citric Acid Buffer and, if so, the concentrations required. It was concluded that $Mg^{2+}$ and $Ca^{2+}$ do affect the AT, SL, B/MF and SD of REBA in Citric Acid Buffer, but concentrations of 30-100 mM were required to realize these effects when used individually. Data are provided in Table 5.

Example 2.3

This study assessed the effect of $Mg^{2+}$ and $Ca^{2+}$ (from $MgCl_2$ and $CaCl_2$ salts) used individually in a disclosed Taste Modulator Composition on the Appearance Time (AT), Sweetness Linger (SL), Body/Mouthfeel (B/MF) and Sweetness Desensitization (SD) of REBA in phosphoric acid and, if so, the concentrations required. It was concluded that $Mg^{2+}$ and $Ca^{2+}$ do affect the AT, SL, B/MF and SD of REBA in phosphoric acid, but concentrations of 30-100 mM were required to realize these effects when used individually. Data are provided in Table 6.

The results of the experimentation in Example Nos. 2.1-2.3 demonstrate that $Mg^{2+}$ and $Ca^{2+}$ mineral salts, when used individually, in a disclosed Taste Modulator Composition can accelerate REBA's sweetness AT, attenuate REBA's SL, reduce REBA's SD and increase the B/MF of REBA solutions. However, when used individually, the $Mg^{2+}$ and $Ca^{2+}$ mineral salt at the concentrations required for these sensory effects also introduced salty and bitter off tastes.

Example 3. Testing of a Representative Disclosed Taste Modulation Formulations: Effect of $Mg^{2+}$ and $Ca^{2+}$ Mineral Salt Concentrations on Modulation of REBA Taste Example 3.1

This study assessed the effect of $K^+$, $Mg^{2+}$, and $Ca^{2+}$ (from KCl, $MgCl_2$, and $CaCl_2$ salts) used individually in a disclosed Taste Modulator Composition on the Appearance Time (AT), Sweetness Linger (SL), Body/Mouthfeel (B/MF) and Sweetness Desensitization (SD) of REBA in Citric Acid Buffer at moderate concentrations (i.e., <12 mM). Based in the data shown in Table 7, it was concluded that $K^+$, $Mg^{2+}$ and $Ca^{2+}$ did not significantly affect the AT, SL, B/MF and SD of REBA in Citric Acid Buffer when used individually at <12 mM. The data are given in Table 7.

Example 3.2

This study assessed the effect of $K^+$, $Mg^{2+}$, and $Ca^{2+}$ (from KCl, $MgCl_2$, and $CaCl_2$ salts) used individually at 20 mM in a disclosed Taste Modulator Composition on the Appearance Time (AT), Sweetness Linger (SL), Body/ Mouthfeel (B/MF) and Sweetness Desensitization (SD) of REBA in Citric Acid Buffer. Based on the data shown in Table 8, it was concluded that $K^+$, $Mg^{2+}$ and $Ca^{2+}$ modestly affected the AT, SL, B/MF and SD of REBA in Citric Acid Buffer when used individually at 20 mM. Data are given in Table 8.

Example 3.3

This study assessed the effect of $K^+$, $Mg^{2+}$, and $Ca^{2+}$ (from KCl, $MgCl_2$, and $CaCl_2$ salts) used individually at 30 mM in a disclosed Taste Modulator Composition on the Appearance Time (AT), Sweetness Linger (SL), Body/ Mouthfeel (B/MF) and Sweetness Desensitization (SD) of REBA in Citric Acid Buffer. Based in the data shown in Table 9, it was concluded that K$^+$, Mg$^{2+}$ and Ca$^{2+}$ do affect the AT, SL, B/MF and SD of REBA in Citric Acid Buffer when used individually at 30 mM, and effect these parameters to a greater extent than when used at 20 mM (as in shown in Example 3.2). Data are given in Table 9.

The results of the experimentation in Example Nos. 3.1-3.3 demonstrate that K$^+$, Mg$^{2+}$, and Ca$^{2+}$ mineral salts accelerate REBA's sweetness AT, attenuate REBA's SL, reduce REBA's SD and increase the B/MF of REBA solutions when used at 20-30 mM. However, effects of the K$^+$, Mg$^{2+}$ and Ca$^{2+}$ mineral salts on SL are modest at 20 mM, and this is observed with a concomitant salty off taste. It is noteworthy that the effects on B/MF even at 20 mM are significant, however.

Example 4. Testing of Representative Disclosed Taste Modulation Formulations: Effect of Na$^+$, K$^+$, Mg$^{2+}$ and Ca$^{2+}$ Mineral Salt Blends on Modulation of REBA Taste Example 4.1

This study assessed the effect of combinations of Na$^+$, K$^+$, Mg$^{2+}$ and Ca$^{2+}$ (from NaCl, KCl, MgCl$_2$, and CaCl$_2$ salts) in a disclosed Taste Modulator Composition the on the Appearance Time (AT), Sweetness Linger (SL), Body/Mouthfeel (B/MF) and Sweetness Desensitization (SD) of REBA in Citric Acid Buffer. It was concluded that combinations of Na$^+$, K$^+$, Mg$^{2+}$ and Ca$^{2+}$ in a disclosed Taste Modulator Composition significantly affect the AT, SL, B/MF and SD of REBA in Citric Acid Buffer, when used at modest concentrations. Without wishing to be bound by a particular theory, these data are suggestive of a synergistic effect. Data are given in Table 10.

Example 4.2

The study assessed the effect of combinations of K$^+$, Mg$^{2+}$ and Ca$^{2+}$ salt blend (from KCl, MgCl$_2$, and CaCl$_2$ salts) in a disclosed Taste Modulator Composition on the Appearance Time (AT), Sweetness Linger (SL), Body/Mouthfeel (B/MF) and Sweetness Desensitization (SD) of REBA in Citric Acid Buffer. It was concluded that the low concentration K$^+$, Mg$^{2+}$ and Ca$^{2+}$ in combination in a disclosed Taste Modulator Composition significantly affected the AT, SL, B/MF and SD of REBA in Citric Acid Buffer. Without wishing to be bound by a particular theory, these data are suggestive of a synergistic effect. Data are given in Table 11.

Example 4.3

The study assessed the effect of a combination of K$^+$, Mg$^{2+}$ and Ca$^{2+}$ (from KCl, MgCl$_2$, and CaCl$_2$ salts) in a disclosed Taste Modulator Composition on the Appearance Time (AT), Sweetness Linger (SL), Body/Mouthfeel (B/MF) and Sweetness Desensitization (SD) of REBA in a Lemonade formulation. Based in the data shown in Table 12, it was concluded that a low concentration K$^+$, Mg$^{2+}$ and Ca$^{2+}$ in combination significantly affected the AT, SL, B/MF and SD of REBA in a Lemonade formulation. Without wishing to be bound by a particular theory, these data are suggestive of a synergistic effect. Data are given in Table 12.

Example 4.4

The study assessed the effect of a combination of Na$^+$, K$^+$, Mg$^{2+}$ and Ca$^{2+}$ (from NaCl, KCl, MgCl$_2$, and CaCl$_2$ salts) in a disclosed Taste Modulator Composition on the Appearance Time (AT), Sweetness Linger (SL), Body/Mouthfeel (B/MF) and Sweetness Desensitization (SD) of a REBA/GSG blend in a lemon-lime flavored Citric Acid Buffer. Both REBA and REBD Controls were used in this experiment. It was concluded that a combination of Na$^+$, K$^+$, Mg$^{2+}$ and Ca$^{2+}$ significantly affects the AT, SL, B/MF and SD of the REBA/GSG sweetener composition in lemon-lime flavored Citric Acid Buffer, when used at modest concentrations. Without wishing to be bound by a particular theory, these data are consistent with the presence of a synergistic effect. In addition, the sweetness intensity of the REBA/GSG system was surprisingly higher than anticipated. It is also noteworthy that the REBA/GSG/Mineral Salt composition exhibited taste not only superior to REBA/GSG alone but also superior to REBD. Data are given in Table 13.

The results of the experimentation in Example Nos. 4.1-4.4 demonstrate that combinations of Na$^+$, K$^+$, Mg$^{2+}$ and Ca$^{2+}$ in a disclosed Taste Modulator Composition accelerate REBA's sweetness AT, attenuate REBA's SL, reduce REBA's SD and very dramatically increase the B/MF of REBA solutions. And, importantly, they do so without the introduction of salty or bitter off tastes as were observed in REBA mineral salt formulations with single mineral salts. The significant increases in B/MF scores for the REBA/mineral salt blends are particularly surprising and provide a sweetness which is strikingly similar to sucrose.

Example 5. Testing of Representative Disclosed Taste Modulation Formulations Comprising Mixtures of Salts Versus Control Formulations In the studies described in this example, a stock solution of citric acid buffer, potassium salt (CAB-K; pH 3.1) was prepared by dropwise addition of 1.00 M KOH to a rapidly stirring solution of 1.71 g (8.16 mmol) of citric acid monohydrate in 900 mL water in a 1 L flask while following pH with a freshly calibrated pH meter; upon reaching pH 3.1, 100 mL water was added to bring the volume to 1.00 L. Then 100 mL portions of the CAB-K were transferred to four 250 mL plastic-capped glass bottles and sample completion was carried out by addition of the additives for preparation of the test formulations. The test samples were prepared as described below in Table 14.

TABLE 14

| Sample | Description |
|---|---|
| Sucrose Control | Sucrose at 10.0% (10.00 g/100 mL) and LL flavor at 0.25% (~250 mg/100 mL) in pH 3.1 CAB-K. |
| REBA Control | REBA at 500 PPM (50 mg/100 mL) and LL flavor at 0.25% (~250 mg/100 mL) in pH 3.1 CAB-K. |
| REBA/GSG/Taste Modulator | REBA at 400 PPM (40 mg/100 mL)/GSG at 175 PPM (17.5 mg/100 mL), and LL flavor at 0.25% (~250 mg/100 mL) with 895 PPM (12.0 mM) KCl (90 mg/100 mL), 702 PPM (3.4 mM) MgCl$_2$•6H$_2$O (72 mg/100 mL) and 720 PPM (6.4 mM) CaCl$_2$ (72 mg/100 mL) in pH 3.1 CAB-K. |
| REBD Control | REBD at 500 PPM (50 mg/100 mL) and LL flavor at 0.25% (~250 mg/100 mL) in pH 3.1 CAB-K. |

It was observed that the solid REBD was slow to dissolve upon addition of the CAB-K buffer, but after swirling vigorously for about 15 min, visual inspection indicated that nearly all of the solid REBD was in solution. However, after standing overnight (about 20 h), the solution was observed to be still cloudy. In order to maintain blind tasting of the samples, the samples were dispensed into test containers in which the cloudiness was not observable. For testing, each of the above samples was randomly assigned a test code (a number 1-4), and after testing, the test code was unsealed and correlated to the above test formulations.

Three independent trials were carried out and in this study, the following abbreviations are used: "SI" indicates Sweetness Intensity on a 0-15 scale; "BI" indicates Bitterness intensity on a 0-15 scale; "SoI" indicates Sourness Intensity on a 0-15 scale; "AI" indicates Astringency Index on a 0-15 scale; and "SL" indicates Sweetness Linger tested at 2 minutes. The "Sample Code" in the table indicates the randomly assigned sample number for blinded testing, and all comments were made before the sample code was broken. The "Formulation" in the table indicates the identity of the formulation after the sample code was broken, and corresponding to the formulations described above and in Table 14. The data from obtained in the three independent trials were averaged and are summarized in Table 15 below for SI, BI, SoI, AI, and SL.

TABLE 15

| Formulation | SI | BI | SoI | AI | SL | Comments |
|---|---|---|---|---|---|---|
| Sucrose Control | 9.3 | 0.0 | 4.0 | 0.0 | 1.3 | In 2 of 3 trials, it was commented that formulation had a sugar-like taste, but in one of them, it was commented as not a body/mouthfeel sensation. |
| REBA Control | 9.3 | 0.0 | 4.0 | 0.0 | 4.3 | In 1 of 3 trials, it was commented that the formulation had a sugar-like taste with body/mouthfeel; but in 2 of 3 trials, it was commented that the formulation had a gradual sweetness onset. |
| REBA/GSG/Taste Modulator | 10.0 | 0.0 | 4.0 | 0.0 | 2.3 | In 3 of 3 trials, it was commented that the formulation had a sugar-like taste with body/mouthfeel; but in 1 of 3 trials, it was commented that the formulation had a gradual sweetness onset. |
| REBD Control | 9.7 | 0.0 | 4.0 | 0.0 | 3.7 | In 1 of 3 trials, it was commented that the formulation had a sugar-like taste with body/mouthfeel; but in 3 of 3 trials, it was commented that the formulation had a gradual sweetness onset. |

After the 3 trials, samples were assessed in an un-blinded manner (as knowns) in a normal drinking mode with swallowing and the following observations noted: (a) Sucrose Control: Good taste, but sweetness intensity was observed to be slightly lower than expected and the lemon-lime flavor was observed to be low; (b) REBA/GSG/Taste Modulator: Sweetness Intensity observed to be higher than the Sucrose Control and with substantial body/mouthfeel observed to be greater than the Sucrose Control, no objectionable Sweetness Linger was observed, the residual sweetness in the mouth after swallowing was observed to be sugar-like, and a faint saltiness was observed; (c) REBA Control: Sweetness intensity observed to be lower than the REBA/GSG/Taste Modulator formulation with significant adaptation observed in between the 3 sips of the sample tested, and there was significant tongue-coating noted after swallowing the sample; and (d) REBD Control: Sweetness intensity appeared to be higher than the REBA Control and there was no observation of adaptation between sips, in contrast to the REBA Control, and Sweetness Rebound was noted, but it was not as objectionable as the REBA Control.

The study described herein above show that a disclosed sweetener formulation, labeled as REBA/GSG/Taste Modulator in this example, had better taste than either the REBA Control or the REBD Control, as assessed either by Sweetness Linger or sugar-like taste and body/mouthfeel. The results also indicated that the REBA/GSG/Taste Modulator sample had greater body/mouthfeel than the Sucrose Control.

Example 6. Testing of a Representative Disclosed Sweetener Compositions Versus Control Formulations A study was conducted to assess the sensory effects of a disclosed taste modulator composition having 10 mM KCl/3 mM $MgCl_2.6H_2O$/3 mM $CaCl_2$ when utilized with different sweeteners: sucrose (SUC), Rebaudioside A (REBA) Saccharin-Na (SAC-Na), Cyclamate-Na (CYC-Na), Aspartame (APM), Acesulfame-K (ACE-K), Sucralose (SUL), Neotame (NTM), Advantame (ADV), and Rebaudioside M (REBM), as well as a blend of SUC and REBA deriving equal sweetness from each sweetener. The concentrations of the sweeteners used in this experiment were calculated so as to be iso-sweet with 500 mg/L REBA from the C/R functions as previously reported (DuBois and Prakash, Annu. Rev. Food Sci. Technol. 2012, 3, 353-380; and Prakash et al. Natural Product Communications 2013, 8(11), 1523-1526). According to the REBA C/R function R=10.0C/(200+C) provided in this reference, 500 mg/L REBA is equivalent in sweetness intensity to 7.14% sucrose and therefore all of the sweetener samples in this experiment should be of this level of sweetness.

Example 6.1

The study assessed the effect of a disclosed taste modulator composition (TMC) having 10 mM KCl/3 mM $MgCl_2.6H_2O$/3 mM $CaCl_2$ when utilized with 7.14% Sucrose, 500 mg/L Rebaudioside A (REBA), or 280 mg/L sodium saccharin (SAC-Na) in Potassium Citric Acid Buffer (CAB-K). The CAB-K was prepared by addition of 0.30 g $K_3$Citrate.$H_2O$ and 1.50 g Citric Acid.$H_2O$ to 1 L of distilled water and stirring to dissolution. The pH of this buffer solution was determined to be 3.17. The CAB-K/KCl/$MgCl_2.6H_2O$/$CaCl_2$ solution was prepared by addition of 0.30 g $K_3$Citrate.$H_2O$, 1.50 g Citric Acid.$H_2O$, 746 mg (10.0 mmol) KCl, 610 mg (3.0 mmol) $MgCl_2.6H_2O$ and 333 mg (3.0 mmol) $CaCl_2$ to 1 L of distilled water and stirring to dissolution. The pH of this buffer solution was determined to be 3.14. Next, 100 mL portions of the CAB-K and the CAB-K/KCl/MgCl$_2$.6H$_2$O/CaCl$_2$ solutions were transferred to 6 plastic-capped glass bottles into which the sweeteners had already been weighed as indicated below. The sample solutions are summarized in Table 16 below.

TABLE 16

| Sample No. | Sample Description* | Composition |
| --- | --- | --- |
| 1 | Sucrose control | 7.1 wt % sucrose in CAB-K |
| 2 | Sucrose with TMC | 7.1 wt % sucrose in CAB-K/KCl/MgCl$_2$•6H$_2$O/CaCl$_2$ |
| 3 | REBA Control | 500 mg/L REBA in CAB-K |
| 4 | REBA with TMC | 500 mg/L REBA in CAB-K/KCl/MgCl$_2$•6H$_2$O/CaCl$_2$ |
| 5 | SAC-Na | 280 mg/L SAC-Na in CAB-K |
| 6 | SAC-Na with TMC | 280 mg/L SAC-Na in CAB-K/KCl/MgCl$_2$•6H$_2$O/CaCl$_2$ |

*"TMC" indicates the composition contains a disclosed taste modulator composition as described above, i.e., CAB-K supplemented with the taste modulator composition, 10 mM KCl/3 mM MgCl$_2$•6H$_2$O/3 mM CaCl$_2$; "REBA" indicates Rebaudioside A; and "SAC-Na" indicates Saccharin-Na.

The sensory protocol used throughout Example 6 was as follows: (1) scramble ambient temperature samples so that all 6 are unknowns; (2) rinse mouth with 15 mL distilled water while swishing vigorously followed by expectoration of the rinse water; (3) take 30 mL of the sample into the mouth and swish around vigorously for 15 sec scaling Sweetness Intensity (SI), Sourness Intensity (SoI), Saltiness Intensity (SaI), Bitterness Intensity (BI), Mouthfeel Intensity (MF) and Astringency Intensity (AI) on 0-15 scales during this period; also, make note of the Sweetness Appearance Time (AT) and rate as Rapid (R), Delay (D) or Significant Delay (SD); record SI, SoI, SaI, BI, MF, AI and AT in table; for AT ratings, R=0.0, D=2.5 and SD=5.0; (4) swallow sample, rinse mouth with 15 mL distilled water and expectorate rinse water at 30 sec; (5) note any change in SI over the next 2.0 min and also any other sensations and record perceived SI at 2.0 min (Sweetness Linger (SL) at 2 min) in table; also make note of any Sweetness Desensitization/Tongue-Numbing (SD) that occurs in this 2 min period and rate it as None (N), Slight (S) or Medium (M); for SD ratings, N=0.0, S=2.5 and M=5.0; (6) rinse mouth with 15 mL distilled water with vigorous agitation in the mouth for 15 sec and expectorate; (7) wait a minimum of 15 min and repeat with next sample; and (8) break sample code to identify samples.

The average data from replicate trials from Example 6.1 are shown below in Table 17. The data show that a disclosed taste modulator composition was very effective in improving the tastes of all of Sucrose, REBA and Saccharin-Na where increases in MF were observed for the three sweetener formulations with the TMC, along with observed reductions in AT, SL and SD for the REBA formulation with the TMC.

TABLE 17

| Sample No. | Sample Description | SI | SoI | SaI | BI | MF | AI | AT | SL | SD |
| --- | --- | --- | --- | --- | --- | --- | --- | --- | --- | --- |
| 1 | Sucrose Control | 7.0 | 2.0 | 0.0 | 0.0 | 1.5 | 3.0 | 0.0 | 0.0 | 0.0 |
| 2 | Sucrose/TMC | 7.0 | 2.5 | 0.0 | 0.0 | 3.5 | 3.0 | 0.0 | 0.0 | 0.0 |
| 3 | REBA Control | 8.0 | 2.5 | 0.0 | 0.0 | 0.0 | 2.5 | 2.5 | 4.5 | 2.5 |
| 4 | REBA/TMC | 8.5 | 3.0 | 0.0 | 0.0 | 4.0 | 2.0 | 1.2 | 1.5 | 0.0 |
| 5 | SAC-Na Control | 8.0 | 2.5 | 0.0 | 0.5 | 0.0 | 3.5 | 0.0 | 3.5 | 0.0 |
| 6 | SAC-Na/TMC | 8.0 | 3.0 | 0.0 | 0.0 | 3.0 | 2.0 | 0.0 | 3.0 | 0.0 |

Example 6.2

The study assessed the effect of a disclosed taste modulator composition (TMC) having 10 mM KCl/3 mM MgCl$_2$.6H$_2$O/3 mM CaCl$_2$ when utilized with 2800 mg/L sodium cyclamate (CYC-Na), 450 mg/L aspartame (APM), or 750 mg/L potassium acesulfame (ACE-K) in Potassium Citric Acid Buffer (CAB-K). The CAB-K was prepared by addition of 0.30 g K$_3$Citrate.H$_2$O and 1.50 g Citric Acid.H$_2$O to 1 L of distilled water and stirring to dissolution. The pH of this buffer solution was determined to be 3.17. The CAB-K/KCl/MgCl$_2$.6H$_2$O/CaCl$_2$ solution was prepared by addition of 0.30 g K$_3$Citrate.H$_2$O, 1.50 g Citric Acid.H$_2$O, 746 mg (10.0 mmol) KCl, 610 mg (3.0 mmol) MgCl$_2$.6H$_2$O and 333 mg (3.0 mmol) CaCl$_2$ to 1 L of distilled water and stirring to dissolution. The pH of this buffer solution was determined to be 3.14. Next, 100 mL portions of the CAB-K and the CAB-K/KCl/MgCl$_2$.6H$_2$O/CaCl$_2$ solutions were added to 6 plastic-capped glass bottles into which the sweeteners had already been weighed as indicated below. The sample solutions are summarized in Table 18 below.

TABLE 18

| Sample No. | Sample Description* | Composition |
| --- | --- | --- |
| 1 | CYC-Na Control | 2800 mg/L CYC-Na in CAB-K |
| 2 | CYC-Na with TMC | 2800 mg/L CYC-Na in CAB-K/KCl/MgCl$_2$•6H$_2$O/CaCl$_2$ |
| 3 | APM Control | 450 mg/L APM in CAB-K |
| 4 | APM with TMC | 450 mg/L APM in CAB-K/KCl/MgCl$_2$•6H$_2$O/CaCl$_2$ |
| 5 | ACE-K Control | 750 mg/L ACE-K in CAB-K |
| 6 | ACE-K with TMC | 750 mg/L ACE-K in CAB-K/KCl/MgCl$_2$•6H$_2$O/CaCl$_2$ |

*"TMC" indicates the composition contains a disclosed taste modulator composition as described above, i.e., CAB-K supplemented with the taste modulator composition, 10 mM KCl/3 mM MgCl$_2$•6H$_2$O/3 mM CaCl$_2$; "CYC-Na" indicates sodium cyclamate; "APM" indicates aspartame; and "ACE-K" indicates potassium acesulfame.

The sensory protocol was as described above in Example 6.1. The average data from replicate trials of Example 6.2 are shown below in Table 19. The data show that a disclosed taste modulator composition was effective in improving MF in the CYC-Na, APM and ACE-K formulations with TMC, along with providing a slight reduction in SL for the CYC-Na and ACE-K formulations with TMC.

TABLE 19

| Sample No. | Sample Description | SI | SoI | SaI | BI | MF | AI | AT | SL | SD |
| --- | --- | --- | --- | --- | --- | --- | --- | --- | --- | --- |
| 1 | CYC-Na Control | 9.3 | 2.0 | 0.0 | 0.0 | 0.0 | 2.7 | 0.0 | 2.3 | 1.7 |
| 2 | CYC-Na with TMC | 9.7 | 2.0 | 0.0 | 0.0 | 3.0 | 2.3 | 0.0 | 1.7 | 0.8 |
| 3 | APM Control | 9.0 | 2.0 | 0.0 | 0.0 | 0.0 | 3.0 | 0.0 | 1.0 | 0.0 |
| 4 | APM with TMC | 9.0 | 2.0 | 0.0 | 0.0 | 3.0 | 2.0 | 0.0 | 1.0 | 0.0 |
| 5 | ACE-K Control | 8.0 | 2.0 | 1.0 | 4.0 | 0.0 | 2.0 | 0.0 | 3.0 | 0.0 |
| 6 | ACE-K with TMC | 9.0 | 2.0 | 1.0 | 4.0 | 3.0 | 2.0 | 0.0 | 2.0 | 0.0 |

Example 6.3

The study assessed the effect of a disclosed taste modulator composition (TMC) having 10 mM KCl/3 mM MgCl$_2$.6H$_2$O/3 mM CaCl$_2$ when utilized with 130 mg/L sucralose (SUL), 8.3 mg/L neotame (NTM), or 2.1 mg/L advantame (ADV) in Potassium Citric Acid Buffer (CAB-K). The CAB-K was prepared by addition of 0.30 g K$_3$Citrate.H$_2$O and 1.50 g Citric Acid.H$_2$O to 1 L of distilled water and stirring to dissolution. The pH of this buffer solution was determined to be 3.17. The CAB-K/KCl/

MgCl$_2$.6H$_2$O/CaCl$_2$ solution was prepared by addition of 0.30 g K$_3$Citrate.H$_2$O, 1.50 g Citric Acid.H$_2$O, 746 mg (10.0 mmol) KCl, 610 mg (3.0 mmol) MgCl$_2$.6H$_2$O and 333 mg (3.0 mmol) CaCl$_2$ to 1 L of distilled water and stirring to dissolution. The pH of this buffer solution was determined to be 3.14. Next, 100 mL portions of the CAB-K and the CAB-K/KCl/MgCl$_2$.6H$_2$O/CaCl$_2$ solutions were added to 6 plastic-capped glass bottles into which the sweeteners had already been weighed as indicated below. The sample solutions are summarized in Table 20 below.

TABLE 20

| Sample No. | Sample Description* | Composition |
|---|---|---|
| 1 | SUL Control | 130 mg/L SUL in CAB-K |
| 2 | SUL with TMC* | 130 mg/L SUL in CAB-K/KCl/MgCl$_2$•6H$_2$O/CaCl$_2$ |
| 3 | NTM Control | 8.3 mg/L NTM in CAB-K |
| 4 | NTM with TMC | 8.3 mg/L NTM in CAB-K/KCl/MgCl$_2$•6H$_2$O/CaCl$_2$ |
| 5 | ADV Control | 2.1 mg/L ADV in CAB-K |
| 6 | ADV with TMC | 2.1 mg/L ADV in CAB-K/KCl/MgCl$_2$•6H$_2$O/CaCl$_2$ |

*"TMC" indicates the composition contains a disclosed taste modulator composition as described above, i.e., CAB-K supplemented with the taste modulator composition, 10 mM KCl/3 mM MgCl$_2$•6H$_2$O/3 mM CaCl$_2$; "SUL" indicates sucralose; "NTM" indicates neotame; and "ADV" indicates advantame.

The sensory protocol was as described above in Example 6.1. The average data from replicate trials of Example 6.3 are shown below in Table 21. The data show that a disclosed taste modulator composition was effective in improving MF in the sucralose, neotame, and advantame formulations with a disclosed TMC, along with providing a slight reduction in SL for the neotame and advantame in formulations with a disclosed TMC.

TABLE 21

| Sample No. | Sample Description | SI | SoI | SaI | BI | MF | AI | AT | SL | SD |
|---|---|---|---|---|---|---|---|---|---|---|
| 1 | SUL Control | 8.0 | 2.3 | 0.0 | 0.0 | 0.0 | 2.0 | 2.5 | 2.0 | 0.0 |
| 2 | SUL with TMC* | 7.0 | 2.0 | 0.0 | 0.0 | 3.0 | 3.0 | 0.0 | 2.0 | 0.0 |
| 3 | NTM Control | 8.5 | 2.5 | 0.0 | 0.0 | 0.0 | 3.0 | 3.8 | 2.5 | 1.7 |
| 4 | NTM with TMC | 8.0 | 2.5 | 0.0 | 0.0 | 3.5 | 3.0 | 3.8 | 2.0 | 1.2 |
| 5 | ADV Control | 6.0 | 3.0 | 0.0 | 0.0 | 0.0 | 3.0 | 5.0 | 3.5 | 2.5 |
| 6 | ADV with TMC | 7.0 | 3.0 | 0.0 | 0.0 | 3.0 | 2.0 | 5.0 | 2.5 | 2.5 |

Example 6.4

The study assessed the effect of a disclosed taste modulator composition (TMC) having 10 mM KCl/3 mM MgCl$_2$.6H$_2$O/3 mM CaCl$_2$ when utilized with 270 mg/L Rebaudioside M (REBM) or a blend of sucrose (3.55 wt %) and Rebaudioside A (REBA; 110 mg/L REBA) in Potassium Citric Acid Buffer (CAB-K). The CAB-K was prepared by addition of 0.30 g K$_3$Citrate.H$_2$O and 1.50 g Citric Acid.H$_2$O to 1 L of distilled water and stirring to dissolution. The pH of this buffer solution was determined to be 3.17. The CAB-K/KCl/MgCl$_2$.6H$_2$O/CaCl$_2$ solution was prepared by addition of 300 mg K$_3$Citrate.H$_2$O, 1.50 g Citric Acid.H$_2$O, 746 mg (10.0 mmol) KCl, 610 mg (3.0 mmol) MgCl$_2$.6H$_2$O and 333 mg (3.0 mmol) CaCl$_2$ to 1 L of distilled water and stirring to dissolution. The pH of this buffer solution was determined to be 3.14. Next, 100 mL portions of the CAB-K and the CAB-K/KCl/MgCl$_2$.6H$_2$O/CaCl$_2$ solutions were added to 4 plastic-capped glass bottles into which the sweeteners had already been weighed as indicated below. The sample solutions are summarized in Table 22 below.

TABLE 22

| Sample No. | Sample Description* | Composition |
|---|---|---|
| 1 | REBM Control | 270 mg/L REBM in CAB-K |
| 2 | REBM with TMC* | 270 mg/L REMB in CAB-K/KCl/MgCl$_2$•6H$_2$O/CaCl$_2$ |
| 3 | Sucrose/REBA Control | 110 mg/L REBA and 3.55 wt % sucrose in CAB-K |
| 4 | Sucrose/REBA with TMC | 110 mg/L REBA and 3.55 wt % sucrose in CAB-K/KCl/MgCl$_2$•6H$_2$O/CaCl$_2$ |

*"TMC" indicates the composition contains a disclosed taste modulator composition as described above, i.e., CAB-K supplemented with the taste modulator composition, 10 mM KCl/3 mM MgCl$_2$•6H$_2$O/3 mM CaCl$_2$; "REBA" indicates Rebaudioside A; and "REBM" indicates Rebaudioside M.

The sensory protocol was as described above in Example 6.1. The average data from replicate trials of Example 6.4 are shown below in Table 23. The data show that a disclosed taste modulator composition was effective in significantly improving MF in the REBM and sucrose/REBA formulations with a disclosed TMC, along with providing a reduction in SL for the REBM formulation with a disclosed TMC.

TABLE 23

| Sample No. | Sample Description | SI | Sol | Sal | BI | MF | AI | AT | SL | SD |
|---|---|---|---|---|---|---|---|---|---|---|
| 1 | REBM Control | 7.0 | 3.0 | 0.0 | 0.0 | 0.0 | 2.0 | 2.5 | 4.0 | 2.5 |
| 2 | REBM with TMC* | 8.0 | 2.0 | 0.0 | 0.0 | 3.0 | 3.0 | 2.5 | 1.0 | 0.0 |
| 3 | Sucrose/REBA Control | 7.3 | 2.0 | 0.0 | 0.0 | 1.0 | 2.3 | 0.0 | 0.0 | 0.0 |
| 4 | Sucrose/REBA with TMC | 8.0 | 2.3 | 0.0 | 0.0 | 3.0 | 2.3 | 0.0 | 0.0 | 0.0 |

Example 7. Assessment of Synergistic Interactions of Components of a Taste Modulator Composition A study was conducted to assess the synergistic interactions of KCl, MgCl$_2$, and CaCl$_2$ in reduction of Sweetness Linger (SL) and enhancement of Mouthfeel (MF) in a formulation utilizing REBA in a Citric Acid/K$_3$Citrate buffer system (CAB-K). Briefly, a control solution of sucrose in the CAB-K was prepared by addition of 45 mg K$_3$Citrate.H$_2$O, 225 mg Citric Acid.H$_2$O, and 15 g sucrose to 150 mL of distilled water in a plastic-capped glass bottle and the resultant composition swirled until complete dissolution. The pH of this buffer solution was determined to be 3.04 as measured using a freshly calibrated pH meter (calibrated using a pH 4.00 standard solution). The stock solution of CAB-K/REBA was prepared by addition of 0.30 g K$_3$Citrate.H$_2$O, 1.50 g Citric Acid.H$_2$O, and 500 mg Rebaudioside A (REBA) to 1 L of distilled water and stirring to dissolution. Next, 150 mL portions of the REBA/CAB-K solution was added to five 250 mL plastic-capped glass bottles and sample preparation completed as summarized in Table 24 below.

TABLE 24

| Sample No. | Sample Description* | Composition | pH (final) |
|---|---|---|---|
| 1 | SUC control | Sucrose control (10 wt % sucrose in CAB-K) | 3.04 |

TABLE 24-continued

| Sample No. | Sample Description* | Composition | pH (final) |
|---|---|---|---|
| 2 | REBA control | 500 PPM REBA in CAB-K Control | 3.06 |
| 3 | REBA/KCl | 500 PPM REBA in CAB-K with 10 mM KCl (112 mg/150 mL) | 3.07 |
| 4 | REBA/MgCl$_2$ | 500 PPM REBA in CAB-K with 3 mM MgCl$_2$ (91 mg/150 mL) | 3.01 |
| 5 | REBA/CaCl$_2$ | 500 PPM REBA in CAB-K with 3 mM CaCl$_2$ (50 mg/150 mL) | 3.07 |

TABLE 24-continued

| Sample No. | Sample Description* | Composition | pH (final) |
|---|---|---|---|
| 6 | REBA/KCl/ MgCl$_2$/CaCl$_2$ | 500 PPM REBA in CAB-K with 10 mM KCl (112 mg/150 mL); 3 mM MgCl$_2$ (91 mg/150 mL); and 3 mM CaCl$_2$ (50 mg/150 mL) | 3.07 |

*500 PPM REBA in CAB-K prepared as described above; and "REBA" indicates Rebaudioside A.

The sensory protocol used throughout Example 7 was as follows: (1) scramble ambient temperature samples so that all 6 are unknowns; (2) rinse mouth with 15 mL distilled water while swishing vigorously followed by expectoration of the rinse water; (3) take 30 mL of the sample into the mouth and swish around vigorously for 15 sec scaling Sweetness Intensity (SI), Sourness Intensity (SoI), Saltiness Intensity (SaI), Bitterness Intensity (BI), Mouthfeel Intensity (MF) and Astringency Intensity (AI) on 0-15 scales during this period; also, make note of the Sweetness Appearance Time (AT) and rate as Rapid (R), Delay (D) or Significant Delay (SD); for AT ratings, R=0.0, D=2.5 and SD=5.0; record SI, SoI, SaI, BI, MF, AI and AT in table; (4) swallow sample, rinse mouth with 15 mL distilled water and expectorate rinse water at 30 sec; (5) note any change in SI over the next 2.0 min and also any other sensations and record perceived SI at 2.0 min (Sweetness Linger (SL) at 2 min) in table; also make note of any Sweetness Desensitization/Tongue-Numbing (SD) that occurs in this 2 min period and rate it as None (N), Slight (S) or Medium (M); for SD ratings, N=0.0, S=2.5 and M=5.0; (6) rinse mouth with 15 mL distilled water with vigorous agitation in the mouth for 15 sec and expectorate; (7) wait a minimum of 15 min and repeat with next sample; and (8) break sample code to identify samples.

Data were collected per the above using the formulations described above, and the average data from replicate trials are summarized in Table 25 below.

TABLE 25*

| Sample No. | Sample Description | SI | SoI | SaI | BI | MF |
|---|---|---|---|---|---|---|
| 1 | SUC control | 10/10/10 Ave: 10.0 | 2/2/2 Ave: 2.0 | 0/0/0 Ave: 0.0 | 0/0/0 Ave: 0.0 | 3/3/3 Ave: 3.0 |
| 2 | REBA control | 8/8/9 Ave: 8.3 | 2/2/2 Ave: 2.0 | 0/0/0 Ave: 0.0 | 0/0/0 Ave: 0.0 | 0/0/3 Ave: 1.0 |
| 3 | REBA/KCl | 8/8/9 Ave: 8.3 | 2/2/2 Ave: 2.0 | 0/0/0 Ave: 0.0 | 0/0/0 Ave: 0.0 | 0/0/2 Ave: 0.7 |
| 4 | REBA/MgCl$_2$ | 8/8/8 Ave: 8.0 | 2/2/2 Ave: 2.0 | 0/0/0 Ave: 0.0 | 0/0/0 Ave: 0.0 | 0/1/0 Ave: 0.3 |
| 5 | REBA/CaCl$_2$ | 8/8/9 Ave: 8.3 | 2/2/2 Ave: 2.0 | 0/0/0 Ave: 0.0 | 0/0/0 Ave: 0.0 | 0/0/3 Ave: 1.0 |
| 6 | REBA/KCl/ MgCl$_2$/CaCl$_2$ | 10/9/10 Ave: 9.7 | 2/2/2 Ave: 2.0 | 0/0/0 Ave: 0.0 | 0/0/0 Ave: 0.0 | 5/4/4 Ave: 4.3 |

| Sample No. | Sample Description | AI | AT | SL | SD |
|---|---|---|---|---|---|
| 1 | SUC control | 2/2/2 Ave: 2.0 | 0/0/0 Ave: 0.0 | 0/0/0 Ave: 0.0 | 0/0/0 Ave: 0.0 |
| 2 | REBA control | 2/2/2 Ave: 2.0 | 0/2.5/0 Ave: 0.8 | 5/5/5 Ave: 5.0 | 2.5/2.5/0 Ave: 1.7 |
| 3 | REBA/KCl | 2/2/2 Ave: 2.0 | 2.5/2.5/2.5 Ave: 2.5 | 5/5/5 Ave: 4.3 | 2.5/2.5/2.5 Ave: 2.5 |
| 4 | REBA/MgCl$_2$ | 2/2/2 Ave: 2.0 | 0/2.5/2.5 Ave: 1.7 | 5/5/4 Ave: 4.7 | 2.5/2.5/2.5 Ave: 2.5 |
| 5 | REBA/CaCl$_2$ | 2/2/2 Ave: 2.0 | 2.5/0/0 Ave: 0.8 | 4/5/5 Ave: 4.7 | 2.5/2.5/0 Ave: 1.7 |
| 6 | REBA/KCl/ MgCl$_2$/CaCl$_2$ | 2/2/2 Ave: 2.0 | 0/0/0 Ave: 0.0 | 3/3/3 Ave: 3.0 | 2.5/2.5/0 Ave: 1.7 |

*The data in the table show the results from each of three independent tests for the indicated sample ("X/Y/Z" indicating the individual result for assessment X, Y and Z) with the average for the three tests given in bold ("Ave:") in each cell of the table.

Data for each test attribute were analyzed separately using a randomized complete-block experimental design. The factors in the randomized complete-block ANOVA model were Rep and Sample. For each attribute, if the P-Value for Sample was <0.05, the average intensities of the samples were compared using a 95% Fisher's LSD. Within a given test attribute, samples with no letters in common are significantly different at the 95% confidence level. The statistical analysis data are given below in Table 26.

TABLE 26

| | Sample | | | | | |
|---|---|---|---|---|---|---|
| Attribute | SUC Control | REBA Control | REBA/ KCl | REBA/ MgCl$_2$ | REBA/ CaCl$_2$ | REBA/KCl/ MgCl$_2$/ CaCl$_2$ |
| SI | 10.0 A | 8.3 B | 8.3 B | 8.0 B | 8.3 B | 9.7 A |
| SoI | 2.0 | 2.0 | 2.0 | 2.0 | 2.0 | 2.0 |
| SaI | 0.0 | 0.0 | 0.0 | 0.0 | 0.0 | 0.0 |
| BI | 0.0 | 0.0 | 0.0 | 0.0 | 0.0 | 0.0 |
| MF | 3.0 A | 1.0 B | 0.7 B | 0.3 B | 1.0 B | 4.3 A |
| AI | 2.0 | 2.0 | 2.0 | 2.0 | 2.0 | 2.0 |
| AT | 0.0 | 0.8 | 2.5 | 1.7 | 0.8 | 0.0 |

TABLE 26-continued

| SL | 0.0 C | 5.0 A | 5.0 A | 4.7 A | 4.7 A | 3.0 B |
| SD | 0.0 B | 1.7 A | 2.5 A | 2.5 A | 1.7 A | 1.7 A |

| Attribute | P-Value for Sample | 95% LSD | Significant Difference @ 95% Confidence Level |
|---|---|---|---|
| SI | 0.0001 | 0.6 | Yes |
| SoI | 1.0000 | NA | No |
| SaI | 1.0000 | NA | No |
| BI | 1.0000 | NA | No |
| MF | 0.0044 | 1.9 | Yes |
| AI | 1.0000 | NA | No |
| AT | 0.1107 | NA | No |
| SL | 0.0001 | 0.6 | Yes |
| SD | 0.0297 | 1.4 | Yes |

The data in Example 7 show that the formulations with sucrose only ("SUC Control") and REBA with the 10.0 mM KCl, 3.0 mM $MgCl_2 \cdot 6H_2O$ and 3.0 mM $CaCl_2$ taste modulator composition are significantly higher in Sweetness and Mouthfeel than all of the other samples. In addition, the data show that the SUC Control formulation and the REBA formulation with the 10.0 mM KCl, 3.0 mM $MgCl_2 \cdot 6H_2O$ and 3.0 mM $CaCl_2$ taste modulator composition are significantly lower in Sweetness Linger and Sweetness Desensitization than any of the other formulations tested above. Finally, the data show that there were no significant differences among the formulations with REBA alone, REBA with KCl, REBA with $MgCl_2$, and REBA with $CaCl_2$ (as detailed above) among the test attributes examined.

Based on the foregoing, a disclosed taste modulator/REBA composition having a combination of KCl, $MgCl_2$, and $CaCl_2$ showed statistically significant supra-additivity of the taste attributes Sweetness Intensity and Mouthfeel, and supra-suppression in the taste attributes of Sweetness Linger and Sweetness Desensitization, relative to the effects anticipated based on additivity. In particular, and surprisingly, the data support a conclusion that the effects of KCl, $MgCl_2$, and $CaCl_2$ in a taste modulator composition are synergistic. The data show that formulations with only one of these salts (KCl, $MgCl_2$, and $CaCl_2$) do not show any statistically significant alterations in any of the taste attributes and predict that mixtures of the three salts at the concentrations employed should not lead to the observed taste improvement.

Example 8. Assessment of Disclosed Taste Modulator Compositions in Beverage Prototypes The sensory protocol used throughout Example 8 was as follows: (1) scramble ambient temperature samples so that all 6 are unknowns; (2) rinse mouth with 15 mL distilled water while swishing vigorously followed by expectoration of the rinse water; (3) take 30 mL of the sample into the mouth and swish around vigorously for 15 sec scaling Sweetness Intensity (SI), Sourness Intensity (SoI), Saltiness Intensity (SaI), Bitterness Intensity (BI), Mouthfeel Intensity (MF) and Astringency Intensity (AI) on 0-15 scales during this period; also, make note of the Sweetness Appearance Time (AT) and rate as Rapid (R), Delay (D) or Significant Delay (SD); record SI, SoI, SaI, BI, MF, AI and AT in table; (4) swallow sample, rinse mouth with 15 mL distilled water and expectorate rinse water at 30 sec; (5) note any change in SI over the next 2.0 min and also any other sensations and record perceived SI at 2.0 min (Sweetness Linger (SL) at 2 min) in table; also make note of any Sweetness Desensitization/Tongue-Numbing (SD) that occurs in this 2 min period and rate it as None (N), Slight (S) or Medium (M); (6) rinse mouth with 15 mL distilled water with vigorous agitation in the mouth for 15 sec and expectorate; (7) wait a minimum of 15 min and repeat with next sample; and (8) break sample code to identify samples.

Example 8.1

The effect of a disclosed taste modulator composition with two REBA formulations was assessed in comparison to formulations without the taste modulator composition and comprising control sweeteners such as REBA, REBD, REBM and Sucrose Controls in a Lemon-Lime flavored Potassium Citric Acid Buffer (LL-CAB-K) formulation. The LL-CAB-K was prepared by addition of 0.30 g $K_3Citrate \cdot H_2O$ and 1.50 g Citric Acid.$H_2O$ to 1 L of distilled water and stirring to dissolution, with 2.5 g of a lemon-lime flavor. The pH of this buffer solution was determined to be 3.16. Next, 100 mL portions of the LL-CAB-K solution were added to 6 plastic-capped glass bottles into which the sweeteners with and without TMC had already been weighed as indicated below. The sample solutions prepared using the LL-CAB-K solution with lemon-lime flavor are summarized in Table 27 below.

TABLE 27

| Sample No. | Sample Description* | Composition** |
|---|---|---|
| 1 | Sucrose control | Sucrose was present at 10 wt %. |
| 2 | REBA control | REBA was present at 500 mg/L. |
| 3 | REBD control | REBD was present at 500 mg/L. |
| 4 | REBM control | REBM was present at 500 mg/L. |
| 5 | REBA with TMC 1 | REBA was present at 500 mg/L; KCl, 895 mg/L (12.0 mM); $MgCl_2 \cdot 6H_2O$, 702 mg/L (3.4 mM); and $CaCl_2$ - 720 mg/L (6.4 mM). |
| 6 | REBA with TMC 2 | REBA was present at 500 mg/L; KCl, 1790 mg/L (24.0 mM); $MgCl_2 \cdot 6H_2O$, 1404 mg/L (6.8 mM); and $CaCl_2$, 1440 mg/L (12.8 mM). |

*"TMC 1" indicates the composition contains a disclosed taste modulator composition at the indicated concentrations of taste modulator components; "TMC 2" indicates the composition contains a different disclosed taste modulator composition at the indicated concentrations of taste modulator components; "REBA" indicates Rebaudioside A; "REBD" indicates Rebaudioside D; and "REBM" indicates Rebaudioside M.
**All solutions prepared in the LL-CAB-K solution described above.

The sensory protocol was as described above for Example 8. The average data from replicate trials of Example 8.1 are shown below in Table 28. The data show that a disclosed taste modulator composition was associated with a concentration-dependent reduction in SL, and significantly improved MF in a concentration-dependent manner relative to REBA, REBD, and REBM controls that did not have the taste modulator composition. It is notable that the SL values determined for the REBA samples with the taste modulator composition was lower compared to not only REBA without the taste modulator composition, but also in the REBD and REBM formulations without the taste modulator composition. A salty-off taste could be observed in the higher concentration taste modulator composition (TMC 2 in the table).

TABLE 28

| Sample No. | Sample Description | SI | SoI | SaI | BI | MF | AI | AT* | SL | SD |
|---|---|---|---|---|---|---|---|---|---|---|
| 1 | Sucrose control | 10.0 | 3.0 | 0.0 | 0.0 | 1.3 | 1.0 | R | 0.0 | N |

TABLE 28-continued

| Sample No. | Sample Description | SI | SoI | SaI | BI | MF | AI | AT* | SL | SD |
|---|---|---|---|---|---|---|---|---|---|---|
| 2 | REBA control | 9.7 | 3.0 | 0.0 | 0.0 | 0.0 | 1.0 | D | 5.0 | N |
| 3 | REBD control | 9.3 | 3.0 | 0.0 | 0.0 | 0.0 | 1.7 | SD– | 4.3 | N |
| 4 | REBM control | 10.0 | 3.0 | 0.0 | 0.0 | 0.0 | 1.3 | D– | 4.3 | N |
| 5 | REBA with TMC 1 | 9.3 | 3.0 | 0.0 | 0.0 | 6.0 | 1.0 | R+ | 3.0 | N |
| 6 | REBA with TMC 2 | 9.3 | 3.0 | 1.0 | 0.0 | 8.0 | 1.0 | R | 2.0 | N |

*R+: Delayed Sweetness AT in 1/3 of ratings; SD–: Significantly Delayed Sweetness AT in 2/3 of ratings; D–: Delayed Sweetness AT in 2/3 of ratings.

Example 8.2

The effect of a disclosed taste modulator composition with three REBA formulations was assessed in comparison to formulations without the taste modulator composition and comprising control sweeteners such as REBA, REBM and Sucrose Controls in a Lemon-Lime flavored Potassium Citric Acid Buffer (LL-CAB-K) formulation, including assessment of whether lowering chloride concentration can mitigate salty off-taste observed in Example 8.1. The LL-CAB-K was prepared by addition of 0.30 g $K_3$Citrate.$H_2O$ and 1.50 g Citric Acid.$H_2O$ to 1 L of distilled water and stirring to dissolution, with 2.5 g of a lemon-lime flavor. The pH of this buffer solution was determined to be 3.16. Next, 100 mL portions of the LL-CAB-K solution were added to 6 plastic-capped glass bottles into which the sweeteners with and without TMC had already been weighed as indicated below. The sample solutions prepared using the LL-CAB-K solution with lemon-lime flavor are summarized in Table 29 below.

TABLE 29

| Sample No. | Sample Description* | Composition** |
|---|---|---|
| 1 | Sucrose control | Sucrose was present at 10 wt %. |
| 2 | REBA control | REBA was present at 500 mg/L. |
| 3 | REBM control | REBM was present at 500 mg/L. |
| 4 | REBA with TMC 1 | REBA was present at 500 mg/L; KCl, 895 mg/L (12.0 mM); $MgCl_2 \cdot 6H_2O$, 702 mg/L (3.4 mM); and $CaCl_2$, 720 mg/L (6.4 mM); total [$Cl^-$] was 31.6 mM. |
| 5 | REBA with TMC 2 | REBA was present at 500 mg/L; KCl, 1790 mg/L (24.0 mM); $MgCl_2 \cdot 6H_2O$, 1404 mg/L (6.8 mM); and $CaCl_2$, 1440 mg/L (12.8 mM); total [$Cl^-$] was 63.2 mM. |
| 6 | REBA with TMC 3 | REBA was present at 500 mg/L; KCl, 1790 mg/L (24.0 mM); and $MgSO_4 \cdot 7H_2O$, 1676 mg/L (6.8 mM); total [$Cl^-$] was 24.0 mM. |

*"TMC 1" indicates the composition contains a disclosed taste modulator composition at the indicated concentrations of taste modulator components; "TMC 2" indicates the composition contains a different disclosed taste modulator composition at the indicated concentrations of taste modulator components; "TMC 3" indicates the composition contains a different disclosed taste modulator composition at the indicated concentrations of taste modulator components; "REBA" indicates Rebaudioside A; and "REBM" indicates Rebaudioside M.
**All solutions prepared in the LL-CAB-K solution described above.

The sensory protocol was as described above for Example 8. The data from Example 8.2 are shown below in Table 30. The data show that a disclosed taste modulator composition was associated with a concentration-dependent reduction in SL, and significantly improved MF in a dose-dependent manner relative to REBA and REBM controls that did not have the taste modulator composition. It is notable that the SL values determined for the REBA samples with the taste modulator composition were lower compared to not only REBA without the taste modulator composition, but also lower than the REBM formulation without the taste modulator composition. A salty-off taste could be observed in the higher concentration taste modulator composition having a higher chloride concentration (TMC 2 in the table). The TMC composition (TMC 3 in the table) which had a lower chloride concentration compared to TMC 2, as desired, showed absence of salty off taste and a significant increase in Body/Mouthfeel compared to the REBA Control; however, at the concentration employed, a weak bitter off taste was observed.

TABLE 30

| Sample No. | Sample Description | SI | SoI | SaI | BI | MF | AI | AT* | SL | SD |
|---|---|---|---|---|---|---|---|---|---|---|
| 1 | Sucrose control | 10.3 | 3.0 | 0.0 | 0.0 | 3.0 | 2.3 | R | 0.0 | N |
| 2 | REBA control | 9.7 | 3.0 | 0.0 | 0.0 | 1.0 | 2.0 | R | 3.0 | N+ |
| 3 | REBM control | 10.3 | 3.0 | 0.0 | 0.0 | 2.0 | 2.3 | R+ | 3.5 | S |
| 4 | REBA with TMC 1 | 10.0 | 3.0 | 0.0 | 0.0 | 3.7 | 2.3 | R | 1.0 | N |
| 5 | REBA with TMC 2 | 10.0 | 3.0 | 0.7 | 0.0 | 5.3 | 2.3 | R | 0.7 | N |
| 6 | REBA with TMC 3 | 10.3 | 3.0 | 0.0 | 0.7 | 3.7 | 2.3 | R+ | 2.7 | S– |

*R+: Delayed Sweetness AT in 1/3 of ratings.
**N+: Slight Sweetness Desensitization in 1/3 of ratings; S–: Slight Sweetness Desensitization in 2/3 of ratings.

Example 8.3

The effect of a disclosed taste modulator composition with two REBA formulations was assessed in comparison to formulations without the taste modulator composition and comprising control sweeteners such as REBA, REBM and Sucrose Controls in a Lemon-Lime flavored Potassium Citric Acid Buffer (LL-CAB-K) formulation, including assessment of chloride concentration and a salty off-taste observed in Example 8.1. The LL-CAB-K was prepared by addition of 0.30 g $K_3$Citrate.$H_2O$ and 1.50 g Citric Acid.$H_2O$ to 1 L of distilled water and stirring to dissolution, with 2.5 g of a lemon-lime flavor. The pH of this buffer solution was determined to be 3.16. Next, 100 mL portions of the CAB-K solution were added to 5 plastic-capped glass bottles into which the sweeteners with and without TMC had already been weighed as indicated below. The sample solutions prepared using the CAB-K solution with lemon-lime flavor are summarized in Table 31 below.

TABLE 31

| Sample No. | Sample Description* | Composition** |
|---|---|---|
| 1 | Sucrose control | Sucrose was present at 10 wt %. |
| 2 | REBA control | REBA was present at 500 mg/L. |
| 3 | REBM control | REBM was present at 500 mg/L. |
| 4 | REBA with TMC 1 | REBA was present at 500 mg/L; KCl, 895 mg/L (12.0 mM); $MgCl_2 \cdot 6H_2O$, 702 mg/L (3.4 mM); and $CaCl_2$ - 720 mg/L (6.4 mM); total [$Cl^-$] was 31.6 mM. |

TABLE 31-continued

| Sample No. | Sample Description* | Composition** |
|---|---|---|
| 5 | REBA with TMC 2 | REBA was present at 500 mg/L; KCl, 1790 mg/L (24.0 mM); $MgCl_2 \cdot 6H_2O$, 1404 mg/L (6.8 mM); and $CaCl_2$, 1440 mg/L (12.8 mM); total [$Cl^-$] was 63.2 mM. |

*"TMC 1" indicates the composition contains a disclosed taste modulator composition at the indicated concentrations of taste modulator components; "TMC 2" indicates the composition contains a different disclosed taste modulator composition at the indicated concentrations of taste modulator components; "REBA" indicates Rebaudioside A; and "REBM" indicates Rebaudioside M.
**All samples were prepared in the LL-CAB-K solution described above.

The sensory protocol was as described above for Example 8. The data from Example 8.3 are shown below in Table 32. The data show that a disclosed taste modulator composition was associated with a reduction in SL effect, and significantly improved MF relative to REBA and REBM controls that did not have the taste modulator composition. It is notable that the SL values determined for the REBA samples with the taste modulator composition were lower compared to not only REBA without the taste modulator composition, but also in the REBM formulation without the taste modulator composition. A salty-off taste was observed, even with the TMC with a lower chloride concentration.

TABLE 32

| Sample No. | Sample Description | SI | SoI | SaI | BI | MF | AI | AT* | SL | SD |
|---|---|---|---|---|---|---|---|---|---|---|
| 1 | Sucrose control | 10.0 | 2.0 | 0.0 | 0.0 | 3.0 | 2.0 | R | 0.0 | N |
| 2 | REBA control | 8.3 | 2.0 | 0.0 | 0.0 | 0.0 | 2.0 | D+ | 4.3 | N+ |
| 3 | REBM control | 10.0 | 2.0 | 0.0 | 0.0 | 2.3 | 2.0 | R+ | 4.3 | N+ |
| 4 | REBA with TMC 1 | 10.0 | 2.0 | 0.7 | 0.0 | 4.3 | 2.0 | R | 2.3 | N |
| 5 | REBA with TMC 2 | 9.3 | 2.0 | 0.7 | 0.0 | 4.3 | 2.0 | R+ | 2.3 | N |

*R+: Delayed Sweetness AT in 1/3 of ratings.
**N+: Slight Sweetness Desensitization in 1/3 of ratings; S−: Slight Sweetness Desensitization in 2/3 of ratings.

Example 8.4

The effect of a disclosed taste modulator composition with two REBA formulations was assessed in comparison to formulations without the taste modulator composition and comprising control sweeteners such as REBA, REBM and Sucrose Controls in a Lemon-Lime flavored Potassium Citric Acid Buffer (LL-CAB-K) formulation. The LL-CAB-K was prepared by addition of 0.30 g $K_3Citrate \cdot H_2O$ and 1.50 g Citric Acid·$H_2O$ to 1 L of distilled water and stirring to dissolution, with 2.5 g of a lemon-lime flavor. The pH of this buffer solution was determined to be 3.16. Next, 100 mL portions of the CAB-K solution were added to 5 plastic-capped glass bottles into which the sweeteners with and without TMC had already been weighed as indicated below. The sample solutions prepared using the CAB-K solution with lemon-lime flavor are summarized in Table 33 below.

TABLE 33

| Sample No. | Sample Description* | Composition** |
|---|---|---|
| 1 | Sucrose control | Sucrose was present at 10 wt %. |
| 2 | REBA control | REBA was present at 500 mg/L. |
| 3 | REBM control | REBM was present at 500 mg/L. |
| 4 | REBA with TMC 1 | REBA was present at 500 mg/L; KCl, 447 mg/L (6.0 mM); $MgCl_2 \cdot 6H_2O$, 691 mg/L (3.4 mM); and $CaCl_2$ - 688 mg/L (6.2 mM); total [$Cl^-$] was 25.2 mM. |
| 5 | REBA with TMC 2 | REBA was present at 500 mg/L; KCl, 250 mg/L (3.4 mM); $MgCl_2 \cdot 6H_2O$, 1100 mg/L (5.4 mM); and $CaCl_2$, 344 mg/L (3.1 mM); total [$Cl^-$] was 20.4 mM. |

*"TMC 1" indicates the composition contains a disclosed taste modulator composition at the indicated concentrations of taste modulator components; "TMC 2" indicates the composition contains a different disclosed taste modulator composition at the indicated concentrations of taste modulator components; "REBA" indicates Rebaudioside A; and "REBM" indicates Rebaudioside M.
**All samples were prepared in the LL-CAB-K solution described above.

The sensory protocol was as described above for Example 8. The average data from replicate trials from Example 8.4 are shown below in Table 34. The data show that a disclosed taste modulator composition was associated with a reduction in SL effect, and significantly improved MF relative to REBA and REBM controls that did not have the taste modulator composition. Moreover, reduction of chloride ion concentration in the disclosed TMC used with REBA formulation significantly reduced salty off taste while still providing significant Body/Mouthfeel and reduction in Sweetness Linger.

TABLE 34

| Sample No. | Sample Description | SI | SoI | SaI | BI | MF | AI | AT* | SL | SD** |
|---|---|---|---|---|---|---|---|---|---|---|
| 1 | Sucrose control | 10.0 | 2.0 | 0.0 | 0.0 | 3.0 | 2.5 | R | 0.0 | N |
| 2 | REBA control | 10.0 | 2.0 | 0.0 | 0.0 | 0.0 | 2.2 | D | 5.0 | S− |
| 3 | REBM control | 10.0 | 2.0 | 0.0 | 0.0 | 1.0 | 2.0 | R+ | 4.0 | N+ |
| 4 | REBA with TMC 1 | 10.0 | 2.0 | 0.0 | 0.0 | 3.0 | 2.0 | D− | 2.0 | N+ |
| 5 | REBA with TMC 2 | 10.0 | 2.0 | 0.0 | 0.0 | 3.7 | 2.0 | R+ | 1.3 | N+ |

*R+: Delayed Sweetness AT in 1/3 of ratings; D+: Significantly Delayed Sweetness AT in 1/3 of ratings; and
**N+: Slight Sweetness Desensitization in ca. 1/3 of ratings.

Example 8.5

The study assessed formulations having a combination of Rebaudioside A (REBA) and glucosylated steviol glycosides (GSG) in the presence and absence of a disclosed taste modulator composition at different pH values. Briefly, a solution having 338 mg citric acid monohydrate in 225 mL was prepared, to which 1.00 M KOH was added dropwise with stirring and monitoring of pH with a freshly calibrated pH meter. Three solutions were accordingly prepared at the following pH values: 2.8, 3.0, and 3.2 (designated as pH 2.8 CAB-K; pH 3.0 CAB-K; and pH 3.2 CAB-K, respectively). These solutions were then used to prepare the REBA with GSG formulations described below in Table 35.

TABLE 35

| Sample No. | Sample Description* | Composition |
|---|---|---|
| 1 | REBA/GSG/pH 2.8 Control | 400 mg/L REBA; and 100 mg/L GSG-5000 in pH 2.8 CAB-K (pH 2.88 after addition of REBA and GSG-5000). |
| 2 | REBA/GSG/pH 2.8 with TMC | 400 mg/L REBA; 100 mg/L GSG-5000; 373 mg/L (5.0 mM) KCl, 1020 mg/L $MgCl_2 \cdot 6H_2O$ (5.0 mM) and 555 mg/L $CaCl_2$ (5.0 mM) in pH 2.8 CAB-K (pH 2.85 after addition of REBA, GSG-5000, and TMC). |
| 3 | REBA/GSG/pH 3.0 Control | 400 mg/L REBA; and 100 mg/L GSG-5000 in pH 3.0 CAB-K (pH 3.09 after addition of REBA and GSG-5000). |
| 4 | REBA/GSG/pH 3.0 with TMC | 400 mg/L REBA; 100 mg/L GSG-5000; 373 mg/L (5.0 mM) KCl, 1020 mg/L $MgCl_2 \cdot 6H_2O$ (5.0 mM) and 555 mg/L $CaCl_2$ (5.0 mM) in pH 3.0 CAB-K (pH 3.0 after addition of REBA, GSG-5000, and TMC). |
| 5 | REBA/GSG/pH 3.2 Control | 400 mg/L REBA; and 100 mg/L GSG-5000 in pH 3.2 CAB-K (pH 3.29 after addition of REBA and GSG-5000). |
| 6 | REBA/GSG/pH 3.2 with TMC | 400 mg/L REBA; 100 mg/L GSG-5000; 373 mg/L (5.0 mM) KCl, 1020 mg/L $MgCl_2 \cdot 6H_2O$ (5.0 mM) and 555 mg/L $CaCl_2$ (5.0 mM) in pH 3.2 CAB-K (pH 3.17 after addition of REBA, GSG-5000, and TMC). |

*"TMC" indicates the composition contains a disclosed taste modulator composition at the indicated concentrations of taste modulator components; "REBA" indicates Rebaudioside A; and "GSG-5000" indicates glucosylated steviol glycosides (GSG) were Steviarome™ 5000.

The sensory protocol was as described above for Example 8. The data from Example 8.5 are shown below in Table 36. The data show that within the range of pH 2.8-3.2, pH did not affect either the reduction in Sweetness Linger reduction or the increase in Body/Mouthfeel for the REBA/GSG formulations tested.

TABLE 36

| Sample No. | Sample Description | SI | SoI | SaI | BI | MF | AI | AT* | SL | SD** |
|---|---|---|---|---|---|---|---|---|---|---|
| 1 | REBA/GSG/pH 2.8 Control | 10.0 | 3.0 | 0.0 | 0.0 | 0.0 | 2.3 | D | 5.0 | S– |
| 2 | REBA/GSG/pH 2.8 with TMC | 10.0 | 2.3 | 0.0 | 0.0 | 3.0 | 2.0 | R | 3.0 | N+ |
| 3 | REBA/GSG/pH 3.0 Control | 10.0 | 2.7 | 0.0 | 0.0 | 1.5 | 2.3 | D | 4.5 | S |
| 4 | REBA/GSG/pH 3.0 with TMC | 10.0 | 2.3 | 0.0 | 0.0 | 3.0 | 2.0 | R+ | 2.5 | S |
| 5 | REBA/GSG/pH 3.2 Control | 9.7 | 1.7 | 0.0 | 0.0 | 0.0 | 2.0 | D | 5.0 | S |
| 6 | REBA/GSG/pH 3.2 with TMC | 10.0 | 2.0 | 0.0 | 0.0 | 3.0 | 2.3 | R+ | 2.5 | N+ |

Example 8.6

The study assessed lemon-lime flavored formulations having a combination of Rebaudioside A (REBA) and glucosylated steviol glycosides (GSG) in the presence and absence of two disclosed taste modulator compositions in a Lemon-Lime flavored Potassium Citric Acid Buffer (LL-CAB-K) formulation. Briefly, a CAB-K stock solution (pH 3.1) was prepared by dropwise addition of 1.00 M KOH to a rapidly stirring solution of 1.71 g (8.16 mmol) of citric acid monohydrate in 900 mL distilled water in a 1 L flask while monitoring pH with a freshly calibrated pH meter. Upon reaching pH 3.1, 100 mL water was added to bring the volume to 1.00 L. At this point, 2.50 g of lemon-lime flavor was added and the resultant mixture stirred vigorously to ensure homogeneity to provide the LL-CAB-K solution. The pH of the LL-CAB-K solution was measured to be 3.20. The lemon-lime flavored CAB-K solution was used in the REBA with GSG formulations described below in Table 37.

TABLE 37

| Sample No. | Sample Description* | Composition** |
|---|---|---|
| 1 | Sucrose Control | 10 wt % sucrose (pH 3.20 after addition of sucrose). |
| 2 | REBA/GSG-2050 Control | 400 mg/L REBA; 175 mg/L GSG-2050 (pH 3.22 after addition of REBA and GSG-2050). |
| 3 | REBM Control | 500 mg/L REBM (pH 3.22 after addition of REBM). |
| 4 | REBA/GSG-2050 with TMC 1 | 400 mg/L REBA; 175 mg/L GSG-2050; 373 mg/L (5.0 mM) KCl, 1020 mg/L $MgCl_2 \cdot 6H_2O$ (5.0 mM) and 555 mg/L $CaCl_2$ (5.0 mM) (pH 3.12 after addition of REBA, GSG-2050, and TMC); total chloride concentration was 25.0 mM. |
| 5 | REBA/GSG-2050 with TMC 2 | 400 mg/L REBA; 175 mg/L GSG-2050; 895 mg/L (12.0 mM) KCl, 702 mg/L $MgCl_2 \cdot 6H_2O$ (3.4 mM) and 720 mg/L $CaCl_2$ (6.4 mM) (pH 3.12 after addition of REBA, GSG-2050, and TMC); total chloride concentration was 31.6 mM. |

*"TMC 1" indicates the composition contains a first disclosed taste modulator composition at the indicated concentrations of taste modulator components; "TMC 2" indicates the composition contains a second disclosed taste modulator composition at the indicated concentrations of taste modulator components; "REBA" indicates Rebaudioside A; "REBM" indicates Rebaudioside M; and "GSG-2050" indicates glucosylated steviol glycosides (GSG) were Steviarome™ 2050.
**All solutions prepared in the LL-CAB-K solution described above.

The sensory protocol was as described above for Example 8. The data from Example 8.6 are shown below in Table 38. The data show a significant dose-dependent increase in Body/Mouthfeel and reduction in Sweetness Linger was observed in each of the REBA/GSG-2050 formulations with a disclosed taste modulator composition. There was observed a weak salty off taste in one of the REBA/GSG formulations tested. Each of the REBA/GSG formulations with a TMC demonstrated a very sugar-like taste, despite showing somewhat greater Sweetness Linger than sucrose.

TABLE 38

| Sample No. | Sample Description | SI | SoI | SaI | BI | MF | AI | AT* | SL | SD** |
|---|---|---|---|---|---|---|---|---|---|---|
| 1 | Sucrose Control | 10.0 | 3.0 | 0.0 | 0.0 | 3.0 | 3.3 | R | 0.0 | N |
| 2 | REBA/GSG-2050 Control | 10.0 | 3.0 | 0.0 | 0.0 | 0.0 | 3.3 | D− | 4.7 | S+ |
| 3 | REBM Control | 10.0 | 3.0 | 0.0 | 0.0 | 1.0 | 3.3 | R | 3.7 | S |
| 4 | REBA/GSG-2050 with TMC 1 | 10.0 | 3.0 | 0.3 | 0.0 | 4.7 | 3.3 | R | 2.0 | N+ |
| 5 | REBA/GSG-2050 with TMC 2 | 10.0 | 3.0 | 0.0 | 0.0 | 6.3 | 3.0 | R | 1.7 | N |

Example 8.7

The study assessed formulations having Rebaudioside A (REBA) and glucosylated steviol glycosides (GSG) in the presence and absence of disclosed taste modulator compositions with different titratable citric acid concentrations in a Potassium Citric Acid Buffer (-CAB-K) solution. Briefly, a stock solution of 8.1 mM citric acid monohydrate and 500 mg/L REBA was prepared in 1 L of distilled water, after which the other ingredients listed below were added for the four samples tested as described below in Table 39. Then, while monitoring using a freshly calibrated pH meter, citric acid monohydrate in small weighed portions was added to adjust the pH of each sample to approximately pH 3.3.

TABLE 39

| Sample No. | Sample Description* | Composition** |
|---|---|---|
| 1 | REBA/8.5 mM CA | 2.4 mM $K_3$Citrate; 0.3 mM $Mg_3$(Citrate)$_2$; 0.0 mM $Ca_3$(Citrate)$_2$; 3.4 mM KCl; 4.6 mM $MgCl_2$; 3.1 mM $CaCl_2$; total [$K^+$], 10.7 mM; total [$Mg^{2+}$], 5.4 mM; total [$Ca^{2+}$], 3.1 mM; total [Citrate$^{3-}$], 3.0 mM; total [Cl$^-$], 18.6 mM; and pH 3.27 after addition of all components. |
| 2 | REBA/12.1 mM CA | 0.0 mM $K_3$Citrate; 1.0 mM $Mg_3$(Citrate)$_2$; 1.0 mM $Ca_3$(Citrate)$_2$; 10.0 mM KCl; 0.0 mM $MgCl_2$; 0.0 mM $CaCl_2$; total [$K^+$], 10.0 mM; total [$Mg^{2+}$], 3.0 mM; total [$Ca^{2+}$], 3.0 mM; total [Citrate$^{3-}$], 4.0 mM; total [Cl$^-$], 10.0 mM; and pH 3.27 after addition of all components. |
| 3 | REBA/17.6 mM CA | 0.0 mM $K_3$Citrate; 1.7 mM $Mg_3$(Citrate)$_2$; 1.7 mM $Ca_3$(Citrate)$_2$; 10.0 mM KCl; 0.0 mM $MgCl_2$; 0.0 mM $CaCl_2$; total [$K^+$], 10.0 mM; total [$Mg^{2+}$], 5.0 mM; total [$Ca^{2+}$], 5.0 mM; total [Citrate$^{3-}$], 6.7 mM; total [Cl$^-$], 10.0 mM; and pH 3.30 after addition of all components. |
| 4 | REBA/25.9 mM CA | 3.3 mM $K_3$Citrate; 1.7 mM $Mg_3$(Citrate)$_2$; 1.7 mM $Ca_3$(Citrate)$_2$; 0.0 mM KCl; 0.0 mM $MgCl_2$; 0.0 mM $CaCl_2$; total [$K^+$], 10.0 mM; total [$Mg^{2+}$], 5.0 mM; total [$Ca^{2+}$], 5.0 mM; total [Citrate$^{3-}$], 10.0 mM; total [Cl$^-$], 0.0 mM; and pH 3.31 after addition of all components. |

*"CA" indicates citric acid and the concentration indicated is the nominal concentration of citric acid, e.g., "8.5 mM CA," indicates total concentration of citric acid; and "REBA" indicates Rebaudioside A.
**All samples were prepared in the CAB-K solution described above.

The sensory protocol was as described above for Example 8. The data from Example 8.7 are shown below in Table 40. The data show that a disclosed TMC with a citric acid concentration of up to approximately 12 mM provided good performance on all parameters, in particular showing good reduction in Sweetness Linger, good Body/Mouthfeel, and acceptable sourness. Samples with higher citric acid concentrations provided greater sourness. In was further observed that Sample No. 2 was associated with a very good sugar-like taste.

TABLE 40

| Sample No. | Sample Description | SI | SoI | SaI | BI | MF | AI | AT* | SL | SD** |
|---|---|---|---|---|---|---|---|---|---|---|
| 1 | REBA/8.5 mM CA | 10.0 | 3.0 | 0.0 | 0.0 | 4.0 | 3.0 | R | 4.0 | S |
| 2 | REBA/12.1 mM CA | 10.0 | 3.0 | 0.0 | 0.0 | 5.0 | 3.0 | R | 2.0 | S |
| 3 | REBA/17.6 mM CA | 10.0 | 5.0 | 0.0 | 0.0 | 6.0 | 3.0 | R | 2.0 | S |
| 4 | REBA/25.9 mM CA | 9.0 | 7.0 | 0.0 | 0.0 | 5.0 | 5.0 | R | 1.0 | S |

Example 8.8

The study assessed formulations having a combination of Rebaudioside A (REBA) and glucosylated steviol glycosides (GSG) in the presence and absence of a disclosed taste modulator composition in a potassium citric acid buffered solution CAB-K) relative to sucrose, REBA, and REBM controls. Briefly, a CAB-K solution was prepared using 1.7 g citric acid monohydrate in 1 L, to which 1.00 M KOH was added dropwise with stirring and monitoring of pH with a freshly calibrated pH meter until pH 3.30 was reached (after addition of 5.7 mL of 1.0 M KOH), after which 2.5 g of lemon-lime flavor was added. This solution was designated CAB-K. A second solution having a disclosed taste modulator composition with calcium and magnesium salts was prepared as follows. Briefly, 2.50 g citric acid monohydrate; 613 mg (1.00 mmol) $Mg_3(Citrate)_2 \cdot 9H_2O$; 570 mg (1.00 mmol) $Ca_3(Citrate)_2 \cdot 4H_2O$; and 746 mg (10.0 mmol) KCl were dissolved in 1 L water. The pH of this solution was determined to be 3.38; 26 mg citric acid monohydrate was added which adjusted the pH to 3.29. This solution was 10.0 mM $K^+$, 10.0 mM $Cl^-$, 3.0 mM $Mg^{2+}$ and 3.0 mM $Ca^{2+}$. To the foregoing solution was added 2.50 g lemon-lime flavor was added and the resultant flavored buffer stirred to homogeneity. This solution was designated CAB-K/Mg/Ca. The two foregoing solutions (CAB-K and CAB-K/Mg/Ca) were used to prepare formulations with REBA, REBM, and GSG as described below in Table 41.

TABLE 41

| Sample No. | Sample Description* | Composition** |
|---|---|---|
| 1 | Sucrose control | 10 wt % sucrose in CAB-K; pH 3.34 after addition of sucrose. |
| 2 | REBA control | 500 mg/L REBA in CAB-K; pH 3.31 after addition of REBA. |
| 3 | REBM control | 500 mg/L REBM in CAB-K; pH 3.33 after addition of REBM. |
| 4 | REBA with TMC | 500 mg/L REBA in CAB-K/Mg/Ca; pH 3.30 after addition of REBA. |
| 5 | REBA/GSG-2050 with TMC | 500 mg/L REBA and 175 mg/L GSG-2050 in CAB-K/Mg/Ca; pH 3.30 after addition of REBA and GSG-2050. |
| 6 | REBA/GSG-5000 with TMC | 500 mg/L REBA and 175 mg/L GSG-5000 in CAB-K/Mg/Ca; pH 3.30 after addition of REBA and GSG-5000. |

*"TMC" indicates the composition contains a disclosed taste modulator composition at the indicated concentrations of taste modulator components; "REBA" indicates Rebaudioside A; "REBM" indicates Rebaudioside M; "GSG-2050" indicates glucosylated steviol glycosides (GSG) were Steviarome™ 2050.; and "GSG-5000" indicates glucosylated steviol glycosides (GSG) were Steviarome™ 5000.
**CAB-K and CAB-K/Mg/Ca were prepared as described above.

The sensory protocol was as described above for Example 8. The data from Example 8.8 are shown below in Table 42. The data show that the disclosed taste modulator composition (having 10.0 mM KCl; 1.0 mM $Mg_3(Citrate)_2$; and 1.0 mM $Ca_3(Citrate)_2$) provided a very significant increase in Body/Mouthfeel and reduction in Sweetness Linger relative to the REBA and REBM Controls. Moreover, it was observed that the marked improvement in taste quality of these beverage prototypes was accomplished without any salty off taste. It was further observed that the taste of the REBA/GSG formulations in the disclosed taste modulator composition were very sugar-like.

TABLE 42

| Sample No. | Sample Description | SI | SoI | SaI | BI | MF | AI | AT* | SL | SD** |
|---|---|---|---|---|---|---|---|---|---|---|
| 1 | Sucrose control | 10.0 | 2.0 | 0.0 | 0.0 | 3.0 | 2.0 | R | 0.0 | N |
| 2 | REBA control | 9.5 | 2.5 | 0.0 | 0.0 | 1.5 | 2.5 | R | 3.5 | N+ |
| 3 | REBM control | 10.0 | 2.5 | 0.0 | 0.0 | 0.0 | 2.0 | R | 5.0 | N |
| 4 | REBA with TMC | 9.0 | 3.0 | 0.0 | 0.0 | 5.0 | 2.5 | R | 1.5 | N |
| 5 | REBA/GSG-2050 with TMC | 10.0 | 3.0 | 0.0 | 0.0 | 5.0 | 2.5 | R | 2.0 | N |
| 6 | REBA/GSG-5000 with TMC | 10.0 | 3.0 | 0.0 | 0.0 | 4.0 | 3.0 | R | 1.0 | N |

Example 8.9

The study assessed a disclosed taste modulator formulation with varying concentrations of Rebaudioside A (REBA) in combination with glucosylated steviol glycosides (GSG) in a lemon-lime flavored citric acid buffered solution (LL-CAB-GSG/K/Mg/Ca), relative to sucrose and REBA controls, in unbuffered citric acid, without the disclosed taste modulator composition. Two stock solutions were prepared: (a) a lemon-lime flavored citric acid solution without the disclosed taste modulator composition, designated "LL-CA"; and (b) a lemon-lime flavored citric acid buffered solution with a disclosed taste modulator composition and GSG, designated "LL-CAB-GSG/K/Mg/Ca." Briefly, the LL-CA solution was prepared using 0.82 g citric acid monohydrate in 0.5 L distilled water, to which was added 1.25 g of lemon-lime flavor. The pH of the LL-CAB-K solution was 3.01. The LL-CAB-GSG/K/Mg/Ca solution was prepared adding to 0.5 L distilled water the following: 2.16 g citric acid monohydrate; 50 mg GSG-5000; 1.25 g lemon-lime flavor; 373 mg (5.0 mmol) KCl; 307 mg (0.50 mmol) $Mg_3(Citrate)_2 \cdot 9H_2O$; and 285 mg (0.50 mmol) $Ca_3(Citrate)_2 \cdot 4H_2O$. The pH of this solution was determined to be 3.48. This solution was 10.0 mM $K^+$, 10.0 mM $Cl^-$, 3.0 mM $Mg^{2+}$ and 3.0 mM $Ca^{2+}$. The two foregoing solutions (LL-CA and LL-CAB-GSG/K/Mg/Ca) were used to prepare formulations with REBA, REBM, and GSG as described below in Table 43.

TABLE 43

| Sample No. | Sample Description* | Composition** |
|---|---|---|
| 1 | Sucrose control | 10 wt % sucrose in LL-CAB-K. |
| 2 | REBA control | 500 mg/L REBA in LL-CAB-K. |
| 3 | REBA-350 + TMC | 350 mg/L REBA in LL-CAB-GSG/K/Mg/Ca |
| 4 | REBA-400 + TMC | 400 mg/L REBA in LL-CAB-GSG/K/Mg/Ca |

TABLE 43-continued

| Sample No. | Sample Description* | Composition** |
|---|---|---|
| 5 | REBA-450 + TMC | 450 mg/L REBA in LL-CAB-GSG/K/Mg/Ca |

*"TMC" indicates the composition contains a disclosed taste modulator composition as described above; and "REBA" indicates Rebaudioside A.
**LL-CAB-K and LL-CAB-GSG/K/Mg/Ca were prepared as described above; "GSG" indicates that it was Steviarome™ 2050.

The sensory protocol was as described above for Example 8. The average data of replicate trials from Example 8.9 are shown below in Table 44. The data show that the disclosed taste modulator composition (having 10.0 mM KCl; 1.0 mM $Mg_3(Citrate)_2$; and 1.0 mM $Ca_3(Citrate)_2$) provided a significant increase in Body/Mouthfeel and reduction in Sweetness Linger for each of the REBA concentrations with a taste modulator composition relative to the REBA Control. Moreover, REBA at a concentration of 400 mg/L in the presence of a taste modulator composition provided a good match in sweetness intensity to the 7.5% sucrose in citric acid control sample; and this sample exhibited a significantly increased Body/Mouthfeel and reduced Sweetness Linger relative to the REBA Control.

TABLE 44

| Sample No. | Sample Description | SI | SoI | SaI | BI | MF | AI | AT* | SL | SD** |
|---|---|---|---|---|---|---|---|---|---|---|
| 1 | Sucrose control | 7.3 | 3.3 | 0.0 | 0.0 | 0.0 | 1.3 | R+ | 0.0 | N |
| 2 | REBA control | 7.7 | 4.0 | 0.0 | 0.0 | 2.0 | 1.3 | R+ | 2.5 | S |
| 3 | REBA-350 + TMC | 7.3 | 3.7 | 0.0 | 0.0 | 3.0 | 1.7 | R+ | 0.5 | S− |
| 4 | REBA-400 + TMC | 7.3 | 4.0 | 0.0 | 0.0 | 5.0 | 2.0 | R | 0.5 | S− |
| 5 | REBA-450 + TMC | 8.0 | 4.0 | 0.0 | 0.0 | 5.0 | 2.0 | R | 0.5 | N+ |

Example 9. Assessment of Disclosed Taste Modulator Compositions in Commercial Beverage Samples Example 9.1

The study assessed sensory characteristics of a commercial REBM sweetened zero-calorie cola (REBMZCC), alone and with two disclosed taste modulator compositions, relative to the sensory characteristics of a commercial HFCS-55 sweetened full-calorie cola (HFCSFCC), a commercial Sucrose/REBA sweetened 30% calorie-reduced cola (SUCREBA30RCC) and a commercial Aspartame/Acesulfame-K sweetened zero-calorie cola (APMACEZCC). The beverages were purchased in retail stores and two taste modulator compositions were used to modify the REBMZCC beverage by addition into the beverage. Details of the preparation of the test samples are further described in Table 45 below.

TABLE 45

| Sample No. | Sample Description* | Composition |
|---|---|---|
| 1 | REBMZCC | REBMZCC: 250 mL can. |
| 2 | HFCSFCC | HFCSFCC: 222 mL (7.5 oz.) can. |
| 3 | SUCREBA30RCC | SUCREBA30RCC: 222 mL (7.5 oz.) can. |
| 4 | APMACEZCC | APMACEZCC: 355 mL (12 oz.) can. |
| 5 | REBMZCC + TMC 1 | REBMZCC with addition of KCl, 895 mg/L (12.0 mM); $MgCl_2 \cdot 6H_2O$, 702 mg/L (3.4 mM); and $CaCl_2$, 720 mg/L (6.4 mM). |
| 6 | REBMZCC + TMC 2 | REBMZCC with addition of KCl, 1790 mg/L (24.0 mM); $MgCl_2 \cdot 6H_2O$, 1404 mg/L (6.8 mM); and $CaCl_2$, 1440 mg/L (12.8 mM). |

*"TMC 1" indicates the composition contains a first disclosed taste modulator composition at the indicated concentration of components; and "TMC 2" indicates the composition contains a second disclosed taste modulator composition at the indicated concentration of components.

The sensory protocol was as described above for Example 8. The average data of replicate trials from Example 9.1 are shown below in Table 46. The data show that the REBM sweetened REBMZCC has negligible Body/Mouthfeel and strong Sweetness Linger. However, addition of disclosed taste modulator compositions provides a concentration-dependent reduction in REBM Sweetness Linger and dramatic increase in Body/Mouthfeel. There was observed a weak salty off taste at the higher concentration $KCl/MgCl_2/CaCl_2$ disclosed taste modulator composition used in this example. Use of a reduced-chloride concentration taste modulator composition (e.g., $KCl/Mg_3(Citrate)_2/Ca_3(Citrate)_2$ or $KCl/MgSO_4/Ca_3(Citrate)_2$) is expected to deliver the desired MF increase and SL reduction without salty off taste.

TABLE 46

| Sample No. | Sample Description | SI | SoI | SaI | BI | MF | AI | AT* | SL | SD** |
|---|---|---|---|---|---|---|---|---|---|---|
| 1 | REBMZCC | 9.7 | 2.7 | 0.0 | 0.0 | 0.0 | 1.7 | D | 5.0 | S |
| 2 | HFCSFCC | 9.3 | 2.7 | 0.0 | 0.0 | 0.7 | 2.0 | R+ | 1.3 | N |
| 3 | SUCREBA30RCC | 10.0 | 2.7 | 0.0 | 0.0 | 2.3 | 2.0 | R | 0.3 | N |
| 4 | APMACEZCC | 10.0 | 2.7 | 0.0 | 0.0 | 1.7 | 1.7 | R+ | 1.3 | N |
| 5 | REBMZCC + TMC 1 | 10.0 | 2.0 | 0.0 | 0.0 | 4.0 | 2.0 | SD− | 4.3 | S |
| 6 | REBMZCC + TMC 2 | 10.0 | 2.0 | 1.3 | 0.0 | 6.3 | 2.0 | D− | 2.0 | N+ |

*R+: Delayed Sweetness AT in ⅓ of ratings; SD⁻: Significantly Delayed Sweetness AT in 2/3 of ratings; D⁻: Delayed Sweetness AT in ca. ⅔ of ratings.
**N+: Slight Sweetness Desensitization in ⅓ of ratings.

Example 9.2

The study assessed sensory characteristics of REBA sweetened lemonade, alone and with two disclosed taste modulator compositions, relative to the sensory characteristics of sucrose, REBA, REBM and Aspartame controls in lemonade. The lemonade stock solution was prepared as follows: commercial lemon juice (ReaLemon® 100% Lemon Juice) was diluted to 11.8% (v/v) with distilled water (which is based upon a publicly available lemonade recipe called "Old Fashioned Lemonade" recipe and available at the website of Allrecipes). Details of the preparation of the test samples in Table 47 in which the indicated sweeteners and taste modulator compositions were added.

TABLE 47

| Sample No. | Sample Description* | Composition** |
|---|---|---|
| 1 | Sucrose control | 10.0 wt % sucrose in lemonade stock solution; pH = 2.71 after addition of sucrose. |
| 2 | REBA control | 500 mg/L REBA in lemonade stock solution; pH = 2.72 after addition of REBA. |
| 3 | REBM control | 500 mg/L REBM in lemonade stock solution; pH = 2.72 after addition of REBM. |
| 4 | APM control | 520 mg/L APM in lemonade stock solution; pH = 2.75 after addition of APM. |
| 5 | REBA + TMC 1 | 500 mg/L REBA; KCl, 895 mg/L (12.0 mM); $MgCl_2 \cdot 6H_2O$, 702 mg/L (3.4 mM); and $CaCl_2$, 720 mg/L (6.4 mM); in lemonade stock solution; pH = 2.65 after addition of all components. |
| 6 | REBA + TMC 2 | 500 mg/L REBA; KCl, 1790 mg/L (24.0 mM); $MgCl_2 \cdot 6H_2O$, 1404 mg/L (6.8 mM); and $CaCl_2$, 1440 mg/L (12.8 mM); in lemonade stock solution; pH = 2.65 after addition of all components. |

*"TMC 1" indicates the composition contains a first disclosed taste modulator composition at the indicated concentration of components; "TMC 2" indicates the composition contains a second disclosed taste modulator composition at the indicated concentration of components; "APM" indicates aspartame; "REBA" indicates Rebaudioside A; and "REBM" indicates Rebaudioside M.
**Lemonade stock solution is prepared as described above.

The sensory protocol was as described above for Example 8. The average data of replicate trials from Example 9.2 are shown below in Table 48. The data show that utilization of disclosed taste modulator compositions with REBA provided a significant increase in Body/Mouthfeel and reduction in Sweetness Linger relative to the REBA Control. There was noted a weak salty off taste in these formulations. Without wishing to be bound by a particular theory, it is believed that the low pH (high acidity) of the lemon juice system can suppress the Sweetness Linger results for the REBA, REBM and APM Controls relative to expectation.

TABLE 48

| Sample No. | Sample Description | SI | SoI | SaI | BI | MF | AI | AT* | SL | SD** |
|---|---|---|---|---|---|---|---|---|---|---|
| 1 | Sucrose control | 10.0 | 4.0 | 0.0 | 0.0 | 3.0 | 3.0 | R | 0.0 | N |
| 2 | REBA control | 9.7 | 4.3 | 0.0 | 0.0 | 1.5 | 3.0 | R+ | 3.7 | N+ |
| 3 | REBM control | 10.0 | 4.3 | 0.0 | 0.0 | 2.0 | 3.0 | R+ | 2.0 | N |
| 4 | APM control | 10.0 | 4.0 | 0.0 | 0.0 | 1.5 | 3.0 | R | 1.5 | N+ |
| 5 | REBA + TMC 1 | 9.3 | 4.0 | 0.7 | 0.0 | 5.0 | 2.7 | R+ | 1.5 | N |
| 6 | REBA + TMC 2 | 9.0 | 4.3 | 1.0 | 0.0 | 5.5 | 3.0 | R+ | 1.0 | N+ |

*R+: Delayed Sweetness AT in ⅓ of ratings; and
**N+: Slight Sweetness Desensitization in ⅓ of ratings.

Example 9.3

The study assessed sensory characteristics of a commercial 50% Calorie-Reduced White Peach Flavored Sparkling Lemonade (WP50RCL) with sucrose and *Stevia* leaf extract as the sweetener system, alone and with two disclosed taste modulator compositions. The description of the sweetening system is based upon the label description of retail product can. The label indicated a sweetener system of sucrose (16 g/355 mL, which is equivalent to 4.5% w/v) and "Purified *Stevia* Leaf Extract." The WP50RCL beverage was modified by addition a disclosed taste modulator composition as detailed in Table 49 below.

TABLE 49

| Sample No. | Sample Description* | Composition |
|---|---|---|
| 1 | WP50RCL | WP50RCL without modification. |
| 2 | WP50RCL + TMC 1 | WP50RCL with addition of solid KCl, $MgCl_2 \cdot 6H_2O$, and $CaCl_2$ to a concentration of 2.5 mM, 2.5 mM, and 2.5 mM, respectively. |
| 3 | WP50RCL + TMC 2 | WP50RCL with addition of solid KCl, $MgCl_2 \cdot 6H_2O$, and $CaCl_2$ to a concentration of 5.0 mM, 5.0 mM, and 5.0 mM, respectively. |

*"TMC 1" indicates the composition contains a first disclosed taste modulator composition at the indicated concentration of components; and "TMC 2" indicates the composition contains a second disclosed taste modulator composition at the indicated concentration of components.

The sensory protocol was as described above for Example 8. The average data of replicate trials from Example 9.3 are shown below in Table 50. The data show that the disclosed taste modulator compositions provided a concentration-dependent increase in Body/Mouthfeel of the sucrose/*Stevia* sweetened WP50RCL beverage. Moreover, the samples having the disclosed taste modulator compositions were observed to be associated with an exceptionally sugar-like character.

TABLE 50

| Sample No. | Sample Description | SI | SoI | SaI | BI | MF | AI | AT* | SL | SD** |
|---|---|---|---|---|---|---|---|---|---|---|
| 1 | WP50RCL | 10.0 | 4.0 | 0.0 | 0.0 | 2.5 | 2.2 | R | 0.0 | N+ |
| 2 | WP50RCL + TMC 1 | 10.0 | 4.0 | 0.0 | 0.0 | 5.2 | 2.2 | R | 0.0 | N+ |
| 3 | WP50RCL + TMC 2 | 10.0 | 4.0 | 0.2 | 0.0 | 6.0 | 2.2 | R | 0.0 | N+ |

Example 9.4

The study assessed sensory characteristics of a commercial 50% calorie-reduced orange juice (OJ50RCL), alone and with two disclosed taste modulator compositions. The retail available beverage bottle stated the beverage to be 50% Less Sugar & Calories than Orange Juice and to be with "Some Pulp". The label indicated sweetness of the calorie-reduced juice is provided by "Purified *Stevia* Leaf Extract." The OJ50RCL was modified by addition a disclosed taste modulator composition as detailed in Table 51 below.

TABLE 51

| Sample No. | Sample Description* | Composition |
|---|---|---|
| 1 | OJ50RCL | OJ50RCL without modification. |
| 2 | OJ50RCL + TMC 1 | OJ50RCL with addition of solid KCl, $MgCl_2 \cdot 6H_2O$, and $CaCl_2$ to a concentration of 2.5 mM, 2.5 mM, and 2.5 mM, respectively. |
| 3 | OJ50RCL + TMC 2 | OJ50RCL with addition of solid KCl, $MgCl_2 \cdot 6H_2O$, and $CaCl_2$ to a concentration of 5.0 mM, 5.0 mM, and 5.0 mM, respectively. |

*"TMC 1" indicates the composition contains a first disclosed taste modulator composition at the indicated concentration of components; and "TMC 2" indicates the composition contains a second disclosed taste modulator composition at the indicated concentration of components.

The sensory protocol was as described above for Example 8. The average data of replicate trials from Example 9.4 are shown below in Table 52. The data show that the disclosed taste modulator compositions provided a concentration-dependent increase in Body/Mouthfeel of the sucrose/*Stevia* sweetened OJ50RCL. Moreover, the samples having the disclosed taste modulator compositions were observed to be associated with an exceptionally sugar-like character.

TABLE 52

| Sample No. | Sample Description | SI | SoI | SaI | BI | MF | AI | AT* | SL | SD** |
|---|---|---|---|---|---|---|---|---|---|---|
| 1 | OJ50RCL | 10.0 | 4.5 | 0.0 | 0.0 | 3.0 | 3.0 | R | 0.0 | N |
| 2 | OJ50RCL + TMC 1 | 10.0 | 4.0 | 0.0 | 0.0 | 6.0 | 3.5 | R | 0.0 | N |
| 3 | OJ50RCL + TMC 2 | 10.0 | 4.5 | 0.0 | 0.0 | 6.5 | 3.0 | R | 0.0 | N |

TABLE 53

| Sample No. | Sample Description* | Composition |
|---|---|---|
| 1 | CHFCSFCL | CHFCSFCL without modification; pH of unmodified beverage was 3.38 (100 mL). |
| 2 | CHFCSFCL + TMC 1 | CHFCSFCL with addition of solid KCl, $Mg_3(Citrate)_2 \cdot 9H_2O$, and $Ca_3(Citrate)_2 \cdot 4H_2O$ to a concentration of 10.0 mM, 1.0 mM, and 1.0 mM, respectively; pH of modified beverage was 4.06 (100 mL). |
| 3 | CHFCSFCL + TMC 2 | CHFCSFCL with addition of solid KCl, $Mg_3(Citrate)_2 \cdot 9H_2O$, and $Ca_3(Citrate)_2 \cdot 4H_2O$ to a concentration of 5.0 mM, 1.0 mM, and 1.0 mM, respectively, and 156 mg (0.74 mmol) citric acid monohydrate; and pH of modified beverage was 3.44 (100 mL). |

*"TMC 1" indicates the composition contains a first disclosed taste modulator composition at the indicated concentration of components; and "TMC 2" indicates the composition contains a second disclosed taste modulator composition at the indicated concentration of components.

The sensory protocol was as described above for Example 8. The average data of replicate trials from Example 9.5 are shown below in Table 54. The data show that the disclosed taste modulator compositions provided a concentration-dependent increase in Body/Mouthfeel of CHFCSFCL beverage. Moreover, the taste of the modified beverage with pH matched (i.e., Sample No. 2) to the commercial CHFCSFCL product was observed to be associated with an exceptionally sugar-like in character.

TABLE 54

| Sample No. | Sample Description | SI | SoI | SaI | BI | MF | AI | AT* | SL | SD** |
|---|---|---|---|---|---|---|---|---|---|---|
| 1 | CHFCSFCL | 10.0 | 4.0 | 0.0 | 0.0 | 3.0 | 2.2 | R | 0.0 | N+ |
| 2 | CHFCSFCL + TMC 1 | 10.0 | 4.0 | 0.0 | 0.0 | 4.6 | 2.2 | R | 0.2 | N+ |
| 3 | CHFCSFCL + TMC 2 | 10.0 | 4.0 | 0.0 | 0.0 | 5.6 | 2.2 | R | 0.0 | N+ |

Example 9.5

The study assessed sensory characteristics of a commercial citrus-flavored HFCS-55 sweetened full-calorie carbonated beverage (CHFCSFCL), alone and with two disclosed taste modulator compositions. The retail available beverage can indicated a sweetener system of High Fructose Corn Syrup (65 g/500 mL). The CHFCSFCL beverage was modified by addition a disclosed taste modulator composition as detailed in Table 53 below.

Example 9.6

The study assessed sensory characteristics of a commercial zero-calorie aspartame-sweetened cola beverage (APMZCC), alone and with four disclosed taste modulator compositions at different pH and comprising either KCl/$Mg_3(Citrate)_2$/$Ca_3(Citrate)_2$ and KCl/$MgSO_4$/$Ca_3(Citrate)_2$. Briefly, four commercial 500 mL PET bottles of APMZCC, indicated on the label as being sweetened with Aspartame, were frozen in an upright position. The bottles were then un-capped and a disclosed taste modulator composition comprising KCl/$Mg_3(Citrate)_2$/$Ca_3(Citrate)_2$ or KCl/$MgSO_4$/$Ca_3(Citrate)_2$ was added (i.e., weighed solid amounts of each component) to the tops of the frozen bottles in the amounts indicated below in Table 55. The bottles were then re-capped and allowed to thaw. After thawing, 85% $H_3PO_4$ was added to 2 of the 4 bottles as indicated below in Table 55.

TABLE 55

| Sample No. | Sample Description* | Composition |
|---|---|---|
| 1 | APMZCC | APMZCC without modification; pH of unmodified beverage was 3.21. |
| 2 | APMZCC + TMC 1 | APMZCC with addition of solid KCl, $Mg_3(Citrate)_2 \cdot 9H_2O$, and $Ca_3(Citrate)_2 \cdot 4H_2O$ to a concentration of 10.0 mM, 1.0 mM, and 1.0 mM, respectively; pH of modified beverage was 4.42. |
| 3 | APMZCC + TMC 2 | APMZCC with addition of solid KCl, $Mg_3(Citrate)_2 \cdot 9H_2O$, and $Ca_3(Citrate)_2 \cdot 4H_2O$ to a concentration of 10.0 mM, 1.0 mM, and 1.0 mM, respectively; pH of modified beverage was 3.52 following acidification with $H_3PO_4$. |
| 4 | DC + TMC 3 | APMZCC with addition of solid KCl, $MgSO_4 \cdot 7H_2O$, and $Ca_3(Citrate)_2 \cdot 4H_2O$ to a concentration of 10.0 mM, 3.0 mM, and 1.0 mM, respectively; pH of modified beverage was 4.05. |
| 5 | DC + TMC 4 | APMZCC with addition of solid KCl, $MgSO_4 \cdot 7H_2O$, and $Ca_3(Citrate)_2 \cdot 4H_2O$ to a concentration of 10.0 mM, 3.0 mM, and 1.0 mM, respectively; pH of modified beverage was 3.41 following acidification with $H_3PO_4$. |

*"TMC 1," "TMC 3," "TMC 3," and "TMC 4" each indicate a composition containing the indicated components at the specified concentration to the right in the table; and "APMZCC" indicates a commercial aspartame-sweetened zero-calorie cola.

The sensory protocol was as described above for Example 8. The average data of replicate trials from Example 9.6 are shown below in Table 56. The data show that each of the disclosed taste modulator compositions tested (i.e., either the $KCl/Mg_3(Citrate)_2/Ca_3(Citrate)_2$ or $KCl/MgSO_4/Ca_3(Citrate)_2$ compositions) when used to modify APMZCC beverages, the resulting formulations all show marked increases in Body/Mouthfeel and significant reductions in Sweetness Linger relative to the Control APMZCC beverage. In addition, it was observed that each of the disclosed taste modulator compositions tested (i.e., either the $KCl/Mg_3(Citrate)_2/Ca_3(Citrate)_2$ and $KCl/MgSO_4/Ca_3(Citrate)_2$ compositions) when used to modify a APMZCC beverages was associated with an increase in pH relative to the APMZCC control and, as a consequence, are significantly reduced in sourness relative to the APMZCC control. However, when the pH of the APMZCC beverage modified with a disclosed taste modulator composition was adjusted with $H_3PO_4$ to a pH similar to the unmodified APMZCC, the modified beverage exhibited sourness similar to that of the APMZCC control. It was observed that each of the disclosed taste modulator compositions tested was effective in modifying the APMZCC to be more sugar-like. Finally, it was observed that the taste modulator composition comprising $KCl/MgSO_4/Ca_3(Citrate)_2$ promoted equivalent taste quality improvement to the taste modulator composition comprising $KCl/Mg_3(Citrate)_2/Ca_3(Citrate)_2$, but with a lower elevation of pH.

TABLE 56

| Sample No. | Sample Description | SI | SoI | SaI | BI | MF | AI | AT* | SL | SD** |
|---|---|---|---|---|---|---|---|---|---|---|
| 1 | APMZCC | 10.0 | 2.3 | 0.0 | 0.0 | 0.0 | 1.0 | R | 2.7 | N |
| 2 | APMZCC + TMC 1 | 10.0 | 1.0 | 0.0 | 0.0 | 4.0 | 1.0 | R | 1.0 | N |
| 3 | APMZCC + TMC 2 | 10.0 | 2.3 | 0.0 | 0.0 | 4.0 | 1.0 | R | 1.0 | N |
| 4 | APMZCC + TMC 3 | 10.0 | 1.7 | 0.0 | 0.0 | 4.0 | 1.7 | R | 0.3 | N |
| 5 | APMZCC + TMC 4 | 10.0 | 2.3 | 0.0 | 0.0 | 4.0 | 1.3 | R | 1.0 | N |

Example 10. Testing of a Representative Disclosed Taste Modulation Formulation: Effect of Binary Combinations of $K^+$, $Mg^{2+}$ and $Ca^{2+}$ Mineral Salts on Modulating REBA Taste Example 10.1

This study assessed the effect of binary combinations of $Na^+$, $K^+$, $Mg^{2+}$ and $Ca^{2+}$ (from NaCl, KCl, $MgCl_2$, and $CaCl_2$ salts) in a disclosed Taste Modulator Composition the on the sensory parameters assessed as described in Example 1 above using REBA in a Potassium Citric Acid Buffer (CAB-K). In this study all salts were at 12.5 mM. Briefly, a CAB-K/Sucrose sample was prepared by addition of 60 mg $K_3Citrate.H_2O$, 300 mg Citric Acid.$H_2O$ and 20 g sucrose to 200 mL water in a 250 mL plastic-capped glass bottle and the resultant composition swirled until complete dissolution. The pH was 3.14 as measured using a pH meter (freshly calibrated using a pH 4.00 standard). A stock solution of CAB-K/REBA was prepared by addition of 300 mg $K_3Citrate.H_2O$, 1500 mg Citric Acid.$H_2O$ and 500 mg REBA to 1.00 L water in a 1 L flask and stirring to full dissolution. The pH was 3.17 as determined using a pH meter (freshly calibrated using a pH 4.00 standard). Portions (200 mL) of the REBA/CAB-K solution were then transferred to each of four 250 mL plastic-capped glass bottles and sample completion was carried out by addition of the Taste Modulator Composition components as follows: (1) 10% Sucrose Control at pH 3.14; (2) 500 ppm REBA (pH 3.17); (3) 500 ppm REBA with 12.5 mM NaCl (146 mg/200 mL) and 12.5 mM KCl (186 mg/200 mL) at pH 3.17 (indicated as "REBA/Na/K" in Table 57); (4) 500 ppm REBA Control (pH 3.17) with addition 12.5 mM NaCl (146 mg/200 mL) and 12.5 mM $MgCl_2.6H_2O$ (508 mg/200 mL), pH after addition of NaCl and $MgCl_2$ was pH 2.97 (indicated as "REBA/Na/Mg" in Table 57); and (5) 500 ppm REBA Control (pH 3.17) with addition of 12.5 mM NaCl (146 mg/200 mL) and 12.5 mM $CaCl_2$ (277 mg/200 mL), pH after addition of NaCl and $CaCl_2$ was pH 3.12 (indicated as "REBA/Na/Ca" in Table 57). Data obtained in this Example are shown below in Table 57.

TABLE 57

| Sample No. | Sample Description | SI | SoI | SaI | BI | MF | AI | AT | SL | SD |
|---|---|---|---|---|---|---|---|---|---|---|
| 1 | Sucrose Control | 10.0 | 2.0 | 0.0 | 0.0 | 3.0 | 2.0 | 0.0 | 0.0 | 0.0 |
| 2 | REBA Control | 8.7 | 2.3 | 0.0 | 0.0 | 0.0 | 1.7 | 2.5 | 5.0 | 2.5 |
| 3 | REBA/Na/K | 9.7 | 2.0 | 0.0 | 0.0 | 3.0 | 1.7 | 2.5 | 3.0 | 1.7 |
| 4 | REBA/Na/Mg | 10.7 | 1.0 | 0.7 | 0.0 | 4.3 | 1.0 | 0.0 | 1.3 | 0.0 |
| 5 | REBA/Na/Ca | 10.0 | 1.7 | 0.5 | 0.0 | 3.0 | 2.3 | 1.7 | 2.3 | 0.8 |

The data show that each of the binary combinations of Na$^+$, K$^+$, Mg$^{2+}$ and Ca$^{2+}$ in a disclosed Taste Modulator Composition enhanced the SI of the REBA formulations, increased MF to approximately equivalent to that of 10% sucrose and reduced both the SL and SD of REBA, albeit with introduction of weak salty off taste, when employed at the Taste Modulator Composition concentrations utilized in this Example.

Example 10.2

This study assessed the effect of binary combinations of Na$^+$, K$^+$, Mg$^{2+}$ and Ca$^{2+}$ (from NaCl, KCl, MgCl$_2$, and CaCl$_2$ salts) in a disclosed Taste Modulator Composition on the sensory parameters assessed as described in Example 1 above using REBA in a Potassium Citric Acid Buffer (CAB-K). In this study all salts were at 12.5 mM. Briefly, a CAB-K/Sucrose sample was prepared by addition of 60 mg K$_3$Citrate.H$_2$O, 300 mg Citric Acid.H$_2$O and 20 g sucrose to 200 mL water in a 250 mL plastic-capped glass bottle and the resultant composition swirled until complete dissolution. The pH was 3.14 as measured using a pH meter (freshly calibrated using a pH 4.00 standard). A stock solution of CAB-K/REBA was prepared by addition of 300 mg K$_3$Citrate.H$_2$O, 1500 mg Citric Acid.H$_2$O and 500 mg REBA to 1.00 L water in a 1 L flask and stirring to full dissolution. The pH was 3.17 as determined using a pH meter (freshly calibrated using a pH 4.00 standard). Portions (200 mL) of the REBA/CAB-K solution were then transferred to each of four 250 mL plastic-capped glass bottles and sample completion was carried out by addition of the Taste Modulator Composition components as follows: (1) 10% Sucrose Control at pH 3.14; (2) 500 ppm REBA Control (pH 3.17); (3) 500 ppm REBA Control (pH 3.17) with addition of 12.5 mM KCl (186 mg/200 mL) and 12.5 mM MgCl$_2$.6H$_2$O (508 mg/200 mL), pH after addition of KCl and MgCl$_2$ was pH 2.97 (indicated as "REBA/K/Mg" in Table 58); (4) 500 ppm REBA Control (pH 3.17) with addition of 12.5 mM KCl (186 mg/200 mL) and 12.5 mM CaCl$_2$ (277 mg/200 mL), pH after addition of KCl and CaCl$_2$ was pH 2.91 (indicated as "REBA/K/Ca" in Table 58); and (5) 500 ppm REBA Control (pH 3.17) with addition of 12.5 mM MgCl$_2$.6H$_2$O (508 mg/200 mL) and 12.5 mM CaCl$_2$ (277 mg/200 mL), pH after addition of MgCl$_2$ and CaCl$_2$ was pH 3.02 (indicated as "REBA/Mg/Ca" in Table 58). Data obtained in this Example are shown below in Table 58.

TABLE 58

| Sample No. | Sample Description | SI | SoI | SaI | BI | MF | AI | AT | SL | SD |
|---|---|---|---|---|---|---|---|---|---|---|
| 1 | Sucrose Control | 10.0 | 2.0 | 0.0 | 0.0 | 3.0 | 2.0 | 0.0 | 0.0 | 0.0 |
| 2 | REBA Control | 8.7 | 2.0 | 0.0 | 0.0 | 0.0 | 2.0 | 2.5 | 5.0 | 3.3 |
| 3 | REBA/K/Mg | 10.3 | 1.7 | 0.7 | 0.0 | 4.3 | 1.7 | 2.5 | 2.3 | 0.8 |
| 4 | REBA/K/Ca | 9.7 | 2.0 | 0.3 | 0.0 | 3.7 | 1.3 | 2.5 | 1.7 | 0.0 |
| 5 | REBA/Mg/Ca | 10.0 | 1.7 | 0.7 | 0.0 | 4.0 | 1.3 | 1.7 | 1.7 | 0.8 |

The data show that each of the binary combinations of K$^+$, Mg$^{2+}$ and Ca$^{2+}$ in a disclosed Taste Modulator Composition enhanced the SI of the REBA formulations, increased MF to approximately equal to or exceeding that of 10% sucrose and reduced both the SL and SD of REBA, albeit with introduction of weak salty off taste, when employed at the Taste Modulator Composition concentrations in this Example.

Example 11. Prospective Testing of a Representative Disclosed Formulation Comprising Mixtures of Salts Versus Control Formulations Further assessment of disclosed sweetener compositions will be carried out using the testing methodology described herein above. Prospective formulations that can be tested in 14 studies (Study 11.1-11.14) are provided in Table 59. The formulations shown in Table 59 are representative formulations using a citric acid buffer system, comprising: Citric acid (H$_3$C$_6$H$_5$O$_7$.H$_2$O) 1.50 g/L (7.81 mM); and trisodium citrate (Na$_3$(C$_6$H$_5$O$_7$).2H$_2$O) 0.300 g/L (1.01 mM), which typically provides a pH of about 3.2. The formulations are designed so that 1.00 mEq/L of citrate salt is present (i.e., sum of mEq of Na, K, Mg and Ca Salts) in combination with 1.50 g/L citric acid. The formulations are designed to have 0, 10, 20 and 30 mmol of total cation present. The 0 mM cation formulation (the first row in each study group) comprises a sweetening agent. For example, the formulations given in Table 57 can be tested with a sweetening agent such as REBA (500 mg/L) or with a mixture of REBA (350 mg/L) and GSG (175 mg/L). The formulation, as tested can further comprise a flavoring such as the lemon-lime flavoring (see Table 14 above and the materials described herein above). The prospective studies can be carried out using further control formulations, such as the sucrose and REBD as given in Table 14 above.

The formulations described herein Table 59 can be further modified in which a phosphoric acid buffer is substituted for the citric acid buffer system, i.e., a mixture of phosphoric acid and substitution of conjugate base forms of citric acid shown with the monohydrogen or dihydrogen forms of phosphoric acid with the cation as Na$^+$, K$^+$, Mg$^{2+}$, or Ca$^{2+}$.

Example 12. Prospective Use of Disclosed Taste Modulator Compositions with Sweeteners, Natural Sweetener Extracts and Sweetness Enhancers Approved for Use as Natural and Artificial Flavors The disclosed taste modulator compositions can be utilized with one or more flavor substances, including a flavor substance that comprises one or more sweetener, natural sweetener extract and sweetness enhancer approved for use as natural and artificial flavors as given in Table 60 below. For example, a disclosed taste modulator composition can be used at a concentration as disclosed herein above with the concentration of sweeteners, natural sweetener extracts and sweetness enhancers given in Table 60. In a particular aspect, a disclosed taste modulator composition is used with one or more sweetness enhancer (i.e., a compound or substance that can potentiate the sweetness intensity of CHO sweeteners) such as FEMA GRAS Nos. 2528, 2628, 2629, 2630, 3732, 3798, 3811, 3985, 4223, 4390, 4495, 4601, 4674, 4701, 4711, 4720, and 4728. In a further particular aspect, a disclosed taste modulator composition is used with one or more sweetness enhancer (i.e., a compound or substance that can potentiate the sweetness intensities of CHO sweeteners) such as FEMA GRAS Nos. 4601, 4711, 4720, and 4728.

TABLE 60

| No. | FEMA GRAS No. | Compound Name | Other Names | Max Use Level (mg/L) | Estimated Sweetness Intensity* |
|---|---|---|---|---|---|
| 1 | 2286 | Cinnamaldehyde | | 9.0 | ? |
| 2 | 2419 | Ethyl Alcohol | Ethanol | 1700 | ~0.1 |
| 3 | 2525 | Glycerol | Glycerine | 570 | <0.1 |
| 4 | 2528 | Glycyrrhizin, Ammoniated | Mono-ammonium glycyrrhizinate, MAG | 51 | 1.4 |
| 5 | 2628 | Licorice Extract | | 33 | ? |
| 6 | 2629 | Licorice Extract Powder | | 110 | ? |
| 7 | 2630 | Licorice Root | | 130 | ? |
| 8 | 2940 | Propylene Glycol | | 690 | <0.1 |
| 9 | 2997 | Saccharin, Sodium Salt | | 72 | 3.3 |
| 10 | 3029 | D-Sorbitol | | 1300 | <0.1 |
| 11 | 3255 | L-Arabinose | | 450 | <0.1 |
| 12 | 3287 | Glycine | | 100 | <0.1 (1000) |
| 13 | 3606 | D-Xylose | | — | — |
| 14 | 3730 | L-Rhamnose | | 500 | <0.1 |
| 15 | 3732 | Thaumatin | Talin | 5 and 25 | 8.8 (25) |
| 16 | 3793 | D-Ribose | | — | — |
| 17 | 3798 | 2,4-Dihydroxy-Benzoic Acid | | 500 | 0 |
| 18 | 3811 | Neohesperidin Dihydrochalcone | | 4.0, 10.0 and 15 | 2.2 (15) |
| 19 | 3814 | Thaumatin, B-Recombinant | | 10 | 7.4 |
| 20 | 3618 | L-Alanine and DL-Alanine | | 500 | <0.1 |
| 21 | 3985 | 2-Hydroxy-Benzoic Acid | Salicylic Acid | 50 | 0 |
| 22 | 4028 | β-Cyclodextrin | | 3000 | 2.1 |
| 23 | 4223 | Betaine | | 5000 | ? |
| 24 | 4245 | Trimethylamine Oxide | TMAO | — | — |
| 25 | 4390 | 3-(4-Hydroxy-phenyl)-1-(2,4,6-Trihydroxyphenyl)-Propan-1-One | Phloretin and Naringenin Dihydro-chalcone | 300 | ? |
| 26 | 4495 | Naringin Dihydrochalcone | | 60 | ? |
| 27 | 4500 | Choline Chloride | | — | — |
| 28 | 4600 | Trehalose, Dihydrate | | 35,000 | 0.5 |
| 29 | 4601 | Rebaudioside A | | 30 | 1.1 |
| 30 | 4669 | 4-Amino-5,6-Dimethylthieno-[2,3-D]-Pyrimidin-2(1H)-One | S-2383 SucralGEM ™ | 15 | 0 |
| 31 | 4674 | Trilobatin | Prunin Dihydro-chalcone | 100 | 0 |
| 32 | 4678 | N-(2-Methylcyclo-hexyl)-2,3,4,5,6-Pentafluoro-Benzamide | | 5 | ? |
| 33 | 4701 | 3-[(4-Amino-2,2-Dioxido-1H-2,1,3-Benzothiadiazin-5-yl)-oxy]-2,2-Dimethyl-N-Propylpropanamide | S-6973 SucroGEM ™ | — | 0 |
| 34 | 4708 | 3',2-Dihydroxy-4'-Methoxy-Flavan | | 500 | ? |
| 35 | 4711 | Luo Han Fruit Concentrate | Luo Han Guo Fruit Concentrate/ Monk Fruit Concentrate | 60 | ~1-2 |

TABLE 60-continued

| No. | FEMA GRAS No. | Compound Name | Other Names | Max Use Level (mg/L) | Estimated Sweetness Intensity* |
|---|---|---|---|---|---|
| 36 | 4716 | N-[N-[3-(3-Hydroxy-4-Methoxyphenyl)-propyl)-L-Alpha-Aspartyl)-L-Phenylalanine-1-Methyl Ester, Monohydrate | Advantame | 2 | 3.0 |
| 37 | 4720 | Rebaudioside C | REBC | 250 | 1.2 |
| 38 | 4721 | 1-(2-Hydroxy-phenyl)-3-(Pyridin-4-yl)-Propan-1-One | | 35 | ? |
| 39 | 4753 | 1,3-Propylene Glycol | | 690 | <0.1 |
| 40 | 4728 | Glycosylated Steviol Glycoside | NSF-02 | 175 | ~6-7 |

*That is, sucrose equivalent at the indicated "Max Use Level".

Example 13. Prospective Tabletop Sweetener Compositions

The present disclosure pertains to tabletop sweetener compositions comprising one or more sweetening agents as disclosed herein above with a disclosed taste modulator composition. Exemplary, but non-limiting, compositions for representative disclosed table-top sweetener compositions are provided herein for the amounts per packet to provide equivalent level of sweetness to one-teaspoon of sucrose. Table 61 provides exemplary packet components except for the taste modulator composition, which can be provided in amounts as described in Table 62 below. Other bulking agents can be used as described herein above.

TABLE 61

| No. | Sugar Equivalent per Packet | Sweetener (Amount/Packet) | Bulking Agent (Amount/Packet) | Other Ingredients & Amounts |
|---|---|---|---|---|
| 1 | 1 | Sodium saccharin (36 mg/1 g packet) | Dextrose (1 g/packet) | Cream of Tartar and Calcium Silicate |
| 2 | 1 | Aspartame (37 mg/1 g packet) | Dextrose with maltodextrin (1 g/packet) | None |
| 3 | 1 | Sucralose (12 mg/1 g packet) | Dextrose with maltodextrin (1 g/packet) | None |
| 4 | 1 | Rebaudioside A (20 mg/2 g packet) | Erythritol (2 g/2 g packet) | Natural Flavors |
| 5 | 1 | Sucrose (4.2 g/packet) | None | None |

* Size of packet is such that one packet provides the equivalent sweetness of a one teaspoon sugar (4.2 g) per packet; exemplary relative amounts of disclosed taste modulator compositions can be as provided in Table 62 below.

Further exemplary tabletop sweetener compositions with prospective amounts of disclosed taste modulator compositions are provided in Table 62 below. It is believed that the exemplary, but non-limiting, tabletop sweetener compositions disclosed in this example provide equivalent or better taste properties than can be manufactured by conventional methods using approximately similar levels of the sodium saccharin, aspartame, sucralose, rebaudioside A and sucrose sweeteners. In the formulations shown in Table 62, the bulking agent for any given formulation can be dextrose (0.5-1 g per packet); dextrose with maltodextrin (dextrose to maltodextrin, weight ratio of 1:10 to 10:1; with amount of the dextrose with maltodextrin per packet as 0.5-1 g); or erythritol (1-2 g per packet). Other bulking agents can be used as described herein above.

TABLE 62

| Sweetener | Na or K Salt | Mg Salt | Ca Salt |
|---|---|---|---|
| Sodium saccharin (42 mg) | NaCl (35 mg) | MgCl$_2$ (17 mg) | CaCl$_2$ (20 mg) |
| | KCl (45 mg) | MgCl$_2$ (17 mg) | CaCl$_2$ (20 mg) |
| | KCl (45 mg) | MgSO$_4$ (22 mg) | CaCl$_2$ (20 mg) |
| | KCl (45 mg) | MgSO$_4$ (22 mg) | Ca$_3$(Citrate)$_2$ (30 mg) |
| | KCl (45 mg) | Mg$_3$(Citrate)$_2$ (27 mg) | Ca$_3$(Citrate)$_2$ (30 mg) |
| Aspartame (43 mg) | NaCl (35 mg) | MgCl$_2$ (17 mg) | CaCl$_2$ (20 mg) |
| | KCl (45 mg) | MgCl$_2$ (17 mg) | CaCl$_2$ (20 mg) |
| | KCl (45 mg) | MgSO$_4$ (22 mg) | CaCl$_2$ (20 mg) |
| | KCl (45 mg) | MgSO$_4$ (22 mg) | Ca$_3$(Citrate)$_2$ (30 mg) |
| | KCl (45 mg) | Mg$_3$(Citrate)$_2$ (27 mg) | Ca$_3$(Citrate)$_2$ (30 mg) |
| Sucralose (14 mg) | NaCl (35 mg) | MgCl$_2$ (17 mg) | CaCl$_2$ (20 mg) |
| | KCl (45 mg) | MgCl$_2$ (17 mg) | CaCl$_2$ (20 mg) |
| | KCl (45 mg) | MgSO$_4$ (22 mg) | CaCl$_2$ (20 mg) |
| | KCl (45 mg) | MgSO$_4$ (22 mg) | Ca$_3$(Citrate)$_2$ (30 mg) |
| | KCl (45 mg) | Mg$_3$(Citrate)$_2$ (27 mg) | Ca$_3$(Citrate)$_2$ (30 mg) |
| Rebaudioside A (30 mg) | NaCl (35 mg) | MgCl$_2$ (17 mg) | CaCl$_2$ (20 mg) |
| | KCl (45 mg) | MgCl$_2$ (17 mg) | CaCl$_2$ (20 mg) |
| | KCl (45 mg) | MgSO$_4$ (22 mg) | CaCl$_2$ (20 mg) |
| | KCl (45 mg) | MgSO$_4$ (22 mg) | Ca$_3$(Citrate)$_2$ (30 mg) |
| | KCl (45 mg) | Mg$_3$(Citrate)$_2$ (27 mg) | Ca$_3$(Citrate)$_2$ (30 mg) |
| Sucrose (4.2 g) | NaCl (35 mg) | MgCl$_2$ (17 mg) | CaCl$_2$ (20 mg) |
| | KCl (45 mg) | MgCl$_2$ (17 mg) | CaCl$_2$ (20 mg) |
| | KCl (45 mg) | MgSO$_4$ (22 mg) | CaCl$_2$ (20 mg) |
| | KCl (45 mg) | MgSO$_4$ (22 mg) | Ca$_3$(Citrate)$_2$ (30 mg) |
| | KCl (45 mg) | Mg$_3$(Citrate)$_2$ (27 mg) | Ca$_3$(Citrate)$_2$ (30 mg) |

* In the table above, the values in parentheses are the amount of the indicated substance per packet.

Example 14. Prospective Flavorings with Modifying Properties Compositions

The present disclosure pertains to flavorings with modifying properties (FMP) compositions comprising one or more sweetening agents as disclosed herein above with a disclosed taste modulator composition. Exemplary, but non-limiting, compositions for representative disclosed FMP compositions are provided herein for the amounts per liter comprising a known FMP agent with a disclosed taste modulator composition in Tables 63-65.

TABLE 63

| Sweetener | Na or K Salt | Mg Salt | Ca Salt |
| --- | --- | --- | --- |
| Glycosylated Steviol Glycoside (175 mg) | NaCl (580 mg) | MgCl$_2$ (610 mg) | CaCl$_2$ (333 mg) |
| | KCl (746 mg) | MgCl$_2$ (610 mg) | CaCl$_2$ (333 mg) |
| | KCl (746 mg) | MgSO$_4$ (361 mg) | CaCl$_2$ (333 mg) |
| | KCl (746 mg) | MgSO$_4$ (361 mg) | Ca$_3$(Citrate)$_2$ (1495 mg) |
| | KCl (746 mg) | Mg$_3$(Citrate)$_2$ (643 mg) | Ca$_3$(Citrate)$_2$ (1495 mg) |
| Luo Han Fruit Concentrate (60 mg) | NaCl (580 mg) | MgCl$_2$ (610 mg) | CaCl$_2$ (333 mg) |
| | KCl (746 mg) | MgCl$_2$ (610 mg) | CaCl$_2$ (333 mg) |
| | KCl (746 mg) | MgSO$_4$ (361 mg) | CaCl$_2$ (333 mg) |
| | KCl (746 mg) | MgSO$_4$ (361 mg) | Ca$_3$(Citrate)$_2$ (1495 mg) |
| | KCl (746 mg) | Mg$_3$(Citrate)$_2$ (643 mg) | Ca$_3$(Citrate)$_2$ (1495 mg) |
| Rebaudioside A (30 mg) | NaCl (580 mg) | MgCl$_2$ (610 mg) | CaCl$_2$ (333 mg) |
| | KCl (746 mg) | MgCl$_2$ (610 mg) | CaCl$_2$ (333 mg) |
| | KCl (746 mg) | MgSO$_4$ (361 mg) | CaCl$_2$ (333 mg) |
| | KCl (746 mg) | MgSO$_4$ (361 mg) | Ca$_3$(Citrate)$_2$ (1495 mg) |
| | KCl (746 mg) | Mg$_3$(Citrate)$_2$ (643 mg) | Ca$_3$(Citrate)$_2$ (1495 mg) |
| Rebaudioside C (250 mg) | NaCl (580 mg) | MgCl$_2$ (610 mg) | CaCl$_2$ (333 mg) |
| | KCl (746 mg) | MgCl$_2$ (610 mg) | CaCl$_2$ (333 mg) |
| | KCl (746 mg) | MgSO$_4$ (361 mg) | CaCl$_2$ (333 mg) |
| | KCl (746 mg) | MgSO$_4$ (361 mg) | Ca$_3$(Citrate)$_2$ (1495 mg) |
| | KCl (746 mg) | Mg$_3$(Citrate)2 (643 mg) | Ca$_3$(Citrate)$_2$ (1495 mg) |

* In the table above, the values in parentheses are the amount of the indicated substance per liter.

TABLE 64

| Sweetener | Na or K Salt | Mg Salt | Ca Salt |
| --- | --- | --- | --- |
| Glycosylated Steviol Glycoside (150 mg) | NaCl (580 mg) | MgCl$_2$ (610 mg) | CaCl$_2$ (333 mg) |
| | KCl (746 mg) | MgCl$_2$ (610 mg) | CaCl$_2$ (333 mg) |
| | KCl (746 mg) | MgSO$_4$ (361 mg) | CaCl$_2$ (333 mg) |
| | KCl (746 mg) | MgSO$_4$ (361 mg) | Ca$_3$(Citrate)$_2$ (1495 mg) |
| | KCl (746 mg) | Mg$_3$(Citrate)$_2$ (643 mg) | Ca$_3$(Citrate)$_2$ (1495 mg) |
| Luo Han Fruit Concentrate (40 mg) | NaCl (580 mg) | MgCl$_2$ (610 mg) | CaCl$_2$ (333 mg) |
| | KCl (746 mg) | MgCl$_2$ (610 mg) | CaCl$_2$ (333 mg) |
| | KCl (746 mg) | MgSO$_4$ (361 mg) | CaCl$_2$ (333 mg) |
| | KCl (746 mg) | MgSO$_4$ (361 mg) | Ca$_3$(Citrate)$_2$ (1495 mg) |
| | KCl (746 mg) | Mg$_3$(Citrate)$_2$ (643 mg) | Ca$_3$(Citrate)$_2$ (1495 mg) |
| Rebaudioside A (20 mg) | NaCl (580 mg) | MgCl$_2$ (610 mg) | CaCl$_2$ (333 mg) |
| | KCl (746 mg) | MgCl$_2$ (610 mg) | CaCl$_2$ (333 mg) |
| | KCl (746 mg) | MgSO$_4$ (361 mg) | CaCl$_2$ (333 mg) |
| | KCl (746 mg) | MgSO$_4$ (361 mg) | Ca$_3$(Citrate)$_2$ (1495 mg) |
| | KCl (746 mg) | Mg$_3$(Citrate)$_2$ (643 mg) | Ca$_3$(Citrate)$_2$ (1495 mg) |
| Rebaudioside C (175 mg) | NaCl (580 mg) | MgCl$_2$ (610 mg) | CaCl$_2$ (333 mg) |
| | KCl (746 mg) | MgCl$_2$ (610 mg) | CaCl$_2$ (333 mg) |
| | KCl (746 mg) | MgSO$_4$ (361 mg) | CaCl$_2$ (333 mg) |
| | KCl (746 mg) | MgSO$_4$ (361 mg) | Ca$_3$(Citrate)$_2$ (1495 mg) |
| | KCl (746 mg) | Mg$_3$(Citrate)$_2$ (643 mg) | Ca$_3$(Citrate)$_2$ (1495 mg) |

* In the table above, the values in parentheses are the amount of the indicated substance per liter.

TABLE 65

| Sweetener | Na or K Salt | Mg Salt | Ca Salt |
| --- | --- | --- | --- |
| Glycosylated Steviol Glycoside (125 mg) | NaCl (580 mg) | MgCl$_2$ (610 mg) | CaCl$_2$ (333 mg) |
| | KCl (746 mg) | MgCl$_2$ (610 mg) | CaCl$_2$ (333 mg) |
| | KCl (746 mg) | MgSO$_4$ (361 mg) | CaCl$_2$ (333 mg) |
| | KCl (746 mg) | MgSO$_4$ (361 mg) | Ca$_3$(Citrate)$_2$ (1495 mg) |
| | KCl (746 mg) | Mg$_3$(Citrate)$_2$ (643 mg) | Ca$_3$(Citrate)$_2$ (1495 mg) |
| Luo Han Fruit Concentrate (20 mg) | NaCl (580 mg) | MgCl$_2$ (610 mg) | CaCl$_2$ (333 mg) |
| | KCl (746 mg) | MgCl$_2$ (610 mg) | CaCl$_2$ (333 mg) |
| | KCl (746 mg) | MgSO$_4$ (361 mg) | CaCl$_2$ (333 mg) |
| | KCl (746 mg) | MgSO$_4$ (361 mg) | Ca$_3$(Citrate)$_2$ (1495 mg) |
| | KCl (746 mg) | Mg$_3$(Citrate)$_2$ (643 mg) | Ca$_3$(Citrate)$_2$ (1495 mg) |
| Rebaudioside A (10 mg) | NaCl (580 mg) | MgCl$_2$ (610 mg) | CaCl$_2$ (333 mg) |
| | KCl (746 mg) | MgCl$_2$ (610 mg) | CaCl$_2$ (333 mg) |
| | KCl (746 mg) | MgSO$_4$ (361 mg) | CaCl$_2$ (333 mg) |
| | KCl (746 mg) | MgSO$_4$ (361 mg) | Ca$_3$(Citrate)$_2$ (1495 mg) |
| | KCl (746 mg) | Mg$_3$(Citrate)$_2$ (643 mg) | Ca$_3$(Citrate)$_2$ (1495 mg) |
| Rebaudioside C (125 mg) | NaCl (580 mg) | MgCl$_2$ (610 mg) | CaCl$_2$ (333 mg) |
| | KCl (746 mg) | MgCl$_2$ (610 mg) | CaCl$_2$ (333 mg) |
| | KCl (746 mg) | MgSO$_4$ (361 mg) | CaCl$_2$ (333 mg) |
| | KCl (746 mg) | MgSO$_4$ (361 mg) | Ca$_3$(Citrate)$_2$ (1495 mg) |
| | KCl (746 mg) | Mg$_3$(Citrate)$_2$ (643 mg) | Ca$_3$(Citrate)$_2$ (1495 mg) |

* In the table above, the values in parentheses are the amount of the indicated substance per liter.

Example 15. Prospective Taste Modulator Compositions

The present disclosure pertains to taste modulator compositions comprising a first salt, a second salt, and a third salt. Exemplary, but non-limiting, compositions for representative taste modulator compositions comprise a first taste modulator component comprising a first salt having a first cation comprising K$^+$ and a first anion comprising chloride (Cl$^-$); a second modulator component comprising a second salt having a second cation comprising Mg$^{2+}$ and a second anion selected from citrate (C$_6$H$_5$O$_7^{-3}$), chloride (Cl$^-$), sulfate (SO$_4^{-2}$), and combinations thereof; and a third modulator component comprising a third salt having a third cation comprising Ca$^{2+}$ and a third anion selected from citrate (C$_6$H$_5$O$_7^{-3}$), chloride (Cl$^-$), and combinations thereof; such that each of the first taste modulator component, second taste modulator component, and third taste modulator component is independently present at a concentration provided in Table 66 below, and combinations thereof.

TABLE 66

| KCl* | MgCl$_2$** | MgSO$_4$† | Mg$_3$(Cit)$_2$†† | CaCl$_2$*** | Ca$_3$(Cit)$_2$‡ |
| --- | --- | --- | --- | --- | --- |
| 746 | 610 | 361 | 643 | 333 | 1495 |
| 821 | 671 | 397 | 707 | 366 | 1645 |
| 895 | 732 | 433 | 772 | 400 | 1794 |
| 970 | 793 | 469 | 836 | 433 | 1944 |
| 1044 | 854 | 505 | 900 | 466 | 2093 |
| 1119 | 915 | 542 | 965 | 500 | 2243 |
| 1194 | 976 | 578 | 1029 | 533 | 2392 |
| 1268 | 1037 | 614 | 1093 | 566 | 2542 |
| 1343 | 1098 | 650 | 1157 | 599 | 2691 |
| 1417 | 1159 | 686 | 1222 | 633 | 2841 |
| 1492 | 1220 | 722 | 1286 | 666 | 2990 |
| 671 | 549 | 325 | 579 | 300 | 1346 |
| 597 | 488 | 289 | 514 | 266 | 1196 |
| 522 | 427 | 253 | 450 | 233 | 1047 |
| 448 | 366 | 217 | 386 | 200 | 897 |

TABLE 66-continued

| KCl* | MgCl₂** | MgSO₄† | Mg₃(Cit)₂†† | CaCl₂*** | Ca₃(Cit)₂‡ |
|---|---|---|---|---|---|
| 373 | 305 | 181 | 322 | 167 | 748 |
| 298 | 244 | 144 | 257 | 133 | 598 |
| 224 | 183 | 108 | 193 | 100 | 449 |
| 149 | 122 | 72 | 129 | 67 | 299 |
| 75 | 61 | 36 | 64 | 33 | 150 |

*In the table above, the amounts given are ppm of KCl.
**In the table above, the amounts given are ppm of MgCl₂•6H₂O.
**In the table above, the amounts given are ppm of CaCl₂.
†In the table above, the amounts given are ppm of magnesium citrate (Mg SO₄•7H₂O).
††In the table above, the amounts given are ppm of magnesium citrate (Mg₃(citrate)₂).
‡In the table above, the amounts given are ppm of calcium citrate (Ca₃(citrate)₂).

The foregoing taste modulator compositions can be used in combination with any of the sweetening agents, flavorings, flavorings with modifying property compositions, tabletop sweeteners, or other products disclosed herein above.

As noted above, certain tables (Tables 4-13 and 59) follow below this section, and before the claims, in full-page format in landscape orientation and rotated 90° counterclockwise to the text preceding and following these tables.

It should be emphasized that the above-described aspects, including the tables herein below, of the present disclosure are merely possible examples of implementations set forth for a clear understanding of the principles of the disclosure. Many variations and modifications may be made to the above-described aspect(s) without departing substantially from the spirit and principles of the disclosure. All such modifications and variations are intended to be included herein within the scope of this disclosure and protected by the following claims.

TABLE 4

Study 2.1: Effect of $Mg^{2+}$ and $Ca^{2+}$ on REBA in Water.

| Examples | pH | [Na⁺] (mM) | [K⁺] (mM) | [Mg²⁺] (mM) | [Ca²⁺] (mM) | [Cl⁻] (mM) | SI | SoI | SaI | BI | B/MF | AI | AT | SL | SD |
|---|---|---|---|---|---|---|---|---|---|---|---|---|---|---|---|
| REBA in Water Control | | | | | | | | | | | | | | | |
| — | 7 | 0 | 0 | 0 | 0 | 0 | 7.9 | 0 | 0 | 0 | 0 | 0 | D | 5.0 | S |
| Effect of Mg²⁺ on REBA in Water | | | | | | | | | | | | | | | |
| 1 | 7 | 0 | 0 | 10 | 0 | 20 | 8.0 | 0 | 0 | 0 | 2.0 | 0.3 | D | 5.0 | N |
| 2 | 7 | 0 | 0 | 30 | 0 | 60 | 8.5 | 0 | 1.5 | 1.5 | 4.1 | 1.7 | R | 3.7 | N |
| 3 | 7 | 0 | 0 | 100 | 0 | 200 | 8.2 | 0 | 2.6 | 3.0 | 6.2 | 3.9 | R | 3.0 | N |
| Effect of Ca²⁺ on REBA in Water | | | | | | | | | | | | | | | |
| 4 | 7 | 0 | 0 | 0 | 10 | 20 | 7.8 | 0 | 0 | 0 | 1.9 | 0.6 | D | 5.0 | N |
| 5 | 7 | 0 | 0 | 0 | 30 | 60 | 8.5 | 0 | 1.5 | 2.3 | 3.8 | 2.1 | R | 3.7 | N |
| 6 | 7 | 0 | 0 | 0 | 100 | 200 | 8.2 | 0 | 2.6 | 3.0 | 6.3 | 4.3 | R | 2.7 | N |

TABLE 5

Study 2.2: Effects of $Mg^{2+}$ and $Ca^{2+}$ on REBA in CA—Na Buffer.

| Examples | pH | [Na⁺] (mM) | [K⁺] (mM) | [Mg²⁺] (mM) | [Ca²⁺] (mM) | [Cl⁻] (mM) | SI | SoI | SaI | BI | B/MF | AI | AT | SL | SD |
|---|---|---|---|---|---|---|---|---|---|---|---|---|---|---|---|
| REBA in Ca—Na Buffer Control | | | | | | | | | | | | | | | |
| | 3.3 | 5.6 | 0 | 0 | 0 | 0 | 8.1 | 4.0 | 0 | 0 | 0.4 | 0.9 | D | 4.9 | S |
| Effect of Mg²⁺ on REBA in Ca—Na Buffer | | | | | | | | | | | | | | | |
| 1 | 3.4 | 5.6 | 0 | 10 | 0 | 20 | 7.9 | 4.1 | 0 | 0 | 1.3 | 0.8 | D | 4.7 | N |
| 2 | 3.3 | 5.6 | 0 | 30 | 0 | 60 | 7.7 | 4.2 | 2.2 | 0 | 2.1 | 1.4 | R | 2.0 | N |
| 3 | 3.2 | 5.6 | 0 | 100 | 0 | 200 | 7.5 | 3.8 | 3.9 | 4.1 | 4.8 | 3.9 | R | 2.7 | N |
| Effect of Ca²⁺ on REBA in Ca—Na Buffer | | | | | | | | | | | | | | | |
| 4 | 3.19 | 5.6 | 0 | 0 | 10 | 20 | 7.6 | 4.0 | 0 | 0 | 1.2 | 0.3 | D | 4.9 | N |
| 5 | 3.18 | 5.6 | 0 | 0 | 30 | 60 | 7.4 | 3.8 | 1.9 | 0 | 2.4 | 2.1 | R | 4.3 | N |
| 6 | 3.07 | 5.6 | 0 | 0 | 100 | 200 | 7.4 | 3.5 | 3.8 | 4.0 | 4.0 | 3.7 | R | 1.3 | N |

TABLE 6

Study 2.3: Effects of $Mg^{2+}$ and $Ca^{2+}$ on REBA in Phosphoric Acid.

| Examples | pH | [Na⁺] (mM) | [K⁺] (mM) | [Mg²⁺] (mM) | [Ca²⁺] (mM) | [Cl⁻] (mM) | SI | SoI | SaI | BI | B/MF | AI | AT | SL | SD |
|---|---|---|---|---|---|---|---|---|---|---|---|---|---|---|---|
| REBA in Phosphoric Acid Control | | | | | | | | | | | | | | | |
| | 2.45 | 0 | 0 | 0 | 0 | 0 | 8.2 | 3.5 | 0 | 0 | 0.3 | 3.0 | D | 4.9 | S |
| Effect of Mg²⁺ on REBA in Phosphoric Acid | | | | | | | | | | | | | | | |
| 1 | 2.44 | 0 | 0 | 10 | 0 | 20 | 8.0 | 3.1 | 1.3 | 0 | 0.7 | 1.8 | D | 4.7 | N |
| 2 | 2.41 | 0 | 0 | 30 | 0 | 60 | 7.8 | 2.9 | 1.8 | 0 | 2.3 | 2.9 | R | 3.7 | N |

TABLE 6-continued

Study 2.3: Effects of $Mg^{2+}$ and $Ca^{2+}$ on REBA in Phosphoric Acid.

| Examples | pH | [Na$^+$] (mM) | [K$^+$] (mM) | [Mg$^{2+}$] (mM) | [Ca$^{2+}$] (mM) | [Cl$^-$] (mM) | SI | SoI | SaI | BI | B/MF | AI | AT | SL | SD |
|---|---|---|---|---|---|---|---|---|---|---|---|---|---|---|---|
| 3 | 2.49 | 0 | 0 | 100 | 0 | 200 | 7.1 | 2.0 | 3.7 | 3.8 | 4.6 | 5.1 | R | 3.0 | N |
| Effect of Ca$^{2+}$ on REBA in Phosphoric Acid | | | | | | | | | | | | | | | |
| 4 | 2.56 | 0 | 0 | 0 | 10 | 20 | 7.9 | 2.9 | 0 | 0 | 0.5 | 2.1 | D | 4.8 | N |
| 5 | 2.57 | 0 | 0 | 0 | 30 | 60 | 7.6 | 2.7 | 1.8 | 2.2 | 1.9 | 3.5 | R | 4.0 | N |
| 6 | 2.44 | 0 | 0 | 0 | 100 | 200 | 7.3 | 2.6 | 4.4 | 4.1 | 4.2 | 4.1 | R | 1.7 | N |

TABLE 7

Study 3.1: Effects of K$^+$, Mg$^{2+}$ and Ca$^{2+}$ on REBA in CA—Na Buffer.

| Examples | pH | [Na$^+$] (mM) | [K$^+$] (mM) | [Mg$^{2+}$] (mM) | [Ca$^{2+}$] (mM) | [Cl$^-$] (mM) | SI | SoI | SaI | BI | B/MF | AI | AT | SL | SD |
|---|---|---|---|---|---|---|---|---|---|---|---|---|---|---|---|
|   | 3.1 | 6.0 | 0 | 0 | 0 | 0 | 8.1 | 4.0 | 0 | 0 | 0.1 | 2.1 | D | 4.9 | M |
| 1 | 3.1 | 6.0 | 5.4 | 0 | 0 | 5.4 | 8.2 | 4.0 | 0 | 0 | 0.7 | 1.3 | D | 4.7 | N |
| 2 | 3.1 | 6.0 | 10.7 | 0 | 0 | 10.7 | 8.3 | 4.0 | 0 | 0 | 1.3 | 2.0 | R | 4.5 | N |
| 3 | 3.1 | 6.0 | 0 | 5.9 | 0 | 11.8 | 7.9 | 4.0 | 0 | 0 | 0.6 | 1.0 | D | 4.8 | N |
| 4 | 3.1 | 6.0 | 0 | 11.8 | 0 | 23.6 | 8.1 | 4.0 | 0 | 0 | 1.1 | 1.2 | R | 4.9 | N |
| 5 | 3.1 | 6.0 | 0 | 0 | 5.9 | 11.8 | 8.0 | 4.0 | 0 | 0 | 0.4 | 0.8 | D | 4.8 | N |
| 6 | 3.1 | 6.0 | 0 | 0 | 11.8 | 23.6 | 7.9 | 4.0 | 0 | 0 | 0.8 | 1.3 | R | 4.7 | N |

TABLE 8

Study 3.2: Effects of K$^+$, Mg$^{2+}$ and Ca$^{2+}$ on REBA in CA—Na Buffer.

| Examples | pH | [Na$^+$] (mM) | [K$^+$] (mM) | [Mg$^{2+}$] (mM) | [Ca$^{2+}$] (mM) | [Cl$^-$] (mM) | SI | SoI | SaI | BI | B/MF | AI | AT | SL | SD |
|---|---|---|---|---|---|---|---|---|---|---|---|---|---|---|---|
| REBA in CA—Na Buffer Control | | | | | | | | | | | | | | | |
|   | 3.1 | 6.0 | 0 | 0 | 0 | 0 | 8.4 | 4.0 | 0 | 0 | 0.1 | 1.9 | D | 5.0 | M |
| Effect of K$^+$ in CA—Na Buffer | | | | | | | | | | | | | | | |
| 1 | 3.1 | 6.0 | 20 | 0 | 0 | 20 | 8.2 | 4.0 | 1.2 | 0 | 2.7 | 1.7 | D | 3.9 | N |
| Effect of Mg$^{2+}$ in CA—Na Buffer | | | | | | | | | | | | | | | |
| 2 | 3.1 | 6.0 | 0 | 20 | 0 | 40 | 8.3 | 4.0 | 1.9 | 0 | 3.4 | 2.4 | D | 3.7 | N |
| Effect of Ca$^{2+}$ in CA—Na Buffer | | | | | | | | | | | | | | | |
| 3 | 3.1 | 6.0 | 0 | 0 | 20 | 40 | 8.1 | 4.0 | 1.5 | 0 | 3.1 | 2.7 | D | 3.8 | N |

TABLE 9

Study 3.3: Effects of K$^+$, Mg$^{2+}$ and Ca$^{2+}$ on REBA in CA—Na Buffer.

| Examples | pH | [Na$^+$] (mM) | [K$^+$] (mM) | [Mg$^{2+}$] (mM) | [Ca$^{2+}$] (mM) | [Cl$^-$] (mM) | SI | SoI | SaI | BI | B/MF | AI | AT | SL | SD |
|---|---|---|---|---|---|---|---|---|---|---|---|---|---|---|---|
| REBA in CA—Na Buffer Control | | | | | | | | | | | | | | | |
|   | 3.1 | 6.0 | 0 | 0 | 0 | 0 | 8.1 | 4.0 | 0 | 0 | 0.2 | 2.1 | D | 5.0 | M |
| Effect of K$^+$ in CA—Na Buffer | | | | | | | | | | | | | | | |
| 1 | 3.1 | 6.0 | 30 | 0 | 0 | 30 | 8.2 | 4.0 | 2.4 | 0 | 3.4 | 2.5 | R | 3.3 | N |
| Effect of Mg$^{2+}$ in CA—Na Buffer | | | | | | | | | | | | | | | |
| 2 | 3.1 | 6.0 | 0 | 30 | 0 | 60 | 7.9 | 4.0 | 2.0 | 0 | 3.7 | 3.4 | R | 3.7 | N |
| Effect of Ca$^{2+}$ in CA—Na Buffer | | | | | | | | | | | | | | | |
| 3 | 3.1 | 6.0 | 0 | 0 | 30 | 60 | 8.0 | 4.0 | 2.5 | 0 | 3.2 | 3.8 | R | 3.0 | N |

TABLE 10

Study 4.1: Effects of $Na^+/K^+/Mg^{2+}/Ca^{2+}$ Blends on REBA in CA—Na Buffer.

| Examples | pH | [Na$^+$] (mM) | [K$^+$] (mM) | [Mg$^{2+}$] (mM) | [Ca$^{2+}$] (mM) | [Cl$^-$] (mM) | SI | SoI | SaI | BI | B/MF | AI | AT | SL | SD |
|---|---|---|---|---|---|---|---|---|---|---|---|---|---|---|---|
| REBA in CA-Na Buffer Control | | | | | | | | | | | | | | | |
|   | 3.1 | 6.0 | 0 | 0 | 0 | 0 | 8.0 | 4.0 | 0 | 0 | 0.2 | 1.8 | D | 5.0 | M |
| Effect of $Na^+/K^+/Mg^{2+}/Ca^{2+}$ Blend A in CA—Na Buffer | | | | | | | | | | | | | | | |
| 1 | 3.1 | 6.0 | 12 | 1.7 | 3.2 | 21.8 | 8.4 | 4.0 | 0 | 0 | 8.4 | 1.5 | R | 2.3 | N |
| Effect of $Na^+/K^+/Mg^{2+}/Ca^{2+}$ Blend B in CA—Na Buffer | | | | | | | | | | | | | | | |
| 2 | 3.1 | 6.0 | 24 | 3.4 | 6.4 | 43.6 | 8.1 | 4.0 | 2.0 | 0 | 8.7 | 1.7 | R | 2.5 | N |
| Effect of $Na^+/K^+/Mg^{2+}/Ca^{2+}$ Blend C in CA—Na Buffer | | | | | | | | | | | | | | | |
| 3 | 3.1 | 6.0 | 36 | 5.1 | 9.6 | 65.4 | 7.9 | 4.0 | 2.5 | 0 | 9.0 | 1.9 | R | 2.9 | N |

TABLE 11

Study 4.2: Effects of $K^+/Mg^{2+}/Ca^{2+}$ Blend on REBA in CA—K Buffer

| Examples | pH | [Na$^+$] (mM) | [K$^+$] (mM) | [Mg$^{2+}$] (mM) | [Ca$^{2+}$] (mM) | [Cl$^-$] (mM) | SI | SoI | SaI | BI | B/MF | AI | AT | SL | SD |
|---|---|---|---|---|---|---|---|---|---|---|---|---|---|---|---|
| REBA in CA—Na Buffer Control | | | | | | | | | | | | | | | |
|   | 3.1 | 0 | 6 | 0 | 0 | 0 | 8.1 | 4.0 | 0 | 0 | 0.3 | 1.5 | D | 5.0 | M |
| Effect of $K^+/Mg^{2+}/Ca^{2+}$ Blend in CA—K Buffer | | | | | | | | | | | | | | | |
| 1 | 3.1 | 0 | 10.7 | 5.4 | 3.1 | 18.6 | 8.4 | 4.0 | 0 | 0 | 8.1 | 1.4 | R | 3.0 | N |

TABLE 12

Study 4.3: Effects of $K^+/Mg^{2+}/Ca^{2+}$ Blend on REBA in Lemonade.

| Examples | pH | [Na$^+$] (mM) | [K$^+$] (mM) | [Mg$^{2+}$] (mM) | [Ca$^{2+}$] (mM) | [Cl$^-$] (mM) | SI | SoI | SaI | BI | B/MF | AI | AT | SL | SD |
|---|---|---|---|---|---|---|---|---|---|---|---|---|---|---|---|
|   | 3.1 | 0 | 0 | 0 | 0 | 0 | 8.0 | 4.5 | 0 | 0 | 0.6 | 2.1 | D | 5.0 | M |
| 1 | 3.1 | 0 | 12 | 3.4 | 6.4 | 31.6 | 8.7 | 4.6 | 0 | 0 | 9.3 | 2.4 | R | 3.7 | N |

TABLE 13

Study 4.4: Effects of a $Na^+$, $K^+/Mg^{2+}/Ca^{2+}$ Blend on a 400 mg/L REBA - 175 mg/L GSG Blend in Lemon-Lime Flavored CA—Na Buffer.

| Examples | pH | [Na$^+$] (mM) | [K$^+$] (mM) | [Mg$^{2+}$] (mM) | [Ca$^{2+}$] (mM) | [Cl$^-$] (mM) | SI | SoI | SaI | BI | B/MF | AI | AT | SL | SD |
|---|---|---|---|---|---|---|---|---|---|---|---|---|---|---|---|
| REBA/GSG Blend in Lemon-Lime Flavored CA—Na Buffer Control | | | | | | | | | | | | | | | |
|   | 3.1 | 6 | 0 | 0 | 0 | 0 | 9.1 | 3.9 | 0 | 0 | 0.6 | 2.1 | D | 5.0 | M |
| 500 mg/L REBD in Lemon-Lime Flavored CA—Na Buffer Control | | | | | | | | | | | | | | | |
| 1 | 3.1 | 6 | 0 | 0 | 0 | 0 | 9.7 | 4.0 | 0 | 0 | 0.8 | 2.4 | D | 3.7 | M |
| Effect of $Na^+/K^+/Mg^{2+}/Ca^{2+}$ Blend in Lemon-Lime Flavored CA—Na Buffer | | | | | | | | | | | | | | | |
| 1 | 3.1 | 6 | 12 | 3.4 | 6.4 | 31.6 | 10.0 | 4. | 0 | 0 | 9.3 | 2.4 | R | 2.3 | N |

TABLE 59

Prospective Test Formulations.*

| Study | [NaCit] (mM) | [NaCl] (mM) | [KCit] (mM) | [KCl] (mM) | [MgCit] (mM) | [MgCl$_2$] (mM) | [CaCit] (mM) | [CaCl$_2$] (mM) | Total** [Na$^+$] (mM) | Total** [K$^+$] (mM) | Total** [Mg$^{2+}$] (mM) | Total** [Ca$^{2+}$] (mM) | Total** [Cl$^-$] (mM) |
|---|---|---|---|---|---|---|---|---|---|---|---|---|---|
| 11.1 | 0.00 | 0.00 | | | | | | | 0.0 | | | | 0.0 |
|   | 1.00 | 7.00 | | | | | | | 10.0 | | | | 7.0 |
|   | 1.00 | 17.00 | | | | | | | 20.0 | | | | 17.0 |
|   | 1.00 | 27.00 | | | | | | | 30.0 | | | | 27.0 |

TABLE 59-continued

Prospective Test Formulations.*

| Study | [NaCit] (mM) | [NaCl] (mM) | [KCit] (mM) | [KCl] (mM) | [MgCit] (mM) | [MgCl$_2$] (mM) | [CaCit] (mM) | [CaCl$_2$] (mM) | Total** [Na$^+$] (mM) | Total** [K$^+$] (mM) | Total** [Mg$^{2+}$] (mM) | Total** [Ca$^{2+}$] (mM) | Total** [Cl$^-$] (mM) |
|---|---|---|---|---|---|---|---|---|---|---|---|---|---|
| 11.2 | | | 0.00 | 0.00 | | | | | | 0.0 | | | 0.0 |
| | | | 1.00 | 7.00 | | | | | | 10.0 | | | 7.0 |
| | | | 1.00 | 17.00 | | | | | | 20.0 | | | 17.0 |
| | | | 1.00 | 27.00 | | | | | | 30.0 | | | 27.0 |
| 11.3 | | | | | 0.00 | 0.00 | | | | | 0.0 | | 0.0 |
| | | | | | 0.50 | 8.50 | | | | | 10.0 | | 17.0 |
| | | | | | 0.50 | 18.50 | | | | | 20.0 | | 37.0 |
| | | | | | 0.50 | 28.50 | | | | | 30.0 | | 57.0 |
| 11.4 | | | | | | | 0.00 | 0.00 | | | | 0.0 | 0.0 |
| | | | | | | | 0.50 | 8.50 | | | | 10.0 | 17.0 |
| | | | | | | | 0.50 | 18.50 | | | | 20.0 | 37.0 |
| | | | | | | | 0.50 | 28.50 | | | | 30.0 | 57.0 |
| 11.5 | 0.00 | 0 | 0.00 | 0 | | | | | 0.0 | 0.0 | | | 0.0 |
| | 0.50 | 3.5 | 0.50 | 3.5 | | | | | 5.0 | 5.0 | | | 7.0 |
| | 0.50 | 8.5 | 0.50 | 8.5 | | | | | 10.0 | 10.0 | | | 17.0 |
| | 0.50 | 13.5 | 0.50 | 13.5 | | | | | 15.0 | 15.0 | | | 27.0 |
| 11.6 | 0.00 | 0 | | | 0 | 0 | | | 0.0 | | 0.0 | | 0.0 |
| | 0.50 | 3.5 | | | 0.25 | 4.25 | | | 5.0 | | 5.0 | | 12.0 |
| | 0.50 | 8.5 | | | 0.25 | 9.25 | | | 10.0 | | 10.0 | | 27.0 |
| | 0.50 | 13.5 | | | 0.25 | 14.25 | | | 15.0 | | 15.0 | | 42.0 |
| 11.7 | 0.00 | 0 | | | | | 0 | 0 | 0.0 | | | 0.0 | 0.0 |
| | 0.50 | 3.5 | | | | | 0.25 | 4.25 | 5.0 | | | 5.0 | 12.0 |
| | 0.50 | 8.5 | | | | | 0.25 | 9.25 | 10.0 | | | 10.0 | 27.0 |
| | 0.50 | 13.5 | | | | | 0.25 | 14.25 | 15.0 | | | 15.0 | 42.0 |
| 11.8 | | | 0.00 | 0 | 0 | 0 | | | | 0.0 | 0.0 | | 0.0 |
| | | | 0.50 | 3.5 | 0.25 | 4.25 | | | | 5.0 | 5.0 | | 12.0 |
| | | | 0.50 | 8.5 | 0.25 | 9.25 | | | | 10.0 | 10.0 | | 27.0 |
| | | | 0.50 | 13.5 | 0.25 | 14.25 | | | | 15.0 | 15.0 | | 42.0 |
| 11.9 | | | 0.00 | 0 | | | 0 | 0 | | 0.0 | | 0.0 | 0.0 |
| | | | 0.50 | 3.5 | | | 0.25 | 4.25 | | 5.0 | | 5.0 | 12.0 |
| | | | 0.50 | 8.5 | | | 0.25 | 9.25 | | 10.0 | | 10.0 | 27.0 |
| | | | 0.50 | 13.5 | | | 0.25 | 14.25 | | 15.0 | | 15.0 | 42.0 |
| 11.10 | | | | | 0 | 0 | 0 | 0 | | | 0.0 | 0.0 | 0.0 |
| | | | | | 0.25 | 4.25 | 0.25 | 4.25 | | | 5.0 | 5.0 | 17.0 |
| | | | | | 0.25 | 9.25 | 0.25 | 9.25 | | | 10.0 | 10.0 | 37.0 |
| | | | | | 0.25 | 14.25 | 0.25 | 14.25 | | | 15.0 | 15.0 | 57.0 |
| 11.11 | 0 | 0 | 0 | 0 | 0 | 0 | | | 0.0 | 0.0 | 0.0 | | 0.0 |
| | 0.33 | 2.33 | 0.33 | 2.33 | 0.17 | 2.82 | | | 3.3 | 3.3 | 3.3 | | 10.3 |
| | 0.33 | 5.67 | 0.33 | 5.67 | 0.17 | 6.16 | | | 6.7 | 6.7 | 6.7 | | 23.7 |
| | 0.33 | 9 | 0.33 | 9 | 0.17 | 9.49 | | | 10.0 | 10.0 | 10.0 | | 37.0 |
| 11.12 | 0 | 0 | 0 | 0 | | | 0 | 0 | 0.0 | 0.0 | | 0.0 | 0.0 |
| | 0.33 | 2.33 | 0.33 | 2.33 | | | 0.17 | 2.82 | 3.3 | 3.3 | | 3.3 | 10.3 |
| | 0.33 | 5.67 | 0.33 | 5.67 | | | 0.17 | 6.16 | 6.7 | 6.7 | | 6.7 | 23.7 |
| | 0.33 | 9 | 0.33 | 9 | | | 0.17 | 9.49 | 10.0 | 10.0 | | 10.0 | 37.0 |
| 11.13 | | | 0 | 0 | 0 | 0 | 0 | 0 | | 0.0 | 0.0 | 0.0 | 0.0 |
| | | | 0.33 | 2.33 | 0.17 | 2.82 | 0.17 | 2.82 | | 3.3 | 3 | 3.3 | 13.6 |
| | | | 0.33 | 5.67 | 0.17 | 6.16 | 0.17 | 6.16 | | 6.7 | 6.7 | 6.7 | 30.3 |
| | | | 0.33 | 9 | 0.17 | 9.49 | 0.17 | 9.49 | | 10.0 | 10.0 | 10.0 | 47.0 |
| 11.14 | 0 | 0 | 0 | 0 | 0 | 0 | 0 | 0 | 0.0 | 0.0 | 0.0 | 0.0 | 0.0 |
| | 0.25 | 1.75 | 0.25 | 1.75 | 0.125 | 2.125 | 0.125 | 2.125 | 2.5 | 2.5 | 2.5 | 2.5 | 12.0 |
| | 0.25 | 4.25 | 0.25 | 4.25 | 0.125 | 4.625 | 0.125 | 4.625 | 5.0 | 5.0 | 5.0 | 5.0 | 27.0 |
| | 0.25 | 6.75 | 0.25 | 6.75 | 0.125 | 7.125 | 0.125 | 7.125 | 7.5 | 7.5 | 7.5 | 7.5 | 42.0 |

*The following abbreviations are used in the table headers above: [NaCit] indicates concentration of Na$_3$(C$_6$H$_5$O$_7$); [KCit] indicates concentration of K$_3$(C$_6$H$_5$O$_7$); [MgCit] indicates concentration of Mg$_3$(C$_6$H$_5$O$_7$)$_2$; and [CaCit] indicates concentration of Ca$_3$(C$_6$H$_5$O$_7$)$_2$.
**Total [Na$^+$], [H$^+$], [Mg$^{2+}$], [Ca$^{2+}$], and [Cl$^-$] represent total concentration of the given ion from all sources based on the salts shown in the table.

What is claimed:

1. A beverage composition comprising:
   a sweetening agent selected from at least one non-caloric sweetener, at least one caloric sweetener, and combinations thereof; and
   a taste modulator composition consisting essentially of
      a first taste modulator component consisting essentially of a first salt having a first cation Mg$^{2+}$ and a first anion;
      a second modulator component consisting essentially of a second salt having a second cation Ca$^{2+}$ and a second anion; and optionally
      a third modulator component consisting essentially of a third salt having a first cation K$^+$ and a third anion;
   wherein the first taste modulator component is at a concentration of from about 0.1 mM to about 10 mM;
   wherein the second taste modulator component is at a concentration of from about 0.1 mM to about 10 mM;
   wherein the third taste modulator component, when present, is at a concentration of from about 0.1 mM to about 25 mM;
   wherein the at least one non-caloric sweetening agent is present in an amount of from about 0.1 mg/L to about 1000 mg/L; and
   wherein the at least one caloric sweetening agent is present in an amount of from about 1 wt % to about 15 wt %.

2. The beverage composition of claim 1, wherein the first taste modulator component is at a concentration of from about 1 mM to about 10 mM; and wherein the second taste modulator component is at a concentration of from about 1 mM to about 10 mM.

3. The beverage composition of claim 1, wherein the first taste modulator component is at a concentration of from about 1 mM to about 5 mM; and wherein the second taste modulator component is at a concentration of from about 1 mM to about 5 mM.

4. The beverage composition of claim 1, wherein the first anion is selected from citrate, chloride, phosphate, carbonate, sulfate, and combinations thereof.

5. The beverage composition of claim 4, wherein the first anion is selected from citrate, sulfate, chloride, and combinations thereof.

6. The beverage composition of claim 1, wherein the second anion is selected from citrate, chloride, phosphate, carbonate, sulfate, and combinations thereof.

7. The beverage composition of claim 6, wherein the second anion is selected from citrate, sulfate, chloride, and combinations thereof.

8. The beverage composition of claim 1, wherein the third taste modulator component is at a concentration of from about 1 mM to about 25 mM.

9. The beverage composition of claim 8, wherein the third taste modulator component is at a concentration of from about 1 mM to about 15 mM.

10. The beverage composition of claim 8, wherein the third taste modulator component is at a concentration of from about 5 mM to about 15.

11. The beverage composition of claim 1, wherein the third anion is selected from citrate, chloride, phosphate, carbonate, sulfate, and combinations thereof.

12. The beverage composition of claim 1, wherein the third anion is selected from citrate, sulfate, chloride, and combinations thereof.

13. The beverage composition of claim 1, wherein the concentration of the first taste modulator component is from about 0.1 mM to about 5 mM; wherein the concentration of the second taste modulator component is from about 0.1 mM to about 5 mM; and where the concentration of the third taste modulator component is from about 0.1 mM to about 25 mM.

14. The beverage composition of claim 1, wherein the sweetening agent is selected from a natural HP sweetener, a synthetic HP sweetener, a carbohydrate/polyol sweetener, and combinations thereof.

15. The beverage composition of claim 14, wherein the carbohydrate/polyol sweetener is selected from sucrose, glucose, maltose, fructose, lactose, xylitol, sorbitol, erythritol, glycerol, propylene glycol, allulose, and combinations thereof.

16. The beverage composition of claim 14, wherein the sweetening agent comprises a first sweetening agent comprising a carbohydrate/polyol sweetener; and wherein the sweetening agent comprises a second sweetening agent selected from a natural HP sweetener, a synthetic HP sweetener, a carbohydrate/polyol sweetener, and combinations thereof.

17. The beverage composition of claim 14, wherein the natural HP sweetener is selected from a stevia sweetener, a monk fruit sweetener, a protein sweetener, and combinations thereof.

18. The beverage composition of claim 17, wherein the stevia sweetener is selected from rebaudioside A, rebaudioside B, rebaudioside C, rebaudioside D, rebaudioside E, rebaudioside F, rebaudioside M, rubusoside, stevioside, and combinations thereof.

19. The beverage composition of claim 18, further comprising one or more glucosylated steviol glycosides.

20. The beverage composition of claim 18, wherein the *stevia* sweetener is selected from rebaudioside A, rebaudioside D, rebaudioside M, and a combination thereof.

21. The beverage composition of claim 20, wherein the rebaudioside A is present in an amount of from about 50 mg/L to about 1000 mg/L; wherein the rebaudioside D is present in an amount of from about 50 mg/L to about 1000 mg/L; wherein the rebaudioside M is present in an amount of from about 50 mg/L to about 1000 mg/L; or a combination thereof.

22. The beverage composition of claim 14, wherein the synthetic HP sweetener is selected from neotame; advantame; aspartame; sucralose; a mixture of aspartame and acesulfame, or a food grade salt thereof; a mixture of aspartame and saccharin, or a food grade salt thereof; a mixture of aspartame and cyclamic acid, or a food grade salt thereof; a mixture of sucralose and saccharin, or a food grade salt thereof; a mixture of sucralose and acesulfame, or a food grade salt thereof; and combinations thereof.

23. The beverage composition of claim 22, wherein the synthetic HP sweetener is neotame; and wherein the neotame is present in an amount of from about 1 mg/L to about 10 mg/L.

24. The beverage composition of claim 1, wherein the pH of the beverage composition is from about pH 2.5 to about pH 7.

* * * * *